United States Patent
O'Hare et al.

(10) Patent No.: US 9,275,071 B2
(45) Date of Patent: Mar. 1, 2016

(54) SYSTEMS AND METHODS FOR SECURE REMOTE STORAGE

(75) Inventors: Mark S. O'Hare, Coto De Caza, CA (US); Rick L. Orsini, Flower Mound, TX (US); Don Martin, Chesterfield, VA (US)

(73) Assignee: Security First Corp., Rancho Santa Margarita, CA (US)

( * ) Notice: Subject to any disclaimer, the term of this patent is extended or adjusted under 35 U.S.C. 154(b) by 940 days.

(21) Appl. No.: 13/209,167

(22) Filed: Aug. 12, 2011

(65) Prior Publication Data

US 2012/0166576 A1 Jun. 28, 2012

Related U.S. Application Data

(60) Provisional application No. 61/373,187, filed on Aug. 12, 2010.

(51) Int. Cl.
*G06F 15/16* (2006.01)
*G06F 17/30* (2006.01)
*G06F 9/38* (2006.01)
(Continued)

(52) U.S. Cl.
CPC ........ *G06F 17/30212* (2013.01); *G06F 9/3834* (2013.01); *G06F 9/3863* (2013.01); *G06F 11/1469* (2013.01); *G06F 11/1471* (2013.01); *H04L 67/1095* (2013.01); *H04L 67/1097* (2013.01)

(58) Field of Classification Search
CPC ............ H04L 67/1095; H04L 67/1097; G06F 12/0815; G06F 9/3863; G06F 11/1461; G06F 9/3834; G06F 11/1469
USPC .................................................. 709/217–219
See application file for complete search history.

(56) References Cited

U.S. PATENT DOCUMENTS

| 5,966,444 A | 10/1999 | Yuan et al. |
| 6,073,209 A * | 6/2000 | Bergsten ...................... 711/114 |
| 6,363,481 B1 | 3/2002 | Hardjono |

(Continued)

FOREIGN PATENT DOCUMENTS

| JP | 2005-250866 | 9/2005 |
| JP | 2008-098894 | 4/2008 |

(Continued)

OTHER PUBLICATIONS

Aaron Weiss/ Computing in the Clouds/ Dec. 12, 2005/ pp. 17-25.
(Continued)

*Primary Examiner* — Chirag R Patel
(74) *Attorney, Agent, or Firm* — Ropes & Gray LLP

(57) ABSTRACT

Systems and methods are provided for transmitting data to at least one storage system. A request is received to store a data set in a storage location. In response, a first plurality of shares is generated, each containing a distribution of data from the data set, and at least one share is stored in a local memory configured for backup in at least one remote storage system. At least one share is transmitted to the at least one remote storage system. Systems and methods are also provided for improving data availability. In response to a restoration event, if insufficient shares of data are available to reconstruct a data set, a read instruction in a journaling message is transmitted to a remote storage system requesting an additional share. The additional share is received and stored in a local storage, and the data set is reconstructed.

18 Claims, 70 Drawing Sheets

(51) Int. Cl.
*G06F 11/14* (2006.01)
*H04L 29/08* (2006.01)

(56) References Cited

U.S. PATENT DOCUMENTS

| | | | |
|---|---|---|---|
| 6,415,373 | B1 | 7/2002 | Peters et al. |
| 6,711,594 | B2 | 3/2004 | Yano et al. |
| 6,957,349 | B1 | 10/2005 | Yasukura |
| 7,206,250 | B2 | 4/2007 | Groux |
| 7,523,278 | B2 * | 4/2009 | Thompson et al. ........... 711/162 |
| 7,573,851 | B2 | 8/2009 | Xing et al. |
| 7,616,766 | B2 | 11/2009 | Ogihara et al. |
| 7,694,298 | B2 | 4/2010 | Goud et al. |
| 7,779,128 | B2 | 8/2010 | Utard et al. |
| 7,823,009 | B1 | 10/2010 | Tormasov et al. |
| 7,882,200 | B2 * | 2/2011 | Sturrock et al. ............. 709/217 |
| 7,897,262 | B1 | 3/2011 | Chambers |
| 8,009,830 | B2 | 8/2011 | Orsini et al. |
| 8,040,850 | B2 | 10/2011 | Soliman |
| 8,069,153 | B2 | 11/2011 | Chan et al. |
| 8,151,333 | B2 | 4/2012 | Zhu et al. |
| 8,266,438 | B2 | 9/2012 | Orsini et al. |
| 8,321,688 | B2 | 11/2012 | Auradkar et al. |
| 8,347,184 | B2 | 1/2013 | Liu |
| 8,370,307 | B2 | 2/2013 | Wolfe |
| 8,397,084 | B2 | 3/2013 | Ranade |
| 8,407,190 | B2 | 3/2013 | Prahlad et al. |
| 8,560,639 | B2 | 10/2013 | Murphy et al. |
| 8,677,086 | B2 * | 3/2014 | Sardella et al. ............... 711/162 |
| 8,712,966 | B1 * | 4/2014 | Armorer et al. ............. 707/645 |
| 8,769,269 | B2 | 7/2014 | Anglin et al. |
| 8,826,013 | B1 | 9/2014 | Kodukula et al. |
| 8,886,705 | B1 * | 11/2014 | Tewari et al. ................. 709/203 |
| 2002/0180798 | A1 * | 12/2002 | Poor et al. ..................... 345/781 |
| 2005/0055579 | A1 | 3/2005 | Kanda et al. |
| 2006/0177061 | A1 | 8/2006 | Orsini et al. |
| 2007/0177739 | A1 * | 8/2007 | Ganguly et al. ............. 380/277 |
| 2008/0043614 | A1 | 2/2008 | Soliman |
| 2008/0082670 | A1 | 4/2008 | Gounares et al. |
| 2009/0198702 | A1 * | 8/2009 | Novik et al. ................... 707/10 |
| 2010/0125473 | A1 | 5/2010 | Tung et al. |
| 2010/0131755 | A1 | 5/2010 | Zhu et al. |
| 2010/0299313 | A1 | 11/2010 | Orsini et al. |
| 2010/0318812 | A1 | 12/2010 | Auradkar et al. |
| 2012/0047339 | A1 | 2/2012 | Decasper et al. |
| 2012/0166576 | A1 | 6/2012 | Orsini et al. |
| 2012/0166818 | A1 | 6/2012 | Orsini et al. |
| 2012/0331088 | A1 | 12/2012 | O'Hare et al. |

FOREIGN PATENT DOCUMENTS

| | | |
|---|---|---|
| WO | WO-2010/057181 | 5/2010 |
| WO | WO-2010/057181 A2 | 5/2010 |

OTHER PUBLICATIONS

Ertaul et al., "ECC Based Threshold Cryptography for Secure Data Forwarding and Secure Key Exchange in MANET (I)", Networking 2005. Networking Technologies, Services and Protocols; Performance of Computer and Communication Networks; Mobile and Wireless Communications Systems; vol. 3462/2005, (12 pp. 102-113).

Wakaha Ogata et al: "Fault Tolerant Anonymous Channel", Information and Communications SecurityFirst International Conference, ICIS '97 Beijing, China, Nov. 11-14, 1997 Proceedings,vol. 1334/1997, Jan. 1, 1997, pp. 440-444, XP55011055, DOI: 10.1007/BFb0028500 ISBN: 978-3-54-063696-0 the whole document.

International Search Report dated Feb. 10, 2012, International Application No. PCT/US2011/047642.

International Search Report and Written Opinion dated Dec. 14, 2010 in International Application No. PCT/US2010/035377 (0012-WO1).

International Search Report and Written Opinion dated Nov. 11, 2011, International Application No. PCT/US2011/47469 (SFC-29 PCT).

Koc "Access Control in Peer-to-Peer Storage Systems", Oct. 1, 2006, SP55036196, Retrieved from the Internet: URL:ftp://ft;.tik.ee.ethz.ch/pub/students/2006-So/NA-2006-10.pdf [retrieved on Aug. 23, 2012] pp. 61 and 62.

International Search Report and Written Opinion dated Sep. 4, 2012, International Application No. PCT/US2012/040480 (SFC-25 PCT).

"BizCITY, Cloud Computing Scheme That Shapes the Next-Generation BizCITY," NTT Technical Review, Japan, The Telecommunications Association, Feb. 1, 2009, vol. 21, No. 2, pp. 32-35. (English language translation attached.).

Mitchell, "Making Serial Number Based Authentication Robust Against Loss of State," Operating Systems Review, vol. 34, No. 3, pp. 56-59, Nov. 24, 1999.

Nozawa, "Power Line Communication Rapidly Gaining Practicality, No Obstacle for 3 Mega Service, Further Speed-Up Due to Easing of Regulations," ("kyuusokuni genjitsusei wo obiru denryokusentuushin 3 megano sabisu ni shougainashi kiseikanwa de saranaru kousokukamo"), Nikkei Communications, Japan, Nikkei Business Publications, Feb. 5, 2001, No. 335, pp. 65-67. (Concise explanation included in IDS letter.).

Aaron Weiss, "Computing in the Clouds," Dec. 12, 2005, pp. 17-25.

International Search Report and Written Opinion dated Dec. 14, 2010 in International Application No. PCT/US2010/035377 (15 pages).

International Search Report and Written Opinion dated Nov. 11, 2011, International Application No. PCT/US2011/47469 (11 pages).

* cited by examiner

| Enrollment Data Flow | | | | |
|---|---|---|---|---|
| Send | Receive | SSL | Action | |
| User | Transaction Engine (TE) | 1/2 | Transmit Enrollment Authentication Data (B) and the User ID (UID) encrypted with the Public Key of the Authentication Engine (AE) as (PUB_AE(UID,B)) | 905 |
| TE | AE | Full | Forward Transmission | 915 |
|  |  |  | AE Decrypts and Splits Forwarded Data | 920 |
| AE | The Xth Depository (DX) | Full | Store Respective Portion of Data | 925 |
| When Digital Certificate Requested | | | | |
| AE | Cryptographic Engine (CE) | Full | Request Key Generation | 930 |
|  |  |  | CE Generates and Splits Key | 935 |
| CE | TE | Full | Transmit Request for Digital Certificate | 945 |
| TE | Certification Authority (CA) | 1/2 | Transmit Request | 950 |
| CA | TE | 1/2 | Transmit Digital Certificate | 955 |
| TE | User | 1/2 | Transmit Digital Certificate | 960 |
| TE | MS | Full | Store Digital Certificate | |
| CE | DX | Full | Store Respective Portion of Key | 965 |

FIG. 9A

| Authentication Data Flow ||||
| SEND | RECEIVE | SSL | ACTION |
| --- | --- | --- | --- |
| User | Vendor | 1/2 | Transaction occurs, such as selecting purchase |
| Vendor | User | 1/2 | Transmit transaction ID (TID) and authentication request (AR) |
|  |  |  | Authentication data (B') is gathered from User |
| User | TE | 1/2 | Transmit TID and B' wrapped in the Public Key of the Authentication Engine (AE), as (PUB_AE(TID, B')) |
| TE | AE | Full | Forward transmission |
|  |  |  | Enrollment authentication data (B) is requested and gathered |
| Vendor | Transaction Engine (TE) | Full | Transmits TID, AR |
| TE | Mass Storage (MS) | Full | Create Record in database |
| TE | The Xth Depository (DX) | Full | UID, TID |
| DX | AE | Full | Transmit the TID and the portion of the authentication data stored at enrollment (BX) as (PUB_AE(TID, BX)) |
|  |  |  | AE assembles B and compares to B' |
| AE | TE | Full | TID, the filled in AR |
| TE | Vendor | Full | TID, Yes/No |
| TE | User | 1/2 | TID, confirmation message |

FIG. 10

Signing Data Flow — 1100

| SEND | RECEIVE | SSL | ACTION |
|---|---|---|---|
| User | Vendor | 1/2 | Transaction occurs, such as agreeing on a deal |
| Vendor | User | 1/2 | Transmit transaction identification number (TID), authentication request (AR), and agreement or message (M) |
|  |  |  | Current authentication data (B') and a hash of the message received by the User (h(M')) is is gathered from User |
| User | TE | 1/2 | Transmit TID, B', AR, and h(M') wrapped in the Public Key of the Authentication Engine (AE), as (PUB_AE(TID, B', h(M')) |
| TE | AE | Full | Forward transmission |
|  |  |  | Gather enrollment authentication data |
| Vendor | Transaction Engine (TE) | Full | Transmits UID, TID, AR, and a hash of the message (h(M')). |
| TE | Mass Storage (MS) | Full | Create Record in database |
| TE | The Xth Depository (DX) | Full | UID, TID |
| DX | AE | Full | Transmit the TID and the portion of the authentication data stored at Enrollment (BX), as (PUB_AE(TID, BX)) |
|  |  |  | The original vendor message is transmitted to the AE |
| TE | AE | Full | Transmit h(M) |
|  |  |  | AE assembles B, compares to B' and compares h(M) to h(M') |
| AE | Cryptographic Engine (CE) | Full | Request for digital signature and a message to be signed, for example, the hashed message |
| AE | DX | Full | TID, signing UID |
| DX | CE | Full | Transmit the portion of the Cryptographic Key corresponding to the signing party |
|  |  |  | CE assembles key and signs |
| CE | AE | Full | Transmit the digital signature (S) of signing party |
| AE | TE | Full | TID, the filled in AR, h(M), and S |
| TE | Vendor | Full | TID, a receipt=(TID, Yes/No, and S), and the digital signature of the trust engine, for example, a hash of the receipt encrypted with the trust engine's Private Key (Priv_TE(h(receipt))) |
| TE | User | 1/2 | TID, confirmation message |

| Encryption/Decryption Data Flow ||||
|---|---|---|---|
| Send | Receive | SSL | Action |
| Decryption ||||
|  |  |  | Perform Authentication Data Process 1000, include the Session Key (sync) in the AR, where the sync has been encrypted with the Public Key of the User as PUB_USER(SYNC) |
|  |  |  | Authenticate the User |
| AE | CE | Full | Forward PUB_USER(SYNC) to CE |
| AE | DX | Full | UID, TID |
| DX | CE | Full | Transmit the TID and the portion of the Private Key as (PUB_AE(TID, KEY_USER)) |
|  |  |  | CE assembles the Cryptographic Key and decrypts the sync |
| CE | AE | Full | TID, the filled in AR including decrypted sync |
| AE | TE | Full | Forward to TE |
| TE | Requesting APP/Vendor | 1/2 | TID, Yes/No, Sync |
| Encryption ||||
| Requesting APP/Vendor | TE | 1/2 | Request for Public Key of User |
| TE | MS | Full | Request Digital Certificate |
| MS | TE | Full | Transmit Digital Certificate |
| TE | Requesting APP/Vendor | 1/2 | Transmit Digital Certificate |

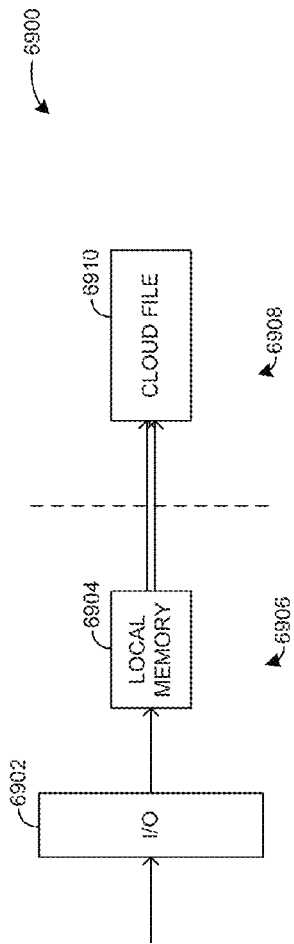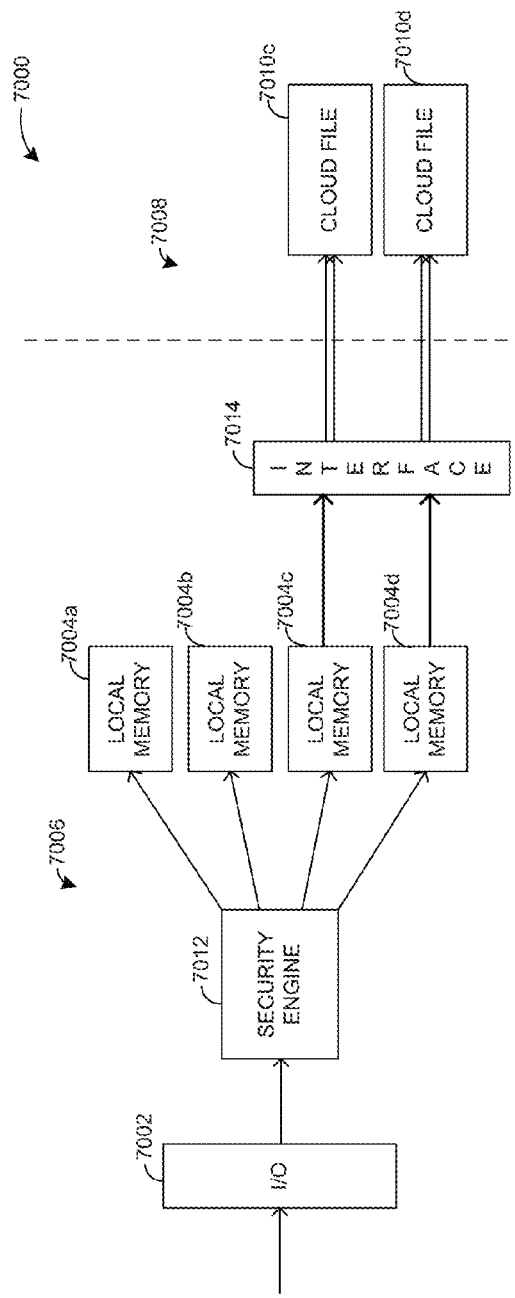

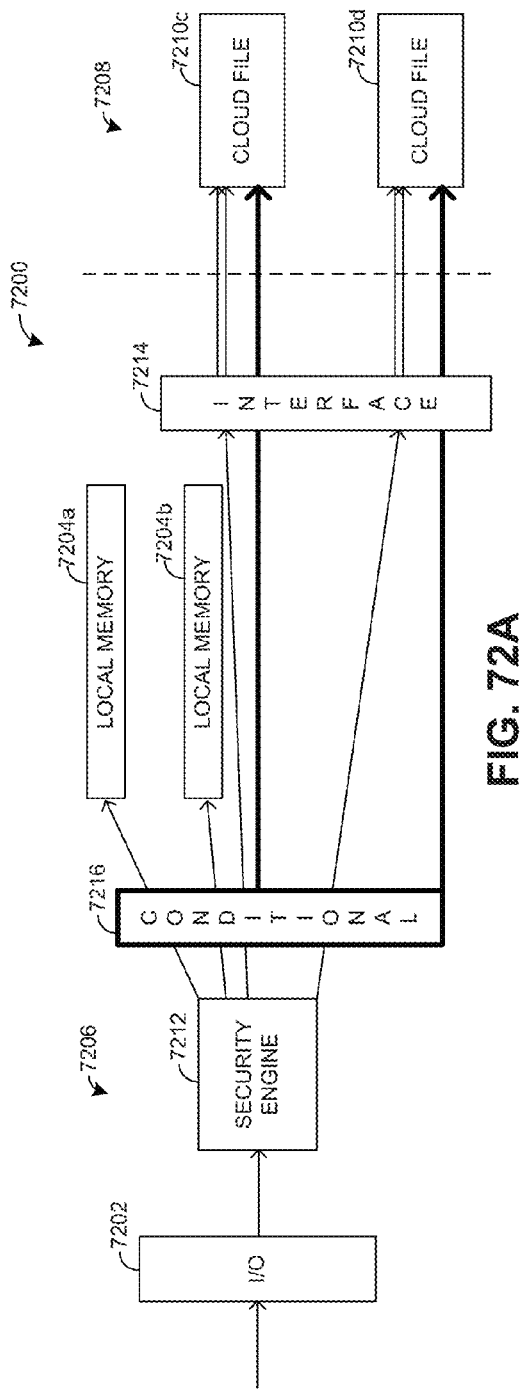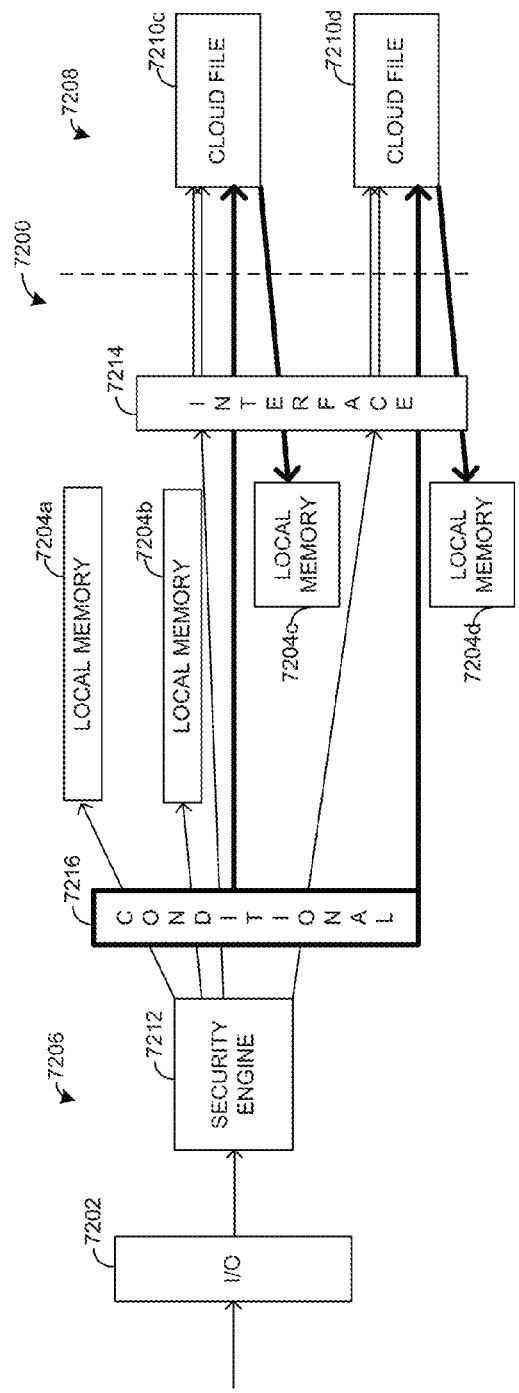

SYSTEMS AND METHODS FOR SECURE REMOTE STORAGE

CROSS-REFERENCE TO RELATED APPLICATIONS

This application claims the benefit of U.S. Provisional Patent Application Ser. No. 61/373,187, filed Aug. 12, 2010, the content of which is hereby incorporated by reference herein in its entirety.

FIELD OF THE INVENTION

The present invention relates in general to systems and methods for secure remote storage. The systems and methods described herein may be used in conjunction with other systems and methods described in commonly-owned U.S. Pat. No. 7,391,865 and commonly-owned U.S. patent application Ser. No. 11/258,839, filed Oct. 25, 2005, Ser. No. 11/602,667, filed Nov. 20, 2006, Ser. No. 11/983,355, filed Nov. 7, 2007, Ser. No. 11/999,575, filed Dec. 5, 2007, Ser. No. 12/148,365, filed Apr. 18, 2008, Ser. No. 12/209,703, filed Sep. 12, 2008, Ser. No. 12/349,897, filed Jan. 7, 2009, Ser. No. 12/391,025, filed Feb. 23, 2009, Ser. No. 12/783,276, filed May 19, 2010, Ser. No. 12/953,877, filed Nov. 24, 2010, Ser. No. 13/077,770, filed Mar. 31, 2011, Ser. No. 13/077,802, filed Mar. 31, 2011, and Ser. No. 13/117,791, filed May 27, 2011 and U.S. Provisional Patent Application Nos. 61/436,991, filed Jan. 27, 2011, 61/264,464, filed Nov. 25, 2009, 61/319,658, filed Mar. 31, 2010, 61/320,242, filed Apr. 1, 2010, 61/349,560, filed May 28, 2010, 61/373,187, filed Aug. 12, 2010, 61/374,950, filed Aug. 18, 2010, 61/384,583, filed Sep. 20, 2010. The disclosures of each of the aforementioned, earlier-filed applications are hereby incorporated by reference herein in their entireties.

SUMMARY

Embodiments relate generally to methods and systems for secure remote storage. One embodiment relates generally to a method of transmitting data to at least one storage system. A data set is identified at a first device, and a request is received to store the data set in a storage location. A first plurality of shares is generated, with each of the first plurality of shares containing a distribution of data from the data set. At least one of the first plurality of shares is stored in a local memory in response to receiving the request, the local memory configured for backup in the at least one remote storage system. At least one share of the first plurality of shares for is transmitted over a network link for storage in at least one remote storage system. Another embodiments relates to a system for transmitting data to at least one storage system.

Yet another embodiment relates to a method of improving data availability. A restoration event is detected, and in response to detecting the restoration event, it is determined whether a sufficient number of shares of data are available to a client device to reconstruct a data set based on the available shares of data. In response to determining an insufficient number of shares are available, at least one read instruction in a journaling message is transmitted to at least one remote storage system, the read instruction requesting an additional share of data. The requested additional share of data is received and stored in a storage local to the client device. The data set is reconstructed based at least in part on the stored additional share of data. A further embodiment relates generally to a system for improving data availability.

BRIEF DESCRIPTION OF THE DRAWINGS

The present invention is described in more detail below in connection with the attached drawings, which are meant to illustrate and not to limit the invention, and in which:

FIG. 9A illustrates a flow chart of an enrollment process according to aspects of an embodiment of the invention;

FIG. 10 illustrates a data flow of an authentication process according to aspects of an embodiment of the invention;

FIG. 11 illustrates a data flow of a signing process according to aspects of an embodiment of the invention;

FIG. 12 illustrates a data flow and an encryption/decryption process according to aspects and yet another embodiment of the invention;

FIG. 69 depicts a system that may be configured to operate according to the process of FIG. 68 in accordance with one embodiment of the present invention.

FIG. 70 depicts a system that may be configured to operate according to the process of FIG. 68 in accordance with one embodiment of the present invention.

FIGS. 72A and B depict a system that may be configured to operate according to the process of FIG. 71 in accordance with one embodiment of the present invention.

DETAILED DESCRIPTION OF THE ILLUSTRATIVE EMBODIMENTS

One aspect of the present invention is to provide a cryptographic system where one or more secure servers, or a trust engine, stores cryptographic keys and user authentication data. The system may store data across one or more storage devices in a cloud. The cloud may include private storage devices (accessible only to a particular set of users) or public storage devices (accessible to any set of users that subscribes to the storage provider).

Users access the functionality of conventional cryptographic systems through network access to the trust engine, however, the trust engine does not release actual keys and other authentication data and therefore, the keys and data remain secure. This server-centric storage of keys and authentication data provides for user-independent security, portability, availability, and straightforwardness.

Because users can be confident in, or trust, the cryptographic system to perform user and document authentication and other cryptographic functions, a wide variety of functionality may be incorporated into the system. For example, the trust engine provider can ensure against agreement repudiation by, for example, authenticating the agreement participants, digitally signing the agreement on behalf of or for the participants, and storing a record of the agreement digitally signed by each participant. In addition, the cryptographic system may monitor agreements and determine to apply varying degrees of authentication, based on, for example, price, user, vendor, geographic location, place of use, or the like.

To facilitate a complete understanding of the invention, the remainder of the detailed description describes the invention with reference to the figures, wherein like elements are referenced with like numerals throughout.

Figure 1:
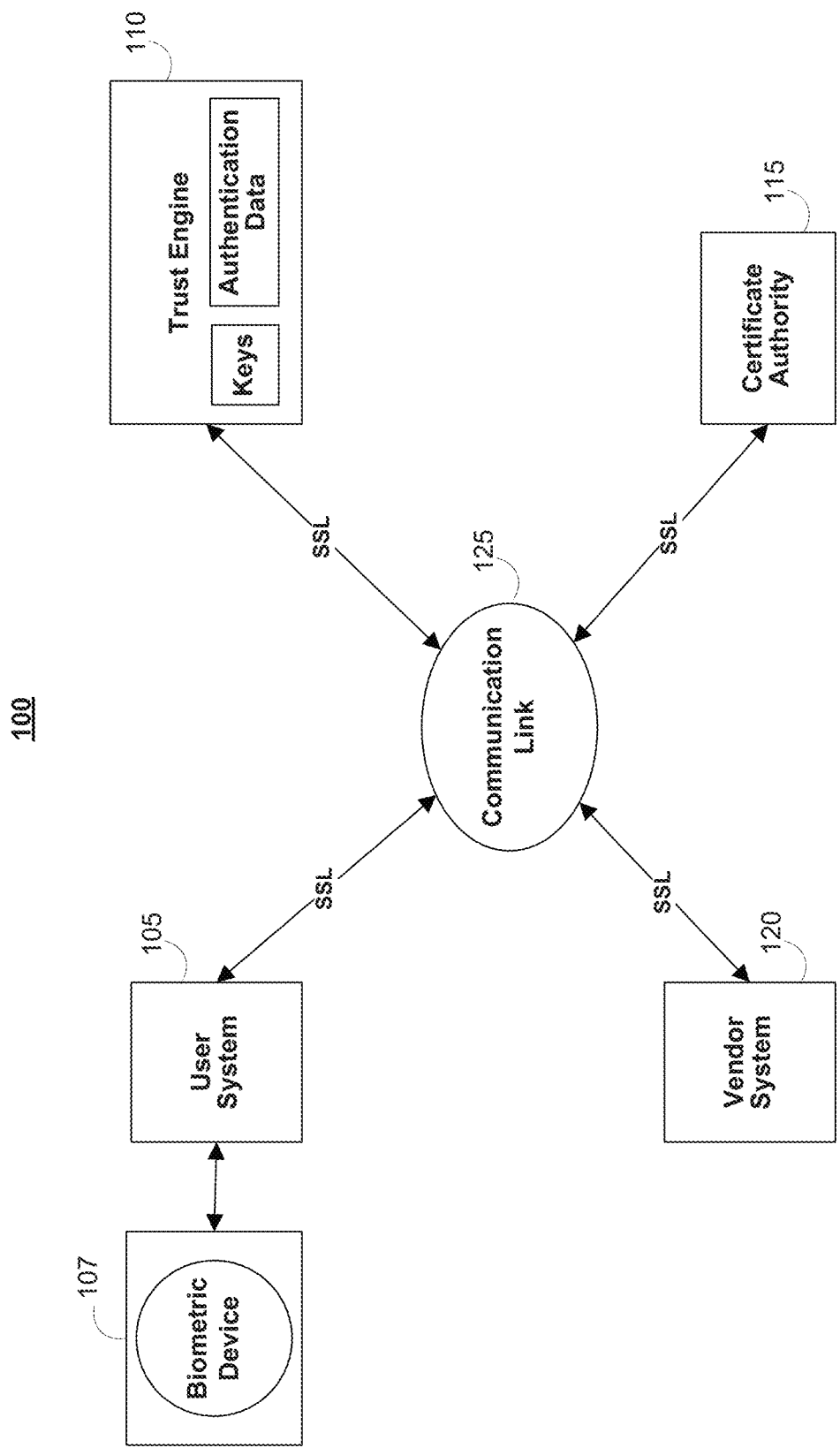
FIG. 1 illustrates a block diagram of a cryptographic system, according to aspects of an embodiment of the invention.

FIG. 1 illustrates a block diagram of a cryptographic system 100, according to aspects of an embodiment of the invention. As shown in FIG. 1, the cryptographic system 100 includes a user system 105, a trust engine 110, a certificate authority 115, and a vendor system 120, communicating through a communication link 125.

According to one embodiment of the invention, the user system 105 comprises a conventional general-purpose computer having one or more microprocessors, such as, for example, an Intel-based processor. Moreover, the user system 105 includes an appropriate operating system, such as, for example, an operating system capable of including graphics or windows, such as Windows, Unix, Linux, or the like. As shown in FIG. 1, the user system 105 may include a biometric device 107. The biometric device 107 may advantageously capture a user's biometric and transfer the captured biometric to the trust engine 110. According to one embodiment of the invention, the biometric device may advantageously comprise a device having attributes and features similar to those disclosed in U.S. patent application Ser. No. 08/926,277, filed on Sep. 5, 1997, entitled "RELIEF OBJECT IMAGE GENERATOR," U.S. patent application Ser. No. 09/558,634, filed on Apr. 26, 2000, entitled "IMAGING DEVICE FOR A RELIEF OBJECT AND SYSTEM AND METHOD OF USING THE IMAGE DEVICE," U.S. patent application Ser. No. 09/435,011, filed on Nov. 5, 1999, entitled "RELIEF OBJECT SENSOR ADAPTOR," and U.S. patent application Ser. No. 09/477,943, filed on Jan. 5, 2000, entitled "PLANAR OPTICAL IMAGE SENSOR AND SYSTEM FOR GENERATING AN ELECTRONIC IMAGE OF A RELIEF OBJECT FOR FINGERPRINT READING," all of which are owned by the instant assignee, and all of which are hereby incorporated by reference herein.

In addition, the user system 105 may connect to the communication link 125 through a conventional service provider, such as, for example, a dial up, digital subscriber line (DSL), cable modem, fiber connection, or the like. According to another embodiment, the user system 105 connects the communication link 125 through network connectivity such as, for example, a local or wide area network. According to one embodiment, the operating system includes a TCP/IP stack that handles all incoming and outgoing message traffic passed over the communication link 125.

Although the user system 105 is disclosed with reference to the foregoing embodiments, the invention is not intended to be limited thereby. Rather, a skilled artisan will recognize from the disclosure herein, a wide number of alternatives embodiments of the user system 105, including almost any computing device capable of sending or receiving information from another computer system. For example, the user system 105 may include, but is not limited to, a computer workstation, an interactive television, an interactive kiosk, a personal mobile computing device, such as a digital assistant, mobile phone, laptop, or the like, a wireless communications device, a smartcard, an embedded computing device, or the like, which can interact with the communication link 125. In such alternative systems, the operating systems will likely differ and be adapted for the particular device. However, according to one embodiment, the operating systems advantageously continue to provide the appropriate communications protocols needed to establish communication with the communication link 125.

FIG. 1 illustrates the trust engine 110. According to one embodiment, the trust engine 110 comprises one or more secure servers for accessing and storing sensitive information, which may be any type or form of data, such as, but not limited to text, audio, video, user authentication data and public and private cryptographic keys. According to one embodiment, the authentication data includes data designed to uniquely identify a user of the cryptographic system 100. For example, the authentication data may include a user identification number, one or more biometrics, and a series of questions and answers generated by the trust engine 110 or the user, but answered initially by the user at enrollment. The foregoing questions may include demographic data, such as place of birth, address, anniversary, or the like, personal data, such as mother's maiden name, favorite ice cream, or the like, or other data designed to uniquely identify the user. The trust engine 110 compares a user's authentication data associated with a current transaction, to the authentication data provided at an earlier time, such as, for example, during enrollment. The trust engine 110 may advantageously require the user to produce the authentication data at the time of each transaction, or, the trust engine 110 may advantageously allow the user to periodically produce authentication data, such as at the beginning of a string of transactions or the logging onto a particular vendor website.

According to the embodiment where the user produces biometric data, the user provides a physical characteristic, such as, but not limited to, facial scan, hand scan, ear scan, iris scan, retinal scan, vascular pattern, DNA, a fingerprint, writing or speech, to the biometric device 107. The biometric device advantageously produces an electronic pattern, or biometric, of the physical characteristic. The electronic pattern is transferred through the user system 105 to the trust engine 110 for either enrollment or authentication purposes.

Once the user produces the appropriate authentication data and the trust engine 110 determines a positive match between that authentication data (current authentication data) and the authentication data provided at the time of enrollment (enrollment authentication data), the trust engine 110 provides the user with complete cryptographic functionality. For example, the properly authenticated user may advantageously employ the trust engine 110 to perform hashing, digitally signing, encrypting and decrypting (often together referred to only as encrypting), creating or distributing digital certificates, and the like. However, the private cryptographic keys used in the cryptographic functions will not be available outside the trust engine 110, thereby ensuring the integrity of the cryptographic keys.

According to one embodiment, the trust engine 110 generates and stores cryptographic keys. According to another embodiment, at least one cryptographic key is associated with each user. Moreover, when the cryptographic keys include public-key technology, each private key associated with a user is generated within, and not released from, the trust engine 110. Thus, so long as the user has access to the trust engine 110, the user may perform cryptographic functions using his or her private or public key. Such remote access advantageously allows users to remain completely mobile and access cryptographic functionality through practically any Internet connection, such as cellular and satellite phones, kiosks, laptops, hotel rooms and the like.

According to another embodiment, the trust engine 110 performs the cryptographic functionality using a key pair generated for the trust engine 110. According to this embodiment, the trust engine 110 first authenticates the user, and after the user has properly produced authentication data matching the enrollment authentication data, the trust engine 110 uses its own cryptographic key pair to perform cryptographic functions on behalf of the authenticated user.

A skilled artisan will recognize from the disclosure herein that the cryptographic keys may advantageously include some or all of symmetric keys, public keys, and private keys. In addition, a skilled artisan will recognize from the disclosure herein that the foregoing keys may be implemented with a wide number of algorithms available from commercial technologies, such as, for example, RSA, ELGAMAL, or the like.

FIG. 1 also illustrates the certificate authority 115. According to one embodiment, the certificate authority 115 may advantageously comprise a trusted third-party organization or company that issues digital certificates, such as, for example, VeriSign, Baltimore, Entrust, or the like. The trust engine 110 may advantageously transmit requests for digital certificates, through one or more conventional digital certificate protocols, such as, for example, PKCS10, to the certificate authority 115. In response, the certificate authority 115 will issue a digital certificate in one or more of a number of differing protocols, such as, for example, PKCS7. According to one embodiment of the invention, the trust engine 110 requests digital certificates from several or all of the prominent certificate authorities 115 such that the trust engine 110 has access to a digital certificate corresponding to the certificate standard of any requesting party.

According to another embodiment, the trust engine 110 internally performs certificate issuances. In this embodiment, the trust engine 110 may access a certificate system for generating certificates and/or may internally generate certificates when they are requested, such as, for example, at the time of key generation or in the certificate standard requested at the time of the request. The trust engine 110 will be disclosed in greater detail below.

FIG. 1 also illustrates the vendor system 120. According to one embodiment, the vendor system 120 advantageously comprises a Web server. Typical Web servers generally serve content over the Internet using one of several internet markup languages or document format standards, such as the HyperText Markup Language (HTML) or the Extensible Markup Language (XML). The Web server accepts requests from browsers like Netscape and Internet Explorer and then returns the appropriate electronic documents. A number of server or client-side technologies can be used to increase the power of the Web server beyond its ability to deliver standard electronic documents. For example, these technologies include Common Gateway Interface (CGI) scripts, Secure Sockets Layer (SSL) security, and Active Server Pages (ASPs). The vendor system 120 may advantageously provide electronic content relating to commercial, personal, educational, or other transactions.

Although the vendor system 120 is disclosed with reference to the foregoing embodiments, the invention is not intended to be limited thereby. Rather, a skilled artisan will recognize from the disclosure herein that the vendor system 120 may advantageously comprise any of the devices described with reference to the user system 105 or combination thereof.

FIG. 1 also illustrates the communication link 125 connecting the user system 105, the trust engine 110, the certificate authority 115, and the vendor system 120. According to one embodiment, the communication link 125 preferably comprises the Internet. The Internet, as used throughout this disclosure is a global network of computers. The structure of the Internet, which is well known to those of ordinary skill in the art, includes a network backbone with networks branching from the backbone. These branches, in turn, have networks branching from them, and so on. Routers move information packets between network levels, and then from network to network, until the packet reaches the neighborhood of its destination. From the destination, the destination network's host directs the information packet to the appropriate terminal, or node. In one advantageous embodiment, the Internet routing hubs comprise domain name system (DNS) servers using Transmission Control Protocol/Internet Protocol (TCP/IP) as is well known in the art. The routing hubs connect to one or more other routing hubs via high-speed communication links.

One popular part of the Internet is the World Wide Web. The World Wide Web contains different computers, which store documents capable of displaying graphical and textual information. The computers that provide information on the World Wide Web are typically called "websites." A website is defined by an Internet address that has an associated electronic page. The electronic page can be identified by a Uniform Resource Locator (URL). Generally, an electronic page is a document that organizes the presentation of text, graphical images, audio, video, and so forth.

Although the communication link 125 is disclosed in terms of its preferred embodiment, one of ordinary skill in the art will recognize from the disclosure herein that the communication link 125 may include a wide range of interactive communications links. For example, the communication link 125 may include interactive television networks, telephone networks, wireless data transmission systems, two-way cable systems, customized private or public computer networks, interactive kiosk networks, automatic teller machine networks, direct links, satellite or cellular networks, and the like.

Figure 2:
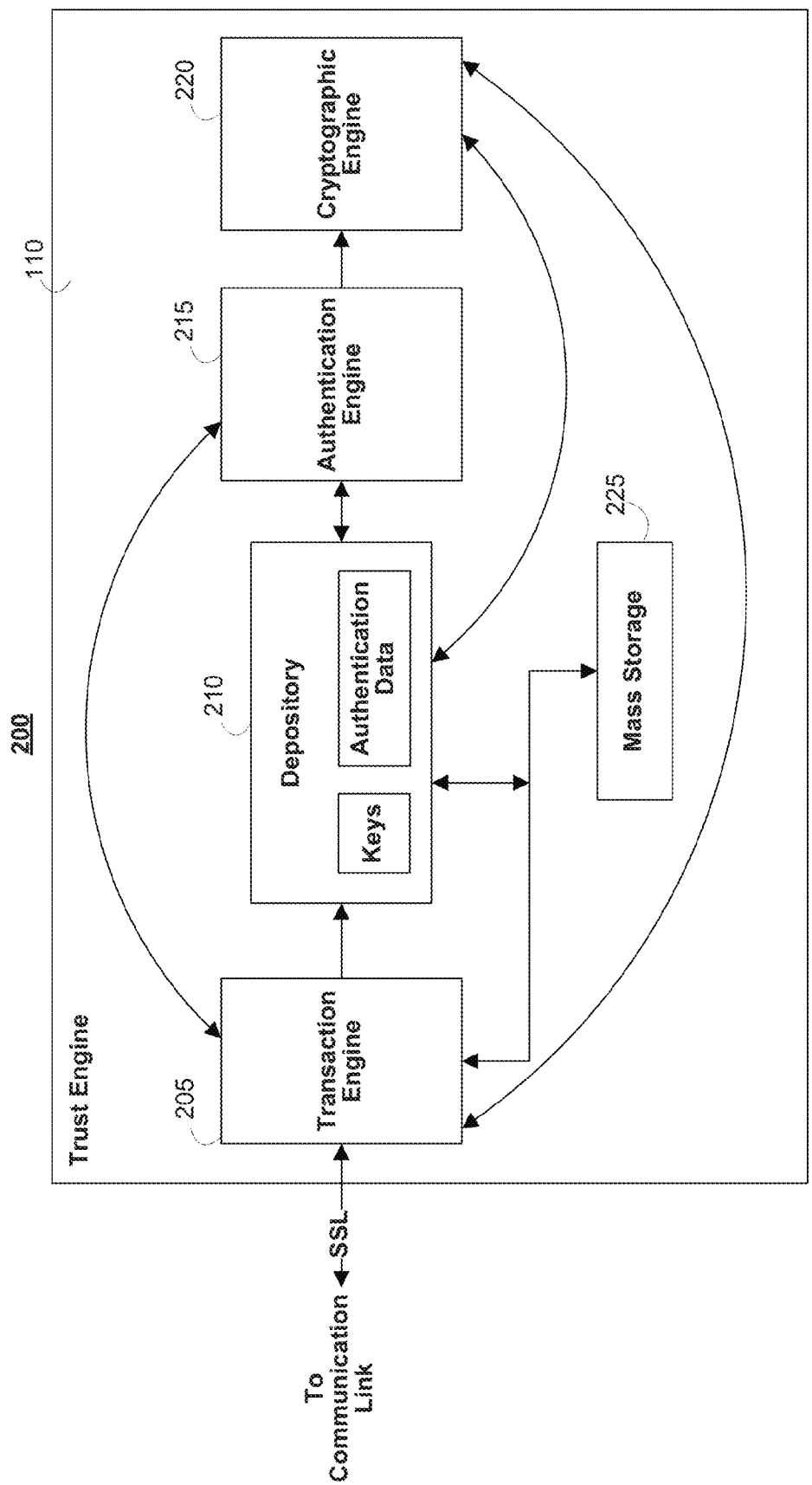
FIG. 2 illustrates a block diagram of the trust engine of FIG. 1, according to aspects of an embodiment of the invention.

FIG. 2 illustrates a block diagram of the trust engine 110 of FIG. 1 according to aspects of an embodiment of the invention. As shown in FIG. 2, the trust engine 110 includes a transaction engine 205, a depository 210, an authentication engine 215, and a cryptographic engine 220. According to one embodiment of the invention, the trust engine 110 also includes mass storage 225. As further shown in FIG. 2, the transaction engine 205 communicates with the depository 210, the authentication engine 215, and the cryptographic engine 220, along with the mass storage 225. In addition, the depository 210 communicates with the authentication engine 215, the cryptographic engine 220, and the mass storage 225. Moreover, the authentication engine 215 communicates with the cryptographic engine 220. According to one embodiment of the invention, some or all of the foregoing communications may advantageously comprise the transmission of XML documents to IP addresses that correspond to the receiving device. As mentioned in the foregoing, XML documents advantageously allow designers to create their own customized document tags, enabling the definition, transmission, validation, and interpretation of data between applications and between organizations. Moreover, some or all of the foregoing communications may include conventional SSL technologies.

According to one embodiment, the transaction engine 205 comprises a data routing device, such as a conventional Web server available from Netscape, Microsoft, Apache, or the like. For example, the Web server may advantageously receive incoming data from the communication link 125. According to one embodiment of the invention, the incoming data is addressed to a front-end security system for the trust engine 110. For example, the front-end security system may advantageously include a firewall, an intrusion detection system searching for known attack profiles, and/or a virus scanner. After clearing the front-end security system, the data is received by the transaction engine 205 and routed to one of the depository 210, the authentication engine 215, the cryptographic engine 220, and the mass storage 225. In addition, the transaction engine 205 monitors incoming data from the authentication engine 215 and cryptographic engine 220, and routes the data to particular systems through the communication link 125. For example, the transaction engine 205 may advantageously route data to the user system 105, the certificate authority 115, or the vendor system 120.

According to one embodiment, the data is routed using conventional HTTP routing techniques, such as, for example, employing URLs or Uniform Resource Indicators (URIs). URIs are similar to URLs, however, URIs typically indicate the source of files or actions, such as, for example, executables, scripts, and the like. Therefore, according to the one embodiment, the user system 105, the certificate authority 115, the vendor system 120, and the components of the trust engine 210, advantageously include sufficient data within communication URLs or URIs for the transaction engine 205 to properly route data throughout the cryptographic system.

Although the data routing is disclosed with reference to its preferred embodiment, a skilled artisan will recognize a wide number of possible data routing solutions or strategies. For example, XML or other data packets may advantageously be unpacked and recognized by their format, content, or the like, such that the transaction engine 205 may properly route data throughout the trust engine 110. Moreover, a skilled artisan will recognize that the data routing may advantageously be adapted to the data transfer protocols conforming to particular network systems, such as, for example, when the communication link 125 comprises a local network.

According to yet another embodiment of the invention, the transaction engine 205 includes conventional SSL encryption technologies, such that the foregoing systems may authenticate themselves, and vice-versa, with transaction engine 205, during particular communications. As will be used throughout this disclosure, the term "½ SSL" refers to communications where a server but not necessarily the client, is SSL authenticated, and the term "FULL SSL" refers to communications where the client and the server are SSL authenticated. When the instant disclosure uses the term "SSL", the communication may comprise ½ or FULL SSL.

As the transaction engine 205 routes data to the various components of the cryptographic system 100, the transaction engine 205 may advantageously create an audit trail. According to one embodiment, the audit trail includes a record of at least the type and format of data routed by the transaction engine 205 throughout the cryptographic system 100. Such audit data may advantageously be stored in the mass storage 225.

FIG. 2 also illustrates the depository 210. According to one embodiment, the depository 210 comprises one or more data storage facilities, such as, for example, a directory server, a database server, or the like. As shown in FIG. 2, the depository 210 stores cryptographic keys and enrollment authentication data. The cryptographic keys may advantageously correspond to the trust engine 110 or to users of the cryptographic system 100, such as the user or vendor. The enrollment authentication data may advantageously include data designed to uniquely identify a user, such as, user ID, passwords, answers to questions, biometric data, or the like. This enrollment authentication data may advantageously be acquired at enrollment of a user or another alternative later time. For example, the trust engine 110 may include periodic or other renewal or reissue of enrollment authentication data.

According to one embodiment, the communication from the transaction engine 205 to and from the authentication engine 215 and the cryptographic engine 220 comprises secure communication, such as, for example conventional SSL technology. In addition, as mentioned in the foregoing, the data of the communications to and from the depository 210 may be transferred using URLs, URIs, HTTP or XML documents, with any of the foregoing advantageously having data requests and formats embedded therein.

As mentioned above, the depository 210 may advantageously comprises a plurality of secure data storage facilities. In such an embodiment, the secure data storage facilities may be configured such that a compromise of the security in one individual data storage facility will not compromise the cryptographic keys or the authentication data stored therein. For example, according to this embodiment, the cryptographic keys and the authentication data are mathematically operated on so as to statistically and substantially randomize the data stored in each data storage facility. According to one embodiment, the randomization of the data of an individual data storage facility renders that data undecipherable. Thus, compromise of an individual data storage facility produces only a randomized undecipherable number and does not compromise the security of any cryptographic keys or the authentication data as a whole.

FIG. 2 also illustrates the trust engine 110 including the authentication engine 215. According to one embodiment, the authentication engine 215 comprises a data comparator configured to compare data from the transaction engine 205 with data from the depository 210. For example, during authentication, a user supplies current authentication data to the trust engine 110 such that the transaction engine 205 receives the current authentication data. As mentioned in the foregoing, the transaction engine 205 recognizes the data requests, preferably in the URL or URI, and routes the authentication data to the authentication engine 215. Moreover, upon request, the depository 210 forwards enrollment authentication data corresponding to the user to the authentication engine 215. Thus, the authentication engine 215 has both the current authentication data and the enrollment authentication data for comparison.

According to one embodiment, the communications to the authentication engine comprise secure communications, such as, for example, SSL technology. Additionally, security can be provided within the trust engine 110 components, such as, for example, super-encryption using public key technologies. For example, according to one embodiment, the user encrypts the current authentication data with the public key of the authentication engine 215. In addition, the depository 210 also encrypts the enrollment authentication data with the public key of the authentication engine 215. In this way, only the authentication engine's private key can be used to decrypt the transmissions.

As shown in FIG. 2, the trust engine 110 also includes the cryptographic engine 220. According to one embodiment, the cryptographic engine comprises a cryptographic handling module, configured to advantageously provide conventional cryptographic functions, such as, for example, public-key infrastructure (PKI) functionality. For example, the cryptographic engine 220 may advantageously issue public and private keys for users of the cryptographic system 100. In this manner, the cryptographic keys are generated at the cryptographic engine 220 and forwarded to the depository 210 such that at least the private cryptographic keys are not available outside of the trust engine 110. According to another embodiment, the cryptographic engine 220 randomizes and splits at least the private cryptographic key data, thereby storing only the randomized split data. Similar to the splitting of the enrollment authentication data, the splitting process ensures the stored keys are not available outside the cryptographic engine 220. According to another embodiment, the functions of the cryptographic engine can be combined with and performed by the authentication engine 215.

According to one embodiment, communications to and from the cryptographic engine include secure communications, such as SSL technology. In addition, XML documents may advantageously be employed to transfer data and/or make cryptographic function requests.

FIG. 2 also illustrates the trust engine 110 having the mass storage 225. As mentioned in the foregoing, the transaction engine 205 keeps data corresponding to an audit trail and stores such data in the mass storage 225. Similarly, according to one embodiment of the invention, the depository 210 keeps data corresponding to an audit trail and stores such data in the mass storage device 225. The depository audit trail data is similar to that of the transaction engine 205 in that the audit trail data comprises a record of the requests received by the depository 210 and the response thereof. In addition, the mass storage 225 may be used to store digital certificates having the public key of a user contained therein.

Although the trust engine 110 is disclosed with reference to its preferred and alternative embodiments, the invention is not intended to be limited thereby. Rather, a skilled artisan will recognize in the disclosure herein, a wide number of alternatives for the trust engine 110. For example, the trust engine 110, may advantageously perform only authentication, or alternatively, only some or all of the cryptographic functions, such as data encryption and decryption. According to such embodiments, one of the authentication engine 215 and the cryptographic engine 220 may advantageously be removed, thereby creating a more straightforward design for the trust engine 110. In addition, the cryptographic engine 220 may also communicate with a certificate authority such that the certificate authority is embodied within the trust engine 110. According to yet another embodiment, the trust engine 110 may advantageously perform authentication and one or more cryptographic functions, such as, for example, digital signing.

Figure 3:
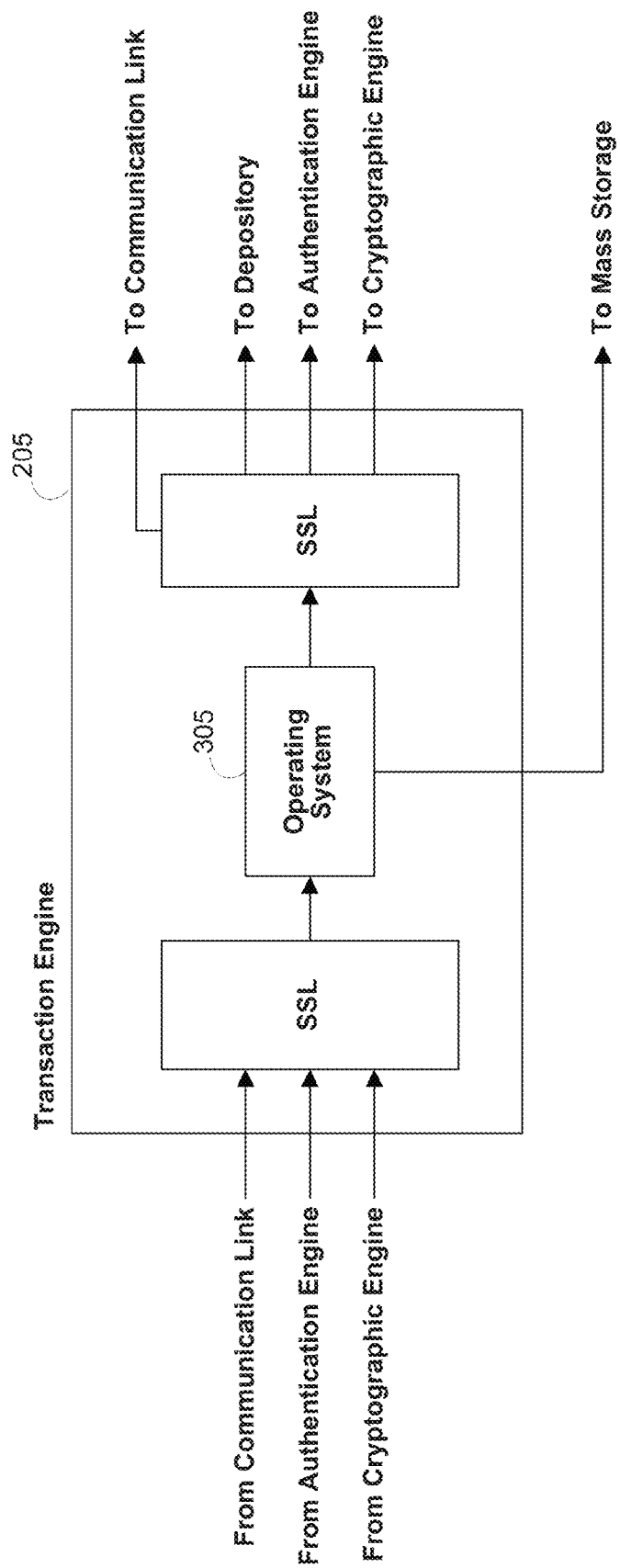
FIG. 3 illustrates a block diagram of the transaction engine of FIG. 2, according to aspects of an embodiment of the invention.

FIG. 3 illustrates a block diagram of the transaction engine 205 of FIG. 2, according to aspects of an embodiment of the invention. According to this embodiment, the transaction engine 205 comprises an operating system 305 having a handling thread and a listening thread. The operating system 305 may advantageously be similar to those found in conventional high volume servers, such as, for example, Web servers available from Apache. The listening thread monitors the incoming communication from one of the communication link 125, the authentication engine 215, and the cryptographic engine 220 for incoming data flow. The handling thread recognizes particular data structures of the incoming data flow, such as, for example, the foregoing data structures, thereby routing the incoming data to one of the communication link 125, the depository 210, the authentication engine 215, the cryptographic engine 220, or the mass storage 225. As shown in FIG. 3, the incoming and outgoing data may advantageously be secured through, for example, SSL technology.

Figure 4:
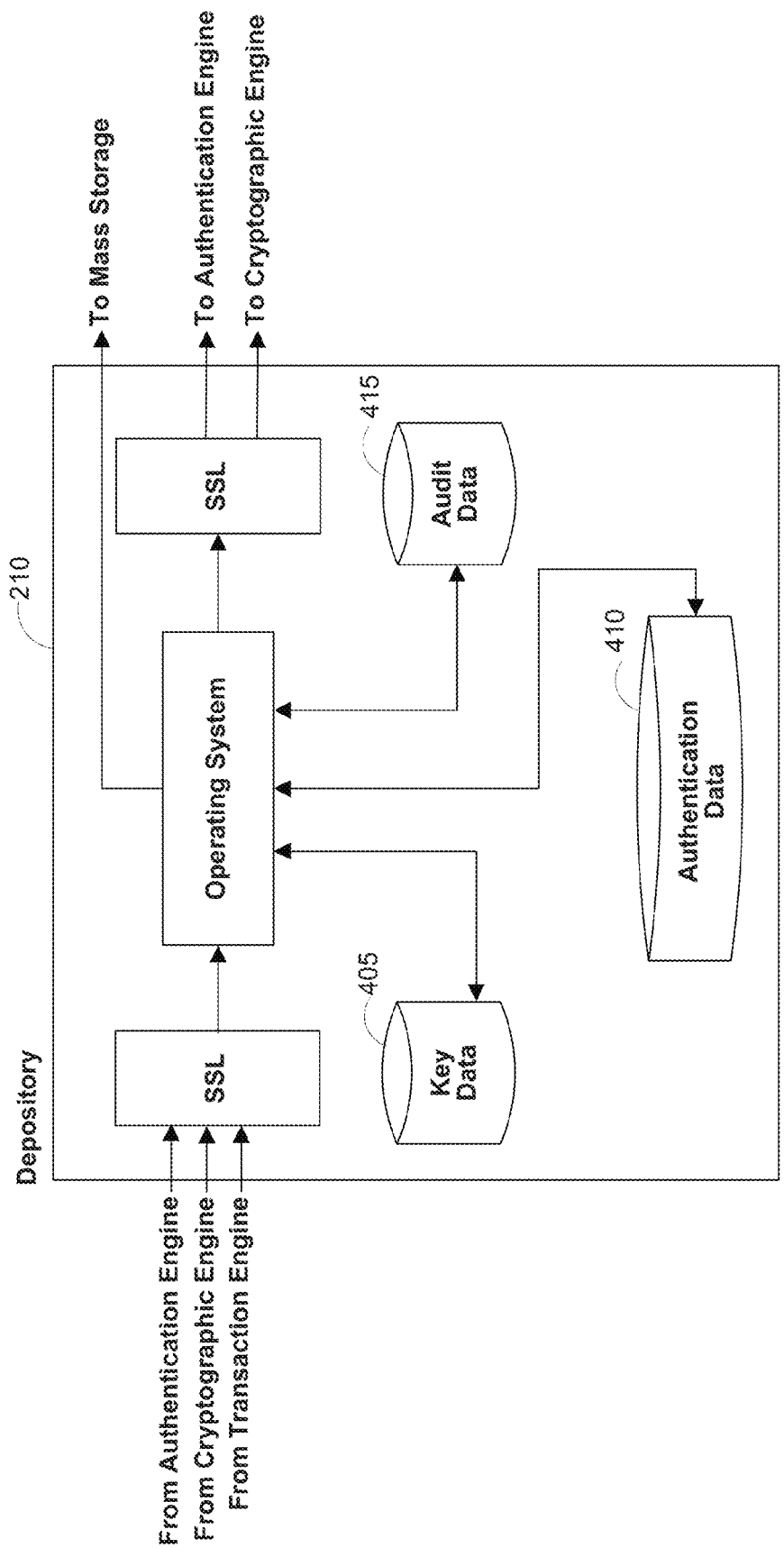
FIG. 4 illustrates a block diagram of the depository of FIG. 2, according to aspects of an embodiment of the invention.

FIG. 4 illustrates a block diagram of the depository 210 of FIG. 2 according to aspects of an embodiment of the invention. According to this embodiment, the depository 210 comprises one or more lightweight directory access protocol (LDAP) servers. LDAP directory servers are available from a wide variety of manufacturers such as Netscape, ISO, and others. FIG. 4 also shows that the directory server preferably stores data 405 corresponding to the cryptographic keys and data 410 corresponding to the enrollment authentication data. According to one embodiment, the depository 210 comprises a single logical memory structure indexing authentication data and cryptographic key data to a unique user ID. The single logical memory structure preferably includes mechanisms to ensure a high degree of trust, or security, in the data stored therein. For example, the physical location of the depository 210 may advantageously include a wide number of conventional security measures, such as limited employee access, modern surveillance systems, and the like. In addition to, or in lieu of, the physical securities, the computer system or server may advantageously include software solutions to protect the stored data. For example, the depository 210 may advantageously create and store data 415 corresponding to an audit trail of actions taken. In addition, the incoming and outgoing communications may advantageously be encrypted with public key encryption coupled with conventional SSL technologies.

Figure 7:
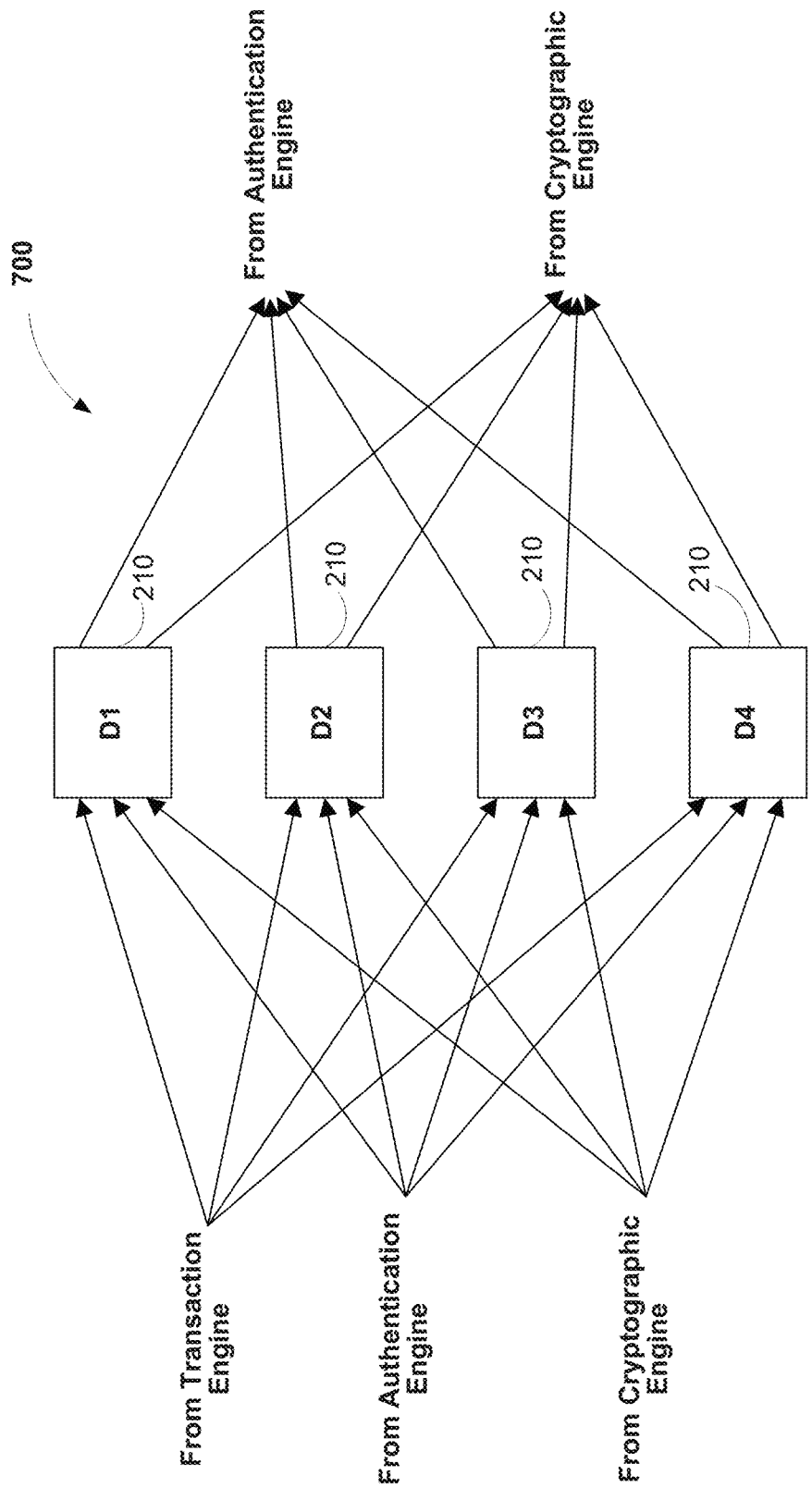
FIG. 7 illustrates a block diagram of a depository system, according to aspects of another embodiment of the invention.

According to another embodiment, the depository 210 may comprise distinct and physically separated data storage facilities, as disclosed further with reference to FIG. 7.

Figure 5:
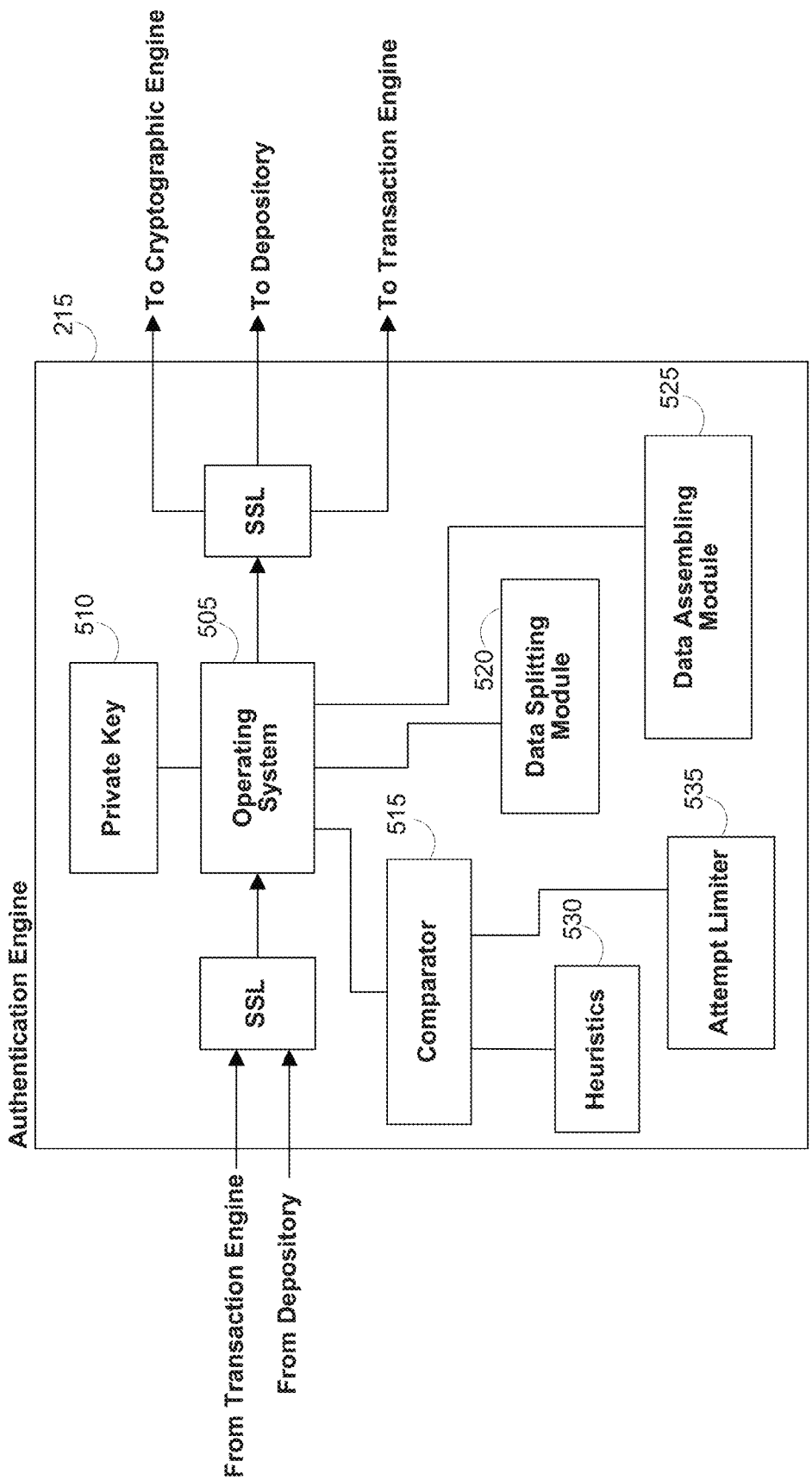
FIG. 5 illustrates a block diagram of the authentication engine of FIG. 2, according to aspects of an embodiment of the invention.

FIG. 5 illustrates a block diagram of the authentication engine 215 of FIG. 2 according to aspects of an embodiment of the invention. Similar to the transaction engine 205 of FIG. 3, the authentication engine 215 comprises an operating system 505 having at least a listening and a handling thread of a modified version of a conventional Web server, such as, for example, Web servers available from Apache. As shown in FIG. 5, the authentication engine 215 includes access to at least one private key 510. The private key 510 may advantageously be used for example, to decrypt data from the transaction engine 205 or the depository 210, which was encrypted with a corresponding public key of the authentication engine 215.

FIG. 5 also illustrates the authentication engine 215 comprising a comparator 515, a data splitting module 520, and a data assembling module 525. According to the preferred embodiment of the invention, the comparator 515 includes technology capable of comparing potentially complex patterns related to the foregoing biometric authentication data. The technology may include hardware, software, or combined solutions for pattern comparisons, such as, for example, those representing finger print patterns or voice patterns. In addition, according to one embodiment, the comparator 515 of the authentication engine 215 may advantageously compare conventional hashes of documents in order to render a comparison result. According to one embodiment of the invention, the comparator 515 includes the application of heuristics 530 to the comparison. The heuristics 530 may advantageously address circumstances surrounding an authentication attempt, such as, for example, the time of day, IP address or subnet mask, purchasing profile, email address, processor serial number or ID, or the like.

Moreover, the nature of biometric data comparisons may result in varying degrees of confidence being produced from the matching of current biometric authentication data to enrollment data. For example, unlike a traditional password which may only return a positive or negative match, a fingerprint may be determined to be a partial match, e.g. a 90% match, a 75% match, or a 10% match, rather than simply being correct or incorrect. Other biometric identifiers such as voice print analysis or face recognition may share this property of probabilistic authentication, rather than absolute authentication.

When working with such probabilistic authentication or in other cases where an authentication is considered less than absolutely reliable, it is desirable to apply the heuristics 530 to determine whether the level of confidence in the authentication provided is sufficiently high to authenticate the transaction which is being made.

It will sometimes be the case that the transaction at issue is a relatively low value transaction where it is acceptable to be authenticated to a lower level of confidence. This could include a transaction which has a low dollar value associated with it (e.g., a $10 purchase) or a transaction with low risk (e.g., admission to a members-only web site).

Conversely, for authenticating other transactions, it may be desirable to require a high degree of confidence in the authentication before allowing the transaction to proceed. Such transactions may include transactions of large dollar value (e.g., signing a multi-million dollar supply contract) or transaction with a high risk if an improper authentication occurs (e.g., remotely logging onto a government computer).

The use of the heuristics 530 in combination with confidence levels and transactions values may be used as will be described below to allow the comparator to provide a dynamic context-sensitive authentication system.

According to another embodiment of the invention, the comparator 515 may advantageously track authentication attempts for a particular transaction. For example, when a transaction fails, the trust engine 110 may request the user to re-enter his or her current authentication data. The comparator 515 of the authentication engine 215 may advantageously employ an attempt limiter 535 to limit the number of authentication attempts, thereby prohibiting brute-force attempts to impersonate a user's authentication data. According to one embodiment, the attempt limiter 535 comprises a software module monitoring transactions for repeating authentication attempts and, for example, limiting the authentication attempts for a given transaction to three. Thus, the attempt limiter 535 will limit an automated attempt to impersonate an individual's authentication data to, for example, simply three "guesses." Upon three failures, the attempt limiter 535 may advantageously deny additional authentication attempts. Such denial may advantageously be implemented through, for example, the comparator 515 returning a negative result regardless of the current authentication data being transmitted. On the other hand, the transaction engine 205 may advantageously block any additional authentication attempts pertaining to a transaction in which three attempts have previously failed.

The authentication engine 215 also includes the data splitting module 520 and the data assembling module 525. The data splitting module 520 advantageously comprises a software, hardware, or combination module having the ability to mathematically operate on various data so as to substantially randomize and split the data into portions. According to one embodiment, original data is not recreatable from an individual portion. The data assembling module 525 advantageously comprises a software, hardware, or combination module configured to mathematically operate on the foregoing substantially randomized portions, such that the combination thereof provides the original deciphered data. According to one embodiment, the authentication engine 215 employs the data splitting module 520 to randomize and split enrollment authentication data into portions, and employs the data assembling module 525 to reassemble the portions into usable enrollment authentication data.

Figure 6:
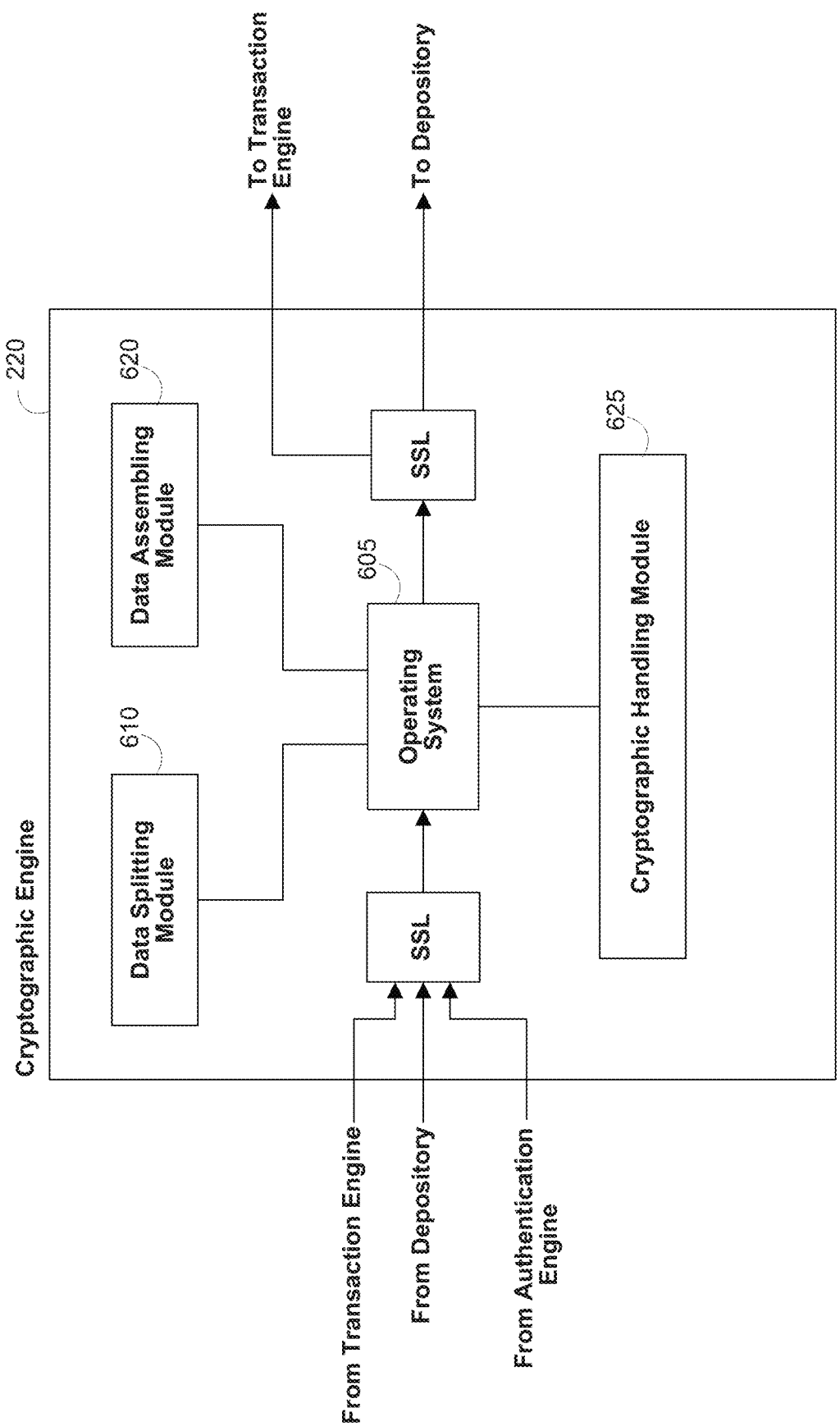
FIG. 6 illustrates a block diagram of the cryptographic engine of FIG. 2, according to aspects of an embodiment of the invention.

FIG. 6 illustrates a block diagram of the cryptographic engine 220 of the trust engine 200 of FIG. 2 according to aspects of one embodiment of the invention. Similar to the transaction engine 205 of FIG. 3, the cryptographic engine 220 comprises an operating system 605 having at least a listening and a handling thread of a modified version of a conventional Web server, such as, for example, Web servers available from Apache. As shown in FIG. 6, the cryptographic engine 220 comprises a data splitting module 610 and a data assembling module 620 that function similar to those of FIG. 5. However, according to one embodiment, the data splitting module 610 and the data assembling module 620 process cryptographic key data, as opposed to the foregoing enrollment authentication data. Although, a skilled artisan will recognize from the disclosure herein that the data splitting module 910 and the data splitting module 620 may be combined with those of the authentication engine 215.

The cryptographic engine 220 also comprises a cryptographic handling module 625 configured to perform one, some or all of a wide number of cryptographic functions. According to one embodiment, the cryptographic handling module 625 may comprise software modules or programs, hardware, or both. According to another embodiment, the cryptographic handling module 625 may perform data comparisons, data parsing, data splitting, data separating, data hashing, data encryption or decryption, digital signature verification or creation, digital certificate generation, storage, or requests, cryptographic key generation, or the like. Moreover, a skilled artisan will recognize from the disclosure herein that the cryptographic handling module 825 may advantageously comprises a public-key infrastructure, such as Pretty Good Privacy (PGP), an RSA-based public-key system, or a wide number of alternative key management systems. In addition, the cryptographic handling module 625 may perform public-key encryption, symmetric-key encryption, or both. In addition to the foregoing, the cryptographic handling module 625 may include one or more computer programs or modules, hardware, or both, for implementing seamless, transparent, interoperability functions.

A skilled artisan will also recognize from the disclosure herein that the cryptographic functionality may include a wide number or variety of functions generally relating to cryptographic key management systems.

FIG. 7 illustrates a simplified block diagram of a depository system 700 according to aspects of an embodiment of the invention. As shown in FIG. 7, the depository system 700 advantageously comprises multiple data storage facilities, for example, data storage facilities D1, D2, D3, and D4. However, it is readily understood by those of ordinary skill in the art that the depository system may have only one data storage facility. According to one embodiment of the invention, each of the data storage facilities D1 through D4 may advantageously comprise some or all of the elements disclosed with reference to the depository 210 of FIG. 4. Similar to the depository 210, the data storage facilities D1 through D4 communicate with the transaction engine 205, the authentication engine 215, and the cryptographic engine 220, preferably through conventional SSL. Communication links transferring, for example, XML documents. Communications from the transaction engine 205 may advantageously include requests for data, wherein the request is advantageously broadcast to the IP address of each data storage facility D1 through D4. On the other hand, the transaction engine 205 may broadcast requests to particular data storage facilities based on a wide number of criteria, such as, for example, response time, server loads, maintenance schedules, or the like.

In response to requests for data from the transaction engine 205, the depository system 700 advantageously forwards stored data to the authentication engine 215 and the cryptographic engine 220. The respective data assembling modules receive the forwarded data and assemble the data into useable formats. On the other hand, communications from the authentication engine 215 and the cryptographic engine 220 to the data storage facilities D1 through D4 may include the transmission of sensitive data to be stored. For example, according to one embodiment, the authentication engine 215 and the cryptographic engine 220 may advantageously employ their respective data splitting modules to divide sensitive data into undecipherable portions, and then transmit one or more undecipherable portions of the sensitive data to a particular data storage facility.

According to one embodiment, each data storage facility, D1 through D4, comprises a separate and independent storage system, such as, for example, a directory server. According to another embodiment of the invention, the depository system 700 comprises multiple geographically separated independent data storage systems. By distributing the sensitive data into distinct and independent storage facilities D1 through D4, some or all of which may be advantageously geographically separated, the depository system 700 provides redundancy along with additional security measures. For example, according to one embodiment, only data from two of the multiple data storage facilities, D1 through D4, are needed to decipher and reassemble the sensitive data. Thus, as many as two of the four data storage facilities D1 through D4 may be inoperative due to maintenance, system failure, power failure, or the like, without affecting the functionality of the trust engine 110. In addition, because, according to one embodiment, the data stored in each data storage facility is randomized and undecipherable, compromise of any individual data storage facility does not necessarily compromise the sensitive data. Moreover, in the embodiment having geographical separation of the data storage facilities, a compromise of multiple geographically remote facilities becomes increasingly difficult. In fact, even a rogue employee will be greatly challenged to subvert the needed multiple independent geographically remote data storage facilities.

Although the depository system 700 is disclosed with reference to its preferred and alternative embodiments, the invention is not intended to be limited thereby. Rather, a skilled artisan will recognize from the disclosure herein, a wide number of alternatives for the depository system 700. For example, the depository system 700 may comprise one, two or more data storage facilities. In addition, sensitive data may be mathematically operated such that portions from two or more data storage facilities are needed to reassemble and decipher the sensitive data.

Figure 8:
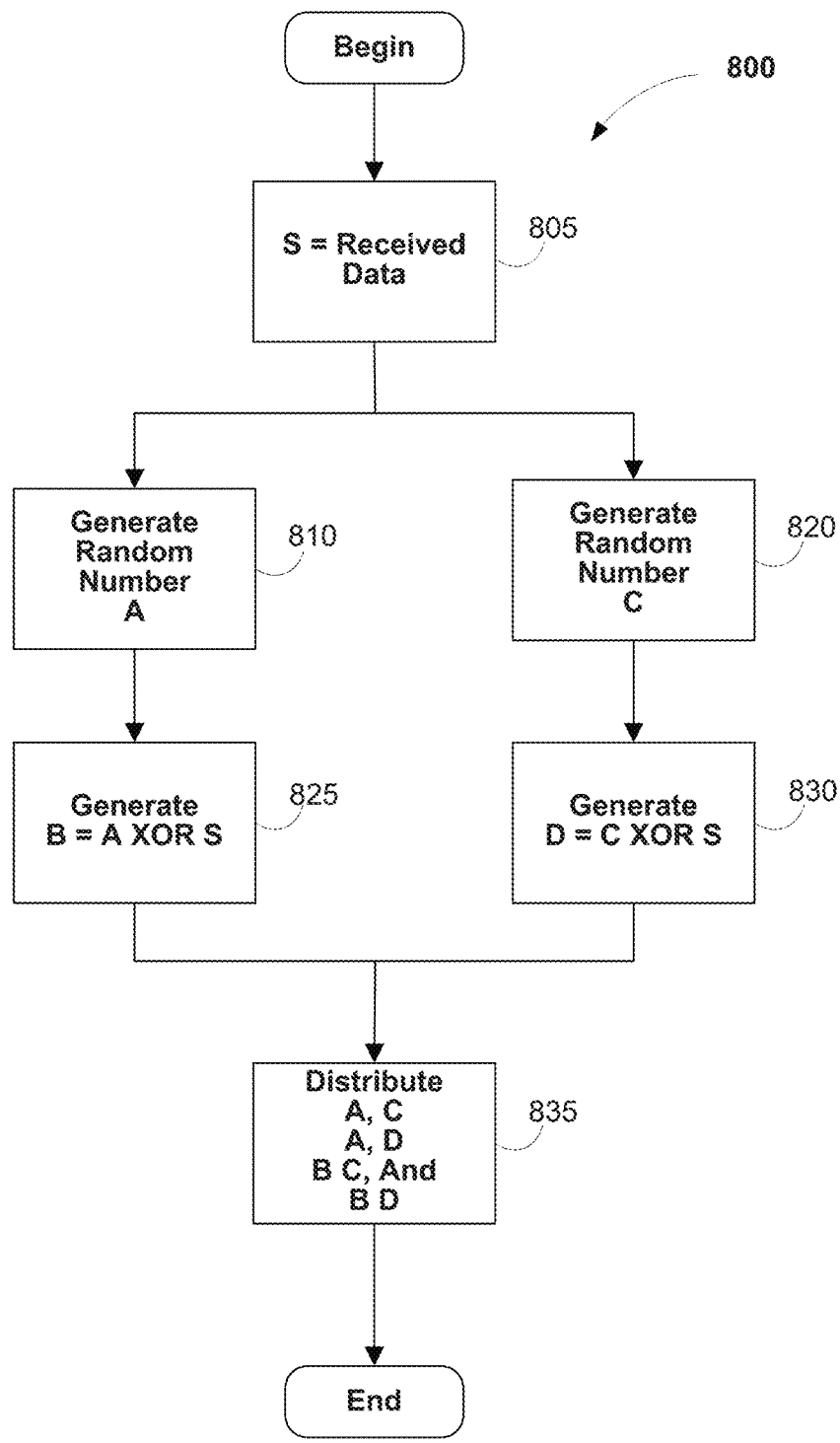
FIG. 8 illustrates a flow chart of a data splitting process according to aspects of an embodiment of the invention.

As mentioned in the foregoing, the authentication engine 215 and the cryptographic engine 220 each include a data splitting module 520 and 610, respectively, for splitting any type or form of sensitive data, such as, for example, text, audio, video, the authentication data and the cryptographic key data. FIG. 8 illustrates a flowchart of a data splitting process 800 performed by the data splitting module according to aspects of an embodiment of the invention. As shown in FIG. 8, the data splitting process 800 begins at step 805 when sensitive data "S" is received by the data splitting module of the authentication engine 215 or the cryptographic engine 220. Preferably, in step 810, the data splitting module then generates a substantially random number, value, or string or set of bits, "A." For example, the random number A may be generated in a wide number of varying conventional techniques available to one of ordinary skill in the art, for producing high quality random numbers suitable for use in cryptographic applications. In addition, according to one embodiment, the random number A comprises a bit length which may be any suitable length, such as shorter, longer or equal to the bit length of the sensitive data, S.

In addition, in step 820 the data splitting process 800 generates another statistically random number "C." According to the preferred embodiment, the generation of the statistically random numbers A and C may advantageously be done in parallel. The data splitting module then combines the numbers A and C with the sensitive data S such that new numbers "B" and "D" are generated. For example, number B may comprise the binary combination of A XOR S and number D may comprise the binary combination of C XOR S. The XOR function, or the "exclusive-or" function, is well known to those of ordinary skill in the art. The foregoing combinations preferably occur in steps 825 and 830, respectively, and, according to one embodiment, the foregoing combinations also occur in parallel. The data splitting process 800 then proceeds to step 835 where the random numbers A and C and the numbers B and D are paired such that none of the pairings contain sufficient data, by themselves, to reorganize and decipher the original sensitive data S. For example, the numbers may be paired as follows: AC, AD, BC, and BD. According to one embodiment, each of the foregoing pairings is distributed to one of the depositories D1 through D4 of FIG. 7. According to another embodiment, each of the foregoing pairings is randomly distributed to one of the depositories D1 through D4. For example, during a first data splitting process 800, the pairing AC may be sent to depository D2, through, for example, a random selection of D2's IP address. Then, during a second data splitting process 800, the pairing AC may be sent to depository D4, through, for example, a random selection of D4's IP address. In addition, the pairings may all be stored on one depository, and may be stored in separate locations on said depository.

Based on the foregoing, the data splitting process 800 advantageously places portions of the sensitive data in each of the four data storage facilities D1 through D4, such that no single data storage facility D1 through D4 includes sufficient encrypted data to recreate the original sensitive data S. As mentioned in the foregoing, such randomization of the data into individually unusable encrypted portions increases security and provides for maintained trust in the data even if one of the data storage facilities, D1 through D4, is compromised.

Although the data splitting process 800 is disclosed with reference to its preferred embodiment, the invention is not intended to be limited thereby. Rather a skilled artisan will recognize from the disclosure herein, a wide number of alternatives for the data splitting process 800. For example, the data splitting process may advantageously split the data into two numbers, for example, random number A and number B and, randomly distribute A and B through two data storage facilities. Moreover, the data splitting process 800 may advantageously split the data among a wide number of data storage facilities through generation of additional random numbers. The data may be split into any desired, selected, predetermined, or randomly assigned size unit, including but not limited to, a bit, bits, bytes, kilobytes, megabytes or larger, or any combination or sequence of sizes. In addition, varying the sizes of the data units resulting from the splitting process may render the data more difficult to restore to a useable form, thereby increasing security of sensitive data. It is readily apparent to those of ordinary skill in the art that the split data unit sizes may be a wide variety of data unit sizes or patterns of sizes or combinations of sizes. For example, the data unit sizes may be selected or predetermined to be all of the same size, a fixed set of different sizes, a combination of sizes, or randomly generates sizes. Similarly, the data units may be distributed into one or more shares according to a fixed or predetermined data unit size, a pattern or combination of data unit sizes, or a randomly generated data unit size or sizes per share.

As mentioned in the foregoing, in order to recreate the sensitive data S, the data portions need to be derandomized and reorganized. This process may advantageously occur in the data assembling modules, 525 and 620, of the authentication engine 215 and the cryptographic engine 220, respectively. The data assembling module, for example, data assembly module 525, receives data portions from the data storage facilities D1 through D4, and reassembles the data into useable form. For example, according to one embodiment where the data splitting module 520 employed the data splitting process 800 of FIG. 8, the data assembling module 525 uses data portions from at least two of the data storage facilities D1 through D4 to recreate the sensitive data S. For example, the pairings of AC, AD, BC, and BD, were distributed such that any two provide one of A and B, or, C and D. Noting that S=A XOR B or S=C XOR D indicates that when the data assembling module receives one of A and B, or, C and D, the data assembling module 525 can advantageously reassemble the sensitive data S. Thus, the data assembling module 525 may assemble the sensitive data S, when, for example, it receives data portions from at least the first two of the data storage facilities D1 through D4 to respond to an assemble request by the trust engine 110.

Based on the above data splitting and assembling processes, the sensitive data S exists in usable format only in a limited area of the trust engine 110. For example, when the sensitive data S includes enrollment authentication data, usable, nonrandomized enrollment authentication data is available only in the authentication engine 215. Likewise, when the sensitive data S includes private cryptographic key data, usable, nonrandomized private cryptographic key data is available only in the cryptographic engine 220.

Although the data splitting and assembling processes are disclosed with reference to their preferred embodiments, the invention is not intended to be limited thereby. Rather, a skilled artisan will recognize from the disclosure herein, a wide number of alternatives for splitting and reassembling the sensitive data S. For example, public-key encryption may be used to further secure the data at the data storage facilities D1 through D4. In addition, it is readily apparent to those of ordinary skill in the art that the data splitting module described herein is also a separate and distinct embodiment of the present invention that may be incorporated into, combined with or otherwise made part of any pre-existing computer systems, software suites, database, or combinations thereof, or other embodiments of the present invention, such as the trust engine, authentication engine, and transaction engine disclosed and described herein.

FIG. 9A illustrates a data flow of an enrollment process 900 according to aspects of an embodiment of the invention. As shown in FIG. 9A, the enrollment process 900 begins at step 905 when a user desires to enroll with the trust engine 110 of the cryptographic system 100. According to this embodiment, the user system 105 advantageously includes a client-side applet, such as a Java-based, that queries the user to enter enrollment data, such as demographic data and enrollment authentication data. According to one embodiment, the enrollment authentication data includes user ID, password(s), biometric(s), or the like. According to one embodiment, during the querying process, the client-side applet preferably communicates with the trust engine 110 to ensure that a chosen user ID is unique. When the user ID is nonunique, the trust engine 110 may advantageously suggest a unique user ID. The client-side applet gathers the enrollment data and transmits the enrollment data, for example, through and XML document, to the trust engine 110, and in particular, to the transaction engine 205. According to one embodiment, the transmission is encoded with the public key of the authentication engine 215.

According to one embodiment, the user performs a single enrollment during step 905 of the enrollment process 900. For example, the user enrolls himself or herself as a particular person, such as Joe User. When Joe User desires to enroll as Joe User, CEO of Mega Corp., then according to this embodiment, Joe User enrolls a second time, receives a second unique user ID and the trust engine 110 does not associate the two identities. According to another embodiment of the invention, the enrollment process 900 provides for multiple user identities for a single user ID. Thus, in the above example, the trust engine 110 will advantageously associate the two identities of Joe User. As will be understood by a skilled artisan from the disclosure herein, a user may have many identities, for example, Joe User the head of household, Joe User the member of the Charitable Foundations, and the like. Even though the user may have multiple identities, according to this embodiment, the trust engine 110 preferably stores only one set of enrollment data. Moreover, users may advantageously add, edit/update, or delete identities as they are needed.

Although the enrollment process 900 is disclosed with reference to its preferred embodiment, the invention is not intended to be limited thereby. Rather, a skilled artisan will recognize from the disclosure herein, a wide number of alternatives for gathering of enrollment data, and in particular, enrollment authentication data. For example, the applet may be common object model (COM) based applet or the like.

On the other hand, the enrollment process may include graded enrollment. For example, at a lowest level of enrollment, the user may enroll over the communication link 125 without producing documentation as to his or her identity. According to an increased level of enrollment, the user enrolls using a trusted third party, such as a digital notary. For example, and the user may appear in person to the trusted third party, produce credentials such as a birth certificate, driver's license, military ID, or the like, and the trusted third party may advantageously include, for example, their digital signature in enrollment submission. The trusted third party may include an actual notary, a government agency, such as the Post Office or Department of Motor Vehicles, a human resources person in a large company enrolling an employee, or the like. A skilled artisan will understand from the disclosure herein that a wide number of varying levels of enrollment may occur during the enrollment process 900.

After receiving the enrollment authentication data, at step 915, the transaction engine 205, using conventional FULL SSL technology forwards the enrollment authentication data to the authentication engine 215. In step 920, the authentication engine 215 decrypts the enrollment authentication data using the private key of the authentication engine 215. In addition, the authentication engine 215 employs the data splitting module to mathematically operate on the enrollment authentication data so as to split the data into at least two independently undecipherable, randomized, numbers. As mentioned in the foregoing, at least two numbers may comprise a statistically random number and a binary X0Red number. In step 925, the authentication engine 215 forwards each portion of the randomized numbers to one of the data storage facilities D1 through D4. As mentioned in the foregoing, the authentication engine 215 may also advantageously randomize which portions are transferred to which depositories.

Often during the enrollment process 900, the user will also desire to have a digital certificate issued such that he or she may receive encrypted documents from others outside the cryptographic system 100. As mentioned in the foregoing, the certificate authority 115 generally issues digital certificates according to one or more of several conventional standards. Generally, the digital certificate includes a public key of the user or system, which is known to everyone.

Whether the user requests a digital certificate at enrollment, or at another time, the request is transferred through the trust engine 110 to the authentication engine 215. According to one embodiment, the request includes an XML document having, for example, the proper name of the user. According to step 935, the authentication engine 215 transfers the request to the cryptographic engine 220 instructing the cryptographic engine 220 to generate a cryptographic key or key pair.

Upon request, at step 935, the cryptographic engine 220 generates at least one cryptographic key. According to one embodiment, the cryptographic handling module 625 generates a key pair, where one key is used as a private key, and one is used as a public key. The cryptographic engine 220 stores the private key and, according to one embodiment, a copy of the public key. In step 945, the cryptographic engine 220 transmits a request for a digital certificate to the transaction engine 205. According to one embodiment, the request advantageously includes a standardized request, such as PKCS10, embedded in, for example, an XML document. The request for a digital certificate may advantageously correspond to one or more certificate authorities and the one or more standard formats the certificate authorities require.

In step 950 the transaction engine 205 forwards this request to the certificate authority 115, who, in step 955, returns a digital certificate. The return digital certificate may advantageously be in a standardized format, such as PKCS7, or in a proprietary format of one or more of the certificate authorities 115. In step 960, the digital certificate is received by the transaction engine 205, and a copy is forwarded to the user and a copy is stored with the trust engine 110. The trust engine 110 stores a copy of the certificate such that the trust engine 110 will not need to rely on the availability of the certificate authority 115. For example, when the user desires to send a digital certificate, or a third party requests the user's digital certificate, the request for the digital certificate is typically sent to the certificate authority 115. However, if the certificate authority 115 is conducting maintenance or has been victim of a failure or security compromise, the digital certificate may not be available.

At any time after issuing the cryptographic keys, the cryptographic engine 220 may advantageously employ the data splitting process 800 described above such that the cryptographic keys are split into independently undecipherable randomized numbers. Similar to the authentication data, at step 965 the cryptographic engine 220 transfers the randomized numbers to the data storage facilities D1 through D4.

A skilled artisan will recognize from the disclosure herein that the user may request a digital certificate anytime after enrollment. Moreover, the communications between systems may advantageously include FULL SSL or public-key encryption technologies. Moreover, the enrollment process may issue multiple digital certificates from multiple certificate authorities, including one or more proprietary certificate authorities internal or external to the trust engine 110.

As disclosed in steps 935 through 960, one embodiment of the invention includes the request for a certificate that is eventually stored on the trust engine 110. Because, according to one embodiment, the cryptographic handling module 625 issues the keys used by the trust engine 110, each certificate corresponds to a private key. Therefore, the trust engine 110 may advantageously provide for interoperability through monitoring the certificates owned by, or associated with, a user. For example, when the cryptographic engine 220 receives a request for a cryptographic function, the cryptographic handling module 625 may investigate the certificates owned by the requesting user to determine whether the user owns a private key matching the attributes of the request. When such a certificate exists, the cryptographic handling module 625 may use the certificate or the public or private keys associated therewith, to perform the requested function. When such a certificate does not exist, the cryptographic handling module 625 may advantageously and transparently perform a number of actions to attempt to remedy the lack of an appropriate key. For example, FIG. 9B illustrates a flowchart of an interoperability process 970, which according to aspects of an embodiment of the invention, discloses the foregoing steps to ensure the cryptographic handling module 625 performs cryptographic functions using appropriate keys.

Figure 9B:
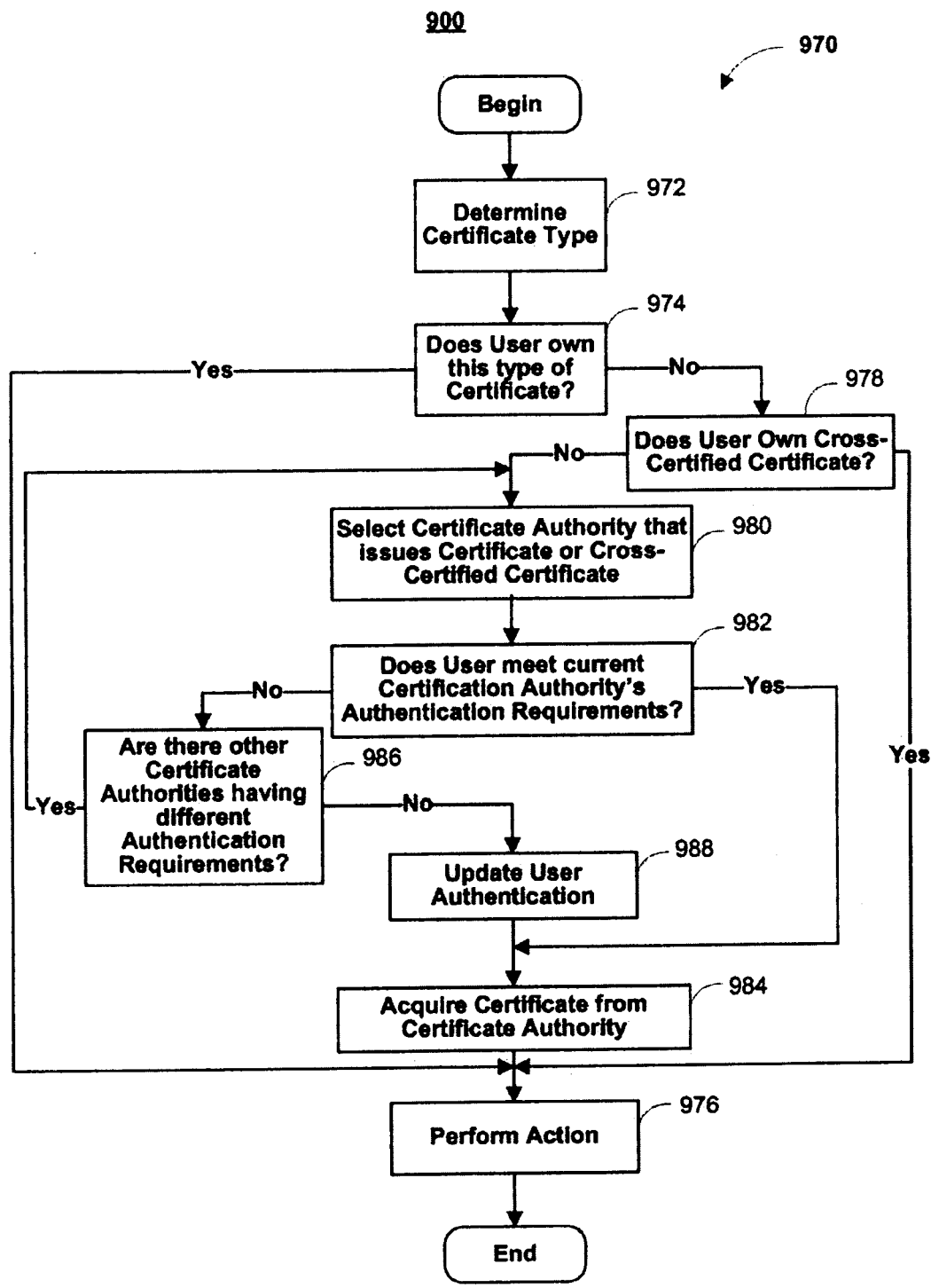
FIG. 9B illustrates a flow chart of an interoperability process according to aspects of an embodiment of the invention.

As shown in FIG. 9B, the interoperability process 970 begins with step 972 where the cryptographic handling module 925 determines the type of certificate desired. According to one embodiment of the invention, the type of certificate may advantageously be specified in the request for cryptographic functions, or other data provided by the requestor. According to another embodiment, the certificate type may be ascertained by the data format of the request. For example, the cryptographic handling module 925 may advantageously recognize the request corresponds to a particular type.

According to one embodiment, the certificate type may include one or more algorithm standards, for example, RSA, ELGAMAL, or the like. In addition, the certificate type may include one or more key types, such as symmetric keys, public keys, strong encryption keys such as 256 bit keys, less secure keys, or the like. Moreover, the certificate type may include upgrades or replacements of one or more of the foregoing algorithm standards or keys, one or more message or data formats, one or more data encapsulation or encoding schemes, such as Base 32 or Base 64. The certificate type may also include compatibility with one or more third-party cryptographic applications or interfaces, one or more communication protocols, or one or more certificate standards or protocols. A skilled artisan will recognize from the disclosure herein that other differences may exist in certificate types, and translations to and from those differences may be implemented as disclosed herein.

Once the cryptographic handling module 625 determines the certificate type, the interoperability process 970 proceeds to step 974, and determines whether the user owns a certificate matching the type determined in step 974. When the user owns a matching certificate, for example, the trust engine 110 has access to the matching certificate through, for example, prior storage thereof, the cryptographic handling module 825 knows that a matching private key is also stored within the trust engine 110. For example, the matching private key may be stored within the depository 210 or depository system 700. The cryptographic handling module 625 may advantageously request the matching private key be assembled from, for example, the depository 210, and then in step 976, use the matching private key to perform cryptographic actions or functions. For example, as mentioned in the foregoing, the cryptographic handling module 625 may advantageously perform hashing, hash comparisons, data encryption or decryption, digital signature verification or creation, or the like.

When the user does not own a matching certificate, the interoperability process 970 proceeds to step 978 where the cryptographic handling module 625 determines whether the users owns a cross-certified certificate. According to one embodiment, cross-certification between certificate authorities occurs when a first certificate authority determines to trust certificates from a second certificate authority. In other words, the first certificate authority determines that certificates from the second certificate authority meets certain quality standards, and therefore, may be "certified" as equivalent to the first certificate authority's own certificates. Cross-certification becomes more complex when the certificate authorities issue, for example, certificates having levels of trust. For example, the first certificate authority may provide three levels of trust for a particular certificate, usually based on the degree of reliability in the enrollment process, while the second certificate authority may provide seven levels of trust. Cross-certification may advantageously track which levels and which certificates from the second certificate authority may be substituted for which levels and which certificates from the first. When the foregoing cross-certification is done officially and publicly between two certification authorities, the mapping of certificates and levels to one another is often called "chaining."

According to another embodiment of the invention, the cryptographic handling module 625 may advantageously develop cross-certifications outside those agreed upon by the certificate authorities. For example, the cryptographic handling module 625 may access a first certificate authority's certificate practice statement (CPS), or other published policy statement, and using, for example, the authentication tokens required by particular trust levels, match the first certificate authority's certificates to those of another certificate authority.

When, in step 978, the cryptographic handling module 625 determines that the users owns a cross-certified certificate, the interoperability process 970 proceeds to step 976, and performs the cryptographic action or function using the cross-certified public key, private key, or both. Alternatively, when the cryptographic handling module 625 determines that the users does not own a cross-certified certificate, the interoperability process 970 proceeds to step 980, where the cryptographic handling module 625 selects a certificate authority that issues the requested certificate type, or a certificate cross-certified thereto. In step 982, the cryptographic handling module 625 determines whether the user enrollment authentication data, discussed in the foregoing, meets the authentication requirements of the chosen certificate authority. For example, if the user enrolled over a network by, for example, answering demographic and other questions, the authentication data provided may establish a lower level of trust than a user providing biometric data and appearing before a third-party, such as, for example, a notary. According to one embodiment, the foregoing authentication requirements may advantageously be provided in the chosen authentication authority's CPS.

When the user has provided the trust engine 110 with enrollment authentication data meeting the requirements of chosen certificate authority, the interoperability process 970 proceeds to step 984, where the cryptographic handling module 825 acquires the certificate from the chosen certificate authority. According to one embodiment, the cryptographic handling module 625 acquires the certificate by following steps 945 through 960 of the enrollment process 900. For example, the cryptographic handling module 625 may advantageously employ one or more public keys from one or more of the key pairs already available to the cryptographic engine 220, to request the certificate from the certificate authority. According to another embodiment, the cryptographic handling module 625 may advantageously generate one or more new key pairs, and use the public keys corresponding thereto, to request the certificate from the certificate authority.

According to another embodiment, the trust engine 110 may advantageously include one or more certificate issuing modules capable of issuing one or more certificate types. According to this embodiment, the certificate issuing module may provide the foregoing certificate. When the cryptographic handling module 625 acquires the certificate, the interoperability process 970 proceeds to step 976, and performs the cryptographic action or function using the public key, private key, or both corresponding to the acquired certificate.

When the user, in step 982, has not provided the trust engine 110 with enrollment authentication data meeting the requirements of chosen certificate authority, the cryptographic handling module 625 determines, in step 986 whether there are other certificate authorities that have different authentication requirements. For example, the cryptographic handling module 625 may look for certificate authorities having lower authentication requirements, but still issue the chosen certificates, or cross-certifications thereof.

When the foregoing certificate authority having lower requirements exists, the interoperability process 970 proceeds to step 980 and chooses that certificate authority. Alternatively, when no such certificate authority exists, in step 988, the trust engine 110 may request additional authentication tokens from the user. For example, the trust engine 110 may request new enrollment authentication data comprising, for example, biometric data. Also, the trust engine 110 may request the user appear before a trusted third party and provide appropriate authenticating credentials, such as, for example, appearing before a notary with a drivers license, social security card, bank card, birth certificate, military ID, or the like. When the trust engine 110 receives updated authentication data, the interoperability process 970 proceeds to step 984 and acquires the foregoing chosen certificate.

Through the foregoing interoperability process 970, the cryptographic handling module 625 advantageously provides seamless, transparent, translations and conversions between differing cryptographic systems. A skilled artisan will recognize from the disclosure herein, a wide number of advantages and implementations of the foregoing interoperable system. For example, the foregoing step 986 of the interoperability process 970 may advantageously include aspects of trust arbitrage, discussed in further detail below, where the certificate authority may under special circumstances accept lower levels of cross-certification. In addition, the interoperability process 970 may include ensuring interoperability between and employment of standard certificate revocations, such as employing certificate revocation lists (CRL), online certificate status protocols (OCSP), or the like.

FIG. 10 illustrates a data flow of an authentication process 1000 according to aspects of an embodiment of the invention. According to one embodiment, the authentication process 1000 includes gathering current authentication data from a user and comparing that to the enrollment authentication data of the user. For example, the authentication process 1000 begins at step 1005 where a user desires to perform a transaction with, for example, a vendor. Such transactions may include, for example, selecting a purchase option, requesting access to a restricted area or device of the vendor system 120, or the like. At step 1010, a vendor provides the user with a transaction ID and an authentication request. The transaction ID may advantageously include a 192 bit quantity having a 32 bit timestamp concatenated with a 128 bit random quantity, or a "nonce," concatenated with a 32 bit vendor specific constant. Such a transaction ID uniquely identifies the transaction such that copycat transactions can be refused by the trust engine 110.

The authentication request may advantageously include what level of authentication is needed for a particular transaction. For example, the vendor may specify a particular level of confidence that is required for the transaction at issue. If authentication cannot be made to this level of confidence, as will be discussed below, the transaction will not occur without either further authentication by the user to raise the level of confidence, or a change in the terms of the authentication between the vendor and the server. These issues are discussed more completely below.

According to one embodiment, the transaction ID and the authentication request may be advantageously generated by a vendor-side applet or other software program. In addition, the transmission of the transaction ID and authentication data may include one or more XML documents encrypted using conventional SSL technology, such as, for example, ½ SSL, or, in other words vendor-side authenticated SSL.

After the user system 105 receives the transaction ID and authentication request, the user system 105 gathers the current authentication data, potentially including current biometric information, from the user. The user system 105, at step 1015, encrypts at least the current authentication data "B" and the transaction ID, with the public key of the authentication engine 215, and transfers that data to the trust engine 110. The transmission preferably comprises XML documents encrypted with at least conventional ½ SSL technology. In step 1020, the transaction engine 205 receives the transmission, preferably recognizes the data format or request in the URL or URI, and forwards the transmission to the authentication engine 215.

During steps 1015 and 1020, the vendor system 120, at step 1025, forwards the transaction ID and the authentication request to the trust engine 110, using the preferred FULL SSL technology. This communication may also include a vendor ID, although vendor identification may also be communicated through a non-random portion of the transaction ID. At steps 1030 and 1035, the transaction engine 205 receives the communication, creates a record in the audit trail, and generates a request for the user's enrollment authentication data to be assembled from the data storage facilities D1 through D4. At step 1040, the depository system 700 transfers the portions of the enrollment authentication data corresponding to the user to the authentication engine 215. At step 1045, the authentication engine 215 decrypts the transmission using its private key and compares the enrollment authentication data to the current authentication data provided by the user.

The comparison of step 1045 may advantageously apply heuristical context sensitive authentication, as referred to in the forgoing, and discussed in further detail below. For example, if the biometric information received does not match perfectly, a lower confidence match results. In particular embodiments, the level of confidence of the authentication is balanced against the nature of the transaction and the desires of both the user and the vendor. Again, this is discussed in greater detail below.

At step 1050, the authentication engine 215 fills in the authentication request with the result of the comparison of step 1045. According to one embodiment of the invention, the authentication request is filled with a YES/NO or TRUE/FALSE result of the authentication process 1000. In step 1055 the filled-in authentication request is returned to the vendor for the vendor to act upon, for example, allowing the user to complete the transaction that initiated the authentication request. According to one embodiment, a confirmation message is passed to the user.

Based on the foregoing, the authentication process 1000 advantageously keeps sensitive data secure and produces results configured to maintain the integrity of the sensitive data. For example, the sensitive data is assembled only inside the authentication engine 215. For example, the enrollment authentication data is undecipherable until it is assembled in the authentication engine 215 by the data assembling module, and the current authentication data is undecipherable until it is unwrapped by the conventional SSL technology and the private key of the authentication engine 215. Moreover, the authentication result transmitted to the vendor does not include the sensitive data, and the user may not even know whether he or she produced valid authentication data.

Although the authentication process 1000 is disclosed with reference to its preferred and alternative embodiments, the invention is not intended to be limited thereby. Rather, a skilled artisan will recognize from the disclosure herein, a wide number of alternatives for the authentication process 1000. For example, the vendor may advantageously be replaced by almost any requesting application, even those residing with the user system 105. For example, a client application, such as Microsoft Word, may use an application program interface (API) or a cryptographic API (CAPI) to request authentication before unlocking a document. Alternatively, a mail server, a network, a cellular phone, a personal or mobile computing device, a workstation, or the like, may all make authentication requests that can be filled by the authentication process 1000. In fact, after providing the foregoing trusted authentication process 1000, the requesting application or device may provide access to or use of a wide number of electronic or computer devices or systems.

Moreover, the authentication process 1000 may employ a wide number of alternative procedures in the event of authentication failure. For example, authentication failure may maintain the same transaction ID and request that the user reenter his or her current authentication data. As mentioned in the foregoing, use of the same transaction ID allows the comparator of the authentication engine 215 to monitor and limit the number of authentication attempts for a particular transaction, thereby creating a more secure cryptographic system 100.

In addition, the authentication process 1000 may be advantageously be employed to develop elegant single sign-on solutions, such as, unlocking a sensitive data vault. For example, successful or positive authentication may provide the authenticated user the ability to automatically access any number of passwords for an almost limitless number of systems and applications. For example, authentication of a user may provide the user access to password, login, financial credentials, or the like, associated with multiple online vendors, a local area network, various personal computing devices, Internet service providers, auction providers, investment brokerages, or the like. By employing a sensitive data vault, users may choose truly large and random passwords because they no longer need to remember them through association. Rather, the authentication process 1000 provides access thereto. For example, a user may choose a random alphanumeric string that is twenty plus digits in length rather than something associated with a memorable data, name, etc.

According to one embodiment, a sensitive data vault associated with a given user may advantageously be stored in the data storage facilities of the depository 210, or split and stored in the depository system 700. According to this embodiment, after positive user authentication, the trust engine 110 serves the requested sensitive data, such as, for example, to the appropriate password to the requesting application. According to another embodiment, the trust engine 110 may include a separate system for storing the sensitive data vault. For example, the trust engine 110 may include a stand-alone software engine implementing the data vault functionality and figuratively residing "behind" the foregoing front-end security system of the trust engine 110. According to this embodiment, the software engine serves the requested sensitive data after the software engine receives a signal indicating positive user authentication from the trust engine 110.

In yet another embodiment, the data vault may be implemented by a third-party system. Similar to the software engine embodiment, the third-party system may advantageously serve the requested sensitive data after the third-party system receives a signal indicating positive user authentication from the trust engine 110. According to yet another embodiment, the data vault may be implemented on the user system 105. A user-side software engine may advantageously serve the foregoing data after receiving a signal indicating positive user authentication from the trust engine 110.

Although the foregoing data vaults are disclosed with reference to alternative embodiments, a skilled artisan will recognize from the disclosure herein, a wide number of additional implementations thereof. For example, a particular data vault may include aspects from some or all of the foregoing embodiments. In addition, any of the foregoing data vaults may employ one or more authentication requests at varying times. For example, any of the data vaults may require authentication every one or more transactions, periodically, every one or more sessions, every access to one or more Webpages or Websites, at one or more other specified intervals, or the like.

FIG. 11 illustrates a data flow of a signing process 1100 according to aspects of an embodiment of the invention. As shown in FIG. 11, the signing process 1100 includes steps similar to those of the authentication process 1000 described in the foregoing with reference to FIG. 10. According to one embodiment of the invention, the signing process 1100 first authenticates the user and then performs one or more of several digital signing functions as will be discussed in further detail below. According to another embodiment, the signing process 1100 may advantageously store data related thereto, such as hashes of messages or documents, or the like. This data may advantageously be used in an audit or any other event, such as for example, when a participating party attempts to repudiate a transaction.

As shown in FIG. 11, during the authentication steps, the user and vendor may advantageously agree on a message, such as, for example, a contract. During signing, the signing process 1100 advantageously ensures that the contract signed by the user is identical to the contract supplied by the vendor. Therefore, according to one embodiment, during authentication, the vendor and the user include a hash of their respective copies of the message or contract, in the data transmitted to the authentication engine 215. By employing only a hash of a message or contract, the trust engine 110 may advantageously store a significantly reduced amount of data, providing for a more efficient and cost effective cryptographic system. In addition, the stored hash may be advantageously compared to a hash of a document in question to determine whether the document in question matches one signed by any of the parties. The ability to determine whether the document is identical to one relating to a transaction provides for additional evidence that can be used against a claim for repudiation by a party to a transaction.

In step 1103, the authentication engine 215 assembles the enrollment authentication data and compares it to the current authentication data provided by the user. When the comparator of the authentication engine 215 indicates that the enrollment authentication data matches the current authentication data, the comparator of the authentication engine 215 also compares the hash of the message supplied by the vendor to the hash of the message supplied by the user. Thus, the authentication engine 215 advantageously ensures that the message agreed to by the user is identical to that agreed to by the vendor.

In step 1105, the authentication engine 215 transmits a digital signature request to the cryptographic engine 220. According to one embodiment of the invention, the request includes a hash of the message or contract. However, a skilled artisan will recognize from the disclosure herein that the cryptographic engine 220 may encrypt virtually any type of data, including, but not limited to, video, audio, biometrics, images or text to form the desired digital signature. Returning to step 1105, the digital signature request preferably comprises an XML document communicated through conventional SSL technologies.

In step 1110, the authentication engine 215 transmits a request to each of the data storage facilities D1 through D4, such that each of the data storage facilities D1 through D4 transmit their respective portion of the cryptographic key or keys corresponding to a signing party. According to another embodiment, the cryptographic engine 220 employs some or all of the steps of the interoperability process 970 discussed in the foregoing, such that the cryptographic engine 220 first determines the appropriate key or keys to request from the depository 210 or the depository system 700 for the signing party, and takes actions to provide appropriate matching keys. According to still another embodiment, the authentication engine 215 or the cryptographic engine 220 may advantageously request one or more of the keys associated with the signing party and stored in the depository 210 or depository system 700.

According to one embodiment, the signing party includes one or both the user and the vendor. In such case, the authentication engine 215 advantageously requests the cryptographic keys corresponding to the user and/or the vendor. According to another embodiment, the signing party includes the trust engine 110. In this embodiment, the trust engine 110 is certifying that the authentication process 1000 properly authenticated the user, vendor, or both. Therefore, the authentication engine 215 requests the cryptographic key of the trust engine 110, such as, for example, the key belonging to the cryptographic engine 220, to perform the digital signature. According to another embodiment, the trust engine 110 performs a digital notary-like function. In this embodiment, the signing party includes the user, vendor, or both, along with the trust engine 110. Thus, the trust engine 110 provides the digital signature of the user and/or vendor, and then indicates with its own digital signature that the user and/or vendor were properly authenticated. In this embodiment, the authentication engine 215 may advantageously request assembly of the cryptographic keys corresponding to the user, the vendor, or both. According to another embodiment, the authentication engine 215 may advantageously request assembly of the cryptographic keys corresponding to the trust engine 110.

According to another embodiment, the trust engine 110 performs power of attorney-like functions. For example, the trust engine 110 may digitally sign the message on behalf of a third party. In such case, the authentication engine 215 requests the cryptographic keys associated with the third party. According to this embodiment, the signing process 1100 may advantageously include authentication of the third party, before allowing power of attorney-like functions. In addition, the authentication process 1000 may include a check for third party constraints, such as, for example, business logic or the like dictating when and in what circumstances a particular third-party's signature may be used.

Based on the foregoing, in step 1110, the authentication engine requested the cryptographic keys from the data storage facilities D1 through D4 corresponding to the signing party. In step 1115, the data storage facilities D1 through D4 transmit their respective portions of the cryptographic key corresponding to the signing party to the cryptographic engine 220. According to one embodiment, the foregoing transmissions include SSL technologies. According to another embodiment, the foregoing transmissions may advantageously be super-encrypted with the public key of the cryptographic engine 220.

In step 1120, the cryptographic engine 220 assembles the foregoing cryptographic keys of the signing party and encrypts the message therewith, thereby forming the digital signature(s). In step 1125 of the signing process 1100, the cryptographic engine 220 transmits the digital signature(s) to the authentication engine 215. In step 1130, the authentication engine 215 transmits the filled-in authentication request along with a copy of the hashed message and the digital signature(s) to the transaction engine 205. In step 1135, the transaction engine 205 transmits a receipt comprising the transaction ID, an indication of whether the authentication was successful, and the digital signature(s), to the vendor. According to one embodiment, the foregoing transmission may advantageously include the digital signature of the trust engine 110. For example, the trust engine 110 may encrypt the hash of the receipt with its private key, thereby forming a digital signature to be attached to the transmission to the vendor.

According to one embodiment, the transaction engine 205 also transmits a confirmation message to the user. Although the signing process 1100 is disclosed with reference to its preferred and alternative embodiments, the invention is not intended to be limited thereby. Rather, a skilled artisan will recognize from the disclosure herein, a wide number of alternatives for the signing process 1100. For example, the vendor may be replaced with a user application, such as an email application. For example, the user may wish to digitally sign a particular email with his or her digital signature. In such an embodiment, the transmission throughout the signing process 1100 may advantageously include only one copy of a hash of the message. Moreover, a skilled artisan will recognize from the disclosure herein that a wide number of client applications may request digital signatures. For example, the client applications may comprise word processors, spreadsheets, emails, voicemail, access to restricted system areas, or the like.

In addition, a skilled artisan will recognize from the disclosure herein that steps 1105 through 1120 of the signing process 1100 may advantageously employ some or all of the steps of the interoperability process 970 of FIG. 9B, thereby providing interoperability between differing cryptographic systems that may, for example, need to process the digital signature under differing signature types.

FIG. 12 illustrates a data flow of an encryption/decryption process 1200 according to aspects of an embodiment of the invention. As shown in FIG. 12, the decryption process 1200 begins by authenticating the user using the authentication process 1000. According to one embodiment, the authentication process 1000 includes in the authentication request, a synchronous session key. For example, in conventional PKI technologies, it is understood by skilled artisans that encrypting or decrypting data using public and private keys is mathematically intensive and may require significant system resources. However, in symmetric key cryptographic systems, or systems where the sender and receiver of a message share a single common key that is used to encrypt and decrypt a message, the mathematical operations are significantly simpler and faster. Thus, in the conventional PKI technologies, the sender of a message will generate synchronous session key, and encrypt the message using the simpler, faster symmetric key system. Then, the sender will encrypt the session key with the public key of the receiver. The encrypted session key will be attached to the synchronously encrypted message and both data are sent to the receiver. The receiver uses his or her private key to decrypt the session key, and then uses the session key to decrypt the message. Based on the foregoing, the simpler and faster symmetric key system is used for the majority of the encryption/decryption processing. Thus, in the decryption process 1200, the decryption advantageously assumes that a synchronous key has been encrypted with the public key of the user. Thus, as mentioned in the foregoing, the encrypted session key is included in the authentication request.

Returning to the decryption process 1200, after the user has been authenticated in step 1205, the authentication engine 215 forwards the encrypted session key to the cryptographic engine 220. In step 1210, the authentication engine 215 forwards a request to each of the data storage facilities, D1 through D4, requesting the cryptographic key data of the user. In step 1215, each data storage facility, D1 through D4, transmits their respective portion of the cryptographic key to the cryptographic engine 220. According to one embodiment, the foregoing transmission is encrypted with the public key of the cryptographic engine 220.

In step 1220 of the decryption process 1200, the cryptographic engine 220 assembles the cryptographic key and decrypts the session key therewith. In step 1225, the cryptographic engine forwards the session key to the authentication engine 215. In step 1227, the authentication engine 215 fills in the authentication request including the decrypted session key, and transmits the filled-in authentication request to the transaction engine 205. In step 1230, the transaction engine 205 forwards the authentication request along with the session key to the requesting application or vendor. Then, according to one embodiment, the requesting application or vendor uses the session key to decrypt the encrypted message.

Although the decryption process 1200 is disclosed with reference to its preferred and alternative embodiments, a skilled artisan will recognize from the disclosure herein, a wide number of alternatives for the decryption process 1200. For example, the decryption process 1200 may forego synchronous key encryption and rely on full public-key technology. In such an embodiment, the requesting application may transmit the entire message to the cryptographic engine 220, or, may employ some type of compression or reversible hash in order to transmit the message to the cryptographic engine 220. A skilled artisan will also recognize from the disclosure herein that the foregoing communications may advantageously include XML documents wrapped in SSL technology.

The encryption/decryption process 1200 also provides for encryption of documents or other data. Thus, in step 1235, a requesting application or vendor may advantageously transmit to the transaction engine 205 of the trust engine 110, a request for the public key of the user. The requesting application or vendor makes this request because the requesting application or vendor uses the public key of the user, for example, to encrypt the session key that will be used to encrypt the document or message. As mentioned in the enrollment process 900, the transaction engine 205 stores a copy of the digital certificate of the user, for example, in the mass storage 225. Thus, in step 1240 of the encryption process 1200, the transaction engine 205 requests the digital certificate of the user from the mass storage 225. In step 1245, the mass storage 225 transmits the digital certificate corresponding to the user, to the transaction engine 205. In step 1250, the transaction engine 205 transmits the digital certificate to the requesting application or vendor. According to one embodiment, the encryption portion of the encryption process 1200 does not include the authentication of a user. This is because the requesting vendor needs only the public key of the user, and is not requesting any sensitive data.

A skilled artisan will recognize from the disclosure herein that if a particular user does not have a digital certificate, the trust engine 110 may employ some or all of the enrollment process 900 in order to generate a digital certificate for that particular user. Then, the trust engine 110 may initiate the encryption/decryption process 1200 and thereby provide the appropriate digital certificate. In addition, a skilled artisan will recognize from the disclosure herein that steps 1220 and 1235 through 1250 of the encryption/decryption process 1200 may advantageously employ some or all of the steps of the interoperability process of FIG. 9B, thereby providing interoperability between differing cryptographic systems that may, for example, need to process the encryption.

Figure 13:
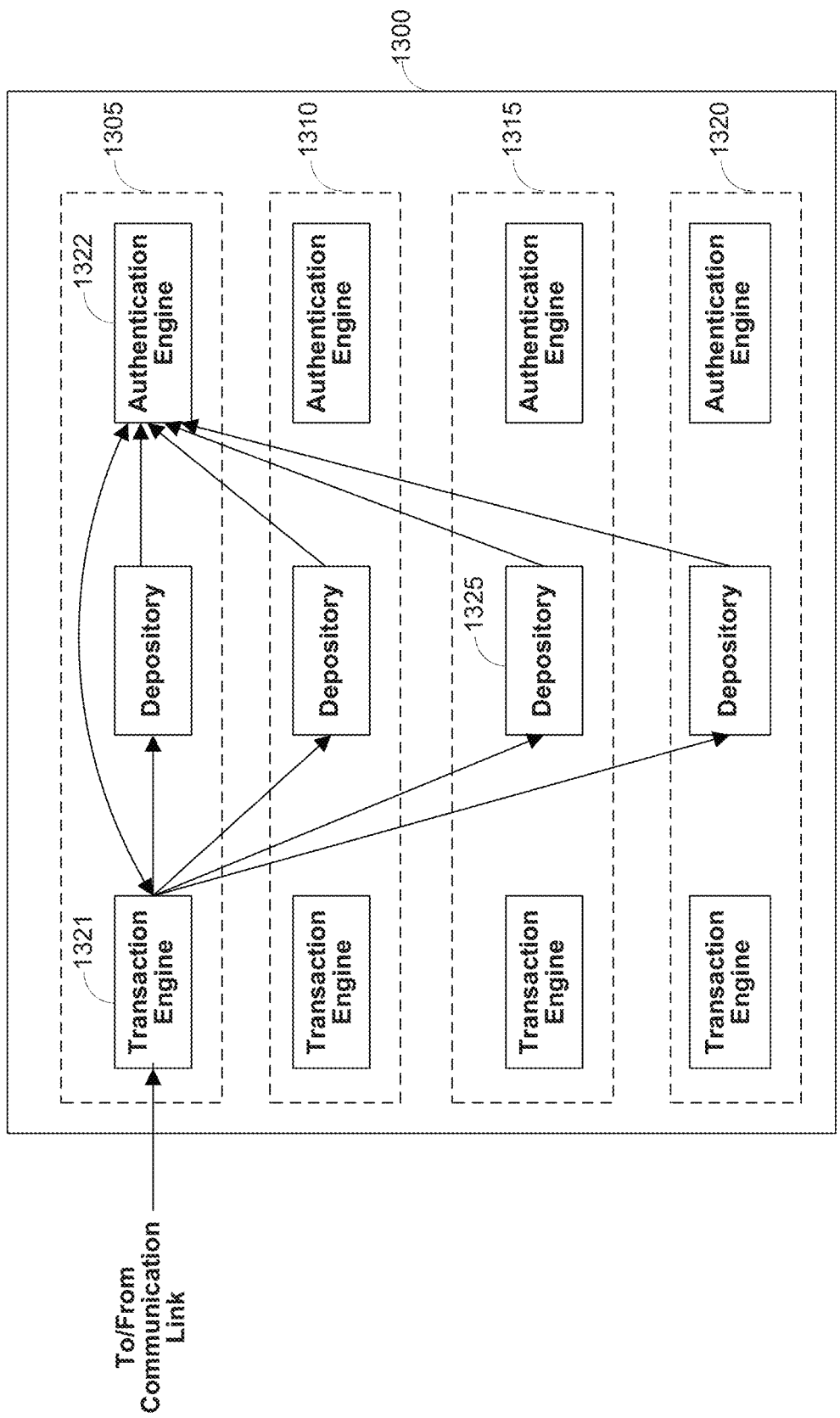
FIG. 13 illustrates a simplified block diagram of a trust engine system according to aspects of another embodiment of the invention.

FIG. 13 illustrates a simplified block diagram of a trust engine system 1300 according to aspects of yet another embodiment of the invention. As shown in FIG. 13, the trust engine system 1300 comprises a plurality of distinct trust engines 1305, 1310, 1315, and 1320, respectively. To facilitate a more complete understanding of the invention, FIG. 13 illustrates each trust engine, 1305, 1310, 1315, and 1320 as having a transaction engine, a depository, and an authentication engine. However, a skilled artisan will recognize that each transaction engine may advantageously comprise some, a combination, or all of the elements and communication channels disclosed with reference to FIGS. 1-8. For example, one embodiment may advantageously include trust engines having one or more transaction engines, depositories, and cryptographic servers or any combinations thereof.

According to one embodiment of the invention, each of the trust engines 1305, 1310, 1315 and 1320 are geographically separated, such that, for example, the trust engine 1305 may reside in a first location, the trust engine 1310 may reside in a second location, the trust engine 1315 may reside in a third location, and the trust engine 1320 may reside in a fourth location. The foregoing geographic separation advantageously decreases system response time while increasing the security of the overall trust engine system 1300.

For example, when a user logs onto the cryptographic system 100, the user may be nearest the first location and may desire to be authenticated. As described with reference to FIG. 10, to be authenticated, the user provides current authentication data, such as a biometric or the like, and the current authentication data is compared to that user's enrollment authentication data. Therefore, according to one example, the user advantageously provides current authentication data to the geographically nearest trust engine 1305. The transaction engine 1321 of the trust engine 1305 then forwards the current authentication data to the authentication engine 1322 also residing at the first location. According to another embodiment, the transaction engine 1321 forwards the current authentication data to one or more of the authentication engines of the trust engines 1310, 1315, or 1320.

The transaction engine 1321 also requests the assembly of the enrollment authentication data from the depositories of, for example, each of the trust engines, 1305 through 1320. According to this embodiment, each depository provides its portion of the enrollment authentication data to the authentication engine 1322 of the trust engine 1305. The authentication engine 1322 then employs the encrypted data portions from, for example, the first two depositories to respond, and assembles the enrollment authentication data into deciphered form. The authentication engine 1322 compares the enrollment authentication data with the current authentication data and returns an authentication result to the transaction engine 1321 of the trust engine 1305.

Based on the above, the trust engine system 1300 employs the nearest one of a plurality of geographically separated trust engines, 1305 through 1320, to perform the authentication process. According to one embodiment of the invention, the routing of information to the nearest transaction engine may advantageously be performed at client-side applets executing on one or more of the user system 105, vendor system 120, or certificate authority 115. According to an alternative embodiment, a more sophisticated decision process may be employed to select from the trust engines 1305 through 1320. For example, the decision may be based on the availability, operability, speed of connections, load, performance, geographic proximity, or a combination thereof, of a given trust engine.

In this way, the trust engine system 1300 lowers its response time while maintaining the security advantages associated with geographically remote data storage facilities, such as those discussed with reference to FIG. 7 where each data storage facility stores randomized portions of sensitive data. For example, a security compromise at, for example, the depository 1325 of the trust engine 1315 does not necessarily compromise the sensitive data of the trust engine system 1300. This is because the depository 1325 contains only non-decipherable randomized data that, without more, is entirely useless.

According to another embodiment, the trust engine system 1300 may advantageously include multiple cryptographic engines arranged similar to the authentication engines. The cryptographic engines may advantageously perform cryptographic functions such as those disclosed with reference to FIGS. 1-8. According to yet another embodiment, the trust engine system 1300 may advantageously replace the multiple authentication engines with multiple cryptographic engines, thereby performing cryptographic functions such as those disclosed with reference to FIGS. 1-8. According to yet another embodiment of the invention, the trust engine system 1300 may replace each multiple authentication engine with an engine having some or all of the functionality of the authentication engines, cryptographic engines, or both, as disclosed in the foregoing, Although the trust engine system 1300 is disclosed with reference to its preferred and alternative embodiments, a skilled artisan will recognize that the trust engine system 1300 may comprise portions of trust engines 1305 through 1320. For example, the trust engine system 1300 may include one or more transaction engines, one or more depositories, one or more authentication engines, or one or more cryptographic engines or combinations thereof.

Figure 14:
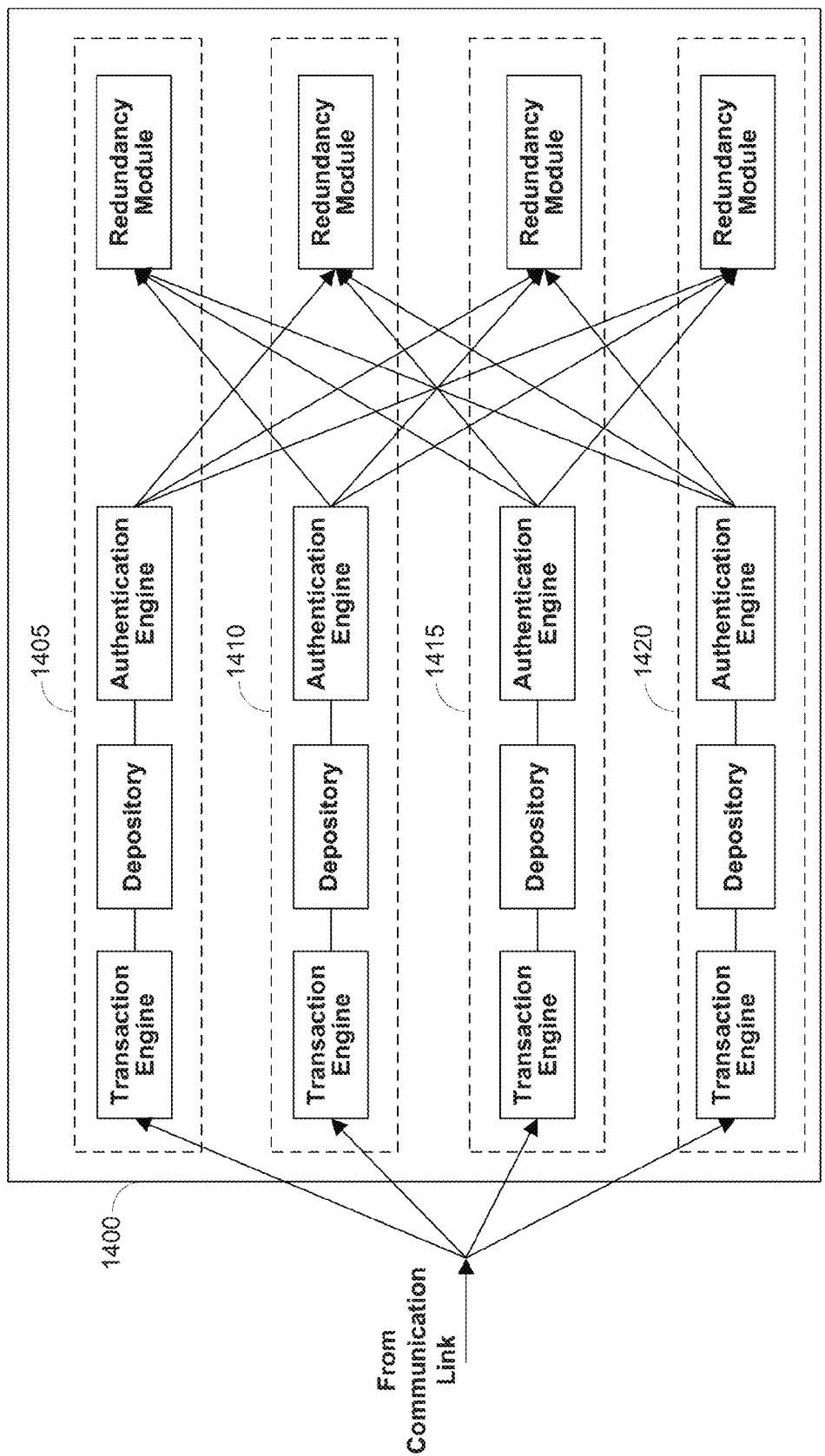
FIG. 14 illustrates a simplified block diagram of a trust engine system according to aspects of another embodiment of the invention.

FIG. 14 illustrates a simplified block diagram of a trust engine System 1400 according to aspects of yet another embodiment of the invention. As shown in FIG. 14, the trust engine system 1400 includes multiple trust engines 1405, 1410, 1415 and 1420. According to one embodiment, each of the trust engines 1405, 1410, 1415 and 1420, comprise some or all of the elements of trust engine 110 disclosed with reference to FIGS. 1-8. According to this embodiment, when the client side applets of the user system 105, the vendor system 120, or the certificate authority 115, communicate with the trust engine system 1400, those communications are sent to the IP address of each of the trust engines 1405 through 1420. Further, each transaction engine of each of the trust engines, 1405, 1410, 1415, and 1420, behaves similar to the transaction engine 1321 of the trust engine 1305 disclosed with reference to FIG. 13. For example, during an authentication process, each transaction engine of each of the trust engines 1405, 1410, 1415, and 1420 transmits the current authentication data to their respective authentication engines and transmits a request to assemble the randomized data stored in each of the depositories of each of the trust engines 1405 through 1420. FIG. 14 does not illustrate all of these communications; as such illustration would become overly complex. Continuing with the authentication process, each of the depositories then communicates its portion of the randomized data to each of the authentication engines of the each of the trust engines 1405 through 1420. Each of the authentication engines of the each of the trust engines employs its comparator to determine whether the current authentication data matches the enrollment authentication data provided by the depositories of each of the trust engines 1405 through 1420. According to this embodiment, the result of the comparison by each of the authentication engines is then transmitted to a redundancy module of the other three trust engines. For example, the result of the authentication engine from the trust engine 1405 is transmitted to the redundancy modules of the trust engines 1410, 1415, and 1420. Thus, the redundancy module of the trust engine 1405 likewise receives the result of the authentication engines from the trust engines 1410, 1415, and 1420.

Figure 15:
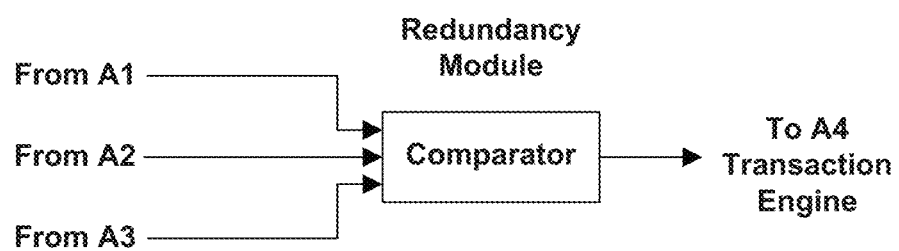
FIG. 15 illustrates a block diagram of the redundancy module of FIG. 14, according to aspects of an embodiment of the invention.

FIG. 15 illustrates a block diagram of the redundancy module of FIG. 14. The redundancy module comprises a comparator configured to receive the authentication result from three authentication engines and transmit that result to the transaction engine of the fourth trust engine. The comparator compares the authentication result form the three authentication engines, and if two of the results agree, the comparator concludes that the authentication result should match that of the two agreeing authentication engines. This result is then transmitted back to the transaction engine corresponding to the trust engine not associated with the three authentication engines.

Based on the foregoing, the redundancy module determines an authentication result from data received from authentication engines that are preferably geographically remote from the trust engine of that the redundancy module. By providing such redundancy functionality, the trust engine system 1400 ensures that a compromise of the authentication engine of one of the trust engines 1405 through 1420, is insufficient to compromise the authentication result of the redundancy module of that particular trust engine. A skilled artisan will recognize that redundancy module functionality of the trust engine system 1400 may also be applied to the cryptographic engine of each of the trust engines 1405 through 1420. However, such cryptographic engine communication was not shown in FIG. 14 to avoid complexity. Moreover, a skilled artisan will recognize a wide number of alternative authentication result conflict resolution algorithms for the comparator of FIG. 15 are suitable for use in the present invention.

According to yet another embodiment of the invention, the trust engine system 1400 may advantageously employ the redundancy module during cryptographic comparison steps. For example, some or all of the foregoing redundancy module disclosure with reference to FIGS. 14 and 15 may advantageously be implemented during a hash comparison of documents provided by one or more parties during a particular transaction.

Although the foregoing invention has been described in terms of certain preferred and alternative embodiments, other embodiments will be apparent to those of ordinary skill in the art from the disclosure herein. For example, the trust engine 110 may issue short-term certificates, where the private cryptographic key is released to the user for a predetermined period of time. For example, current certificate standards include a validity field that can be set to expire after a predetermined amount of time. Thus, the trust engine 110 may release a private key to a user where the private key would be valid for, for example, 24 hours. According to such an embodiment, the trust engine 110 may advantageously issue a new cryptographic key pair to be associated with a particular user and then release the private key of the new cryptographic key pair. Then, once the private cryptographic key is released, the trust engine 110 immediately expires any internal valid use of such private key, as it is no longer securable by the trust engine 110.

In addition, a skilled artisan will recognize that the cryptographic system 100 or the trust engine 110 may include the ability to recognize any type of devices, such as, but not limited to, a laptop, a cell phone, a network, a biometric device or the like. According to one embodiment, such recognition may come from data supplied in the request for a particular service, such as, a request for authentication leading to access or use, a request for cryptographic functionality, or the like. According to one embodiment, the foregoing request may include a unique device identifier, such as, for example, a processor ID. Alternatively, the request may include data in a particular recognizable data format. For example, mobile and satellite phones often do not include the processing power for full X509.v3 heavy encryption certificates, and therefore do not request them. According to this embodiment, the trust engine 110 may recognize the type of data format presented, and respond only in kind.

Figure 16:
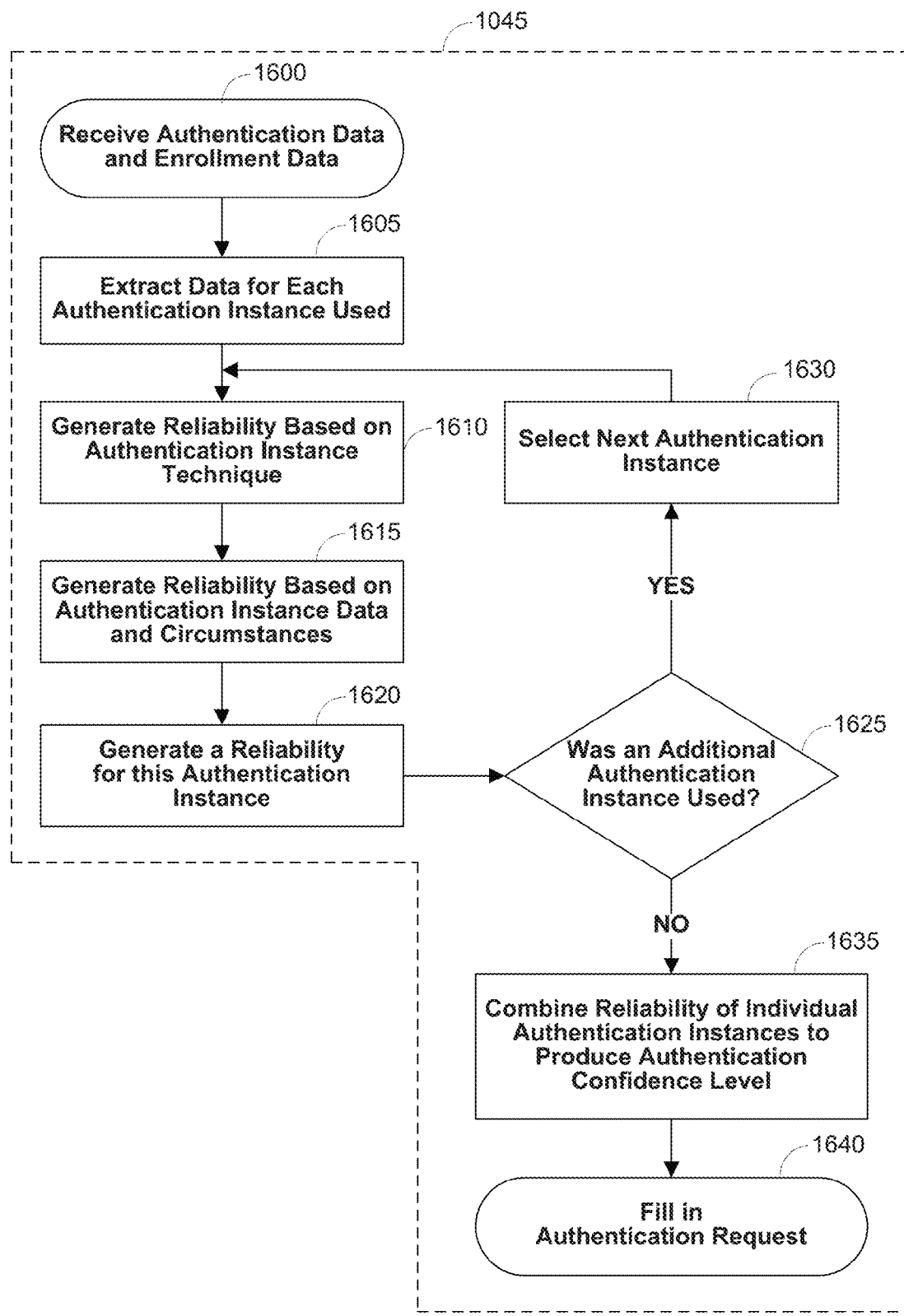
FIG. 16 illustrates a process for evaluating authentications according to one aspect of the invention.

In an additional aspect of the system described above, context sensitive authentication can be provided using various techniques as will be described below. Context sensitive authentication, for example as shown in FIG. 16, provides the possibility of evaluating not only the actual data which is sent by the user when attempting to authenticate himself, but also the circumstances surrounding the generation and delivery of that data. Such techniques may also support transaction specific trust arbitrage between the user and trust engine 110 or between the vendor and trust engine 110, as will be described below.

As discussed above, authentication is the process of proving that a user is who he says he is. Generally, authentication requires demonstrating some fact to an authentication authority. The trust engine 110 of the present invention represents the authority to which a user must authenticate himself. The user must demonstrate to the trust engine 110 that he is who he says he is by either: knowing something that only the user should know (knowledge-based authentication), having something that only the user should have (token-based authentication), or by being something that only the user should be (biometric-based authentication).

Examples of knowledge-based authentication include without limitation a password, PIN number, or lock combination. Examples of token-based authentication include without limitation a house key, a physical credit card, a driver's license, or a particular phone number. Examples of biometric-based authentication include without limitation a fingerprint, handwriting analysis, facial scan, hand scan, ear scan, iris scan, vascular pattern, DNA, a voice analysis, or a retinal scan.

Each type of authentication has particular advantages and disadvantages, and each provides a different level of security. For example, it is generally harder to create a false fingerprint that matches someone else's than it is to overhear someone's password and repeat it. Each type of authentication also requires a different type of data to be known to the authenticating authority in order to verify someone using that form of authentication.

As used herein, "authentication" will refer broadly to the overall process of verifying someone's identity to be who he says he is. An "authentication technique" will refer to a particular type of authentication based upon a particular piece of knowledge, physical token, or biometric reading. "Authentication data" refers to information which is sent to or otherwise demonstrated to an authentication authority in order to establish identity. "Enrollment data" will refer to the data which is initially submitted to an authentication authority in order to establish a baseline for comparison with authentication data. An "authentication instance" will refer to the data associated with an attempt to authenticate by an authentication technique.

The internal protocols and communications involved in the process of authenticating a user is described with reference to FIG. 10 above. The part of this process within which the context sensitive authentication takes place occurs within the comparison step shown as step 1045 of FIG. 10. This step takes place within the authentication engine 215 and involves assembling the enrollment data 410 retrieved from the depository 210 and comparing the authentication data provided by the user to it. One particular embodiment of this process is shown in FIG. 16 and described below.

The current authentication data provided by the user and the enrollment data retrieved from the depository 210 are received by the authentication engine 215 in step 1600 of FIG. 16. Both of these sets of data may contain data which is related to separate techniques of authentication. The authentication engine 215 separates the authentication data associated with each individual authentication instance in step 1605. This is necessary so that the authentication data is compared with the appropriate subset of the enrollment data for the user (e.g. fingerprint authentication data should be compared with fingerprint enrollment data, rather than password enrollment data).

Generally, authenticating a user involves one or more individual authentication instances, depending on which authentication techniques are available to the user. These methods are limited by the enrollment data which were provided by the user during his enrollment process (if the user did not provide a retinal scan when enrolling, he will not be able to authenticate himself using a retinal scan), as well as the means which may be currently available to the user (e.g. if the user does not have a fingerprint reader at his current location, fingerprint authentication will not be practical). In some cases, a single authentication instance may be sufficient to authenticate a user; however, in certain circumstances a combination of multiple authentication instances may be used in order to more confidently authenticate a user for a particular transaction.

Each authentication instance consists of data related to a particular authentication technique (e.g. fingerprint, password, smart card, etc.) and the circumstances which surround the capture and delivery of the data for that particular technique. For example, a particular instance of attempting to authenticate via password will generate not only the data related to the password itself, but also circumstantial data, known as "metadata", related to that password attempt. This circumstantial data includes information such as: the time at which the particular authentication instance took place, the network address from which the authentication information was delivered, as well as any other information as is known to those of skill in the art which may be determined about the origin of the authentication data (the type of connection, the processor serial number, etc.).

In many cases, only a small amount of circumstantial metadata will be available. For example, if the user is located on a network which uses proxies or network address translation or another technique which masks the address of the originating computer, only the address of the proxy or router may be determined. Similarly, in many cases information such as the processor serial number will not be available because of either limitations of the hardware or operating system being used, disabling of such features by the operator of the system, or other limitations of the connection between the user's system and the trust engine 110.

As shown in FIG. 16, once the individual authentication instances represented within the authentication data are extracted and separated in step 1605, the authentication engine 215 evaluates each instance for its reliability in indicating that the user is who he claims to be. The reliability for a single authentication instance will generally be determined based on several factors. These may be grouped as factors relating to the reliability associated with the authentication technique, which are evaluated in step 1610, and factors relating to the reliability of the particular authentication data provided, which are evaluated in step 1815. The first group includes without limitation the inherent reliability of the authentication technique being used, and the reliability of the enrollment data being used with that method. The second group includes without limitation the degree of match between the enrollment data and the data provided with the authentication instance, and the metadata associated with that authentication instance. Each of these factors may vary independently of the others.

The inherent reliability of an authentication technique is based on how hard it is for an imposter to provide someone else's correct data, as well as the overall error rates for the authentication technique. For passwords and knowledge based authentication methods, this reliability is often fairly low because there is nothing that prevents someone from revealing their password to another person and for that second person to use that password. Even a more complex knowledge based system may have only moderate reliability since knowledge may be transferred from person to person fairly easily. Token based authentication, such as having a proper smart card or using a particular terminal to perform the authentication, is similarly of low reliability used by itself, since there is no guarantee that the right person is in possession of the proper token.

However, biometric techniques are more inherently reliable because it is generally difficult to provide someone else with the ability to use your fingerprints in a convenient manner, even intentionally. Because subverting biometric authentication techniques is more difficult, the inherent reliability of biometric methods is generally higher than that of purely knowledge or token based authentication techniques. However, even biometric techniques may have some occasions in which a false acceptance or false rejection is generated. These occurrences may be reflected by differing reliabilities for different implementations of the same biometric technique. For example, a fingerprint matching system provided by one company may provide a higher reliability than one provided by a different company because one uses higher quality optics or a better scanning resolution or some other improvement which reduces the occurrence of false acceptances or false rejections.

Note that this reliability may be expressed in different manners. The reliability is desirably expressed in some metric which can be used by the heuristics 530 and algorithms of the authentication engine 215 to calculate the confidence level of each authentication. One preferred mode of expressing these reliabilities is as a percentage or fraction. For instance, fingerprints might be assigned an inherent reliability of 97%, while passwords might only be assigned an inherent reliability of 50%. Those of skill in the art will recognize that these particular values are merely exemplary and may vary between specific implementations.

The second factor for which reliability must be assessed is the reliability of the enrollment. This is part of the "graded enrollment" process referred to above. This reliability factor reflects the reliability of the identification provided during the initial enrollment process. For instance, if the individual initially enrolls in a manner where they physically produce evidence of their identity to a notary or other public official, and enrollment data is recorded at that time and notarized, the data will be more reliable than data which is provided over a network during enrollment and only vouched for by a digital signature or other information which is not truly tied to the individual.

Other enrollment techniques with varying levels of reliability include without limitation: enrollment at a physical office of the trust engine 110 operator; enrollment at a user's place of employment; enrollment at a post office or passport office; enrollment through an affiliated or trusted party to the trust engine 110 operator; anonymous or pseudonymous enrollment in which the enrolled identity is not yet identified with a particular real individual, as well as such other means as are known in the art.

These factors reflect the trust between the trust engine 110 and the source of identification provided during the enrollment process. For instance, if enrollment is performed in association with an employer during the initial process of providing evidence of identity, this information may be considered extremely reliable for purposes within the company, but may be trusted to a lesser degree by a government agency, or by a competitor. Therefore, trust engines operated by each of these other organizations may assign different levels of reliability to this enrollment.

Similarly, additional data which is submitted across a network, but which is authenticated by other trusted data provided during a previous enrollment with the same trust engine 110 may be considered as reliable as the original enrollment data was, even though the latter data were submitted across an open network. In such circumstances, a subsequent notarization will effectively increase the level of reliability associated with the original enrollment data. In this way for example, an anonymous or pseudonymous enrollment may then be raised to a full enrollment by demonstrating to some enrollment official the identity of the individual matching the enrolled data.

The reliability factors discussed above are generally values which may be determined in advance of any particular authentication instance. This is because they are based upon the enrollment and the technique, rather than the actual authentication. In one embodiment, the step of generating reliability based upon these factors involves looking up previously determined values for this particular authentication technique and the enrollment data of the user. In a further aspect of an advantageous embodiment of the present invention, such reliabilities may be included with the enrollment data itself. In this way, these factors are automatically delivered to the authentication engine 215 along with the enrollment data sent from the depository 210.

While these factors may generally be determined in advance of any individual authentication instance, they still have an effect on each authentication instance which uses that particular technique of authentication for that user. Furthermore, although the values may change over time (e.g. if the user re-enrolls in a more reliable fashion), they are not dependent on the authentication data itself. By contrast, the reliability factors associated with a single specific instance's data may vary on each occasion. These factors, as discussed below, must be evaluated for each new authentication in order to generate reliability scores in step 1815.

The reliability of the authentication data reflects the match between the data provided by the user in a particular authentication instance and the data provided during the authentication enrollment. This is the fundamental question of whether the authentication data matches the enrollment data for the individual the user is claiming to be. Normally, when the data do not match, the user is considered to not be successfully authenticated, and the authentication fails. The manner in which this is evaluated may change depending on the authentication technique used. The comparison of such data is performed by the comparator 515 function of the authentication engine 215 as shown in FIG. 5.

For instance, matches of passwords are generally evaluated in a binary fashion. In other words, a password is either a perfect match, or a failed match. It is usually not desirable to accept as even a partial match a password which is close to the correct password if it is not exactly correct. Therefore, when evaluating a password authentication, the reliability of the authentication returned by the comparator 515 is typically either 100% (correct) or 0% (wrong), with no possibility of intermediate values.

Similar rules to those for passwords are generally applied to token based authentication methods, such as smart cards. This is because having a smart card which has a similar identifier or which is similar to the correct one, is still just as wrong as having any other incorrect token. Therefore tokens tend also to be binary authenticators: a user either has the right token, or he doesn't.

However, certain types of authentication data, such as questionnaires and biometrics, are generally not binary authenticators. For example, a fingerprint may match a reference fingerprint to varying degrees. To some extent, this may be due to variations in the quality of the data captured either during the initial enrollment or in subsequent authentications. (A fingerprint may be smudged or a person may have a still healing scar or burn on a particular finger.) In other instances the data may match less than perfectly because the information itself is somewhat variable and based upon pattern matching. (A voice analysis may seem close but not quite right because of background noise, or the acoustics of the environment in which the voice is recorded, or because the person has a cold.) Finally, in situations where large amounts of data are being compared, it may simply be the case that much of the data matches well, but some doesn't. (A ten-question questionnaire may have resulted in eight correct answers to personal questions, but two incorrect answers.) For any of these reasons, the match between the enrollment data and the data for a particular authentication instance may be desirably assigned a partial match value by the comparator 515. In this way, the fingerprint might be said to be a 85% match, the voice print a 65% match, and the questionnaire an 80% match, for example.

This measure (degree of match) produced by the comparator 515 is the factor representing the basic issue of whether an authentication is correct or not. However, as discussed above, this is only one of the factors which may be used in determining the reliability of a given authentication instance. Note also that even though a match to some partial degree may be determined, that ultimately, it may be desirable to provide a binary result based upon a partial match. In an alternate mode of operation, it is also possible to treat partial matches as binary, i.e. either perfect (100%) or failed (0%) matches, based upon whether or not the degree of match passes a particular threshold level of match. Such a process may be used to provide a simple pass/fail level of matching for systems which would otherwise produce partial matches.

Another factor to be considered in evaluating the reliability of a given authentication instance concerns the circumstances under which the authentication data for this particular instance are provided. As discussed above, the circumstances refer to the metadata associated with a particular authentication instance. This may include without limitation such information as: the network address of the authenticator, to the extent that it can be determined; the time of the authentication; the mode of transmission of the authentication data (phone line, cellular, network, etc.); and the serial number of the system of the authenticator.

These factors can be used to produce a profile of the type of authentication that is normally requested by the user. Then, this information can be used to assess reliability in at least two manners. One manner is to consider whether the user is requesting authentication in a manner which is consistent with the normal profile of authentication by this user. If the user normally makes authentication requests from one network address during business days (when she is at work) and from a different network address during evenings or weekends (when she is at home), an authentication which occurs from the home address during the business day is less reliable because it is outside the normal authentication profile. Similarly, if the user normally authenticates using a fingerprint biometric and in the evenings, an authentication which originates during the day using only a password is less reliable.

An additional way in which the circumstantial metadata can be used to evaluate the reliability of an instance of authentication is to determine how much corroboration the circumstance provides that the authenticator is the individual he claims to be. For instance, if the authentication comes from a system with a serial number known to be associated with the user, this is a good circumstantial indicator that the user is who they claim to be. Conversely, if the authentication is coming from a network address which is known to be in Los Angeles when the user is known to reside in London, this is an indication that this authentication is less reliable based on its circumstances.

It is also possible that a cookie or other electronic data may be placed upon the system being used by a user when they interact with a vendor system or with the trust engine 110. This data is written to the storage of the system of the user and may contain an identification which may be read by a Web browser or other software on the user system. If this data is allowed to reside on the user system between sessions (a "persistent cookie"), it may be sent with the authentication data as further evidence of the past use of this system during authentication of a particular user. In effect, the metadata of a given instance, particularly a persistent cookie, may form a sort of token based authenticator itself.

Once the appropriate reliability factors based on the technique and data of the authentication instance are generated as described above in steps 1610 and 1615 respectively, they are used to produce an overall reliability for the authentication instance provided in step 1620. One means of doing this is simply to express each reliability as a percentage and then to multiply them together.

For example, suppose the authentication data is being sent in from a network address known to be the user's home computer completely in accordance with the user's past authentication profile (100%), and the technique being used is fingerprint identification (97%), and the initial finger print data was roistered through the user's employer with the trust engine 110 (90%), and the match between the authentication data and the original fingerprint template in the enrollment data is very good (99%). The overall reliability of this authentication instance could then be calculated as the product of these reliabilities: 100%*97%*90%*99%-86.4% reliability.

This calculated reliability represents the reliability of one single instance of authentication. The overall reliability of a single authentication instance may also be calculated using techniques which treat the different reliability factors differently, for example by using formulas where different weights are assigned to each reliability factor. Furthermore, those of skill in the art will recognize that the actual values used may represent values other than percentages and may use non-arithmetic systems. One embodiment may include a module used by an authentication requestor to set the weights for each factor and the algorithms used in establishing the overall reliability of the authentication instance.

The authentication engine 215 may use the above techniques and variations thereof to determine the reliability of a single authentication instance, indicated as step 1620. However, it may be useful in many authentication situations for multiple authentication instances to be provided at the same time. For example, while attempting to authenticate himself using the system of the present invention, a user may provide a user identification, fingerprint authentication data, a smart card, and a password. In such a case, three independent authentication instances are being provided to the trust engine 110 for evaluation. Proceeding to step 1625, if the authentication engine 215 determines that the data provided by the user includes more than one authentication instance, then each instance in turn will be selected as shown in step 1630 and evaluated as described above in steps 1610, 1615 and 1620.

Note that many of the reliability factors discussed may vary from one of these instances to another. For instance, the inherent reliability of these techniques is likely to be different, as well as the degree of match provided between the authentication data and the enrollment data. Furthermore, the user may have provided enrollment data at different times and under different circumstances for each of these techniques, providing different enrollment reliabilities for each of these instances as well. Finally, even though the circumstances under which the data for each of these instances is being submitted is the same, the use of such techniques may each fit the profile of the user differently, and so may be assigned different circumstantial reliabilities. (For example, the user may normally use their password and fingerprint, but not their smart card.)

As a result, the final reliability for each of these authentication instances may be different from One another. However, by using multiple instances together, the overall confidence level for the authentication will tend to increase.

Once the authentication engine has performed steps 1610 through 1620 for all of the authentication instances provided in the authentication data, the reliability of each instance is used in step 1635 to evaluate the overall authentication confidence level. This process of combining the individual authentication instance reliabilities into the authentication confidence level may be modeled by various methods relating the individual reliabilities produced, and may also address the particular interaction between some of these authentication techniques. (For example, multiple knowledge-based systems such as passwords may produce less confidence than a single password and even a fairly weak biometric, such as a basic voice analysis.)

One means in which the authentication engine 215 may combine the reliabilities of multiple concurrent authentication instances to generate a final confidence level is to multiply the unreliability of each instance to arrive at a total unreliability. The unreliability is generally the complementary percentage of the reliability. For example, a technique which is 84% reliable is 16% unreliable. The three authentication instances described above (fingerprint, smart card, password) which produce reliabilities of 86%, 75%, and 72% would have corresponding unreliabilities of (100-86) %, (100-75) % and (100-72) %, or 14%, 25%, and 28%, respectively. By multiplying these unreliabilities, we get a cumulative unreliability of 14%*25%*28%-0.98% unreliability, which corresponds to a reliability of 99.02%.

In an additional mode of operation, additional factors and heuristics 530 may be applied within the authentication engine 215 to account for the interdependence of various authentication techniques. For example, if someone has unauthorized access to a particular home computer, they probably have access to the phone line at that address as well. Therefore, authenticating based on an originating phone number as well as upon the serial number of the authenticating system does not add much to the overall confidence in the authentication. However, knowledge based authentication is largely independent of token based authentication (i.e. if someone steals your cellular phone or keys, they are no more likely to know your PIN or password than if they hadn't).

Furthermore, different vendors or other authentication requestors may wish to weigh different aspects of the authentication differently. This may include the use of separate weighing factors or algorithms used in calculating the reliability of individual instances as well as the use of different means to evaluate authentication events with multiple instances.

For instance, vendors for certain types of transactions, for instance corporate email systems, may desire to authenticate primarily based upon heuristics and other circumstantial data by default. Therefore, they may apply high weights to factors related to the metadata and other profile related information associated with the circumstances surrounding authentication events. This arrangement could be used to ease the burden on users during normal operating hours, by not requiring more from the user than that he be logged on to the correct machine during business hours. However, another vendor may weigh authentications coming from a particular technique most heavily, for instance fingerprint matching, because of a policy decision that such a technique is most suited to authentication for the particular vendor's purposes.

Such varying weights may be defined by the authentication requestor in generating the authentication request and sent to the trust engine 110 with the authentication request in one mode of operation. Such options could also be set as preferences during an initial enrollment process for the authentication requestor and stored within the authentication engine in another mode of operation.

Once the authentication engine 215 produces an authentication confidence level for the authentication data provided, this confidence level is used to complete the authentication request in step 1640, and this information is forwarded from the authentication engine 215 to the transaction engine 205 for inclusion in a message to the authentication requestor.

The process described above is merely exemplary, and those of skill in the art will recognize that the steps need not be performed in the order shown or that only certain of the steps are desired to be performed, or that a variety of combinations of steps may be desired. Furthermore, certain steps, such as the evaluation of the reliability of each authentication instance provided, may be carried out in parallel with one another if circumstances permit.

In a further aspect of this invention, a method is provided to accommodate conditions when the authentication confidence level produced by the process described above fails to meet the required trust level of the vendor or other party requiring the authentication. In circumstances such as these where a gap exists between the level of confidence provided and the level of trust desired, the operator of the trust engine 110 is in a position to provide opportunities for one or both parties to provide alternate data or requirements in order to close this trust gap. This process will be referred to as "trust arbitrage" herein.

Trust arbitrage may take place within a framework of cryptographic authentication as described above with reference to FIGS. 10 and 11. As shown therein, a vendor or other party will request authentication of a particular user in association with a particular transaction. In one circumstance, the vendor simply requests an authentication, either positive or negative, and after receiving appropriate data from the user, the trust engine 110 will provide such a binary authentication. In circumstances such as these, the degree of confidence required in order to secure a positive authentication is determined based upon preferences set within the trust engine 110.

However, it is also possible that the vendor may request a particular level of trust in order to complete a particular transaction. This required level may be included with the authentication request (e.g. authenticate this user to 98% confidence) or may be determined by the trust engine 110 based on other factors associated with the transaction (i.e. authenticate this user as appropriate for this transaction). One such factor might be the economic value of the transaction. For transactions which have greater economic value, a higher degree of trust may be required. Similarly, for transactions with high degrees of risk a high degree of trust may be required. Conversely, for transactions which are either of low risk or of low value, lower trust levels may be required by the vendor or other authentication requestor.

Figure 17:
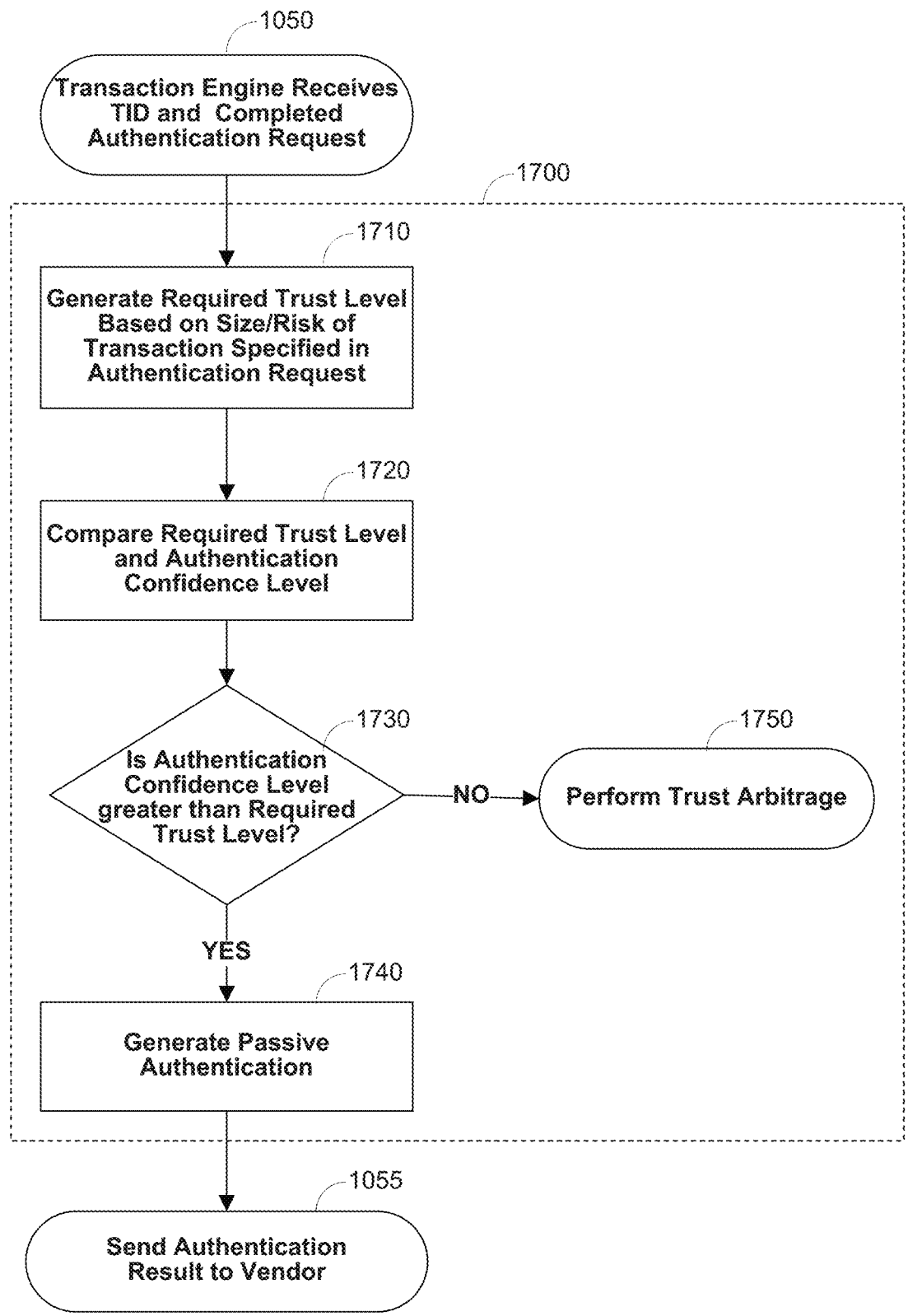
FIG. 17 illustrates a process for assigning a value to an authentication according to one aspect as shown in FIG. 16 of the invention.

The process of trust arbitrage occurs between the steps of the trust engine 110 receiving the authentication data in step 1050 of FIG. 10 and the return of an authentication result to the vendor in step 1055 of FIG. 10. Between these steps, the process which leads to the evaluation of trust levels and the potential trust arbitrage occurs as shown in FIG. 17. In circumstances where simple binary authentication is performed, the process shown in FIG. 17 reduces to having the transaction engine 205 directly compare the authentication data provided with the enrollment data for the identified user as discussed above with reference to FIG. 10, flagging any difference as a negative authentication.

As shown in FIG. 17, the first step after receiving the data in step 1050 is for the transaction engine 205 to determine the trust level which is required for a positive authentication for this particular transaction in step 1710. This step may be performed by one of several different methods. The required trust level may be specified to the trust engine 110 by the authentication requestor at the time when the authentication request is made. The authentication requestor may also set a preference in advance which is stored within the depository 210 or other storage which is accessible by the transaction engine 205. This preference may then be read and used each time an authentication request is made by this authentication requestor. The preference may also be associated with a particular user as a security measure such that a particular level of trust is always required in order to authenticate that user, the user preference being stored in the depository 210 or other storage media accessible by the transaction engine 205. The required level may also be derived by the transaction engine 205 or authentication engine 215 based upon information provided in the authentication request, such as the value and risk level of the transaction to be authenticated.

In one mode of operation, a policy management module or other software which is used when generating the authentication request is used to specify the required degree of trust for the authentication of the transaction. This may be used to provide a series of rules to follow when assigning the required level of trust based upon the policies which are specified within the policy management module. One advantageous mode of operation is for such a module to be incorporated with the web server of a vendor in order to appropriately determine required level of trust for transactions initiated with the vendor's web server. In this way, transaction requests from users may be assigned a required trust level in accordance with the policies of the vendor and such information may be forwarded to the trust engine 110 along with the authentication request.

This required trust level correlates with the degree of certainty that the vendor wants to have that the individual authenticating is in fact who he identifies himself as. For example, if the transaction is one where the vendor wants a fair degree of certainty because goods are changing hands, the vendor may require a trust level of 85%. For situation where the vendor is merely authenticating the user to allow him to view members only content or exercise privileges on a chat room, the downside risk may be small enough that the vendor requires only a 60% trust level. However, to enter into a production contract with a value of tens of thousands of dollars, the vendor may require a trust level of 99% or more.

This required trust level represents a metric to which the user must authenticate himself in order to complete the transaction. If the required trust level is 85% for example, the user must provide authentication to the trust engine 110 sufficient for the trust engine 110 to say with 85% confidence that the user is who they say they are. It is the balance between this required trust level and the authentication confidence level which produces either a positive authentication (to the satisfaction of the vendor) or a possibility of trust arbitrage.

As shown in FIG. 17, after the transaction engine 205 receives the required trust level, it compares in step 1720 the required trust level to the authentication confidence level which the authentication engine 215 calculated for the current authentication (as discussed with reference to FIG. 16). If the authentication confidence level is higher than the required trust level for the transaction in step 1730, then the process moves to step 1740 where a positive authentication for this transaction is produced by the transaction engine 205. A message to this effect will then be inserted into the authentication results and returned to the vendor by the transaction engine 205 as shown in step 1055 (see FIG. 10).

Figure 18:
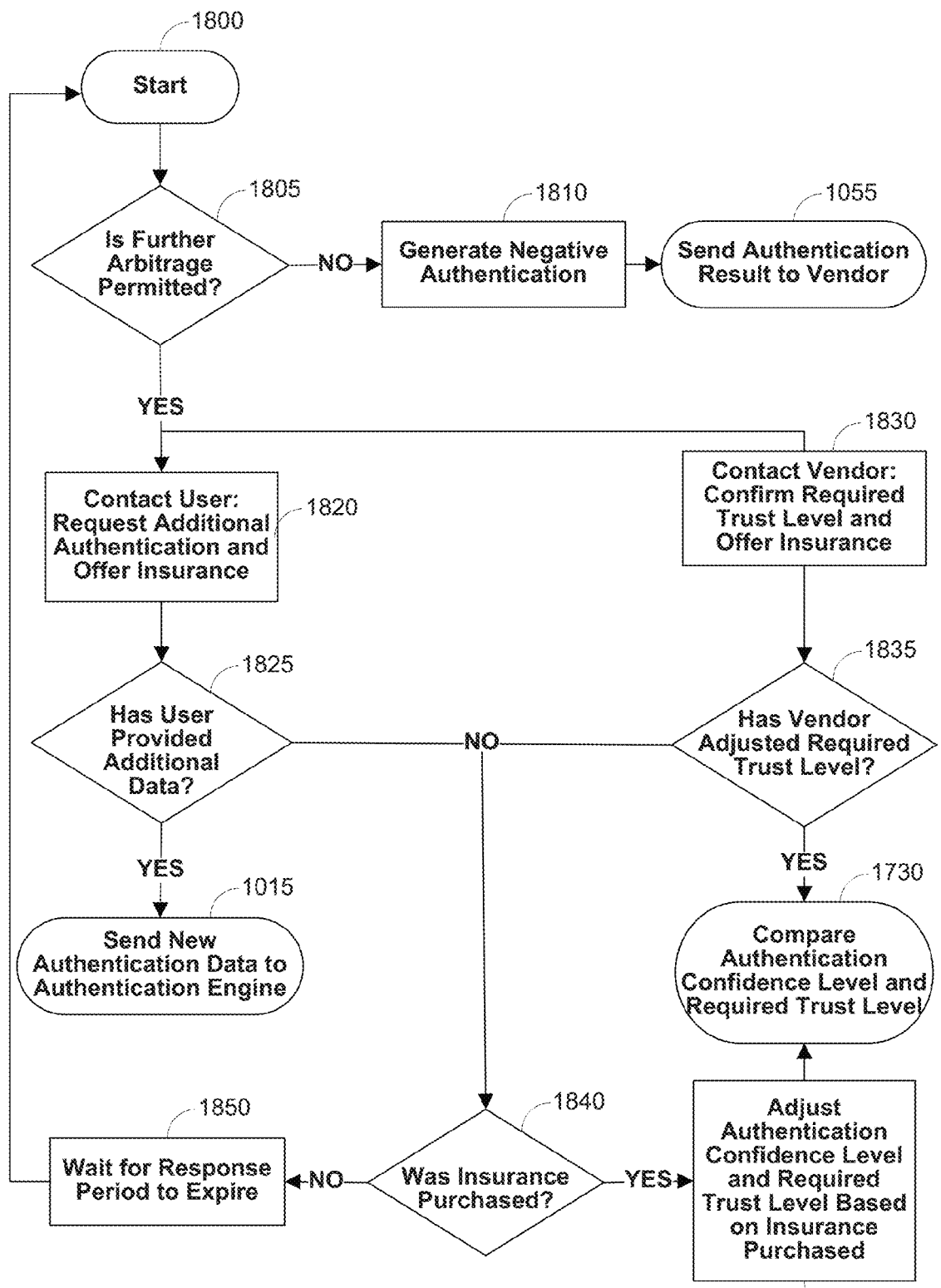
FIG. 18 illustrates a process for performing trust arbitrage in an aspect of the invention as shown in FIG. 17.

However, if the authentication confidence level does not fulfill the required trust level in step 1730, then a confidence gap exists for the current authentication, and trust arbitrage is conducted in step 1750. Trust arbitrage is described more completely with reference to FIG. 18 below. This process as described below takes place within the transaction engine 205 of the trust engine 110. Because no authentication or other cryptographic operations are needed to execute trust arbitrage (other than those required for the SSL communication between the transaction engine 205 and other components), the process may be performed outside the authentication engine 215. However, as will be discussed below, any reevaluation of authentication data or other cryptographic or authentication events will require the transaction engine 205 to resubmit the appropriate data to the authentication engine 215. Those of skill in the art will recognize that the trust arbitrage process could alternately be structured to take place partially or entirely within the authentication engine 215 itself.

As mentioned above, trust arbitrage is a process where the trust engine 110 mediates a negotiation between the vendor and user in an attempt to secure a positive authentication where appropriate. As shown in step 1805, the transaction engine 205 first determines whether or not the current situation is appropriate for trust arbitrage. This may be determined based upon the circumstances of the authentication, e.g. whether this authentication has already been through multiple cycles of arbitrage, as well as upon the preferences of either the vendor or user, as will be discussed further below.

In such circumstances where arbitrage is not possible, the process proceeds to step 1810 where the transaction engine 205 generates a negative authentication and then inserts it into the authentication results which are sent to the vendor in step 1055 (see FIG. 10). One limit which may be advantageously used to prevent authentications from pending indefinitely is to set a time-out period from the initial authentication request. In this way, any transaction which is not positively authenticated within the time limit is denied further arbitrage and negatively authenticated. Those of skill in the art will recognize that such a time limit may vary depending upon the circumstances of the transaction and the desires of the user and vendor. Limitations may also be placed upon the number of attempts that may be made at providing a successful authentication. Such limitations may be handled by an attempt limiter 535 as shown in FIG. 5.

If arbitrage is not prohibited in step 1805, the transaction engine 205 will then engage in negotiation with one or both of the transacting parties. The transaction engine 205 may send a message to the user requesting some form of additional authentication in order to boost the authentication confidence level produced as shown in step 1820. In the simplest form, this may simply indicates that authentication was insufficient. A request to produce one or more additional authentication instances to improve the overall confidence level of the authentication may also be sent.

If the user provides some additional authentication instances in step 1825, then the transaction engine 205 adds these authentication instances to the authentication data for the transaction and forwards it to the authentication engine 215 as shown in step 1015 (see FIG. 10), and the authentication is reevaluated based upon both the pre-existing authentication instances for this transaction and the newly provided authentication instances.

An additional type of authentication may be a request from the trust engine 110 to make some form of person-to-person contact between the trust engine 110 operator (or a trusted associate) and the user, for example, by phone call. This phone call or other non-computer authentication can be used to provide personal contact with the individual and also to conduct some form of questionnaire based authentication. This also may give the opportunity to verify an originating telephone number and potentially a voice analysis of the user when he calls in. Even if no additional authentication data can be provided, the additional context associated with the user's phone number may improve the reliability of the authentication context. Any revised data or circumstances based upon this phone call are fed into the trust engine 110 for use in consideration of the authentication request.

Additionally, in step 1820 the trust engine 110 may provide an opportunity for the user to purchase insurance, effectively buying a more confident authentication. The operator of the trust engine 110 may, at times, only want to make such an option available if the confidence level of the authentication is above a certain threshold to begin with. In effect, this user side insurance is a way for the trust engine 110 to vouch for the user when the authentication meets the normal required trust level of the trust engine 110 for authentication, but does not meet the required trust level of the vendor for this transaction. In this way, the user may still successfully authenticate to a very high level as may be required by the vendor, even though he only has authentication instances which produce confidence sufficient for the trust engine 110.

This function of the trust engine 110 allows the trust engine 110 to vouch for someone who is authenticated to the satisfaction of the trust engine 110, but not of the vendor. This is analogous to the function performed by a notary in adding his signature to a document in order to indicate to someone reading the document at a later time that the person whose signature appears on the document is in fact the person who signed it. The signature of the notary testifies to the act of signing by the user. In the same way, the trust engine is providing an indication that the person transacting is who they say they are.

However, because the trust engine 110 is artificially boosting the level of confidence provided by the user, there is a greater risk to the trust engine 110 operator, since the user is not actually meeting the required trust level of the vendor. The cost of the insurance is designed to offset the risk of a false positive authentication to the trust engine 110 (who may be effectively notarizing the authentications of the user). The user pays the trust engine 110 operator to take the risk of authenticating to a higher level of confidence than has actually been provided.

Because such an insurance system allows someone to effectively buy a higher confidence rating from the trust engine 110, both vendors and users may wish to prevent the use of user side insurance in certain transactions. Vendors may wish to limit positive authentications to circumstances where they know that actual authentication data supports the degree of confidence which they require and so may indicate to the trust engine 110 that user side insurance is not to be allowed. Similarly, to protect his online identity, a user may wish to prevent the use of user side insurance on his account, or may wish to limit its use to situations where the authentication confidence level without the insurance is higher than a certain limit. This may be used as a security measure to prevent someone from overhearing a password or stealing a smart card and using them to falsely authenticate to a low level of confidence, and then purchasing insurance to produce a very high level of (false) confidence. These factors may be evaluated in determining whether user side insurance is allowed.

If user purchases insurance in step 1840, then the authentication confidence level is adjusted based upon the insurance purchased in step 1845, and the authentication confidence level and required trust level are again compared in step 1730 (see FIG. 17). The process continues from there, and may lead to either a positive authentication in step 1740 (see FIG. 17), or back into the trust arbitrage process in step 1750 for either further arbitrage (if allowed) or a negative authentication in step 1810 if further arbitrage is prohibited.

In addition to sending a message to the user in step 1820, the transaction engine 205 may also send a message to the vendor in step 1830 which indicates that a pending authentication is currently below the required trust level. The message may also offer various options on how to proceed to the vendor. One of these Options is to simply inform the vendor of what the current authentication confidence level is and ask if the vendor wishes to maintain their current unfulfilled required trust level. This may be beneficial because in some cases, the vendor may have independent means for authenticating the transaction or may have been using a default set of requirements which generally result in a higher required level being initially specified than is actually needed for the particular transaction at hand.

For instance, it may be standard practice that all incoming purchase order transactions with the vendor are expected to meet a 98% trust level. However, if an order was recently discussed by phone between the vendor and a long-standing customer, and immediately thereafter the transaction is authenticated, but only to a 93% confidence level, the vendor may wish to simply lower the acceptance threshold for this transaction, because the phone call effectively provides additional authentication to the vendor. In certain circumstances, the vendor may be willing to lower their required trust level, but not all the way to the level of the current authentication confidence. For instance, the vendor in the above example might consider that the phone call prior to the order might merit a 4% reduction in the degree of trust needed; however, this is still greater than the 93% confidence produced by the user.

If the vendor does adjust their required trust level in step 1835, then the authentication confidence level produced by the authentication and the required trust level are compared in step 1730 (see FIG. 17). If the confidence level now exceeds the required trust level, a positive authentication may be generated in the transaction engine 205 in step 1740 (see FIG. 17). If not, further arbitrage may be attempted as discussed above if it is permitted.

In addition to requesting an adjustment to the required trust level, the transaction engine 205 may also offer vendor side insurance to the vendor requesting the authentication. This insurance serves a similar purpose to that described above for the user side insurance. Here, however, rather than the cost corresponding to the risk being taken by the trust engine 110 in authenticating above the actual authentication confidence level produced, the cost of the insurance corresponds to the risk being taken by the vendor in accepting a lower trust level in the authentication.

Instead of just lowering their actual required trust level, the vendor has the option of purchasing insurance to protect itself from the additional risk associated with a lower level of trust in the authentication of the user. As described above, it may be advantageous for the vendor to only consider purchasing such insurance to cover the trust gap in conditions where the existing authentication is already above a certain threshold.

The availability of such vendor side insurance allows the vendor the option to either: lower his trust requirement directly at no additional cost to himself, bearing the risk of a false authentication himself (based on the lower trust level required); or, buying insurance for the trust gap between the authentication confidence level and his requirement, with the trust engine 110 operator bearing the risk of the lower confidence level which has been provided. By purchasing the insurance, the vendor effectively keeps his high trust level requirement; because the risk of a false authentication is shifted to the trust engine 110 operator.

If the vendor purchases insurance in step 1840, the authentication confidence level and required trust levels are compared in step 1730 (see FIG. 17), and the process continues as described above.

Note that it is also possible that both the user and the vendor respond to messages from the trust engine 110. Those of skill in the art will recognize that there are multiple ways in which such situations can be handled. One advantageous mode of handling the possibility of multiple responses is simply to treat the responses in a first-come, first-served manner. For example, if the vendor responds with a lowered required trust level and immediately thereafter the user also purchases insurance to raise his authentication level, the authentication is first reevaluated based upon the lowered trust requirement from the vendor. If the authentication is now positive, the user's insurance purchase is ignored. In another advantageous mode of operation, the user might only be charged for the level of insurance required to meet the new, lowered trust requirement of the vendor (if a trust gap remained even with the lowered vendor trust requirement).

If no response from either party is received during the trust arbitrage process at step 1850 within the time limit set for the authentication, the arbitrage is reevaluated in step 1805. This effectively begins the arbitrage process again. If the time limit was final or other circumstances prevent further arbitrage in step 1805, a negative authentication is generated by the transaction engine 205 in step 1810 and returned to the vendor in step 1055 (see FIG. 10). If not, new messages may be sent to the user and vendor, and the process may be repeated as desired.

Note that for certain types of transactions, for instance, digitally signing documents which are not part of a transaction, there may not necessarily be a vendor or other third party; therefore the transaction is primarily between the user and the trust engine 110. In circumstances such as these, the trust engine 110 will have its own required trust level which must be satisfied in order to generate a positive authentication. However, in such circumstances, it will often not be desirable for the trust engine 110 to offer insurance to the user in order for him to raise the confidence of his own signature.

The process described above and shown in FIGS. 16-18 may be carried out using various communications modes as described above with reference to the trust engine 110. For instance, the messages may be web-based and sent using SSL connections between the trust engine 110 and applets downloaded in real time to browsers running on the user or vendor systems. In an alternate mode of operation, certain dedicated applications may be in use by the user and vendor which facilitate such arbitrage and insurance transactions. In another alternate mode of operation, secure email operations may be used to mediate the arbitrage described above, thereby allowing deferred evaluations and batch processing of authentications. Those of skill in the art will recognize that different communications modes may be used as are appropriate for the circumstances and authentication requirements of the vendor.

Figure 19:
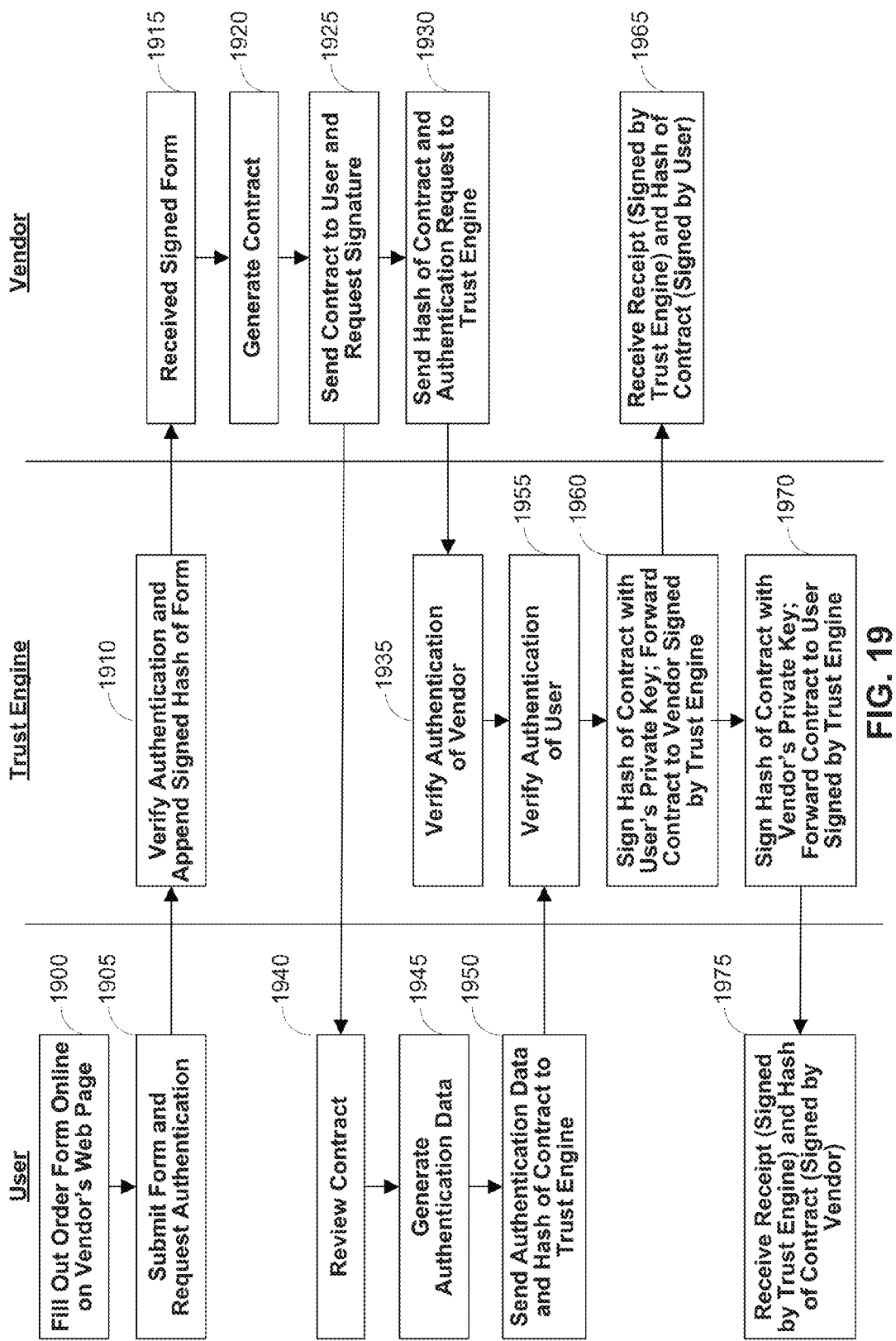
FIG. 19 illustrates a sample transaction between a user and a vendor according to aspects of an embodiment of the invention where an initial web based contact leads to a sales contract signed by both parties.

The following description with reference to FIG. 19 describes a sample transaction which integrates the various aspects of the present invention as described above. This example illustrates the overall process between a user and a vendor as mediates by the trust engine 110. Although the various steps and components as described in detail above may be used to carry out the following transaction, the process illustrated focuses on the interaction between the trust engine 110, user and vendor.

The transaction begins when the user, while viewing web pages online, fills out an order form on the web site of the vendor in step 1900. The user wishes to submit this order form to the vendor, signed with his digital signature. In order to do this, the user submits the order form with his request for a signature to the trust engine 110 in step 1905. The user will also provide authentication data which will be used as described above to authenticate his identity.

In step 1910 the authentication data is compared to the enrollment data by the trust engine 110 as discussed above, and if a positive authentication is produced, the hash of the order form, signed with the private key of the user, is forwarded to the vendor along with the order form itself.

The vendor receives the signed form in step 1915, and then the vendor will generate an invoice or other contract related to the purchase to be made in step 1920. This contract is sent back to the user with a request for a signature in step 1925. The vendor also sends an authentication request for this contract transaction to the trust engine 110 in step 1930 including a hash of the contract which will be signed by both parties. To allow the contract to be digitally signed by both parties, the vendor also includes authentication data for itself so that the vendor's signature upon the contract can later be verified if necessary.

As discussed above, the trust engine 110 then verifies the authentication data provided by the vendor to confirm the vendor's identity, and if the data produces a positive authentication in step 1935, continues with step 1955 when the data is received from the user. If the vendor's authentication data does not match the enrollment data of the vendor to the desired degree, a message is returned to the vendor requesting further authentication. Trust arbitrage may be performed here if necessary, as described above, in order for the vendor to successfully authenticate itself to the trust engine 110.

When the user receives the contract in step 1940, he reviews it, generates authentication data to sign it if it is acceptable in step 1945, and then sends a hash of the contract and his authentication data to the trust engine 110 in step 1950. The trust engine 110 verifies the authentication data in step 1955 and if the authentication is good, proceeds to process the contract as described below. As discussed above with reference to FIGS. 17 and 18, trust arbitrage may be performed as appropriate to close any trust gap which exists between the authentication confidence level and the required authentication level for the transaction.

The trust engine 110 signs the hash of the contract with the user's private key, and sends this signed hash to the vendor in step 1960, signing the complete message on its own behalf, i.e., including a hash of the complete message (including the user's signature) encrypted with the private key 510 of the trust engine 110. This message is received by the vendor in step 1965. The message represents a signed contract (hash of contract encrypted using user's private key) and a receipt from the trust engine 110 (the hash of the message including the signed contract, encrypted using the trust engine 110's private key).

The trust engine 110 similarly prepares a hash of the contract with the vendor's private key in step 1970, and forwards this to the user, signed by the trust engine 110. In this way, the user also receives a copy of the contract, signed by the vendor, as well as a receipt, signed by the trust engine 110, for delivery of the signed contract in step 1975.

Figure 20:
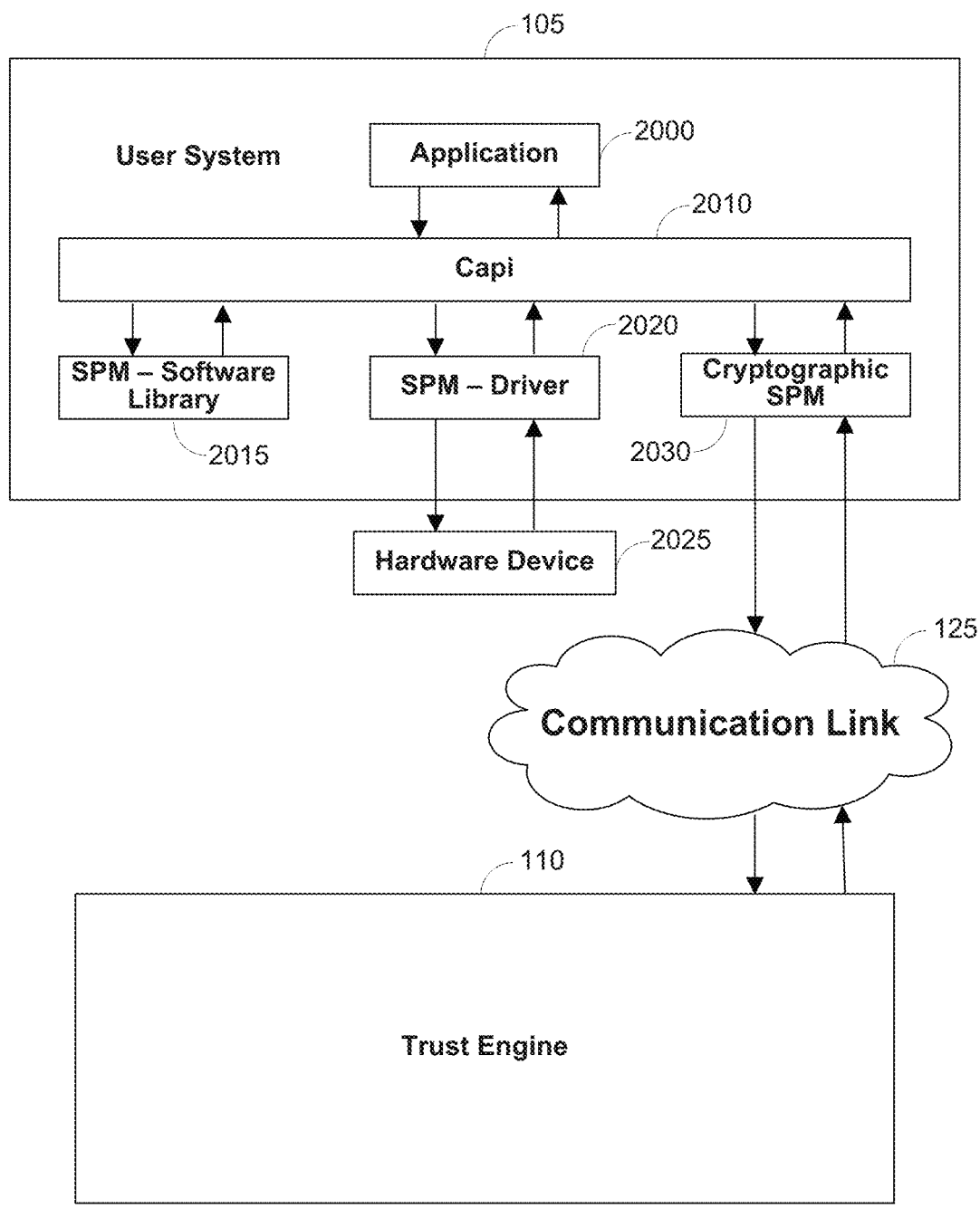
FIG. 20 illustrates a sample user system with a cryptographic service provider module which provides security functions to a user system.

In addition to the foregoing, an additional aspect of the invention provides a cryptographic Service Provider Module (SPM) which may be available to a client side application as a means to access functions provided by the trust engine 110 described above. One advantageous way to provide such a service is for the cryptographic SPM is to mediate communications between a third party Application Programming Interface (API) and a trust engine 110 which is accessible via a network or other remote connection. A sample cryptographic SPM is described below with reference to FIG. 20.

For example, on a typical system, a number of API's are available to programmers. Each API provides a set of function calls which may be made by an application 2000 running upon the system. Examples of API's which provide programming interfaces suitable for cryptographic functions, authentication functions, and other security function include the Cryptographic API (CAPI) 2010 provided by Microsoft with its Windows operating systems, and the Common Data Security Architecture (CDSA), sponsored by IBM, Intel and other members of the Open Group. CAPI will be used as an exemplary security API in the discussion that follows. However, the cryptographic SPM described could be used with CDSA or other security API's as are known in the art.

This API is used by a user system 105 or vendor system 120 when a call is made for a cryptographic function. Included among these functions may be requests associated with performing various cryptographic operations, such as encrypting a document with a particular key, signing a document, requesting a digital certificate, verifying a signature upon a signed document, and such other cryptographic functions as are described herein or known to those of skill in the art.

Such cryptographic functions are normally performed locally to the system upon which CAPI 2010 is located. This is because generally the functions called require the use of either resources of the local user system 105, such as a fingerprint reader, or software functions which are programmed using libraries which are executed on the local machine. Access to these local resources is normally provided by one or more Service Provider Modules (SPM's) 2015, 2020 as referred to above which provide resources with which the cryptographic functions are carried out. Such SPM's may include software libraries 2015 to perform encrypting or decrypting operations, or drivers and applications 2020 which are capable of accessing specialized hardware 2025, such as biometric scanning devices. In much the way that CAPI 2010 provides functions which may be used by an application 2000 of the system 105, the SPM's 2015, 2020 provide CAPI with access to the lower level functions and resources associated with the available services upon the system.

In accordance with the invention, it is possible to provide a cryptographic SPM 2030 which is capable of accessing the cryptographic functions provided by the trust engine 110 and making these functions available to an application 2000 through CAPI 2010. Unlike embodiments where CAPI 2010 is only able to access resources which are locally available through SPM's 2015, 2020, a cryptographic SPM 2030 as described herein would be able to submit requests for cryptographic operations to a remotely-located, network-accessible trust engine 110 in order to perform the operations desired.

For instance, if an application 2000 has a need for a cryptographic operation, such as signing a document, the application 2000 makes a function call to the appropriate CAPI 2010 function. CAPI 2010 in turn will execute this function, making use of the resources which are made available to it by the SPM's 2015, 2020 and the cryptographic SPM 2030. In the case of a digital signature function, the cryptographic SPM 2030 will generate an appropriate request which will be sent to the trust engine 110 across the communication link 125.

The operations which occur between the cryptographic SPM 2030 and the trust engine 110 are the same operations that would be possible between any other system and the trust engine 110. However, these functions are effectively made available to a user system 105 through CAPI 2010 such that they appear to be locally available upon the user system 105 itself. However, unlike ordinary SPM's 2015, 2020, the functions are being carried out on the remote trust engine 110 and the results relayed to the cryptographic SPM 2030 in response to appropriate requests across the communication link 125.

This cryptographic SPM 2030 makes a number of operations available to the user system 105 or a vendor system 120 which might not otherwise be available. These functions include without limitation: encryption and decryption of documents; issuance of digital certificates; digital signing of documents; verification of digital signatures; and such other operations as will be apparent to those of skill in the art.

In a separate embodiment, the present invention comprises a complete system for performing the data securing methods of the present invention on any data set. The computer system of this embodiment comprises a data splitting module that comprises the functionality shown in FIG. 8 and described herein. In one embodiment of the present invention, the data splitting module, sometimes referred to herein as a secure data parser, comprises a parser program or software suite which comprises data splitting, encryption and decryption, reconstitution or reassembly functionality. This embodiment may further comprise a data storage facility or multiple data storage facilities, as well. The data splitting module, or secure data parser, comprises a cross-platform software module suite which integrates within an electronic infrastructure, or as an add-on to any application which requires the ultimate security of its data elements. This parsing process operates on any type of data set, and on any and all file types, or in a database on any row, column or cell of data in that database.

The parsing process of the present invention may, in one embodiment, be designed in a modular tiered fashion, and any encryption process is suitable for use in the process of the present invention. The modular tiers of the parsing and splitting process of the present invention may include, but are not limited to, 1) cryptographic split, dispersed and securely stored in multiple locations; 2) encrypt, cryptographically split, dispersed and securely stored in multiple locations; 3) encrypt, cryptographically split, encrypt each share, then dispersed and securely stored in multiple locations; and 4) encrypt, cryptographically split, encrypt each share with a different type of encryption than was used in the first step, then dispersed and securely stored in multiple locations.

The process comprises, in one embodiment, splitting of the data according to the contents of a generated random number, or key and performing the same cryptographic splitting of the key used in the encryption of splitting of the data to be secured into two or more portions, or shares, of parsed and split data, and in one embodiment, preferably into four or more portions of parsed and split data, encrypting all of the portions, then scattering and storing these portions back into the database, or relocating them to any named device, fixed or removable, depending on the requestor's need for privacy and security. Alternatively, in another embodiment, encryption may occur prior to the splitting of the data set by the splitting module or secure data parser. The original data processed as described in this embodiment is encrypted and obfuscated and is secured. The dispersion of the encrypted elements, if desired, can be virtually anywhere, including, but not limited to, a single server or data storage device, or among separate data storage facilities or devices. Encryption key management in one embodiment may be included within the software suite, or in another embodiment may be integrated into an existing infrastructure or any other desired location.

A cryptographic split (cryptosplit) partitions the data into N number of shares. The partitioning can be on any size unit of data, including an individual bit, bits, bytes, kilobytes, megabytes, or larger units, as well as any pattern or combination of data unit sizes whether predetermined or randomly generated. The units can also be of different sized, based on either a random or predetermined set of values. This means the data can be viewed as a sequence of these units. In this manner the size of the data units themselves may render the data more secure, for example by using one or more predetermined or randomly generated pattern, sequence or combination of data unit sizes. The units are then distributed (either randomly or by a predetermined set of values) into the N shares. This distribution could also involve a shuffling of the order of the units in the shares. It is readily apparent to those of ordinary skill in the art that the distribution of the data units into the shares may be performed according to a wide variety of possible selections, including but not limited to size-fixed, predetermined sizes, or one or more combination, pattern or sequence of data unit sizes that are predetermined or randomly generated.

One example of this cryptographic split process, or cryptosplit, would be to consider the data to be 23 bytes in size, with the data unit size chosen to be one byte, and with the number of shares selected to be 4. Each byte would be distributed into one of the 4 shares. Assuming a random distribution, a key would be obtained to create a sequence of 23 random numbers (r1, r2, r3 through r23), each with a value between 1 and 4 corresponding to the four shares. Each of the units of data (in this example 23 individual bytes of data) is associated with one of the 23 random numbers corresponding to one of the four shares. The distribution of the bytes of data into the four shares would occur by placing the first byte of the data into share number r1, byte two into share r2, byte three into share r3, through the $23^{rd}$ byte of data into share r23. It is readily apparent to those of ordinary skill in the art that a wide variety of other possible steps or combination or sequence of steps, including the size of the data units, may be used in the cryptosplit process of the present invention, and the above example is a non-limiting description of one process for cryptosplitting data. To recreate the original data, the reverse operation would be performed.

In another embodiment of the cryptosplit process of the present invention, an option for the cryptosplitting process is to provide sufficient redundancy in the shares such that only a subset of the shares are needed to reassemble or restore the data to its original or useable form. As a non-limiting example, the cryptosplit may be done as a "3 of 4" cryptosplit such that only three of the four shares are necessary to reassemble or restore the data to its original or useable form. This is also referred to as a "M of N cryptosplit" wherein N is the total number of shares, and M is at least one less than N. It is readily apparent to those of ordinary skill in the art that there are many possibilities for creating this redundancy in the cryptosplitting process of the present invention.

In one embodiment of the cryptosplitting process of the present invention, each unit of data is stored in two shares, the primary share and the backup share. Using the "3 of 4" cryptosplitting process described above, any one share can be missing, and this is sufficient to reassemble or restore the original data with no missing data units since only three of the total four shares are required. As described herein, a random number is generated that corresponds to one of the shares. The random number is associated with a data unit, and stored in the corresponding share, based on a key. One key is used, in this embodiment, to generate the primary and backup share random number. As described herein for the cryptosplitting process of the present invention, a set of random numbers (also referred to as primary share numbers) from 0 to 3 are generated equal to the number of data units. Then another set of random numbers is generated (also referred to as backup share numbers) from 1 to 3 equal to the number of data units. Each unit of data is then associated with a primary share number and a backup share number. Alternatively, a set of random numbers may be generated that is fewer than the number of data units, and repeating the random number set, but this may reduce the security of the sensitive data. The primary share number is used to determine into which share the data unit is stored. The backup share number is combined with the primary share number to create a third share number between 0 and 3, and this number is used to determine into which share the data unit is stored. In this example, the equation to determine the third share number is:

(primary share number+backup share number)MOD 4=third share number.

In the embodiment described above where the primary share number is between 0 and 3, and the backup share number is between 1 and 3 ensures that the third share number is different from the primary share number. This results in the data unit being stored in two different shares. It is readily apparent to those of ordinary skill in the art that there are many ways of performing redundant cryptosplitting and non-redundant cryptosplitting in addition to the embodiments disclosed herein. For example, the data units in each share could be shuffled utilizing a different algorithm. This data unit shuffling may be performed as the original data is split into the data units, or after the data units are placed into the shares, or after the share is full, for example.

The various cryptosplitting processes and data shuffling processes described herein, and all other embodiments of the cryptosplitting and data shuffling methods of the present invention may be performed on data units of any size, including but not limited to, as small as an individual bit, bits, bytes, kilobytes, megabytes or larger.

An example of one embodiment of source code that would perform the cryptosplitting process described herein is:

```
DATA [1:24] - array of bytes with the data to be split
SHARES[0:3; 1:24] - 2-dimensionalarray with each row representing
one of the shares
RANDOM[1:24] - array random numbers in the range of 0..3
S1 = 1;
S2 = 1;
S3 = 1;
S4 = 1;
For J = 1 to 24 do
    Begin
    IF RANDOM[J[ ==0 then
        Begin
        SHARES[1,S1] = DATA [J];
        S1 = S1 + 1;
        End
    ELSE IF RANDOM[J[ ==1 then
        Begin
        SHARES[2,S2] = DATA [J];
        S2 = S2 + 1;
        END
    ELSE IF RANDOM[J[ ==2 then
        Begin
        Shares[3,S3] = data [J];
        S3 = S3 + 1;
        End
    Else begin
        Shares[4,S4] = data [J];
        S4 = S4 + 1;
        End;
    END;
```

An example of one embodiment of source code that would perform the cryptosplitting RAID process described herein is:

Generate two sets of numbers, PrimaryShare is 0 to 3, BackupShare is 1 to 3. Then put each data unit into share [primaryshare[1]] and share[(primaryshare[1]+backupshare [1]) mod 4, with the same process as in cryptosplitting described above. This method will be scalable to any size N, where only N−1 shares are necessary to restore the data.

The retrieval, recombining, reassembly or reconstituting of the encrypted data elements may utilize any number of authentication techniques, including, but not limited to, biometrics, such as fingerprint recognition, facial scan, hand scan, iris scan, retinal scan, ear scan, vascular pattern recognition or DNA analysis. The data splitting and/or parser modules of the present invention may be integrated into a wide variety of infrastructure products or applications as desired.

Traditional encryption technologies known in the art rely on one or more key used to encrypt the data and render it unusable without the key. The data, however, remains whole and intact and subject to attack. The secure data parser of the present invention, in one embodiment, addresses this problem by performing a cryptographic parsing and splitting of the encrypted file into two or more portions or shares, and in another embodiment, preferably four or more shares, adding another layer of encryption to each share of the data, then storing the shares in different physical and/or logical locations. When one or more data shares are physically removed from the system, either by using a removable device, such as a data storage device, or by placing the share under another party's control, any possibility of compromise of secured data is effectively removed.

Figure 21:
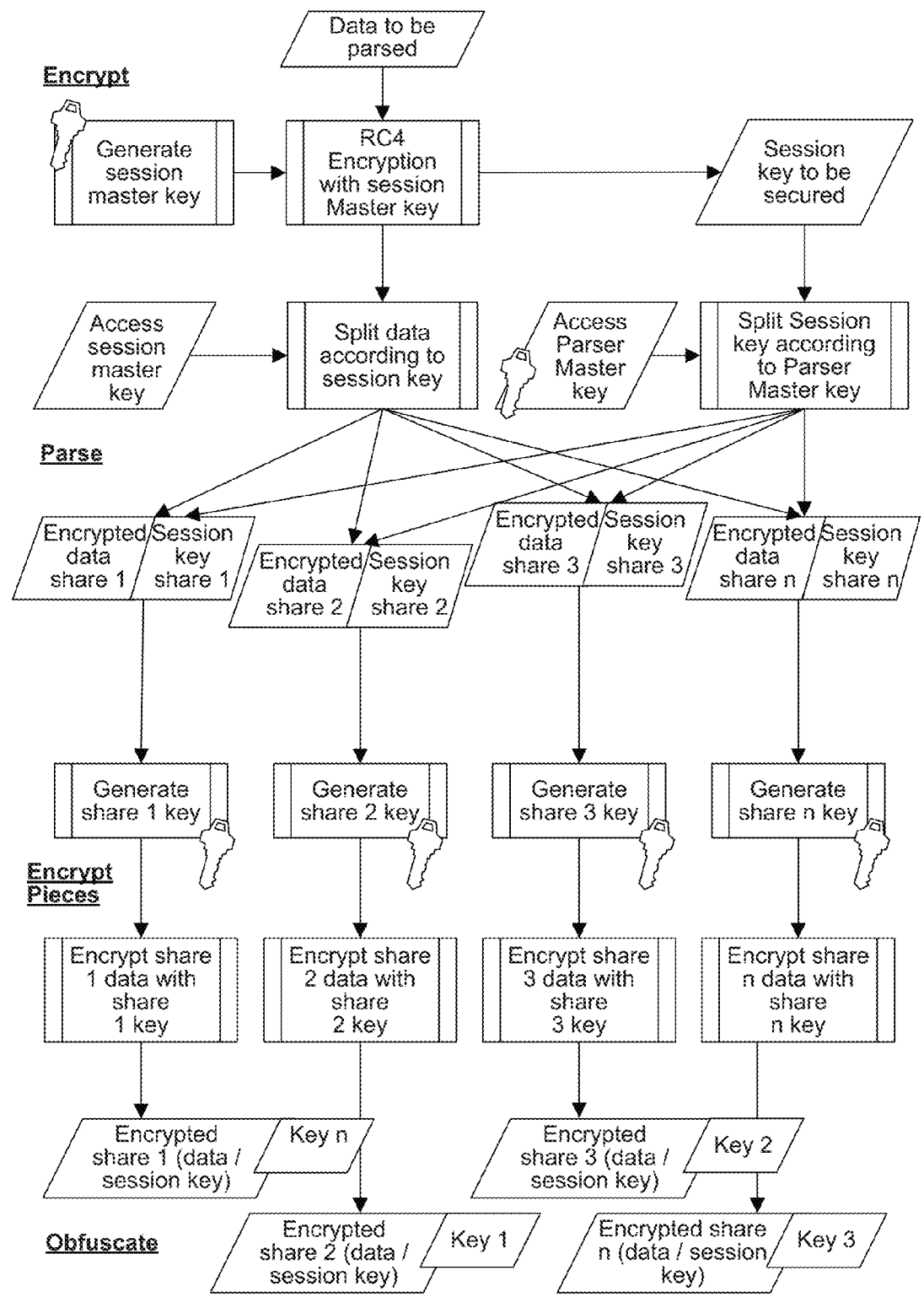
FIG. 21 illustrates a process for parsing, splitting and/or separating data with encryption and storage of the encryption master key with the data.

An example of one embodiment of the secure data parser of the present invention and an example of how it may be utilized is shown in FIG. 21 and described below. However, it is readily apparent to those of ordinary skill in the art that the secure data parser of the present invention may be utilized in a wide variety of ways in addition to the non-limiting example below. As a deployment option, and in one embodiment, the secure data parser may be implemented with external session key management or secure internal storage of session keys. Upon implementation, a Parser Master Key will be generated which will be used for securing the application and for encryption purposes. It should be also noted that the incorporation of the Parser Master key in the resulting secured data allows for a flexibility of sharing of secured data by individuals within a workgroup, enterprise or extended audience.

As shown in FIG. 21, this embodiment of the present invention shows the steps of the process performed by the secure data parser on data to store the session master key with the parsed data:

1. Generating a session master key and encrypt the data using RS1 stream cipher.

2. Separating the resulting encrypted data into four shares or portions of parsed data according to the pattern of the session master key.

3. In this embodiment of the method, the session master key will be stored along with the secured data shares in a data depository. Separating the session master key according to the pattern of the Parser Master Key and append the key data to the encrypted parsed data.

4. The resulting four shares of data will contain encrypted portions of the original data and portions of the session master key. Generate a stream cipher key for each of the four data shares.

5. Encrypting each share, then store the encryption keys in different locations from the encrypted data portions or shares: Share 1 gets Key 4, Share 2 gets Key 1, Share 3 gets Key 2, Share 4 gets Key 3.

To restore the original data format, the steps are reversed.

It is readily apparent to those of ordinary skill in the art that certain steps of the methods described herein may be performed in different order, or repeated multiple times, as desired. It is also readily apparent to those skilled in the art that the portions of the data may be handled differently from one another. For example, multiple parsing steps may be performed on only one portion of the parsed data. Each portion of parsed data may be uniquely secured in any desirable way provided only that the data may be reassembled, reconstituted, reformed, decrypted or restored to its original or other usable form.

Figure 22:
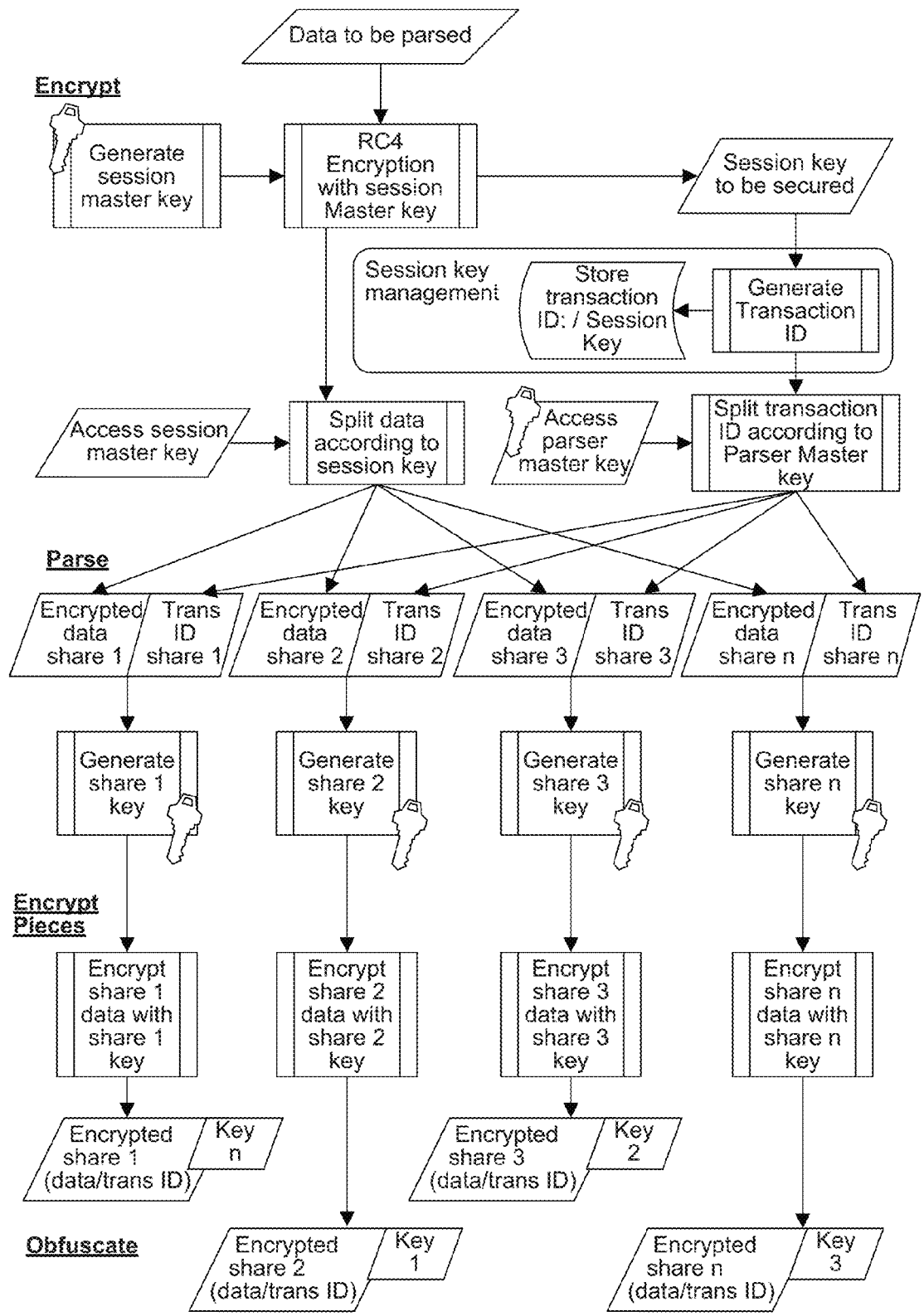
FIG. 22 illustrates a process for parsing, splitting and/or separating data with encryption and storing the encryption master key separately from the data.

As shown in FIG. 22 and described herein, another embodiment of the present invention comprises the steps of the process performed by the secure data parser on data to store the session master key data in one or more separate key management table:

1. Generating a session master key and encrypt the data using RS1 stream cipher.

2. Separating the resulting encrypted data into four shares or portions of parsed data according to the pattern of the session master key.

3. In this embodiment of the method of the present invention, the session master key will be stored in a separate key management table in a data depository. Generating a unique transaction ID for this transaction. Storing the transaction ID and session master key in a separate key management table. Separating the transaction ID according to the pattern of the Parser Master Key and append the data to the encrypted parsed or separated data.

4. The resulting four shares of data will contain encrypted portions of the original data and portions of the transaction ID.

5. Generating a stream cipher key for each of the four data shares.

6. Encrypting each share, then store the encryption keys in different locations from the encrypted data portions or shares: Share 1 gets Key 4, Share 2 gets Key 1, Share 3 gets Key 2, Share 4 gets Key 3.

To restore the original data format, the steps are reversed.

It is readily apparent to those of ordinary skill in the art that certain steps of the method described herein may be performed in different order, or repeated multiple times, as desired. It is also readily apparent to those skilled in the art that the portions of the data may be handled differently from one another. For example, multiple separating or parsing steps may be performed on only one portion of the parsed data. Each portion of parsed data may be uniquely secured in any desirable way provided only that the data may be reassembled, reconstituted, reformed, decrypted or restored to its original or other usable form.

Figure 23:
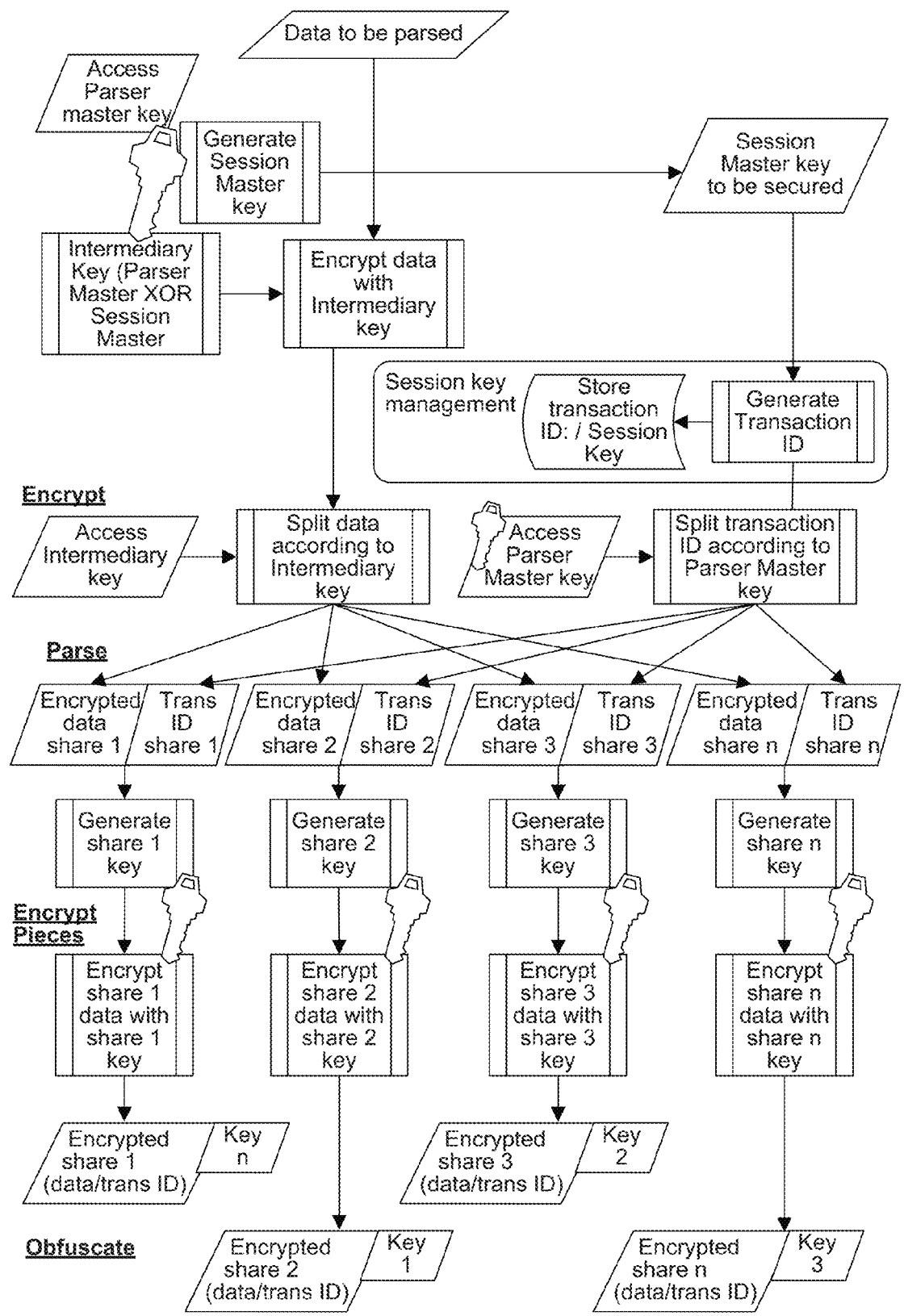
FIG. 23 illustrates the intermediary key process for parsing, splitting and/or separating data with encryption and storage of the encryption master key with the data.

As shown in FIG. 23, this embodiment of the present invention shows the steps of the process performed by the secure data parser on data to store the session master key with the parsed data:

1. Accessing the parser master key associated with the authenticated user

2. Generating a unique Session Master key

3. Derive an Intermediary Key from an exclusive OR function of the Parser Master Key and Session Master key 4. Optional encryption of the data using an existing or new encryption algorithm keyed with the Intermediary Key.

5. Separating the resulting optionally encrypted data into four shares or portions of parsed data according to the pattern of the Intermediary key.

6. In this embodiment of the method, the session master key will be stored along with the secured data shares in a data depository. Separating the session master key according to the pattern of the Parser Master Key and append the key data to the optionally encrypted parsed data shares.

7. The resulting multiple shares of data will contain optionally encrypted portions of the original data and portions of the session master key.

8. Optionally generate an encryption key for each of the four data shares.

9. Optionally encrypting each share with an existing or new encryption algorithm, then store the encryption keys in different locations from the encrypted data portions or shares: for example, Share 1 gets Key 4, Share 2 gets Key 1, Share 3 gets Key 2, Share 4 gets Key 3.

To restore the original data format, the steps are reversed.

It is readily apparent to those of ordinary skill in the art that certain steps of the methods described herein may be performed in different order, or repeated multiple times, as desired. It is also readily apparent to those skilled in the art that the portions of the data may be handled differently from one another. For example, multiple parsing steps may be performed on only one portion of the parsed data. Each portion of parsed data may be uniquely secured in any desirable way provided only that the data may be reassembled, reconstituted, reformed, decrypted or restored to its original or other usable form.

Figure 24:
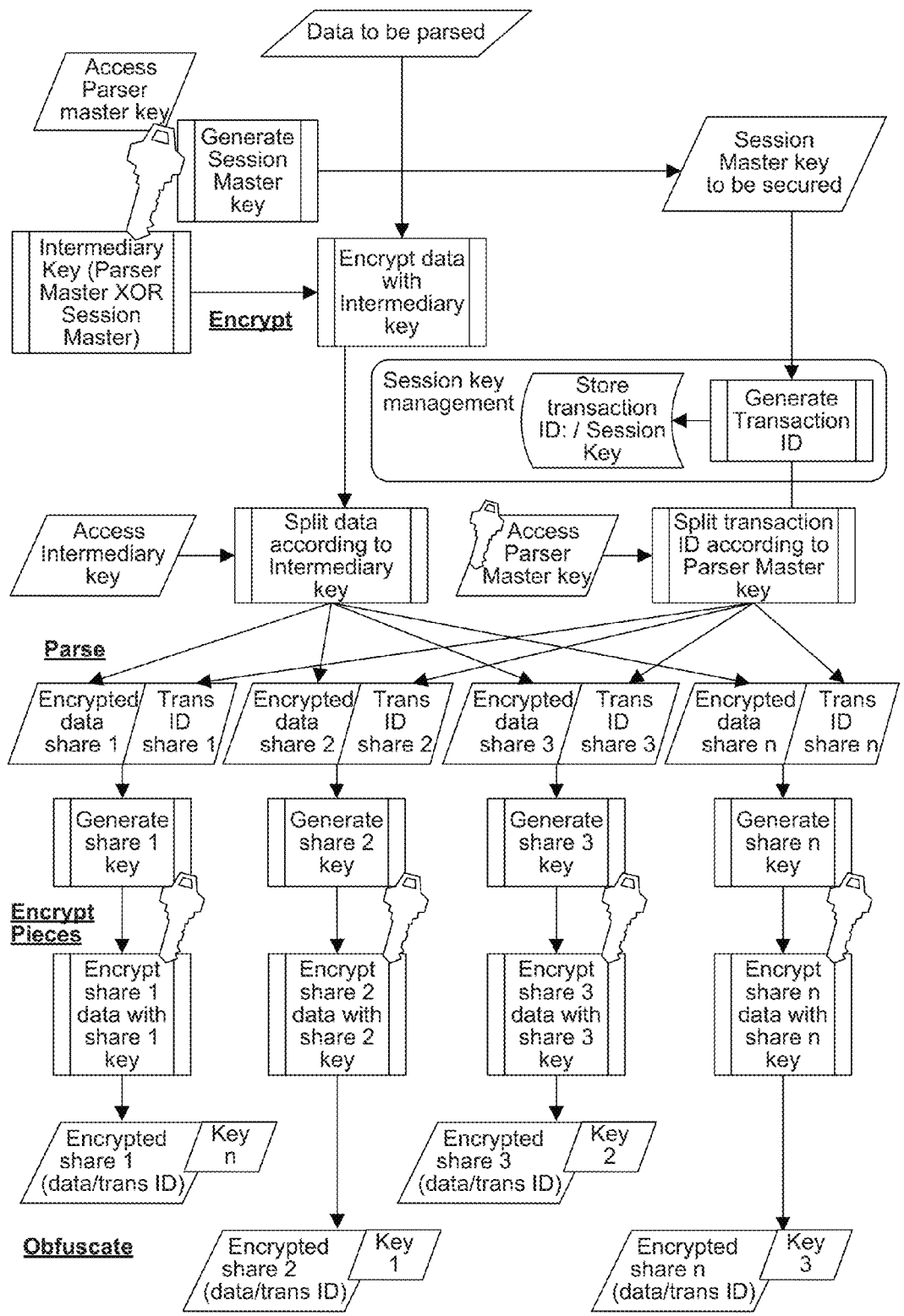
FIG. 24 illustrates the intermediary key process for parsing, splitting and/or separating data with encryption and storing the encryption master key separately from the data.

As shown in FIG. 24 and described herein, another embodiment of the present invention comprises the steps of the process performed by the secure data parser on data to store the session master key data in one or more separate key management table:

1. Accessing the Parser Master Key associated with the authenticated user

2. Generating a unique Session Master Key

3. Derive an Intermediary Key from an exclusive OR function of the Parser Master Key and Session Master key 4. Optionally encrypt the data using an existing or new encryption algorithm keyed with the Intermediary Key.

5. Separating the resulting optionally encrypted data into four shares or portions of parsed data according to the pattern of the Intermediary Key.

6. In this embodiment of the method of the present invention, the session master key will be stored in a separate key management table in a data depository. Generating a unique transaction ID for this transaction. Storing the transaction ID and session master key in a separate key management table or passing the Session Master Key and transaction ID back to the calling program for external management. Separating the transaction ID according to the pattern of the Parser Master Key and append the data to the optionally encrypted parsed or separated data.

7. The resulting four shares of data will contain optionally encrypted portions of the original data and portions of the transaction ID.

8. Optionally generate an encryption key for each of the four data shares.

9. Optionally encrypting each share, then store the encryption keys in different locations from the encrypted data portions or shares. For example: Share 1 gets Key 4, Share 2 gets Key 1, Share 3 gets Key 2, Share 4 gets Key 3.

To restore the original data format, the steps are reversed.

It is readily apparent to those of ordinary skill in the art that certain steps of the method described herein may be performed in different order, or repeated multiple times, as desired. It is also readily apparent to those skilled in the art that the portions of the data may be handled differently from one another. For example, multiple separating or parsing steps may be performed on only one portion of the parsed data. Each portion of parsed data may be uniquely secured in any desirable way provided only that the data may be reassembled, reconstituted, reformed, decrypted or restored to its original or other usable form.

A wide variety of encryption methodologies are suitable for use in the methods of the present invention, as is readily apparent to those skilled in the art. The One Time Pad algorithm, is often considered one of the most secure encryption methods, and is suitable for use in the method of the present invention. Using the One Time Pad algorithm requires that a key be generated which is as long as the data to be secured. The use of this method may be less desirable in certain circumstances such as those resulting in the generation and management of very long keys because of the size of the data set to be secured. In the One-Time Pad (OTP) algorithm, the simple exclusive-or function, XOR, is used. For two binary streams x and y of the same length, x XOR y means the bitwise exclusive-or of x and y.

At the bit level is generated:
0 XOR 0=0
0 XOR 1=1
1 XOR 0=1
1 XOR 1=0

An example of this process is described herein for an n-byte secret, s, (or data set) to be split. The process will generate an n-byte random value, a, and then set:

$b = a \text{ XOR } s.$

Note that one can derive "s" via the equation:

$s = a \text{ XOR } b.$

The values a and b are referred to as shares or portions and are placed in separate depositories. Once the secret s is split into two or more shares, it is discarded in a secure manner.

The secure data parser of the present invention may utilize this function, performing multiple XOR functions incorporating multiple distinct secret key values: K1, K2, K3, Kn, K5. At the beginning of the operation, the data to be secured is passed through the first encryption operation, secure data=data XOR secret key 5:
S=D XOR K5

In order to securely store the resulting encrypted data in, for example, four shares, S1, S2, S3, Sn, the data is parsed and split into "n" segments, or shares, according to the value of K5. This operation results in "n" pseudorandom shares of the original encrypted data. Subsequent XOR functions may then be performed on each share with the remaining secret key values, for example: Secure data segment 1=encrypted data share 1 XOR secret key 1:
SD1=S1 XOR K1
SD2=S2 XOR K2
SD3=S3 XOR K3
SDn=Sn XOR Kn.

In one embodiment, it may not be desired to have any one depository contain enough information to decrypt the information held there, so the key required to decrypt the share is stored in a different data depository:
Depository 1: SD1, Kn
Depository 2: SD2, K1
Depository 3: SD3, K2
Depository n: SDn, K3.

Additionally, appended to each share may be the information required to retrieve the original session encryption key, K5. Therefore, in the key management example described herein, the original session master key is referenced by a transaction ID split into "n" shares according to the contents of the installation dependant Parser Master Key (TID1, TID2, TID3, TIDn):

Depository 1: SD1, Kn, TID1
Depository 2: SD2, K1, TID2
Depository 3: SD3, K2, TID3
Depository n: SDn, K3, TIDn.

In the incorporated session key example described herein, the session master key is split into "n" shares according to the contents of the installation dependant Parser Master Key (SK1, SK2, SK3, SKn):
Depository 1: SD1, Kn, SK1
Depository 2: SD2, K1, SK2
Depository 3: SD3, K2, SK3
Depository n: SDn, K3, SKn.

Unless all four shares are retrieved, the data cannot be reassembled according to this example. Even if all four shares are captured, there is no possibility of reassembling or restoring the original information without access to the session master key and the Parser Master Key.

This example has described an embodiment of the method of the present invention, and also describes, in another embodiment, the algorithm used to place shares into depositories so that shares from all depositories can be combined to form the secret authentication material. The computations needed are very simple and fast. However, with the One Time Pad (OTP) algorithm there may be circumstances that cause it to be less desirable, such as a large data set to be secured, because the key size is the same size as the data to be stored. Therefore, there would be a need to store and transmit about twice the amount of the original data which may be less desirable under certain circumstances.

Stream Cipher RS1

The stream cipher RS1 splitting technique is very similar to the OTP splitting technique described herein. Instead of an n-byte random value, an n'=min(n, 16)-byte random value is generated and used to key the RS1 Stream Cipher algorithm. The advantage of the RS1 Stream Cipher algorithm is that a pseudorandom key is generated from a much smaller seed number. The speed of execution of the RS1 Stream Cipher encryption is also rated at approximately 10 times the speed of the well known in the art Triple DES encryption without compromising security. The RS1 Stream Cipher algorithm is well known in the art, and may be used to generate the keys used in the XOR function. The RS1 Stream Cipher algorithm is interoperable with other commercially available stream cipher algorithms, such as the RC4™ stream cipher algorithm of RSA Security, Inc and is suitable for use in the methods of the present invention.

Using the key notation above, K1 thru K5 are now an n' byte random values and we set:
SD1=S1 XOR E(K1)
SD2=S2 XOR E(K2)
SD3=S3 XOR E(K3)
SDn=Sn XOR E(Kn)
where E(K1) thru E(Kn) are the first n' bytes of output from the RS1 Stream Cipher algorithm keyed by K1 thru Kn. The shares are now placed into data depositories as described herein.

In this stream cipher RS1 algorithm, the required computations needed are nearly as simple and fast as the OTP algorithm. The benefit in this example using the RS1 Stream Cipher is that the system needs to store and transmit on average only about 16 bytes more than the size of the original data to be secured per share. When the size of the original data is more than 16 bytes, this RS1 algorithm is more efficient than the OTP algorithm because it is simply shorter. It is readily apparent to those of ordinary skill in the art that a wide variety of encryption methods or algorithms are suitable for use in the present invention, including, but not limited to RS1, OTP, RC4™, Triple DES and AES.

There are major advantages provided by the data security methods and computer systems of the present invention over traditional encryption methods. One advantage is the security gained from moving shares of the data to different locations on one or more data depositories or storage devices, that may be in different logical, physical or geographical locations. When the shares of data are split physically and under the control of different personnel, for example, the possibility of compromising the data is greatly reduced.

Another advantage provided by the methods and system of the present invention is the combination of the steps of the method of the present invention for securing data to provide a comprehensive process of maintaining security of sensitive data. The data is encrypted with a secure key and split into one or more shares, and in one embodiment, four shares, according to the secure key. The secure key is stored safely with a reference pointer which is secured into four shares according to a secure key. The data shares are then encrypted individually and the keys are stored safely with different encrypted shares. When combined, the entire process for securing data according to the methods disclosed herein becomes a comprehensive package for data security.

The data secured according to the methods of the present invention is readily retrievable and restored, reconstituted, reassembled, decrypted, or otherwise returned into its original or other suitable form for use. In order to restore the original data, the following items may be utilized:

1. All shares or portions of the data set.
2. Knowledge of and ability to reproduce the process flow of the method used to secure the data.
3. Access to the session master key.
4. Access to the Parser Master Key.

Therefore, it may be desirable to plan a secure installation wherein at least one of the above elements may be physically separated from the remaining components of the system (under the control of a different system administrator for example).

Protection against a rogue application invoking the data securing methods application may be enforced by use of the Parser Master Key. A mutual authentication handshake between the secure data parser and the application may be required in this embodiment of the present invention prior to any action taken.

The security of the system dictates that there be no "backdoor" method for recreation of the original data. For installations where data recovery issues may arise, the secure data parser can be enhanced to provide a mirror of the four shares and session master key depository. Hardware options such as RAID (redundant array of inexpensive disks, used to spread information over several disks) and software options such as replication can assist as well in the data recovery planning.

Key Management

In one embodiment of the present invention, the data securing method uses three sets of keys for an encryption operation. Each set of keys may have individual key storage, retrieval, security and recovery options, based on the installation. The keys that may be used, include, but are not limited to:

The Parser Master Key

This key is an individual key associated with the installation of the secure data parser. It is installed on the server on which the secure data parser has been deployed. There are a variety of options suitable for securing this key including, but not limited to, a smart card, separate hardware key store, standard key stores, custom key stores or within a secured database table, for example.

The Session Master Key

A Session Master Key may be generated each time data is secured. The Session Master Key is used to encrypt the data prior to the parsing and splitting operations. It may also be incorporated (if the Session Master Key is not integrated into the parsed data) as a means of parsing the encrypted data. The Session Master Key may be secured in a variety of manners, including, but not limited to, a standard key store, custom key store, separate database table, or secured within the encrypted shares, for example.

The Share Encryption Keys

For each share or portions of a data set that is created, an individual Share Encryption Key may be generated to further encrypt the shares. The Share Encryption Keys may be stored in different shares than the share that was encrypted.

It is readily apparent to those of ordinary skill in the art that the data securing methods and computer system of the present invention are widely applicable to any type of data in any setting or environment. In addition to commercial applications conducted over the Internet or between customers and vendors, the data securing methods and computer systems of the present invention are highly applicable to non-commercial or private settings or environments. Any data set that is desired to be kept secure from any unauthorized user may be secured using the methods and systems described herein. For example, access to a particular database within a company or organization may be advantageously restricted to only selected users by employing the methods and systems of the present invention for securing data. Another example is the generation, modification or access to documents wherein it is desired to restrict access or prevent unauthorized or accidental access or disclosure outside a group of selected individuals, computers or workstations. These and other examples of the ways in which the methods and systems of data securing of the present invention are applicable to any non-commercial or commercial environment or setting for any setting, including, but not limited to any organization, government agency or corporation.

In another embodiment of the present invention, the data securing method uses three sets of keys for an encryption operation. Each set of keys may have individual key storage, retrieval, security and recovery options, based on the installation. The keys that may be used, include, but are not limited to:

1. The Parser Master Key

This key is an individual key associated with the installation of the secure data parser. It is installed on the server on which the secure data parser has been deployed. There are a variety of options suitable for securing this key including, but not limited to, a smart card, separate hardware key store, standard key stores, custom key stores or within a secured database table, for example.

2. The Session Master Key

A Session Master Key may be generated each time data is secured. The Session Master Key is used in conjunction with the Parser Master key to derive the Intermediary Key. The Session Master Key may be secured in a variety of manners, including, but not limited to, a standard key store, custom key store, separate database table, or secured within the encrypted shares, for example.

3. The Intermediary Key

An Intermediary Key may be generated each time data is secured. The Intermediary Key is used to encrypt the data prior to the parsing and splitting operation. It may also be incorporated as a means of parsing the encrypted data.

4. The Share Encryption Keys

For each share or portions of a data set that is created, an individual Share Encryption Key may be generated to further encrypt the shares. The Share Encryption Keys may be stored in different shares than the share that was encrypted.

It is readily apparent to those of ordinary skill in the art that the data securing methods and computer system of the present invention are widely applicable to any type of data in any setting or environment. In addition to commercial applications conducted over the Internet or between customers and vendors, the data securing methods and computer systems of the present invention are highly applicable to non-commercial or private settings or environments. Any data set that is desired to be kept secure from any unauthorized user may be secured using the methods and systems described herein. For example, access to a particular database within a company or organization may be advantageously restricted to only selected users by employing the methods and systems of the present invention for securing data. Another example is the generation, modification or access to documents wherein it is desired to restrict access or prevent unauthorized or accidental access or disclosure outside a group of selected individuals, computers or workstations. These and other examples of the ways in which the methods and systems of data securing of the present invention are applicable to any non-commercial or commercial environment or setting for any setting, including, but not limited to any organization, government agency or corporation.

Workgroup, Project, Individual PC/Laptop or Cross Platform Data Security

The data securing methods and computer systems of the present invention are also useful in securing data by workgroup, project, individual PC/Laptop and any other platform that is in use in, for example, businesses, offices, government agencies, or any setting in which sensitive data is created, handled or stored. The present invention provides methods and computer systems to secure data that is known to be sought after by organizations, such as the U.S. Government, for implementation across the entire government organization or between governments at a state or federal level.

The data securing methods and computer systems of the present invention provide the ability to not only parse and split flat files but also data fields, sets and or table of any type. Additionally, all forms of data are capable of being secured under this process, including, but not limited to, text, video, images, biometrics and voice data. Scalability, speed and data throughput of the methods of securing data of the present invention are only limited to the hardware the user has at their disposal.

In one embodiment of the present invention, the data securing methods are utilized as described below in a workgroup environment. In one embodiment, as shown in FIG. 23 and described below, the Workgroup Scale data securing method of the present invention uses the private key management functionality of the TrustEngine to store the user/group relationships and the associated private keys (Parser Group Master Keys) necessary for a group of users to share secure data. The method of the present invention has the capability to secure data for an enterprise, workgroup, or individual user, depending on how the Parser Master Key was deployed.

In one embodiment, additional key management and user/group management programs may be provided, enabling wide scale workgroup implementation with a single point of administration and key management. Key generation, management and revocation are handled by the single maintenance program, which all become especially important as the number of users increase. In another embodiment, key management may also be set up across one or several different system administrators, which may not allow any one person or group to control data as needed. This allows for the management of secured data to be obtained by roles, responsibilities, membership, rights, etc., as defined by an organization, and the access to secured data can be limited to just those who are permitted or required to have access only to the portion they are working on, while others, such as managers or executives, may have access to all of the secured data. This embodiment allows for the sharing of secured data among different groups within a company or organization while at the same time only allowing certain selected individuals, such as those with the authorized and predetermined roles and responsibilities, to observe the data as a whole. In addition, this embodiment of the methods and systems of the present invention also allows for the sharing of data among, for example, separate companies, or separate departments or divisions of companies, or any separate organization departments, groups, agencies, or offices, or the like, of any government or organization or any kind, where some sharing is required, but not any one party may be permitted to have access to all the data. Particularly apparent examples of the need and utility for such a method and system of the present invention are to allow sharing, but maintain security, in between government areas, agencies and offices, and between different divisions, departments or offices of a large company, or any other organization, for example.

An example of the applicability of the methods of the present invention on a smaller scale is as follows. A Parser Master key is used as a serialization or branding of the secure data parser to an organization. As the scale of use of the Parser Master key is reduced from the whole enterprise to a smaller workgroup, the data securing methods described herein are used to share files within groups of users.

Figure 25:
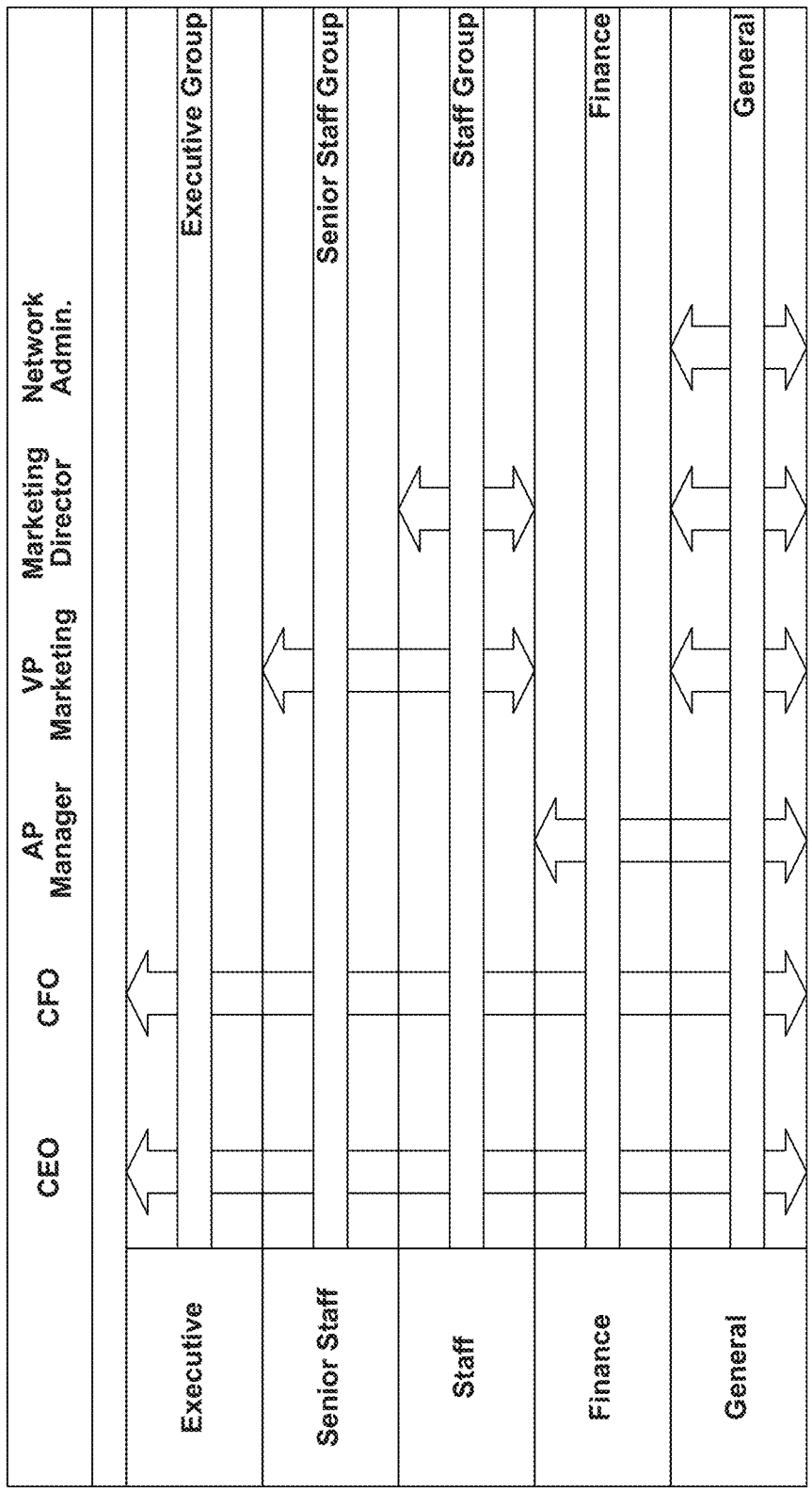
FIG. 25 illustrates utilization of the cryptographic methods and systems of the present invention with a small working group.

In the example shown in FIG. 25 and described below, there are six users defined along with their title or role within the organization. The side bar represents five possible groups that the users can belong to according to their role. The arrow represents membership by the user in one or more of the groups.

When configuring the secure data parser for use in this example, the system administrator accesses the user and group information from the operating system by a maintenance program. This maintenance program generates and assigns Parser Group Master Keys to users based on their membership in groups.

In this example, there are three members in the Senior Staff group. For this group, the actions would be:

1. Access Parser Group Master Key for the Senior Staff group (generate a key if not available);
2. Generate a digital certificate associating CEO with the Senior Staff group;
3. Generate a digital certificate associating CFO with the Senior Staff group;
4. Generate a digital certificate associating Vice President, Marketing with the Senior Staff group.

The same set of actions would be done for each group, and each member within each group. When the maintenance program is complete, the Parser Group Master Key becomes a shared credential for each member of the group. Revocation of the assigned digital certificate may be done automatically when a user is removed from a group through the maintenance program without affecting the remaining members of the group.

Once the shared credentials have been defined, the parsing and splitting process remains the same. When a file, document or data element is to be secured, the user is prompted for the target group to be used when securing the data. The resulting secured data is only accessible by other members of the target group. This functionality of the methods and systems of the present invention may be used with any other computer system or software platform, any may be, for example, integrated into existing application programs or used standalone for file security.

It is readily apparent to those of ordinary skill in the art that any one or combination of encryption algorithms are suitable for use in the methods and systems of the present invention. For example, the encryption steps may, in one embodiment, be repeated to produce a multi-layered encryption scheme. In addition, a different encryption algorithm, or combination of encryption algorithms, may be used in repeat encryption steps such that different encryption algorithms are applied to the different layers of the multi-layered encryption scheme. As such, the encryption scheme itself may become a component of the methods of the present invention for securing sensitive data from unauthorized use or access.

The secure data parser may include as an internal component, as an external component, or as both an error-checking component. For example, in one suitable approach, as portions of data are created using the secure data parser in accordance with the present invention, to assure the integrity of the data within a portion, a hash value is taken at preset intervals within the portion and is appended to the end of the interval. The hash value is a predictable and reproducible numeric representation of the data. If any bit within the data changes, the hash value would be different. A scanning module (either as a stand-alone component external to the secure data parser or as an internal component) may then scan the portions of data generated by the secure data parser. Each portion of data (or alternatively, less than all portions of data according to some interval or by a random or pseudo-random sampling) is compared to the appended hash value or values and an action may be taken. This action may include a report of values that match and do not match, an alert for values that do not match, or invoking of some external or internal program to trigger a recovery of the data. For example, recovery of the data could be performed by invoking a recovery module based on the concept that fewer than all portions may be needed to generate original data in accordance with the present invention.

Any other suitable integrity checking may be implemented using any suitable integrity information appended anywhere in all or a subset of data portions. Integrity information may include any suitable information that can be used to determine the integrity of data portions. Examples of integrity information may include hash values computed based on any suitable parameter (e.g., based on respective data portions), digital signature information, message authentication code (MAC) information, any other suitable information, or any combination thereof.

The secure data parser of the present invention may be used in any suitable application. Namely, the secure data parser described herein has a variety of applications in different areas of computing and technology. Several such areas are discussed below. It will be understood that these are merely illustrative in nature and that any other suitable applications may make use of the secure data parser. It will further be understood that the examples described are merely illustrative embodiments that may be modified in any suitable way in order to satisfy any suitable desires. For example, parsing and splitting may be based on any suitable units, such as by bits, by bytes, by kilobytes, by megabytes, by any combination thereof, or by any other suitable unit.

Figure 26:
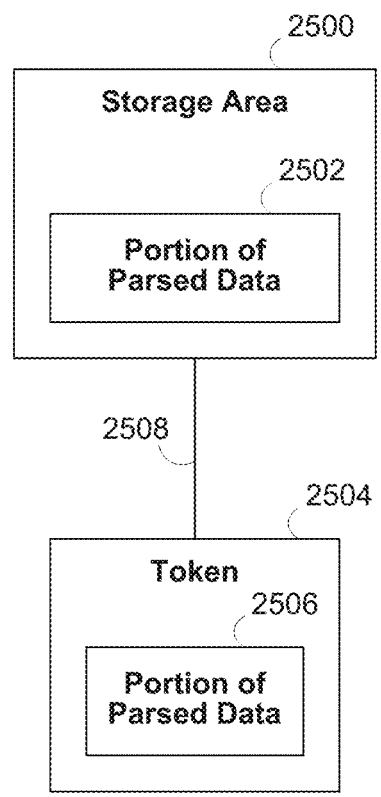
FIG. 26 is a block diagram of an illustrative physical token security system employing the secure data parser in accordance with one embodiment of the present invention.

The secure data parser of the present invention may be used to implement secure physical tokens, whereby data stored in a physical token may be required in order to access additional data stored in another storage area. In one suitable approach, a physical token, such as a compact USB flash drive, a floppy disk, an optical disk, a smart card, or any other suitable physical token, may be used to store one of at least two portions of parsed data in accordance with the present invention. In order to access the original data, the USB flash drive would need to be accessed. Thus, a personal computer holding one portion of parsed data would need to have the USB flash drive, having the other portion of parsed data, attached before the original data can be accessed. FIG. 26 illustrates this application. Storage area 2500 includes a portion of parsed data 2502. Physical token 2504, having a portion of parsed data 2506 would need to be coupled to storage area 2500 using any suitable communications interface 2508 (e.g., USB, serial, parallel, Bluetooth, IR, IEEE 1394, Ethernet, or any other suitable communications interface) in order to access the original data. This is useful in a situation where, for example, sensitive data on a computer is left alone and subject to unauthorized access attempts. By removing the physical token (e.g., the USB flash drive), the sensitive data is inaccessible. It will be understood that any other suitable approach for using physical tokens may be used.

The secure data parser of the present invention may be used to implement a secure authentication system whereby user enrollment data (e.g., passwords, private encryption keys, fingerprint templates, biometric data or any other suitable user enrollment data) is parsed and split using the secure data parser. The user enrollment data may be parsed and split whereby one or more portions are stored on a smart card, a government Common Access Card, any suitable physical storage device (e.g., magnetic or optical disk, USB key drive, etc.), or any other suitable device. One or more other portions of the parsed user enrollment data may be stored in the system performing the authentication. This provides an added level of security to the authentication process (e.g., in addition to the biometric authentication information obtained from the biometric source, the user enrollment data must also be obtained via the appropriate parsed and split data portion).

Figure 27:
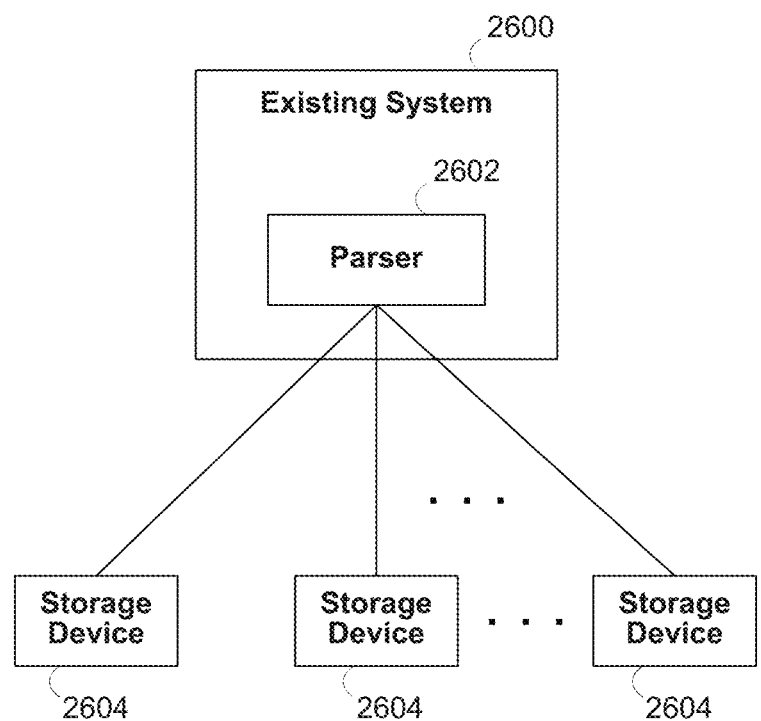
FIG. 27 is a block diagram of an illustrative arrangement in which the secure data parser is integrated into a system in accordance with one embodiment of the present invention.

The secure data parser of the present invention may be integrated into any suitable existing system in order to provide the use of its functionality in each system's respective environment. FIG. 27 shows a block diagram of an illustrative system 2600, which may include software, hardware, or both for implementing any suitable application. System 2600 may be an existing system in which secure data parser 2602 may be retrofitted as an integrated component. Alternatively, secure data parser 2602 may be integrated into any suitable system 2600 from, for example, its earliest design stage. Secure data parser 2600 may be integrated at any suitable level of system 2600. For example, secure data parser 2602 may be integrated into system 2600 at a sufficiently back-end level such that the presence of secure data parser 2602 may be substantially transparent to an end user of system 2600. Secure data parser 2602 may be used for parsing and splitting data among one or more storage devices 2604 in accordance with the present invention. Some illustrative examples of systems having the secure data parser integrated therein are discussed below.

The secure data parser of the present invention may be integrated into an operating system kernel (e.g., Linux, Unix, or any other suitable commercial or proprietary operating system). This integration may be used to protect data at the device level whereby, for example, data that would ordinarily be stored in one or more devices is separated into a certain number of portions by the secure data parser integrated into the operating system and stored among the one or more devices. When original data is attempted to be accessed, the appropriate software, also integrated into the operating system, may recombine the parsed data portions into the original data in a way that may be transparent to the end user.

The secure data parser of the present invention may be integrated into a volume manager or any other suitable component of a storage system to protect local and networked data storage across any or all supported platforms. For example, with the secure data parser integrated, a storage system may make use of the redundancy offered by the secure data parser (i.e., which is used to implement the feature of needing fewer than all separated portions of data in order to reconstruct the original data) to protect against data loss. The secure data parser also allows all data written to storage devices, whether using redundancy or not, to be in the form of multiple portions that are generated according to the parsing of the present invention. When original data is attempted to be accessed, the appropriate software, also integrated into the volume manager or other suitable component of the storage system, may recombine the parsed data portions into the original data in a way that may be transparent to the end user.

In one suitable approach, the secure data parser of the present invention may be integrated into a RAID controller (as either hardware or software). This allows for the secure storage of data to multiple drives while maintaining fault tolerance in case of drive failure.

The secure data parser of the present invention may be integrated into a database in order to, for example, protect sensitive table information. For example, in one suitable approach, data associated with particular cells of a database table (e.g., individual cells, one or more particular columns, one or more particular rows, any combination thereof, or an entire database table) may be parsed and separated according to the present invention (e.g., where the different portions are stored on one or more storage devices at one or more locations or on a single storage device). Access to recombine the portions in order to view the original data may be granted by traditional authentication methods (e.g., username and password query).

The secure parser of the present invention may be integrated in any suitable system that involves data in motion (i.e., transfer of data from one location to another). Such systems include, for example, email, streaming data broadcasts, and wireless (e.g., WiFi) communications. With respect to email, in one suitable approach, the secure parser may be used to parse outgoing messages (i.e., containing text, binary data, or both (e.g., files attached to an email message)) and sending the different portions of the parsed data along different paths thus creating multiple streams of data. If any one of these streams of data is compromised, the original message remains secure because the system may require that more than one of the portions be combined, in accordance with the present invention, in order to generate the original data. In another suitable approach, the different portions of data may be communicated along one path sequentially so that if one portion is obtained, it may not be sufficient to generate the original data. The different portions arrive at the intended recipient's location and may be combined to generate the original data in accordance with the present invention.

Figure 28:
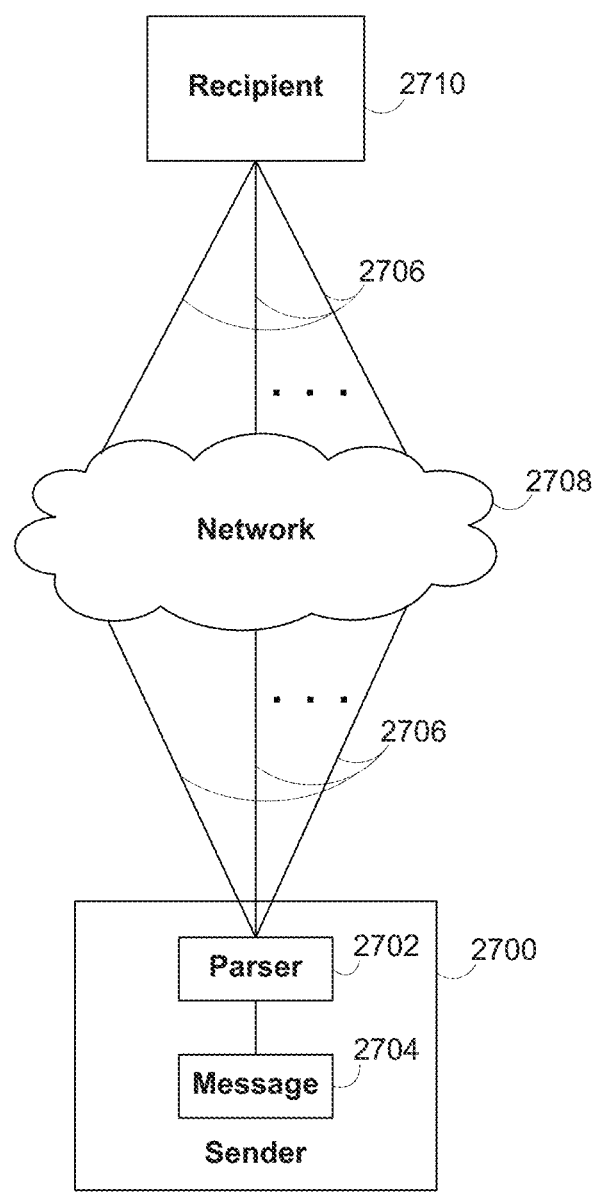
FIG. 28 is a block diagram of an illustrative data in motion system in accordance with one embodiment of the present invention.
Figure 29:
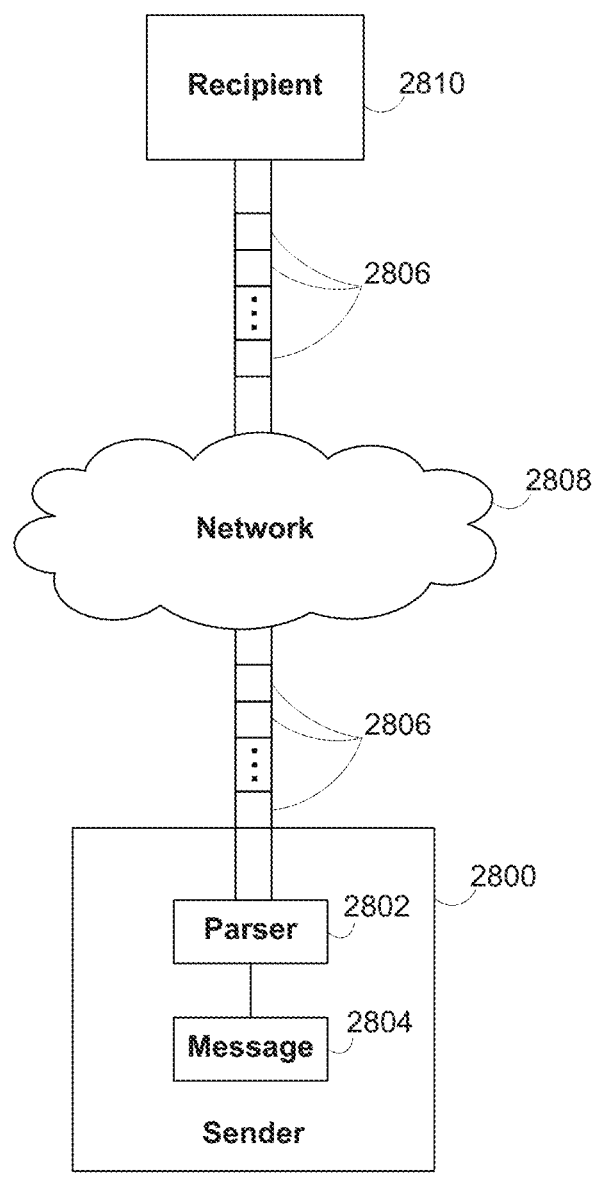
FIG. 29 is a block diagram of another illustrative data in motion system in accordance with one embodiment of the present invention.

FIGS. 28 and 29 are illustrative block diagrams of such email systems. FIG. 28 shows a sender system 2700, which may include any suitable hardware, such as a computer terminal, personal computer, handheld device (e.g., PDA, Blackberry), cellular telephone, computer network, any other suitable hardware, or any combination thereof. Sender system 2700 is used to generate and/or store a message 2704, which may be, for example, an email message, a binary data file (e.g., graphics, voice, video, etc.), or both. Message 2704 is parsed and split by secure data parser 2702 in accordance with the present invention. The resultant data portions may be communicated across one or more separate communications paths 2706 over network 2708 (e.g., the Internet, an intranet, a LAN, WiFi, Bluetooth, any other suitable hard-wired or wireless communications means, or any combination thereof) to recipient system 2710. The data portions may be communicated parallel in time or alternatively, according to any suitable time delay between the communication of the different data portions. Recipient system 2710 may be any suitable hardware as described above with respect to sender system 2700. The separate data portions carried along communications paths 2706 are recombined at recipient system 2710 to generate the original message or data in accordance with the present invention.

FIG. 29 shows a sender system 2800, which may include any suitable hardware, such as a computer terminal, personal computer, handheld device (e.g., PDA), cellular telephone, computer network, any other suitable hardware, or any combination thereof. Sender system 2800 is used to generate and/or store a message 2804, which may be, for example, an email message, a binary data file (e.g., graphics, voice, video, etc.), or both. Message 2804 is parsed and split by secure data parser 2802 in accordance with the present invention. The resultant data portions may be communicated across a single communications paths 2806 over network 2808 (e.g., the Internet, an intranet, a LAN, WiFi, Bluetooth, any other suitable communications means, or any combination thereof) to recipient system 2810. The data portions may be communicated serially across communications path 2806 with respect to one another. Recipient system 2810 may be any suitable hardware as described above with respect to sender system 2800. The separate data portions carried along communications path 2806 are recombined at recipient system 2810 to generate the original message or data in accordance with the present invention.

It will be understood that the arrangement of FIGS. 28 and 29 are merely illustrative. Any other suitable arrangement may be used. For example, in another suitable approach, the features of the systems of FIGS. 28 and 29 may be combined whereby the multi-path approach of FIG. 28 is used and in which one or more of communications paths 2706 are used to carry more than one portion of data as communications path 2806 does in the context of FIG. 29.

The secure data parser may be integrated at any suitable level of a data-in motion system. For example, in the context of an email system, the secure parser may be integrated at the user-interface level (e.g., into Microsoft® Outlook), in which case the user may have control over the use of the secure data parser features when using email. Alternatively, the secure parser may be implemented in a back-end component such as at the exchange server, in which case messages may be automatically parsed, split, and communicated along different paths in accordance with the present invention without any user intervention.

Similarly, in the case of streaming broadcasts of data (e.g., audio, video), the outgoing data may be parsed and separated into multiple streams each containing a portion of the parsed data. The multiple streams may be transmitted along one or more paths and recombined at the recipient's location in accordance with the present invention. One of the benefits of this approach is that it avoids the relatively large overhead associated with traditional encryption of data followed by transmission of the encrypted data over a single communications channel. The secure parser of the present invention allows data in motion to be sent in multiple parallel streams, increasing speed and efficiency.

It will be understand that the secure data parser may be integrated for protection of and fault tolerance of any type of data in motion through any transport medium, including, for example, wired, wireless, or physical. For example, voice over Internet protocol (VoIP) applications may make use of the secure data parser of the present invention. Wireless or wired data transport from or to any suitable personal digital assistant (PDA) devices such as Blackberries and SmartPhones may be secured using the secure data parser of the present invention. Communications using wireless 802.11 protocols for peer to peer and hub based wireless networks, satellite communications, point to point wireless communications, Internet client/server communications, or any other suitable communications may involve the data in motion capabilities of the secure data parser in accordance with the present invention. Data communication between computer peripheral device (e.g., printer, scanner, monitor, keyboard, network router, biometric authentication device (e.g., fingerprint scanner), or any other suitable peripheral device) between a computer and a computer peripheral device, between a computer peripheral device and any other suitable device, or any combination thereof may make use of the data in motion features of the present invention.

The data in motion features of the present invention may also apply to physical transportation of secure shares using for example, separate routes, vehicles, methods, any other suitable physical transportation, or any combination thereof. For example, physical transportation of data may take place on digital/magnetic tapes, floppy disks, optical disks, physical tokens, USB drives, removable hard drives, consumer electronic devices with flash memory (e.g., Apple IPODs or other MP3 players), flash memory, any other suitable medium used for transporting data, or any combination thereof.

The secure data parser of the present invention may provide security with the ability for disaster recovery. According to the present invention, fewer than all portions of the separated data generated by the secure data parser may be necessary in order to retrieve the original data. That is, out of m portions stored, n may be the minimum number of these m portions necessary to retrieve the original data, where n<=m. For example, if each of four portions is stored in a different physical location relative to the other three portions, then, if n=2 in this example, two of the locations may be compromised whereby data is destroyed or inaccessible, and the original data may still be retrieved from the portions in the other two locations. Any suitable value for n or m may be used.

In addition, the n of m feature of the present invention may be used to create a "two man rule" whereby in order to avoid entrusting a single individual or any other entity with full access to what may be sensitive data, two or more distinct entities, each with a portion of the separated data parsed by the secure parser of the present invention may need to agree to put their portions together in order to retrieve the original data.

The secure data parser of the present invention may be used to provide a group of entities with a group-wide key that allows the group members to access particular information authorized to be accessed by that particular group. The group key may be one of the data portions generated by the secure parser in accordance with the present invention that may be required to be combined with another portion centrally stored, for example in order to retrieve the information sought. This feature allows for, for example, secure collaboration among a group. It may be applied in for example, dedicated networks, virtual private networks, intranets, or any other suitable network.

Specific applications of this use of the secure parser include, for example, coalition information sharing in which, for example, multi-national friendly government forces are given the capability to communicate operational and otherwise sensitive data on a security level authorized to each respective country over a single network or a dual network (i.e., as compared to the many networks involving relatively substantial manual processes currently used). This capability is also applicable for companies or other organizations in which information needed to be known by one or more specific individuals (within the organization or without) may be communicated over a single network without the need to worry about unauthorized individuals viewing the information.

Another specific application includes a multi-level security hierarchy for government systems. That is, the secure parser of the present invention may provide for the ability to operate a government system at different levels of classified information (e.g., unclassified, classified, secret, top secret) using a single network. If desired, more networks may be used (e.g., a separate network for top secret), but the present invention allows for substantially fewer than current arrangement in which a separate network is used for each level of classification.

It will be understood that any combination of the above described applications of the secure parser of the present invention may be used. For example, the group key application can be used together with the data in motion security application (i.e., whereby data that is communicated over a network can only be accessed by a member of the respective group and where, while the data is in motion, it is split among multiple paths (or sent in sequential portions) in accordance with the present invention).

The secure data parser of the present invention may be integrated into any middleware application to enable applications to securely store data to different database products or to different devices without modification to either the applications or the database. Middleware is a general term for any product that allows two separate and already existing programs to communicate. For example, in one suitable approach, middleware having the secure data parser integrated, may be used to allow programs written for a particular database to communicate with other databases without custom coding.

The secure data parser of the present invention may be implemented having any combination of any suitable capabilities, such as those discussed herein. In some embodiments of the present invention, for example, the secure data parser may be implemented having only certain capabilities whereas other capabilities may be obtained through the use of external software, hardware, or both interfaced either directly or indirectly with the secure data parser.

Figure 30:
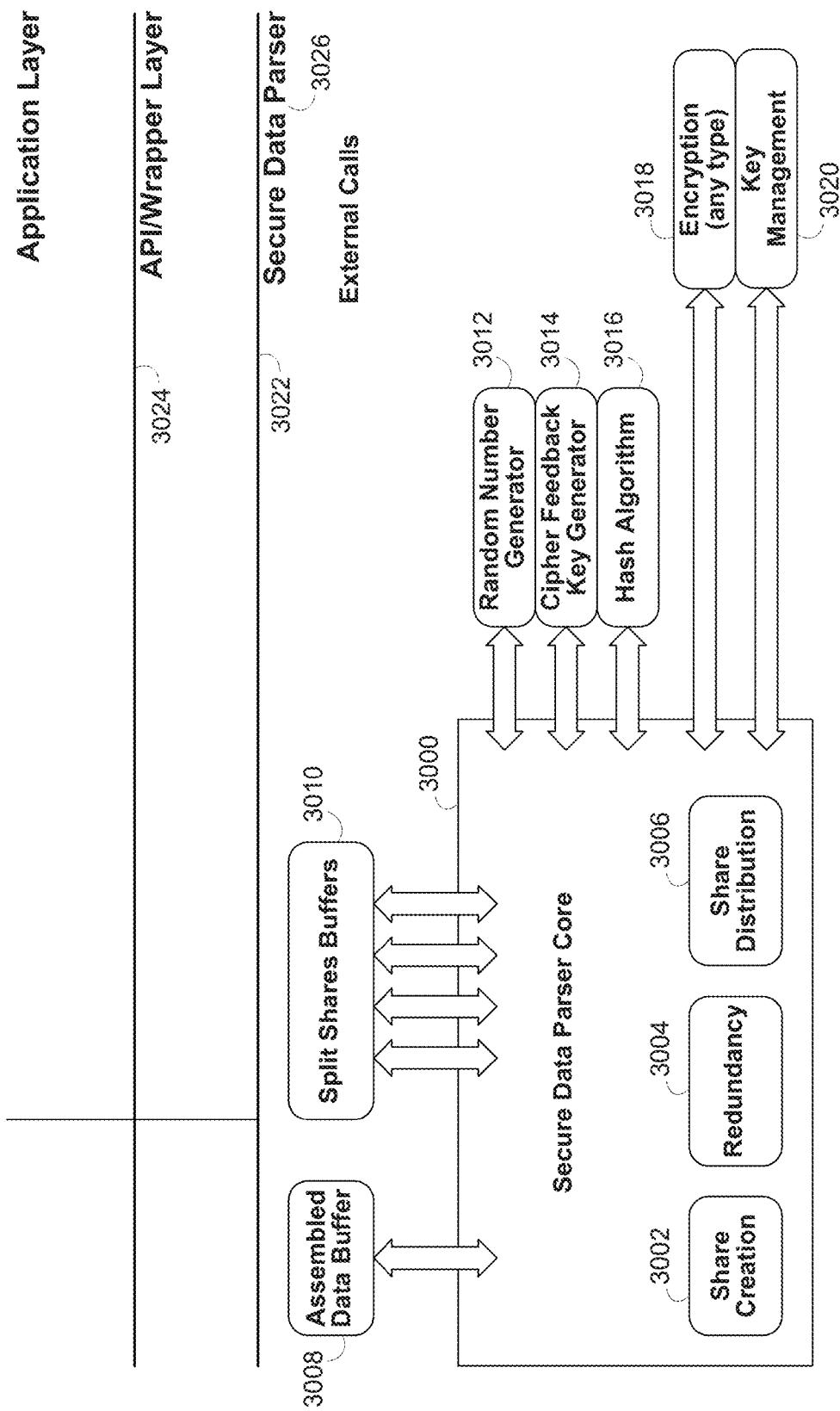
FIG. 30-32 are block diagrams of an illustrative system having the secure data parser integrated in accordance with one embodiment of the present invention.

FIG. 30, for example, shows an illustrative implementation of the secure data parser as secure data parser 3000. Secure data parser 3000 may be implemented with very few built-in capabilities. As illustrated, secure data parser 3000 may include built-in capabilities for parsing and splitting data into portions (also referred to herein as shares) of data using module 3002 in accordance with the present invention. Secure data parser 3000 may also include built in capabilities for performing redundancy in order to be able to implement, for example, the m of n feature described above (i.e., recreating the original data using fewer than all shares of parsed and split data) using module 3004. Secure data parser 3000 may also include share distribution capabilities using module 3006 for placing the shares of data into buffers from which they are sent for communication to a remote location, for storage, etc. in accordance with the present invention. It will be understood that any other suitable capabilities may be built into secure data parser 3000.

Assembled data buffer 3008 may be any suitable memory used to store the original data (although not necessarily in its original form) that will be parsed and split by secure data parser 3000. In a splitting operation, assembled data buffer 3008 provides input to secure data parser 3008. In a restore operation, assembled data buffer 3008 may be used to store the output of secure data parser 3000.

Split shares buffers 3010 may be one or more memory modules that may be used to store the multiple shares of data that resulted from the parsing and splitting of original data. In a splitting operation, split shares buffers 3010 hold the output of the secure data parser. In a restore operation, split shares buffers hold the input to secure data parser 3000.

It will be understood that any other suitable arrangement of capabilities may be built-in for secure data parser 3000. Any additional features may be built-in and any of the features illustrated may be removed, made more robust, made less robust, or may otherwise be modified in any suitable way. Buffers 3008 and 3010 are likewise merely illustrative and may be modified, removed, or added to in any suitable way.

Any suitable modules implemented in software, hardware or both may be called by or may call to secure data parser 3000. If desired, even capabilities that are built into secure data parser 3000 may be replaced by one or more external modules. As illustrated, some external modules include random number generator 3012, cipher feedback key generator 3014, hash algorithm 3016, any one or more types of encryption 3018, and key management 3020. It will be understood that these are merely illustrative external modules. Any other suitable modules may be used in addition to or in place of those illustrated.

Cipher feedback key generator 3014 may, externally to secure data parser 3000, generate for each secure data parser operation, a unique key, or random number (using, for example, random number generator 3012), to be used as a seed value for an operation that extends an original session key size (e.g., a value of 128, 256, 512, or 1024 bits) into a value equal to the length of the data to be parsed and split. Any suitable algorithm may be used for the cipher feedback key generation, including, for example, the AES cipher feedback key generation algorithm.

In order to facilitate integration of secure data parser 3000 and its external modules (i.e., secure data parser layer 3026) into an application layer 3024 (e.g., email application, database application, etc.), a wrapping layer that may make use of, for example, API function calls may be used. Any other suitable arrangement for facilitating integration of secure data parser layer 3026 into application layer 3024 may be used.

Figure 31:
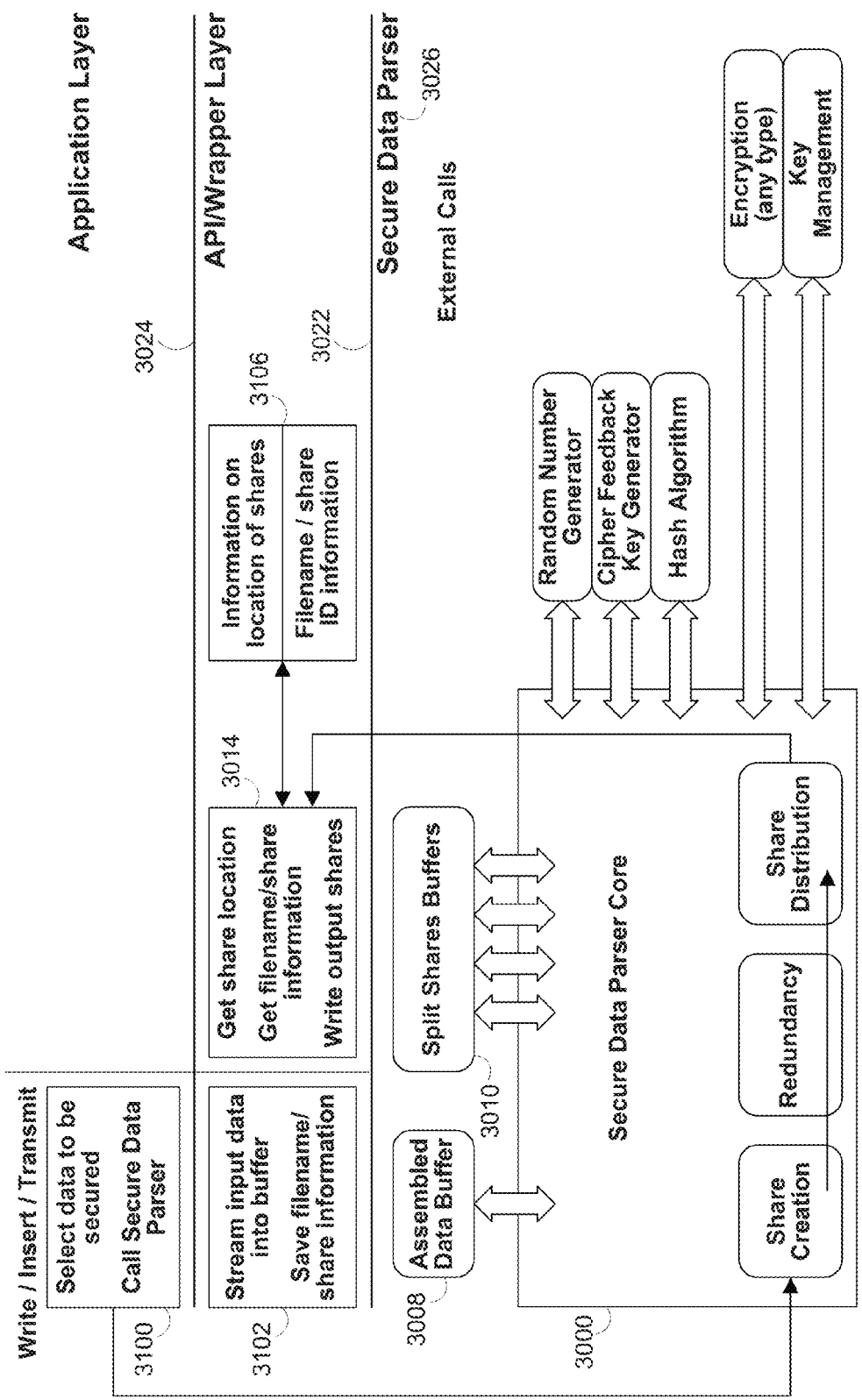

FIG. 31 illustratively shows how the arrangement of FIG. 30 may be used when a write (e.g., to a storage device), insert (e.g., in a database field), or transmit (e.g., across a network) command is issued in application layer 3024. At step 3100 data to be secured is identified and a call is made to the secure data parser. The call is passed through wrapper layer 3022 where at step 3102, wrapper layer 3022 streams the input data identified at step 3100 into assembled data buffer 3008. Also at step 3102, any suitable share information, filenames, any other suitable information, or any combination thereof may be stored (e.g., as information 3106 at wrapper layer 3022). Secure data processor 3000 then parses and splits the data it takes as input from assembled data buffer 3008 in accordance with the present invention. It outputs the data shares into split shares buffers 3010. At step 3104, wrapper layer 3022 obtains from stored information 3106 any suitable share information (i.e., stored by wrapper 3022 at step 3102) and share location(s) (e.g., from one or more configuration files). Wrapper layer 3022 then writes the output shares (obtained from split shares buffers 3010) appropriately (e.g., written to one or more storage devices, communicated onto a network, etc.).

Figure 32:
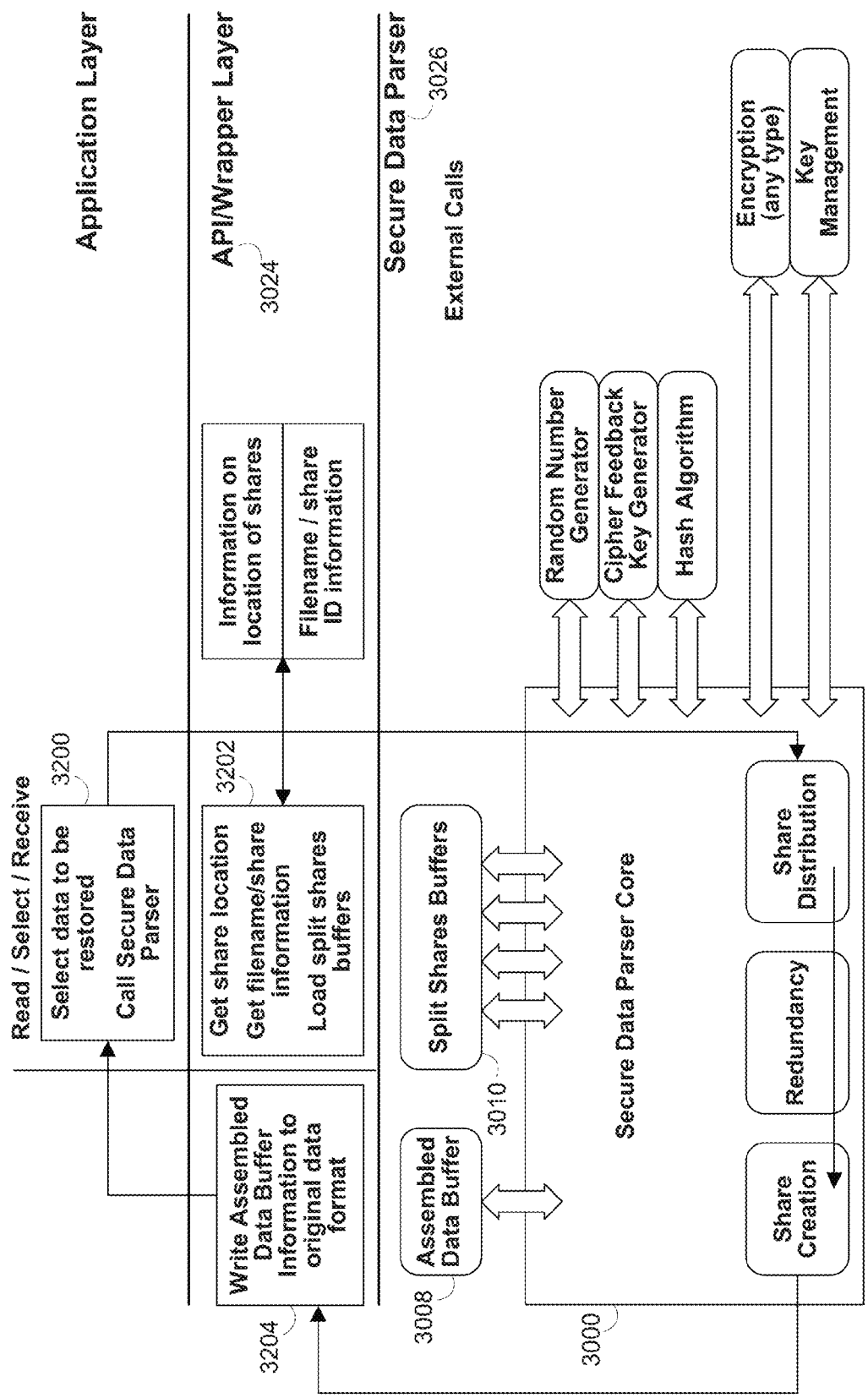

FIG. 32 illustratively shows how the arrangement of FIG. 30 may be used when a read (e.g., from a storage device), select (e.g., from a database field), or receive (e.g., from a network) occurs. At step 3200, data to be restored is identified and a call to secure data parser 3000 is made from application layer 3024. At step 3202, from wrapper layer 3022, any suitable share information is obtained and share location is determined. Wrapper layer 3022 loads the portions of data identified at step 3200 into split shares buffers 3010. Secure data parser 3000 then processes these shares in accordance with the present invention (e.g., if only three of four shares are available, then the redundancy capabilities of secure data parser 3000 may be used to restore the original data using only the three shares). The restored data is then stored in assembled data buffer 3008. At step 3204, application layer 3022 converts the data stored in assembled data buffer 3008 into its original data format (if necessary) and provides the original data in its original format to application layer 3024.

It will be understood that the parsing and splitting of original data illustrated in FIG. 31 and the restoring of portions of data into original data illustrated in FIG. 32 is merely illustrative. Any other suitable processes, components, or both may be used in addition to or in place of those illustrated.

Figure 33:
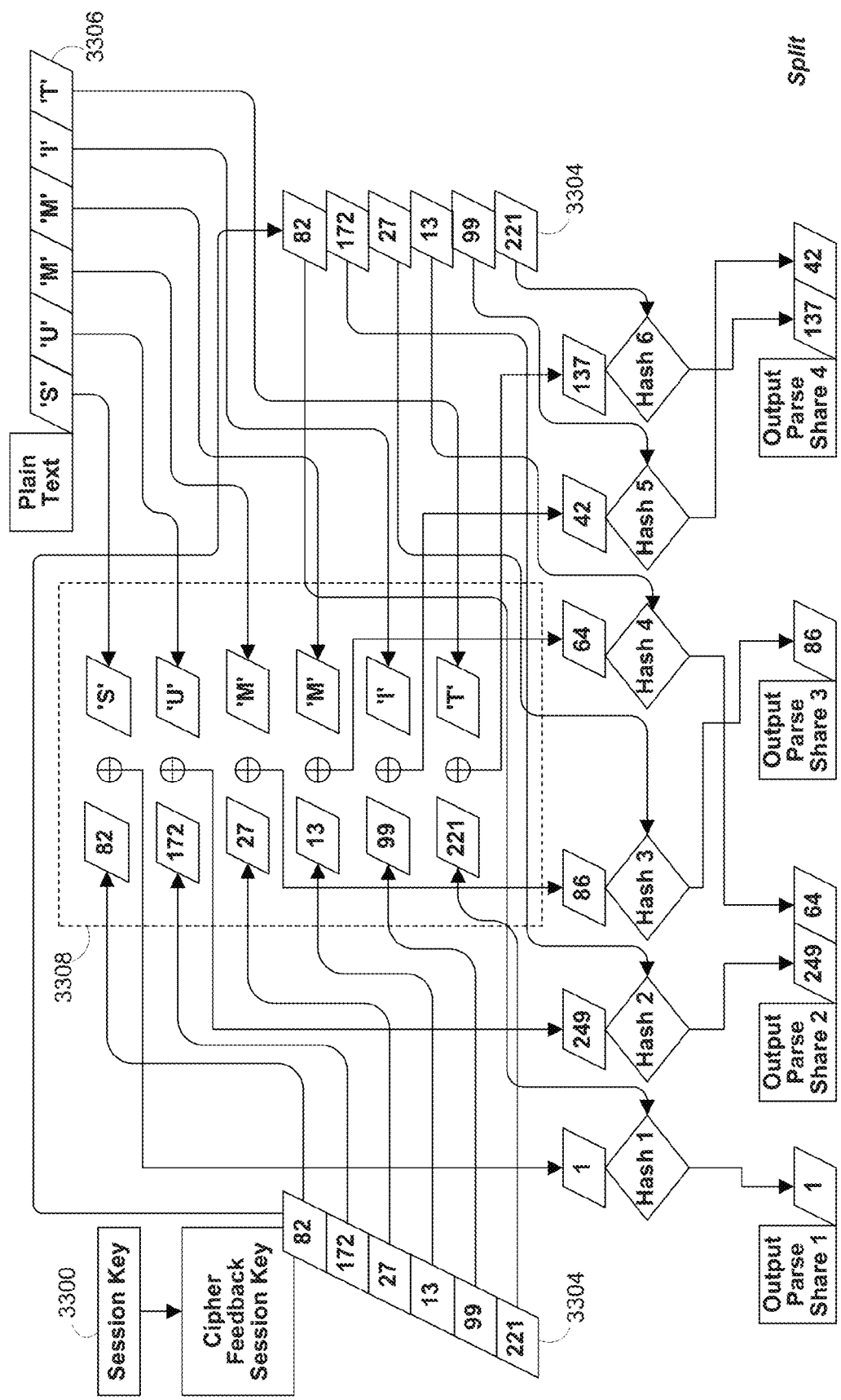
FIG. 33 is a process flow diagram of an illustrative process for parsing and splitting data in accordance with one embodiment of the present invention.

FIG. 33 is a block diagram of an illustrative process flow for parsing and splitting original data into two or more portions of data in accordance with one embodiment of the present invention. As illustrated, the original data desired to be parsed and split is plain text 3306 (i.e., the word "SUMMIT" is used as an example). It will be understood that any other type of data may be parsed and split in accordance with the present invention. A session key 3300 is generated. If the length of session key 3300 is not compatible with the length of original data 3306, then cipher feedback session key 3304 may be generated.

In one suitable approach, original data 3306 may be encrypted prior to parsing, splitting, or both. For example, as FIG. 33 illustrates, original data 3306 may be XORed with any suitable value (e.g., with cipher feedback session key 3304, or with any other suitable value). It will be understood that any other suitable encryption technique may be used in place of or in addition to the XOR technique illustrate. It will further be understood that although FIG. 33 is illustrated in terms of byte by byte operations, the operation may take place at the bit level or at any other suitable level. It will further be understood that, if desired, there need not be any encryption whatsoever of original data 3306.

The resultant encrypted data (or original data if no encryption took place) is then hashed to determine how to split the encrypted (or original) data among the output buckets (e.g., of which there are four in the illustrated example). In the illustrated example, the hashing takes place by bytes and is a function of cipher feedback session key 3304. It will be understood that this is merely illustrative. The hashing may be performed at the bit level, if desired. The hashing may be a function of any other suitable value besides cipher feedback session key 3304. In another suitable approach, hashing need not be used. Rather, any other suitable technique for splitting data may be employed.

Figure 34:
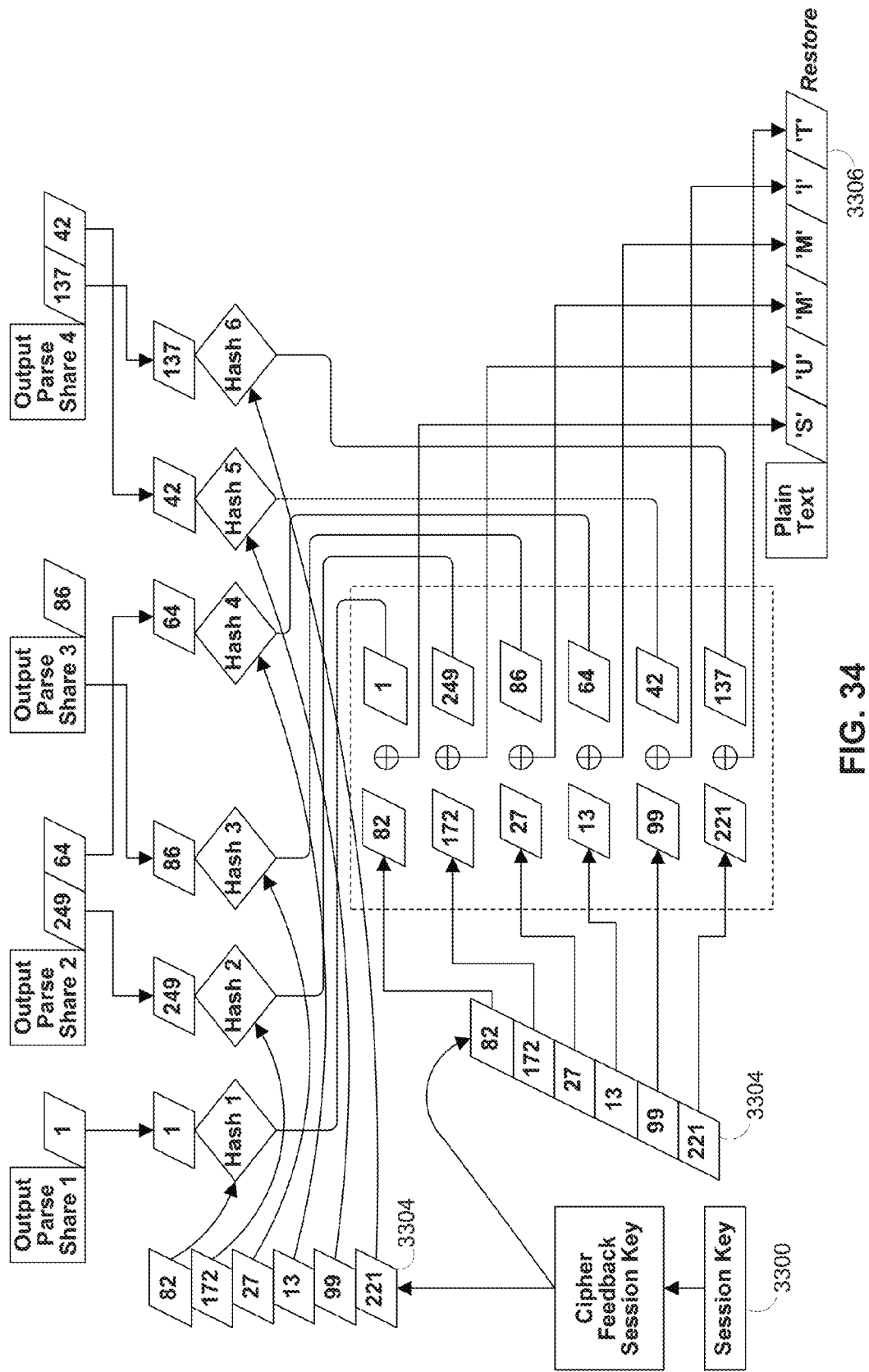
FIG. 34 is a process flow diagram of an illustrative process for restoring portions of data into original data in accordance with one embodiment of the present invention.

FIG. 34 is a block diagram of an illustrative process flow for restoring original data 3306 from two or more parsed and split portions of original data 3306 in accordance with one embodiment of the present invention. The process involves hashing the portions in reverse (i.e., to the process of FIG. 33) as a function of cipher feedback session key 3304 to restore the encrypted original data (or original data if there was no encryption prior to the parsing and splitting). The encryption key may then be used to restore the original data (i.e., in the illustrated example, cipher feedback session key 3304 is used to decrypt the XOR encryption by XORing it with the encrypted data). This the restores original data 3306.

Figure 35:
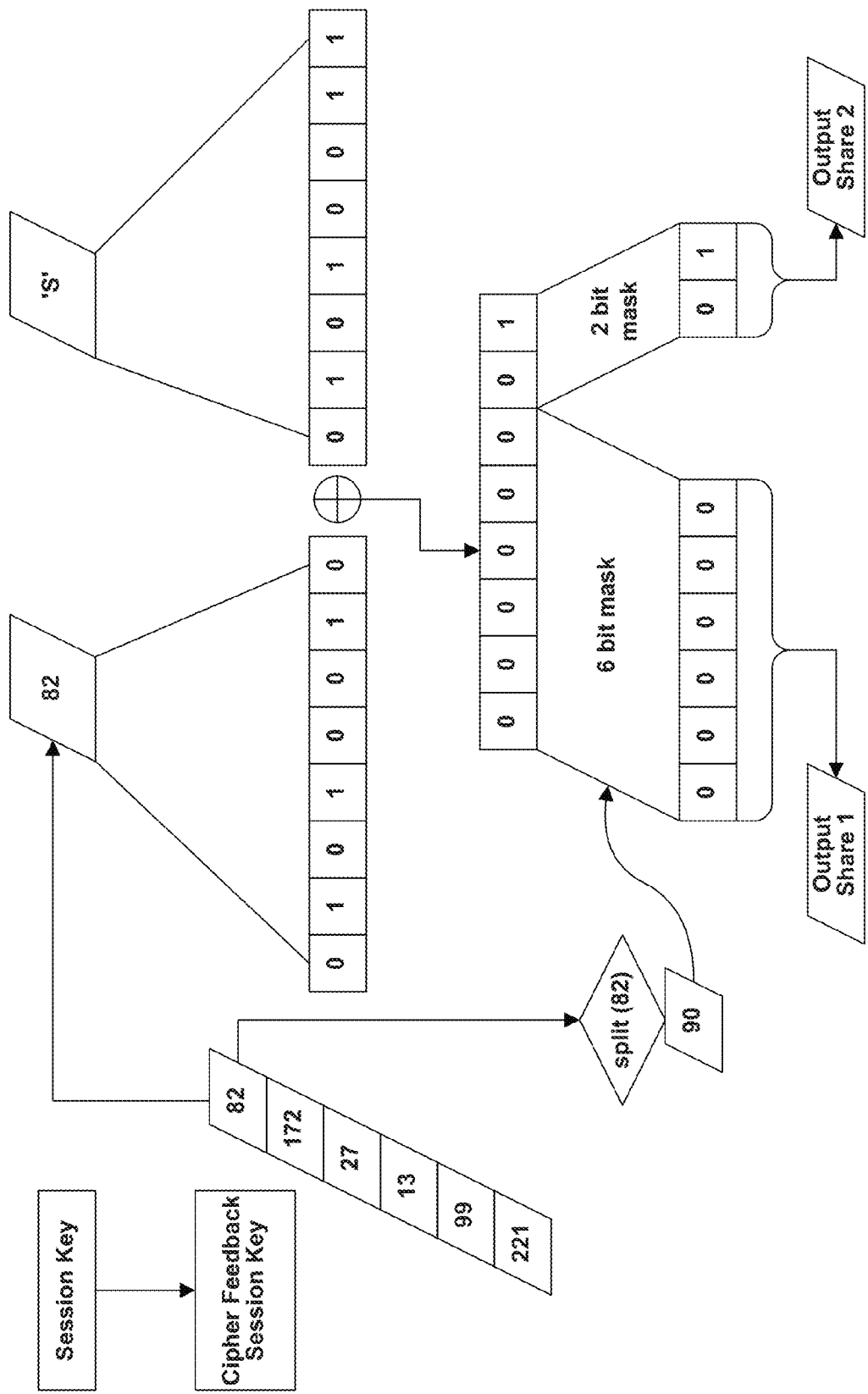
FIG. 35 is a process flow diagram of an illustrative process for splitting data at the bit level in accordance with one embodiment of the present invention.

FIG. 35 shows how bit-splitting may be implemented in the example of FIGS. 33 and 34. A hash may be used (e.g., as a function of the cipher feedback session key, as a function of any other suitable value) to determine a bit value at which to split each byte of data. It will be understood that this is merely one illustrative way in which to implement splitting at the bit level. Any other suitable technique may be used.

It will be understood that any reference to hash functionality made herein may be made with respect to any suitable hash algorithm. These include for example, MD5 and SHA-1. Different hash algorithms may be used at different times and by different components of the present invention.

After a split point has been determined in accordance with the above illustrative procedure or through any other procedure or algorithm, a determination may be made with regard to which data portions to append each of the left and right segments. Any suitable algorithm may be used for making this determination. For example, in one suitable approach, a table of all possible distributions (e.g., in the form of pairings of destinations for the left segment and for the right segment) may be created, whereby a destination share value for each of the left and right segment may be determined by using any suitable hash function on corresponding data in the session key, cipher feedback session key, or any other suitable random or pseudo-random value, which may be generated and extended to the size of the original data. For example, a hash function of a corresponding byte in the random or pseudo-random value may be made. The output of the hash function is used to determine which pairing of destinations (i.e., one for the left segment and one for the right segment) to select from the table of all the destination combinations. Based on this result, each segment of the split data unit is appended to the respective two shares indicated by the table value selected as a result of the hash function.

Redundancy information may be appended to the data portions in accordance with the present invention to allow for the restoration of the original data using fewer than all the data portions. For example, if two out of four portions are desired to be sufficient for restoration of data, then additional data from the shares may be accordingly appended to each share in, for example, a round-robin manner (e.g., where the size of the original data is 4 MB, then share 1 gets its own shares as well as those of shares 2 and 3; share 2 gets its own share as well as those of shares 3 and 4; share 3 gets its own share as well as those of shares 4 and 1; and share 4 gets its own shares as well as those of shares 1 and 2). Any such suitable redundancy may be used in accordance with the present invention.

It will be understood that any other suitable parsing and splitting approach may be used to generate portions of data from an original data set in accordance with the present invention. For example, parsing and splitting may be randomly or pseudo-randomly processed on a bit by bit basis. A random or pseudo-random value may be used (e.g., session key, cipher feedback session key, etc.) whereby for each bit in the original data, the result of a hash function on corresponding data in the random or pseudo-random value may indicate to which share to append the respective bit. In one suitable approach the random or pseudo-random value may be generated as, or extended to, 8 times the size of the original data so that the hash function may be performed on a corresponding byte of the random or pseudo-random value with respect to each bit of the original data. Any other suitable algorithm for parsing and splitting data on a bit by bit level may be used in accordance with the present invention. It will further be appreciated that redundancy data may be appended to the data shares such as, for example, in the manner described immediately above in accordance with the present invention.

In one suitable approach, parsing and splitting need not be random or pseudo-random. Rather, any suitable deterministic algorithm for parsing and splitting data may be used. For example, breaking up the original data into sequential shares may be employed as a parsing and splitting algorithm. Another example is to parse and split the original data bit by bit, appending each respective bit to the data shares sequentially in a round-robin manner. It will further be appreciated that redundancy data may be appended to the data shares such as, for example, in the manner described above in accordance with the present invention.

In one embodiment of the present invention, after the secure data parser generates a number of portions of original data, in order to restore the original data, certain one or more of the generated portions may be mandatory. For example, if one of the portions is used as an authentication share (e.g., saved on a physical token device), and if the fault tolerance feature of the secure data parser is being used (i.e., where fewer than all portions are necessary to restore the original data), then even though the secure data parser may have access to a sufficient number of portions of the original data in order to restore the original data, it may require the authentication share stored on the physical token device before it restores the original data. It will be understood that any number and types of particular shares may be required based on, for example, application, type of data, user, any other suitable factors, or any combination thereof.

In one suitable approach, the secure data parser or some external component to the secure data parser may encrypt one or more portions of the original data. The encrypted portions may be required to be provided and decrypted in order to restore the original data. The different encrypted portions may be encrypted with different encryption keys. For example, this feature may be used to implement a more secure "two man rule" whereby a first user would need to have a particular share encrypted using a first encryption and a second user would need to have a particular share encrypted using a second encryption key. In order to access the original data, both users would need to have their respective encryption keys and provide their respective portions of the original data. In one suitable approach, a public key may be used to encrypt one or more data portions that may be a mandatory share required to restore the original data. A private key may then be used to decrypt the share in order to be used to restore to the original data.

Any such suitable paradigm may be used that makes use of mandatory shares where fewer than all shares are needed to restore original data.

In one suitable embodiment of the present invention, distribution of data into a finite number of shares of data may be processed randomly or pseudo-randomly such that from a statistical perspective, the probability that any particular share of data receives a particular unit of data is equal to the probability that any one of the remaining shares will receive the unit of data. As a result, each share of data will have an approximately equal amount of data bits.

According to another embodiment of the present invention, each of the finite number of shares of data need not have an equal probability of receiving units of data from the parsing and splitting of the original data. Rather certain one or more shares may have a higher or lower probability than the remaining shares. As a result, certain shares may be larger or smaller in terms of bit size relative to other shares. For example, in a two-share scenario, one share may have a 1% probability of receiving a unit of data whereas the second share has a 99% probability. It should follow, therefore that once the data units have been distributed by the secure data parser among the two share, the first share should have approximately 1% of the data and the second share 99%. Any suitable probabilities may be used in accordance with the present invention.

It will be understood that the secure data parser may be programmed to distribute data to shares according to an exact (or near exact) percentage as well. For example, the secure data parser may be programmed to distribute 80% of data to a first share and the remaining 20% of data to a second share.

According to another embodiment of the present invention, the secure data parser may generate data shares, one or more of which have predefined sizes. For example, the secure data parser may split original data into data portions where one of the portions is exactly 256 bits. In one suitable approach, if it is not possible to generate a data portion having the requisite size, then the secure data parser may pad the portion to make it the correct size. Any suitable size may be used.

In one suitable approach, the size of a data portion may be the size of an encryption key, a splitting key, any other suitable key, or any other suitable data element.

As previously discussed, the secure data parser may use keys in the parsing and splitting of data. For purposes of clarity and brevity, these keys shall be referred to herein as "splitting keys." For example, the Session Master Key, previously introduced, is one type of splitting key. Also, as previously discussed, splitting keys may be secured within shares of data generated by the secure data parser. Any suitable algorithms for securing splitting keys may be used to secure them among the shares of data. For example, the Shamir algorithm may be used to secure the splitting keys whereby information that may be used to reconstruct a splitting key is generated and appended to the shares of data. Any other such suitable algorithm may be used in accordance with the present invention.

Similarly, any suitable encryption keys may be secured within one or more shares of data according to any suitable algorithm such as the Shamir algorithm. For example, encryption keys used to encrypt a data set prior to parsing and splitting, encryption keys used to encrypt a data portions after parsing and splitting, or both may be secured using, for example, the Shamir algorithm or any other suitable algorithm.

According to one embodiment of the present invention, an All or Nothing Transform (AoNT), such as a Full Package Transform, may be used to further secure data by transforming splitting keys, encryption keys, any other suitable data elements, or any combination thereof. For example, an encryption key used to encrypt a data set prior to parsing and splitting in accordance with the present invention may be transformed by an AoNT algorithm. The transformed encryption key may then be distributed among the data shares according to, for example, the Shamir algorithm or any other suitable algorithm. In order to reconstruct the encryption key, the encrypted data set must be restored (e.g., not necessarily using all the data shares if redundancy was used in accordance with the present invention) in order to access the necessary information regarding the transformation in accordance with AoNTs as is well known by one skilled in the art. When the original encryption key is retrieved, it may be used to decrypt the encrypted data set to retrieve the original data set. It will be understood that the fault tolerance features of the present invention may be used in conjunction with the AoNT feature. Namely, redundancy data may be included in the data portions such that fewer than all data portions are necessary to restore the encrypted data set.

It will be understood that the AoNT may be applied to encryption keys used to encrypt the data portions following parsing and splitting either in place of or in addition to the encryption and AoNT of the respective encryption key corresponding to the data set prior to parsing and splitting. Likewise, AoNT may be applied to splitting keys.

In one embodiment of the present invention, encryption keys, splitting keys, or both as used in accordance with the present invention may be further encrypted using, for example, a workgroup key in order to provide an extra level of security to a secured data set.

In one embodiment of the present invention, an audit module may be provided that tracks whenever the secure data parser is invoked to split data.

Figure 36:
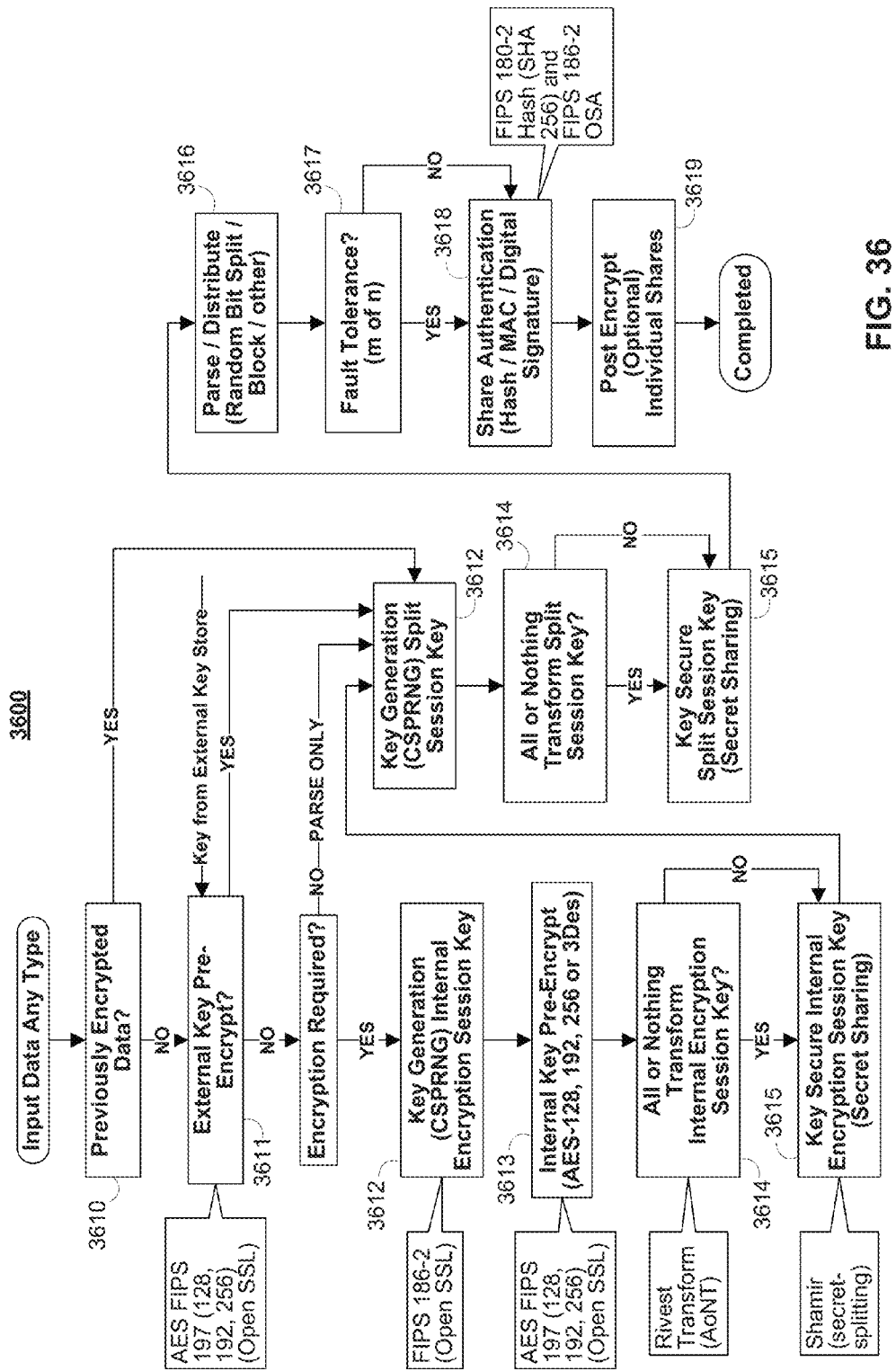
FIG. 36 is a process flow diagram of illustrative steps and features, that may be used in any suitable combination, with any suitable additions, deletions, or modifications in accordance with one embodiment of the present invention.

FIG. 36 illustrates possible options 3600 for using the components of the secure data parser in accordance with the invention. Each combination of options is outlined below and labeled with the appropriate step numbers from FIG. 36. The secure data parser may be modular in nature, allowing for any known algorithm to be used within each of the function blocks shown in FIG. 36. For example, other key splitting (e.g., secret sharing) algorithms such as Blakely may be used in place of Shamir, or the AES encryption could be replaced by other known encryption algorithms such as Triple DES. The labels shown in the example of FIG. 36 merely depict one possible combination of algorithms for use in one embodiment of the invention. It should be understood that any suitable algorithm or combination of algorithms may be used in place of the labeled algorithms.

1) 3610, 3612, 3614, 3615, 3616, 3617, 3618, 3619

Using previously encrypted data at step 3610, the data may be eventually split into a predefined number of shares. If the split algorithm requires a key, a split encryption key may be generated at step 3612 using a cryptographically secure pseudo-random number generator. The split encryption key may optionally be transformed using an All or Nothing Transform (AoNT) into a transform split key at step 3614 before being key split to the predefined number of shares with fault tolerance at step 3615. The data may then be split into the predefined number of shares at step 3616. A fault tolerant scheme may be used at step 3617 to allow for regeneration of the data from less than the total number of shares. Once the shares are created, authentication/integrity information may be embedded into the shares at step 3618. Each share may be optionally post-encrypted at step 3619.

2) 3111, 3612, 3614, 3615, 3616, 3617, 3618, 3619

In some embodiments, the input data may be encrypted using an encryption key provided by a user or an external system. The external key is provided at step 3611. For example, the key may be provided from an external key store. If the split algorithm requires a key, the split encryption key may be generated using a cryptographically secure pseudo-random number generator at step 3612. The split key may optionally be transformed using an All or Nothing Transform (AoNT) into a transform split encryption key at step 3614 before being key split to the predefined number of shares with fault tolerance at step 3615. The data is then split to a predefined number of shares at step 3616. A fault tolerant scheme may be used at step 3617 to allow for regeneration of the data from less than the total number of shares. Once the shares are created, authentication/integrity information may be embedded into the shares at step 3618. Each share may be optionally post-encrypted at step 3619.

3) 3612, 3613, 3614, 3615, 3612, 3614, 3615, 3616, 3617, 3618, 3619

In some embodiments, an encryption key may be generated using a cryptographically secure pseudo-random number generator at step 3612 to transform the data. Encryption of the data using the generated encryption key may occur at step 3613. The encryption key may optionally be transformed using an All or Nothing Transform (AoNT) into a transform encryption key at step 3614. The transform encryption key and/or generated encryption key may then be split into the predefined number of shares with fault tolerance at step 3615. If the split algorithm requires a key, generation of the split encryption key using a cryptographically secure pseudo-random number generator may occur at step 3612. The split key may optionally be transformed using an All or Nothing Transform (AoNT) into a transform split encryption key at step 3614 before being key split to the predefined number of shares with fault tolerance at step 3615. The data may then be split into a predefined number of shares at step 3616. A fault tolerant scheme may be used at step 3617 to allow for regeneration of the data from less than the total number of shares. Once the shares are created, authentication/integrity information will be embedded into the shares at step 3618. Each share may then be optionally post-encrypted at step 3619.

4) 3612, 3614, 3615, 3616, 3617, 3618, 3619

In some embodiments, the data may be split into a predefined number of shares. If the split algorithm requires a key, generation of the split encryption key using a cryptographically secure pseudo-random number generator may occur at step 3612. The split key may optionally be transformed using an All or Nothing Transform (AoNT) into a transformed split key at step 3614 before being key split into the predefined number of shares with fault tolerance at step 3615. The data may then be split at step 3616. A fault tolerant scheme may be used at step 3617 to allow for regeneration of the data from less than the total number of shares. Once the shares are created, authentication/integrity information may be embedded into the shares at step 3618. Each share may be optionally post-encrypted at step 3619.

Although the above four combinations of options are preferably used in some embodiments of the invention, any other suitable combinations of features, steps, or options may be used with the secure data parser in other embodiments.

The secure data parser may offer flexible data protection by facilitating physical separation. Data may be first encrypted, then split into shares with "m of n" fault tolerance. This allows for regeneration of the original information when less than the total number of shares is available. For example, some shares may be lost or corrupted in transmission. The lost or corrupted shares may be recreated from fault tolerance or integrity information appended to the shares, as discussed in more detail below.

In order to create the shares, a number of keys are optionally utilized by the secure data parser. These keys may include one or more of the following:

Pre-encryption key: When pre-encryption of the shares is selected, an external key may be passed to the secure data parser. This key may be generated and stored externally in a key store (or other location) and may be used to optionally encrypt data prior to data splitting.

Split encryption key: This key may be generated internally and used by the secure data parser to encrypt the data prior to splitting. This key may then be stored securely within the shares using a key split algorithm.

Split session key: This key is not used with an encryption algorithm; rather, it may be used to key the data partitioning algorithms when random splitting is selected. When a random split is used, a split session key may be generated internally and used by the secure data parser to partition the data into shares. This key may be stored securely within the shares using a key splitting algorithm.

Post encryption key: When post encryption of the shares is selected, an external key may be passed to the secure data parser and used to post encrypt the individual shares. This key may be generated and stored externally in a key store or other suitable location.

In some embodiments, when data is secured using the secure data parser in this way, the information may only be reassembled provided that all of the required shares and external encryption keys are present.

Figure 37:
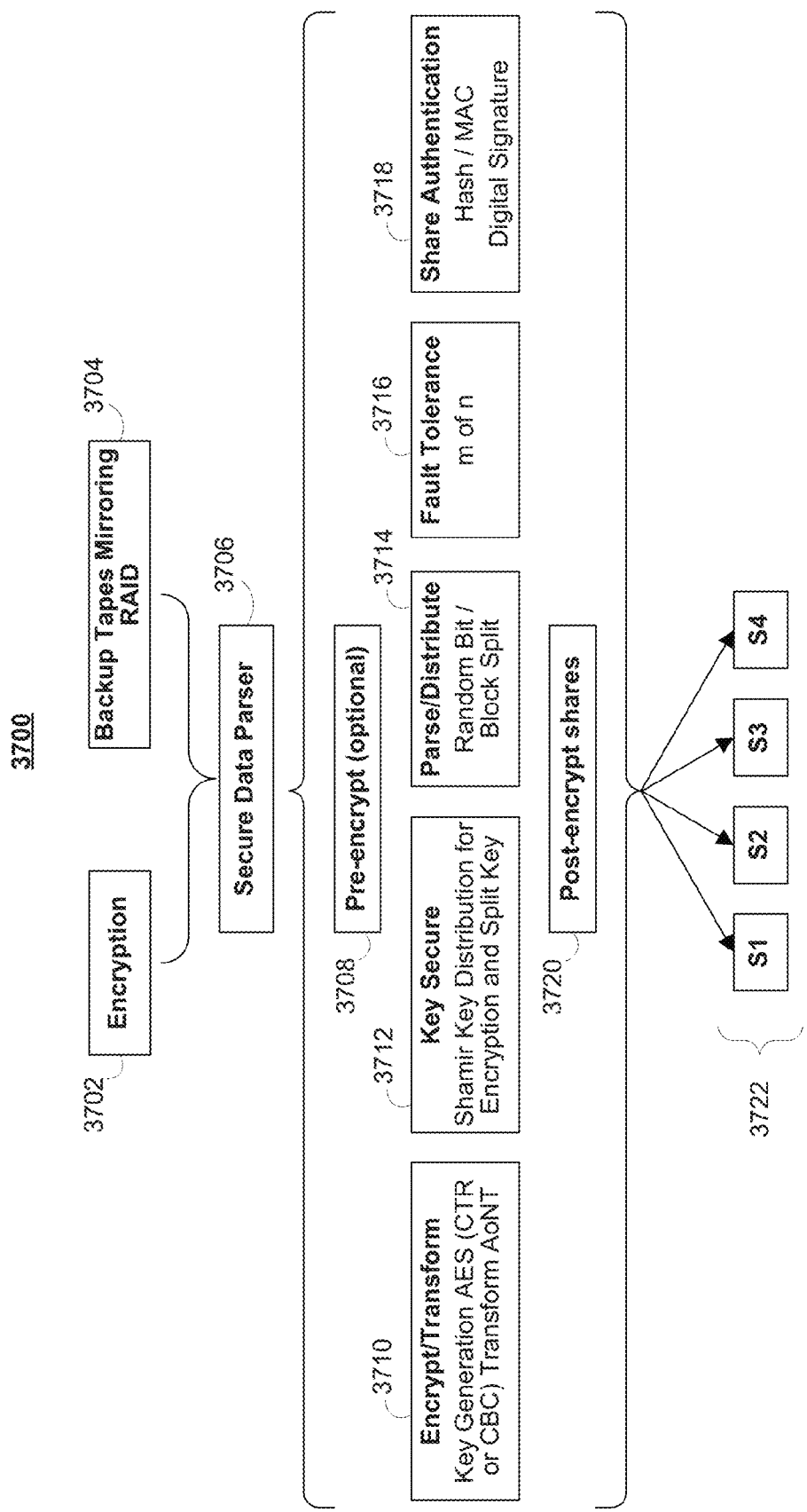
FIG. 37 is a process flow diagram of illustrative steps and features that may be used in any suitable combination, with any suitable additions, deletions, or modifications in accordance with one embodiment of the present invention.

FIG. 37 shows illustrative overview process 3700 for using the secure data parser of the present invention in some embodiments. As described above, two well-suited functions for secure data parser 3706 may include encryption 3702 and backup 3704. As such, secure data parser 3706 may be integrated with a RAID or backup system or a hardware or software encryption engine in some embodiments.

The primary key processes associated with secure data parser 3706 may include one or more of pre-encryption process 3708, encrypt/transform process 3710, key secure process 3712, parse/distribute process 3714, fault tolerance process 3716, share authentication process 3716, and post-encryption process 3720. These processes may be executed in several suitable orders or combinations, as detailed in FIG. 36. The combination and order of processes used may depend on the particular application or use, the level of security desired, whether optional pre-encryption, post-encryption, or both, are desired, the redundancy desired, the capabilities or performance of an underlying or integrated system, or any other suitable factor or combination of factors.

The output of illustrative process 3700 may be two or more shares 3722. As described above, data may be distributed to each of these shares randomly (or pseudo-randomly) in some embodiments. In other embodiments, a deterministic algorithm (or some suitable combination of random, pseudo-random, and deterministic algorithms) may be used.

In addition to the individual protection of information assets, there is sometimes a requirement to share information among different groups of users or communities of interest. It may then be necessary to either control access to the individual shares within that group of users or to share credentials among those users that would only allow members of the group to reassemble the shares. To this end, a workgroup key may be deployed to group members in some embodiments of the invention. The workgroup key should be protected and kept confidential, as compromise of the workgroup key may potentially allow those outside the group to access information. Some systems and methods for workgroup key deployment and protection are discussed below.

The workgroup key concept allows for enhanced protection of information assets by encrypting key information stored within the shares. Once this operation is performed, even if all required shares and external keys are discovered, an attacker has no hope of recreating the information without access to the workgroup key.

Figure 38:
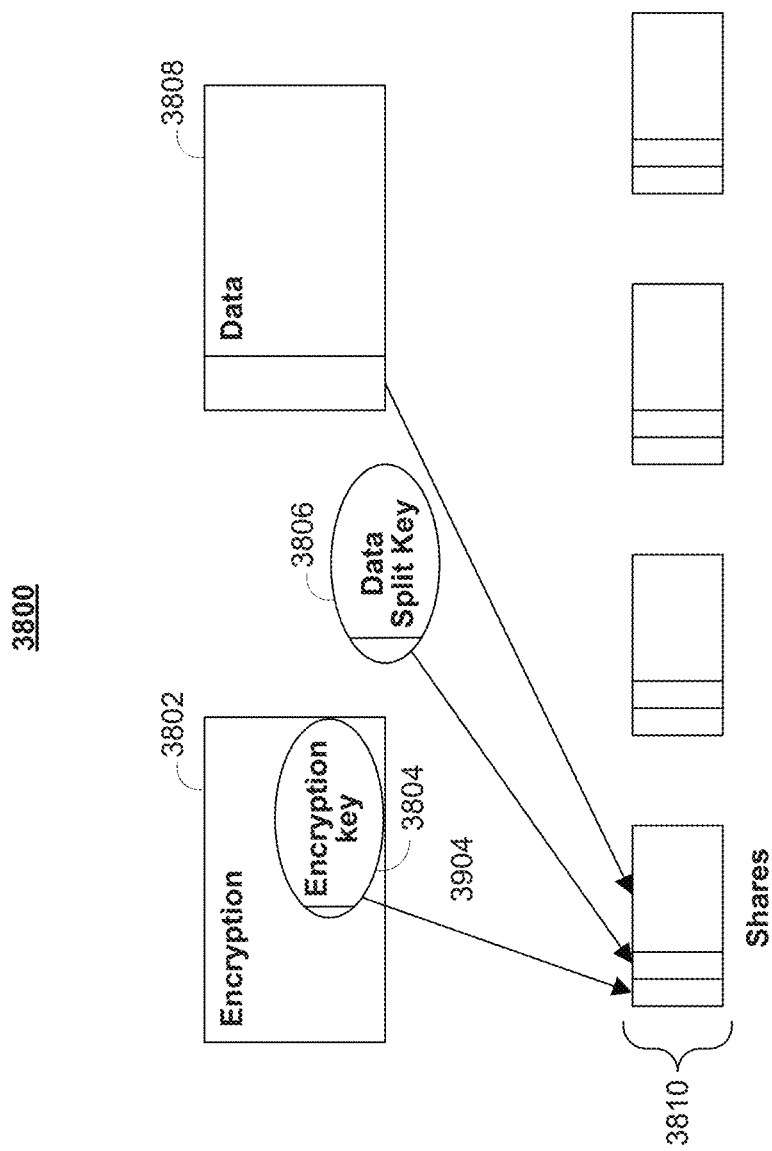
FIG. 38 is a simplified block diagram of the storage of key and data components within shares, that may be used in any suitable combination, with any suitable additions, deletions, or modifications in accordance with one embodiment of the present invention.

FIG. 38 shows illustrative block diagram 3800 for storing key and data components within the shares. In the example of diagram 3800, the optional pre-encrypt and post-encrypt steps are omitted, although these steps may be included in other embodiments.

The simplified process to split the data includes encrypting the data using encryption key 3804 at encryption stage 3802. Portions of encryption key 3804 may then be split and stored within shares 3810 in accordance with the present invention. Portions of split encryption key 3806 may also be stored within shares 3810. Using the split encryption key, data 3808 is then split and stored in shares 3810.

In order to restore the data, split encryption key 3806 may be retrieved and restored in accordance with the present invention. The split operation may then be reversed to restore the ciphertext. Encryption key 3804 may also be retrieved and restored, and the ciphertext may then be decrypted using the encryption key.

Figure 39:
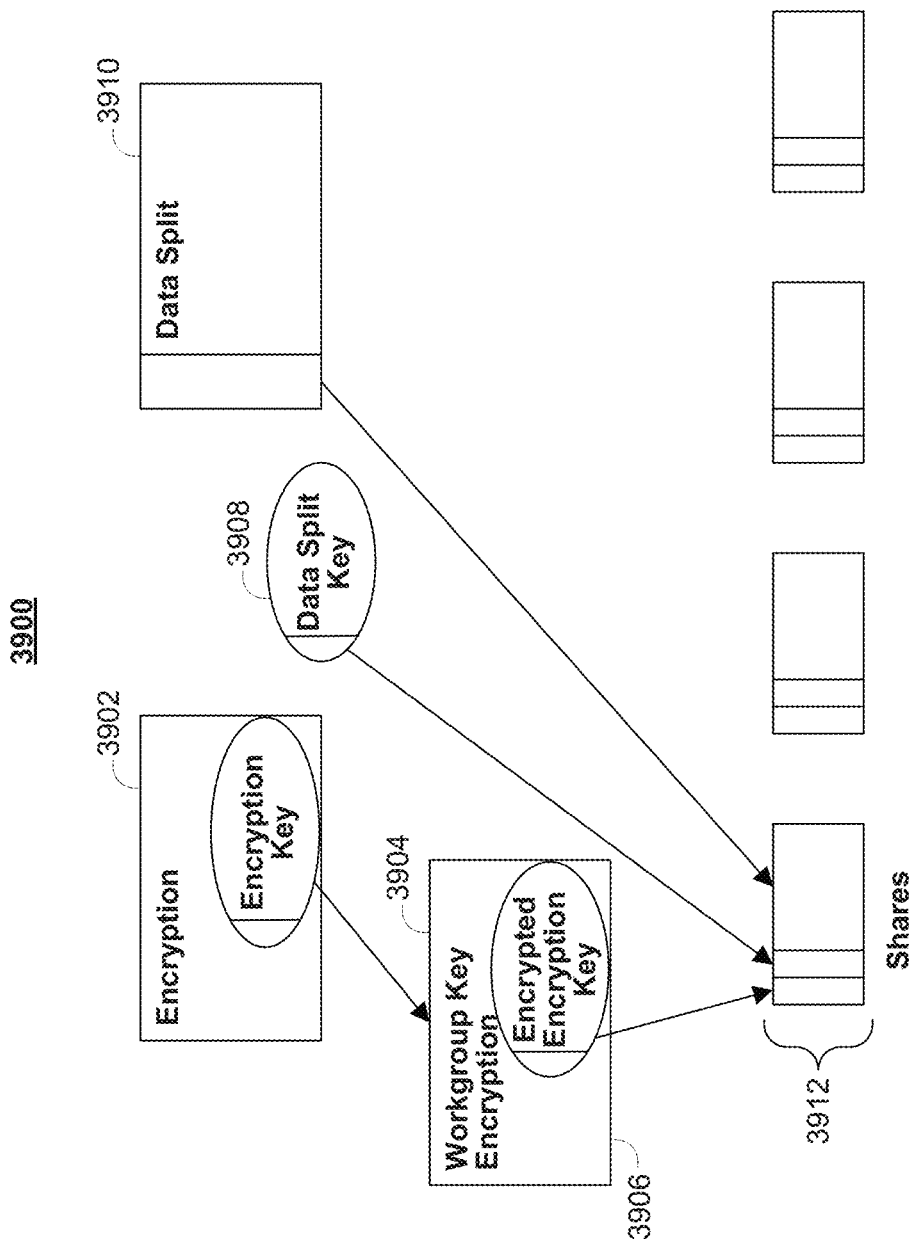
FIG. 39 is a simplified block diagram of the storage of key and data components within shares using a workgroup key, that may be used in any suitable combination, with any suitable additions, deletions, or modifications in accordance with one embodiment of the present invention.

When a workgroup key is utilized, the above process may be changed slightly to protect the encryption key with the workgroup key. The encryption key may then be encrypted with the workgroup key prior to being stored within the shares. The modified steps are shown in illustrative block diagram 3900 of FIG. 39.

The simplified process to split the data using a workgroup key includes first encrypting the data using the encryption key at stage 3902. The encryption key may then be encrypted with the workgroup key at stage 3904. The encryption key encrypted with the workgroup key may then be split into portions and stored with shares 3912. Split key 3908 may also be split and stored in shares 3912. Finally, portions of data 3910 are split and stored in shares 3912 using split key 3908.

In order to restore the data, the split key may be retrieved and restored in accordance with the present invention. The split operation may then be reversed to restore the ciphertext in accordance with the present invention. The encryption key (which was encrypted with the workgroup key) may be retrieved and restored. The encryption key may then be decrypted using the workgroup key. Finally, the ciphertext may be decrypted using the encryption key.

There are several secure methods for deploying and protecting workgroup keys. The selection of which method to use for a particular application depends on a number of factors. These factors may include security level required, cost, convenience, and the number of users in the workgroup. Some commonly used techniques used in some embodiments are provided below:

Hardware-Based Key Storage

Hardware-based solutions generally provide the strongest guarantees for the security of encryption/decryption keys in an encryption system. Examples of hardware-based storage solutions include tamper-resistant key token devices which store keys in a portable device (e.g., smartcard/dongle), or non-portable key storage peripherals. These devices are designed to prevent easy duplication of key material by unauthorized parties. Keys may be generated by a trusted authority and distributed to users, or generated within the hardware. Additionally, many key storage systems provide for multi-factor authentication, where use of the keys requires access both a physical object (token) and a passphrase or biometric.

Software-Based Key Storage

While dedicated hardware-based storage may be desirable for high-security deployments or applications, other deployments may elect to store keys directly on local hardware (e.g., disks, RAM or non-volatile RAM stores such as USB drives). This provides a lower level of protection against insider attacks, or in instances where an attacker is able to directly access the encryption machine.

To secure keys on disk, software-based key management often protects keys by storing them in encrypted form under a key derived from a combination of other authentication metrics, including: passwords and passphrases, presence of other keys (e.g., from a hardware-based solution), biometrics, or any suitable combination of the foregoing. The level of security provided by such techniques may range from the relatively weak key protection mechanisms provided by some operating systems (e.g., MS Windows and Linux), to more robust solutions implemented using multi-factor authentication.

The secure data parser of the present invention may be advantageously used in a number of applications and technologies. For example, email system, RAID systems, video broadcasting systems, database systems, tape backup systems, or any other suitable system may have the secure data parser integrated at any suitable level. As previously discussed, it will be understand that the secure data parser may also be integrated for protection and fault tolerance of any type of data in motion through any transport medium, including, for example, wired, wireless, or physical transport mediums. As one example, voice over Internet protocol (VoIP) applications may make use of the secure data parser of the present invention to solve problems relating to echoes and delays that are commonly found in VoIP. The need for network retry on dropped packets may be eliminated by using fault tolerance, which guarantees packet delivery even with the loss of a predetermined number of shares. Packets of data (e.g., network packets) may also be efficiently split and restored "on-the-fly" with minimal delay and buffering, resulting in a comprehensive solution for various types of data in motion. The secure data parser may act on network data packets, network voice packets, file system data blocks, or any other suitable unit of information. In addition to being integrated with a VoIP application, the secure data parser may be integrated with a file-sharing application (e.g., a peer-to-peer file-sharing application), a video broadcasting application, an electronic voting or polling application (which may implement an electronic voting protocol and blind signatures, such as the Sensus protocol), an email application, or any other network application that may require or desire secure communication.

Figure 40:
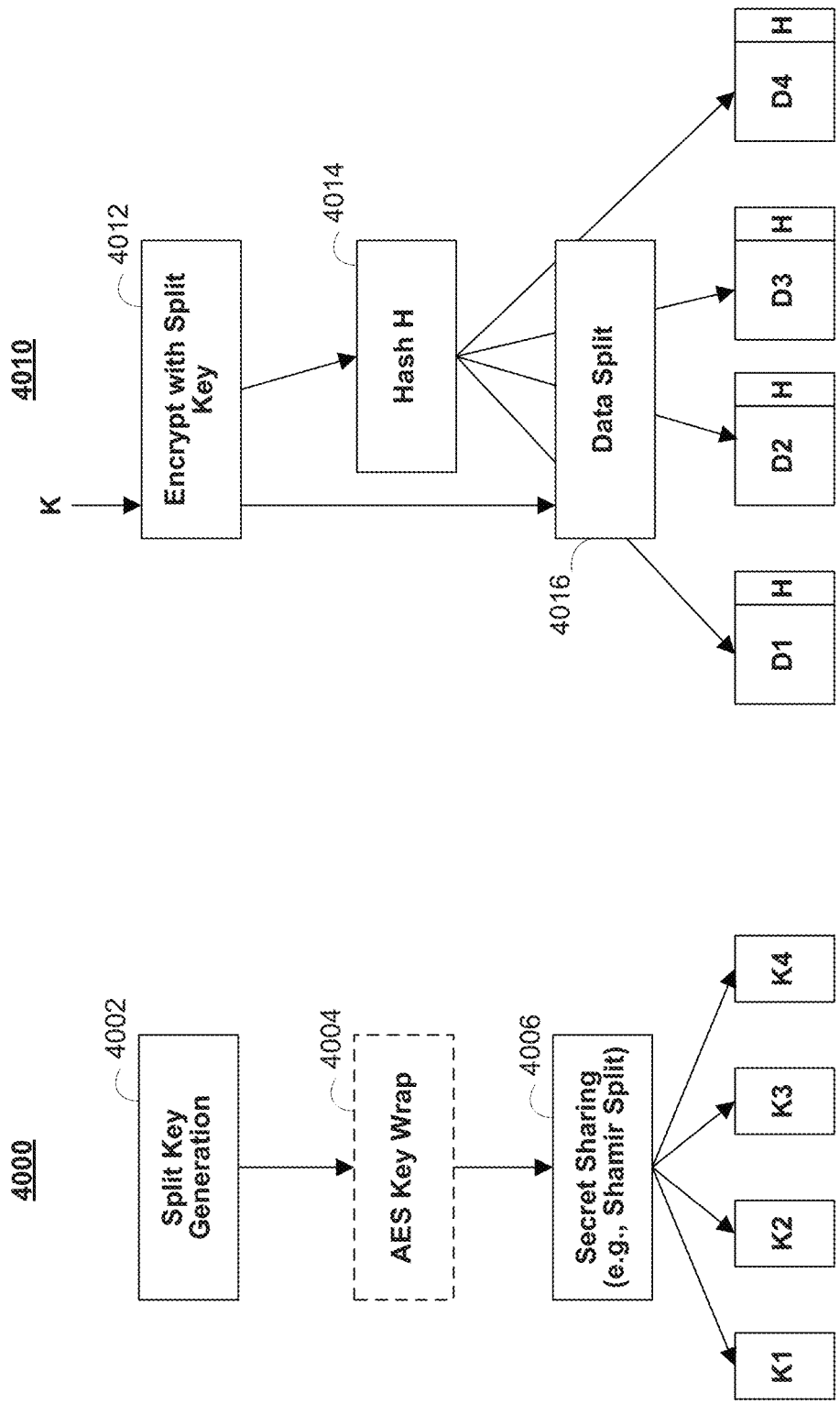
FIGS. 40A and 40B are simplified and illustrative process flow diagrams for header generation and data splitting for data in motion, that may be used in any suitable combination, with any suitable additions, deletions, or modifications in accordance with one embodiment of the present invention.

In some embodiments, support for network data in motion may be provided by the secure data parser of the present invention in two distinct phases—a header generation phase and a data partitioning phase. Simplified header generation process 4000 and simplified data partitioning process 4010 are shown in FIGS. 40A and 40B, respectively. One or both of these processes may be performed on network packets, file system blocks, or any other suitable information.

In some embodiments, header generation process 4000 may be performed one time at the initiation of a network packet stream. At step 4002, a random (or pseudo-random) split encryption key, K, may be generated. The split encryption key, K, may then be optionally encrypted (e.g., using the workgroup key described above) at AES key wrap step 4004. Although an AES key wrap may be used in some embodiments, any suitable key encryption or key wrap algorithm may be used in other embodiments. AES key wrap step 4004 may operate on the entire split encryption key, K, or the split encryption key may be parsed into several blocks (e.g., 64-bit blocks). AES key wrap step 4004 may then operate on blocks of the split encryption key, if desired.

At step 4006, a secret sharing algorithm (e.g., Shamir) may be used to split the split encryption key, K, into key shares. Each key share may then be embedded into one of the output shares (e.g., in the share headers). Finally, a share integrity block and (optionally) a post-authentication tag (e.g., MAC) may be appended to the header block of each share. Each header block may be designed to fit within a single data packet.

After header generation is complete (e.g., using simplified header generation process 4000), the secure data parser may enter the data partitioning phase using simplified data splitting process 4010. Each incoming data packet or data block in the stream is encrypted using the split encryption key, K, at step 4012. At step 4014, share integrity information (e.g., a hash H) may be computed on the resulting ciphertext from step 4012. For example, a SHA-256 hash may be computed. At step 4106, the data packet or data block may then be partitioned into two or more data shares using one of the data splitting algorithms described above in accordance with the present invention. In some embodiments, the data packet or data block may be split so that each data share contains a substantially random distribution of the encrypted data packet or data block. The integrity information (e.g., hash H) may then be appended to each data share. An optional post-authentication tag (e.g., MAC) may also be computed and appended to each data share in some embodiments.

Each data share may include metadata, which may be necessary to permit correct reconstruction of the data blocks or data packets. This information may be included in the share header. The metadata may include such information as cryptographic key shares, key identities, share nonces, signatures/MAC values, and integrity blocks. In order to maximize bandwidth efficiency, the metadata may be stored in a compact binary format.

For example, in some embodiments, the share header includes a cleartext header chunk, which is not encrypted and may include such elements as the Shamir key share, per-session nonce, per-share nonce, key identifiers (e.g., a workgroup key identifier and a post-authentication key identifier). The share header may also include an encrypted header chunk, which is encrypted with the split encryption key. An integrity header chunk, which may include integrity checks for any number of the previous blocks (e.g., the previous two blocks) may also be included in the header. Any other suitable values or information may also be included in the share header.

Figure 41:
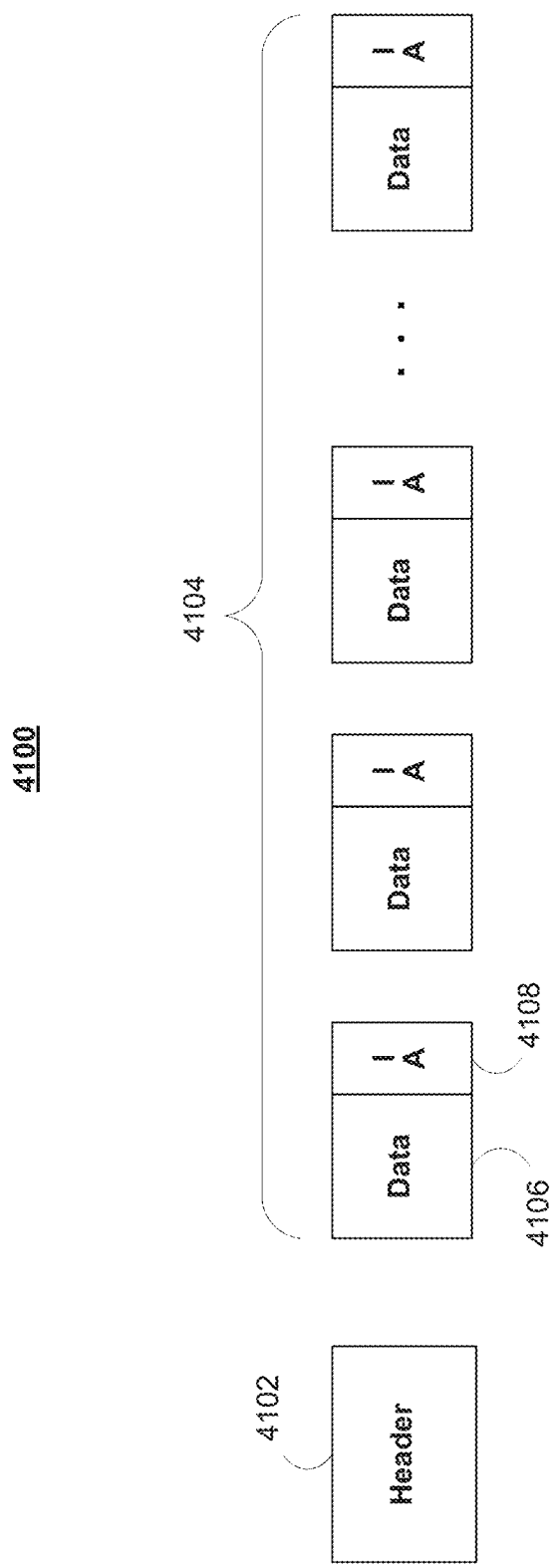
FIG. 41 is a simplified block diagram of an illustrative share format, that may be used in any suitable combination, with any suitable additions, deletions, or modifications in accordance with one embodiment of the present invention.

As shown in illustrative share format 4100 of FIG. 41, header block 4102 may be associated with two or more output blocks 4104. Each header block, such as header block 4102, may be designed to fit within a single network data packet. In some embodiments, after header block 4102 is transmitted from a first location to a second location, the output blocks may then be transmitted. Alternatively, header block 4102 and output blocks 4104 may be transmitted at the same time in parallel. The transmission may occur over one or more similar or dissimilar communications paths.

Each output block may include data portion 4106 and integrity/authenticity portion 4108. As described above, each data share may be secured using a share integrity portion including share integrity information (e.g., a SHA-256 hash) of the encrypted, pre-partitioned data. To verify the integrity of the outputs blocks at recovery time, the secure data parser may compare the share integrity blocks of each share and then invert the split algorithm. The hash of the recovered data may then be verified against the share hash.

As previously mentioned, in some embodiments of the present invention, the secure date parser may be used in conjunction with a tape backup system. For example, an individual tape may be used as a node (i.e., portion/share) in accordance with the present invention. Any other suitable arrangement may be used. For example, a tape library or subsystem, which is made up of two or more tapes, may be treated as a single node.

Redundancy may also be used with the tapes in accordance with the present invention. For example, if a data set is apportioned among four tapes (i.e., portions/shares), then two of the four tapes may be necessary in order to restore the original data. It will be understood that any suitable number of nodes (i.e., less than the total number of nodes) may be required to restore the original data in accordance with the redundancy features of the present invention. This substantially increases the probability for restoration when one or more tapes expire.

Each tape may also be digitally protected with a SHA-256, HMAC hash value, any other suitable value, or any combination thereof to insure against tampering. Should any data on the tape or the hash value change, that tape would not be a candidate for restoration and any minimum required number of tapes of the remaining tapes would be used to restore the data.

In conventional tape backup systems, when a user calls for data to be written to or read from a tape, the tape management system (TMS) presents a number that corresponds to a physical tape mount. This tape mount points to a physical drive where the data will be mounted. The tape is loaded either by a human tape operator or by a tape robot in a tape silo.

Under the present invention, the physical tape mount may be considered a logical mount point that points to a number of physical tapes. This not only increases the data capacity but also improves the performance because of the parallelism.

For increased performance the tape nodes may be or may include a RAID array of disks used for storing tape images. This allows for high-speed restoration because the data may always be available in the protected RAID.

In any of the foregoing embodiments, the data to be secured may be distributed into a plurality of shares using deterministic, probabilistic, or both deterministic and probabilistic data distribution techniques. In order to prevent an attacker from beginning a crypto attack on any cipher block, the bits from cipher blocks may be deterministically distributed to the shares. For example, the distribution may be performed using the BitSegment routine, or the BlockSegment routine may be modified to allow for distribution of portions of blocks to multiple shares. This strategy may defend against an attacker who has accumulated less than "M" shares.

In some embodiments, a keyed secret sharing routine may be employed using keyed information dispersal (e.g., through the use of a keyed information dispersal algorithm or "IDA"). The key for the keyed IDA may also be protected by one or more external workgroup keys, one or more shared keys, or any combination of workgroup keys and shared keys. In this way, a multi-factor secret sharing scheme may be employed. To reconstruct the data, at least "M" shares plus the workgroup key(s) (and/or shared key(s)) may be required in some embodiments. The IDA (or the key for the IDA) may also be driven into the encryption process. For example, the transform may be driven into the clear text (e.g., during the pre-processing layer before encrypting) and may further protect the clear text before it is encrypted.

For example, in some embodiments, keyed information dispersal is used to distribute unique portions of data from a data set into two or more shares. The keyed information dispersal may use a session key to first encrypt the data set, to distribute unique portions of encrypted data from the data set into two or more encrypted data set shares, or both encrypt the data set and distribute unique portions of encrypted data from the data set into the two or more encrypted data set shares. For example, to distribute unique portions of the data set or encrypted data set, secret sharing (or the methods described above, such as BitSegment or BlockSegment) may be used. The session key may then optionally be transformed (for example, using a full package transform or AoNT) and shared using, for example, secret sharing (or the keyed information dispersal and session key).

In some embodiments, the session key may be encrypted using a shared key (e.g., a workgroup key) before unique portions of the key are distributed or shared into two or more session key shares. Two or more user shares may then be formed by combining at least one encrypted data set share and at least one session key share. In forming a user share, in some embodiments, the at least one session key share may be interleaved into an encrypted data set share. In other embodiments, the at least one session key share may be inserted into an encrypted data set share at a location based at least in part on the shared workgroup key. For example, keyed information dispersal may be used to distribute each session key share into a unique encrypted data set share to form a user share. Interleaving or inserting a session key share into an encrypted data set share at a location based at least in part on the shared workgroup may provide increased security in the face of cryptographic attacks. In other embodiments, one or more session key shares may be appended to the beginning or end of an encrypted data set share to form a user share. The collection of user shares may then be stored separately on at least one data depository. The data depository or depositories may be located in the same physical location (for example, on the same magnetic or tape storage device) or geographically separated (for example, on physically separated servers in different geographic locations). To reconstruct the original data set, an authorized set of user shares and the shared workgroup key may be required.

Keyed information dispersal may be secure even in the face of key-retrieval oracles. For example, take a blockcipher E and a key-retrieval oracle for E that takes a list $(X_1, Y_1), \ldots, (X_c, Y_c)$ of input/output pairs to the blockcipher, and returns a key K that is consistent with the input/output examples (e.g., $Y_i = E_K(X_i)$ for all i). The oracle may return the distinguished value 1 if there is no consistent key. This oracle may model a cryptanalytic attack that may recover a key from a list of input/output examples.

Standard blockcipher-based schemes may fail in the presence of a key-retrieval oracle. For example, CBC encryption or the CBC MAC may become completely insecure in the presence of a key-retrieval oracle.

If $\Pi^{IDA}$ is an IDA scheme and $\Pi^{Enc}$ is an encryption scheme given by a mode of operation of some blockcipher E, then $(\Pi^{IDA}, \Pi^{Enc})$ provides security in the face of a key-retrieval attack if the two schemes, when combined with an arbitrary perfect secret-sharing scheme (PSS) as per HK1 or HK2, achieve the robust computational secret sharing (RCSS) goal, but in the model in which the adversary has a key-retrieval oracle.

If there exists an IDA scheme $\Pi^{IDA}$ and an encryption scheme $\Pi^{Enc}$ such that the pair of schemes provides security in the face of key-retrieval attacks, then one way to achieve this pair may be to have a "clever" IDA and a "dumb" encryption scheme. Another way to achieve this pair of schemes may be to have a "dumb" IDA and a "clever" encryption scheme.

To illustrate the use of a clever IDA and a dumb encryption scheme, in some embodiments, the encryption scheme may be CBC and the IDA may have a "weak privacy" property. The weak privacy property means, for example, that if the input to the IDA is a random sequence of blocks $M = M_1 \ldots M_l$ and the adversary obtains shares from a non-authorized collection, then there is some block index i such that it is infeasible for the adversary to compute $M_i$. Such a weakly-private IDA may be built by first applying to M an information-theoretic AoNT, such as Stinson's AoNT, and then applying a simple IDA such as BlockSegment, or a bit-efficient IDA like Rabin's scheme (e.g., Reed-Solomon encoding).

To illustrate the use of a dumb IDA and a clever encryption scheme, in some embodiments, one may use a CBC mode with double encryption instead of single encryption. Now any IDA may be used, even replication. Having the key-retrieval oracle for the blockcipher would be useless to an adversary, as the adversary will be denied any singly-enciphered input/output example.

While a clever IDA has value, it may also be inessential in some contexts, in the sense that the "smarts" needed to provide security in the face of a key-retrieval attack could have been "pushed" elsewhere. For example, in some embodiments, no matter how smart the IDA, and for whatever goal is trying to be achieved with the IDA in the context of HK1/HK2, the smarts may be pushed out of the IDA and into the encryption scheme, being left with a fixed and dumb IDA.

Based on the above, in some embodiments, a "universally sound" clever IDA $\Pi^{IDA}$ may be used. For example, an IDA is provided such that, for all encryption schemes $\Pi^{Enc}$ the pair $(\Pi^{IDA}, \Pi^{Enc})$ universally provides security in the face of key-retrieval attacks.

In some embodiments, an encryption scheme is provided that is RCSS secure in the face of a key-retrieval oracle. The scheme may be integrated with HK1/HK2, with any IDA, to achieve security in the face of key-retrieval. Using the new scheme may be particularly useful, for example, for making symmetric encryption schemes more secure against key-retrieval attacks.

As mentioned above, classical secret-sharing notions are typically unkeyed. Thus, a secret is broken into shares, or reconstructed from them, in a way that requires neither the dealer nor the party reconstructing the secret to hold any kind of symmetric or asymmetric key. The secure data parser described herein, however, is optionally keyed. The dealer may provide a symmetric key that, if used for data sharing, may be required for data recovery. The secure data parser may use the symmetric key to disperse or distribute unique portions of the message to be secured into two or more shares.

The shared key may enable multi-factor or two-factor secret-sharing (2FSS). The adversary may then be required to navigate through two fundamentally different types of security in order to break the security mechanism. For example, to violate the secret-sharing goals, the adversary (1) may need to obtain the shares of an authorized set of players, and (2) may need to obtain a secret key that it should not be able to obtain (or break the cryptographic mechanism that is keyed by that key).

In some embodiments, a new set of additional requirements is added to the RCSS goal. The additional requirements may include the "second factor"—key possession. These additional requirements may be added without diminishing the original set of requirements. One set of requirements may relate to the adversary's inability to break the scheme if it knows the secret key but does not obtain enough shares (e.g., the classical or first-factor requirements) while the other set of requirements may relate to the adversary's inability to break the scheme if it does have the secret key but manages to get hold of all of the shares (e.g., the new or second-factor requirements).

In some embodiments, there may be two second-factor requirements: a privacy requirement and an authenticity requirement. In the privacy requirement, a game may be involved where a secret key K and a bit b are selected by the environment. The adversary now supplies a pair of equal-length messages in the domain of the secret-sharing scheme, $M_1^0$ and $M_1^1$. The environment computes the shares of $M_1^b$ to get a vector of shares, $S_1=(S_1[1], \ldots, S_1[n])$, and it gives the shares $S_1$ (all of them) to the adversary. The adversary may now choose another pair of messages ($M_2^0$, $M_2^1$) and everything proceeds as before, using the same key K and hidden bit b. The adversary's job is to output the bit b' that it believes to be b. The adversary privacy advantage is one less than twice the probability that b=b'. This games captures the notion that, even learning all the shares, the adversary still cannot learn anything about the shared secret if it lacks the secret key.

In the authenticity requirement, a game may be involved where the environment chooses a secret key K and uses this in the subsequent calls to Share and Recover. Share and Recover may have their syntax modified, in some embodiments, to reflect the presence of this key. Then the adversary makes Share requests for whatever messages $M_1, \ldots, M_q$ it chooses in the domain of the secret-sharing scheme. In response to each Share request it gets the corresponding n-vector of shares, $S_1, \ldots, S_q$. The adversary's aim is to forge a new plaintext; it wins if it outputs a vector of shares S' such that, when fed to the Recover algorithm, results in something not in $\{M_1, \ldots, M_q\}$. This is an "integrity of plaintext" notion.

There are two approaches to achieve multi-factor secret-sharing. The first is a generic approach—generic in the sense of using an underlying (R)CSS scheme in a black-box way. An authenticated-encryption scheme is used to encrypt the message that is to be CSS-shared, and then the resulting ciphertext may be shared out, for example, using a secret sharing algorithm, such as Blakely or Shamir.

A potentially more efficient approach is to allow the shared key to be the workgroup key. Namely, (1) the randomly generated session key of the (R)CSS scheme may be encrypted using the shared key, and (2) the encryption scheme applied to the message (e.g., the file) may be replaced by an authenticated-encryption scheme. This approach may entail only a minimal degradation in performance.

Although some applications of the secure data parser are described above, it should be clearly understood that the present invention may be integrated with any network application in order to increase security, fault-tolerance, anonymity, or any suitable combination of the foregoing.

The secure data parser of the present invention may be used to implement a cloud computing data security solution. Cloud computing is network-based computing, storage, or both where computing and storage resources may be provided to computer systems and other devices over a network. Cloud computing resources are generally accessed over the Internet, but cloud computing may be performed over any suitable public or private network. Cloud computing may provide a level of abstraction between computing resources and their underlying hardware components (e.g., servers, storage devices, networks), enabling remote access to a pool of computing resources. These cloud computing resources may be collectively referred to as the "cloud." Cloud computing may be used to provide dynamically scalable and often virtualized resources as a service over the Internet or any other suitable network or combination of networks.

Security is an important concern with cloud computing because private data (e.g., from an enterprises' private network) may be transferred over public networks and may be processed and stored within publicly accessible or shared systems (e.g., Google (e.g., Google Apps Storage), Dropbox, or Amazon (e.g., Amazon's S3 storage facility)). These publicly accessible systems do not necessarily provided encrypted storage space, however, they do provide user's with the capability of storing a set of files on their servers. The secure data parser may be used to protect cloud computing resources and the data being communicated between the cloud and an end-user or device. For example, the secure data parser may be used to secure data storage in the cloud, data-in-motion to/from the cloud, network access in the cloud, data services in the cloud, access to high-performance computing resources in the cloud, and any other operations in the cloud.

Figure 42:
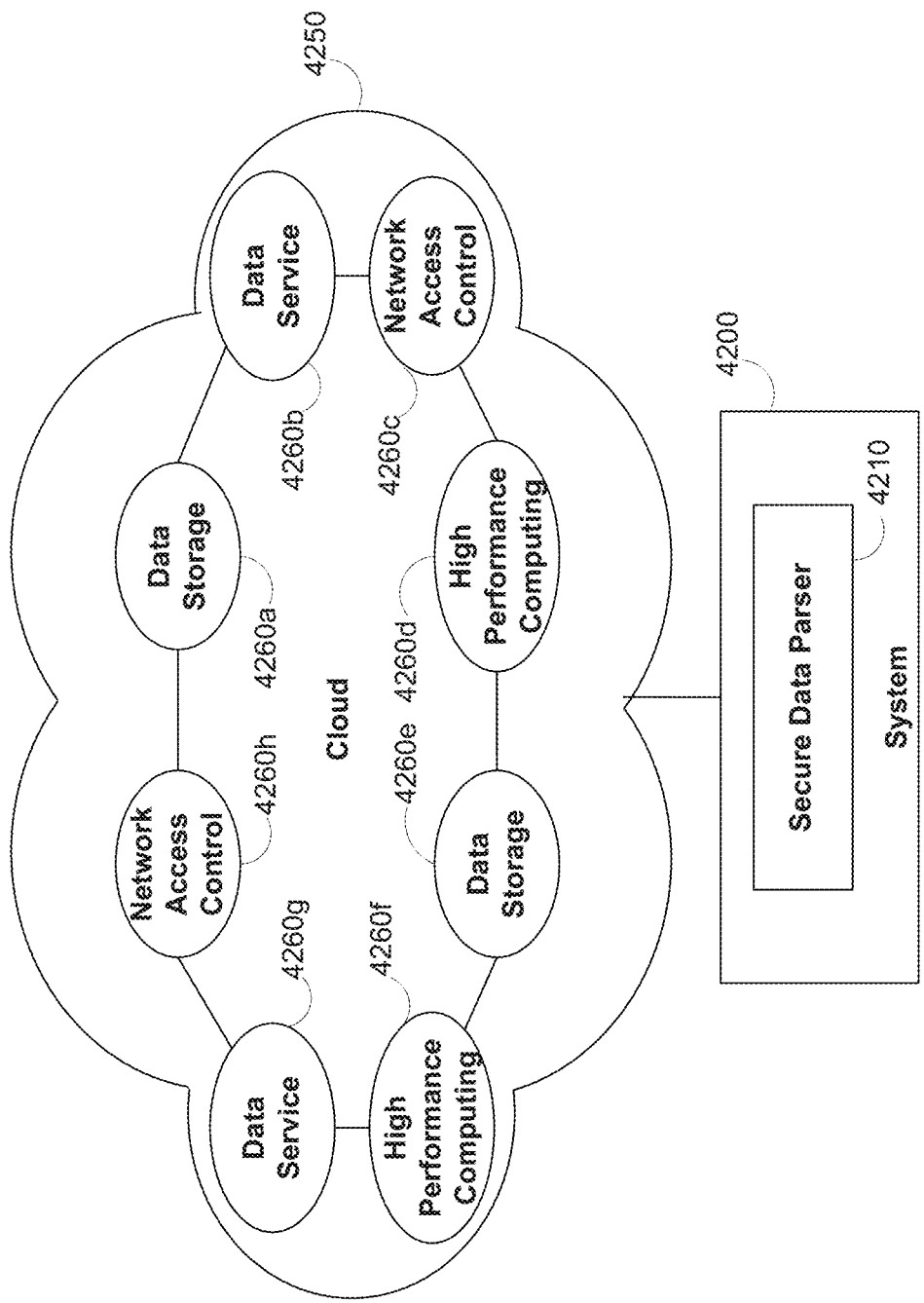
FIG. 42 is a block diagram of an illustrative arrangement in which the secure data parser is integrated into a system connected to cloud computing resources in accordance with one embodiment of the present invention.

FIG. 42 is an illustrative block diagram of a cloud computing security solution. System 4200, including secure data parser 4210, is coupled to cloud 4250 including cloud resources 4260. System 4200 may include any suitable hardware, such as a computer terminal, personal computer, hand-held device (e.g., PDA, Blackberry, smart phone, tablet device), cellular telephone, computer network, any other suitable hardware, or any combination thereof. Secure data parser 4210 may be integrated at any suitable level of system 4200. For example, secure data parser 4210 may be integrated into the hardware and/or software of system 4200 at a sufficiently back-end level such that the presence of secure data parser 4210 may be substantially transparent to an end user of system 4200. The integration of the secure data parser within suitable systems is described in greater detail above with respect to, for example, FIGS. 27 and 28. Cloud 4250 includes multiple illustrative cloud resources 4260 including, data storage resources 4260a and 4260e, data service resources 4260b and 4260g, network access control resources 4260c and 4260h, and high performing computing resources 4260d and 4260f. The cloud resources may be provided by a plurality of cloud resource providers, e.g., Amazon, Google, or Dropbox. Each of these cloud computing resources will be described in greater detail below with respect to FIGS. 43-56. These cloud computing resources are merely illustrative. It should be understood that any suitable number and type of cloud computing resources may be accessible from system 4200.

One advantage of cloud computing is that the user of system 4200 may be able to access multiple cloud computing resources without having to invest in dedicated storage hardware. The user may have the ability to dynamically control the number and type of cloud computing resources accessible to system 4200. For example, system 4200 may be provided with on-demand storage resources in the cloud having capacities that are dynamically adjustable based on current needs. In some embodiments, one or more software applications executed on system 4200 may couple system 4200 to cloud resources 4260. For example, an Internet web browser may be used to couple system 4200 to one or more cloud resources 4260 over the Internet. In some embodiments, hardware integrated with or connected to system 4200 may couple system 4200 to cloud resources 4260. In both embodiments, secure data parser 4210 may secure communications with cloud resources 4260 and/or the data stored within cloud resources 4260. The coupling of cloud resources 4260 to system 4200 may be transparent to system 4200 or the users of system 4200 such that cloud resources 4260 appear to system 4200 as local hardware resources. Furthermore shared cloud resources 4260 may appear to system 4200 as dedicated hardware resources.

In some embodiments, secure data parser 4210 may encrypt and split data such that no forensically discernable data will traverse or will be stored within the cloud. The underlying hardware components of the cloud (e.g., servers, storage devices, networks) may be geographically disbursed to ensure continuity of cloud resources in the event of a power grid failure, weather event or other man-made or natural event. As a result, even if some of the hardware components within the cloud suffer a catastrophic failure, the cloud resources may still be accessible. Cloud resources 4260 may be designed with redundancies to provide uninterrupted service in spite of one or more hardware failures.

In some embodiments, the secure parser of the present invention may first randomize the original data and then split the data according to either a randomized or deterministic technique. For example, if randomizing at the bit level, the secure parser of the present invention may jumble the bits of original data according to a randomized technique (e.g., according to a random or pseudo-random session key) to form a sequence of randomized bits. The secure parser may then split the bits into a predetermined number of shares by any suitable technique (e.g., a suitable information dispersal algorithm (IDA)) as previously discussed.

Figure 43:
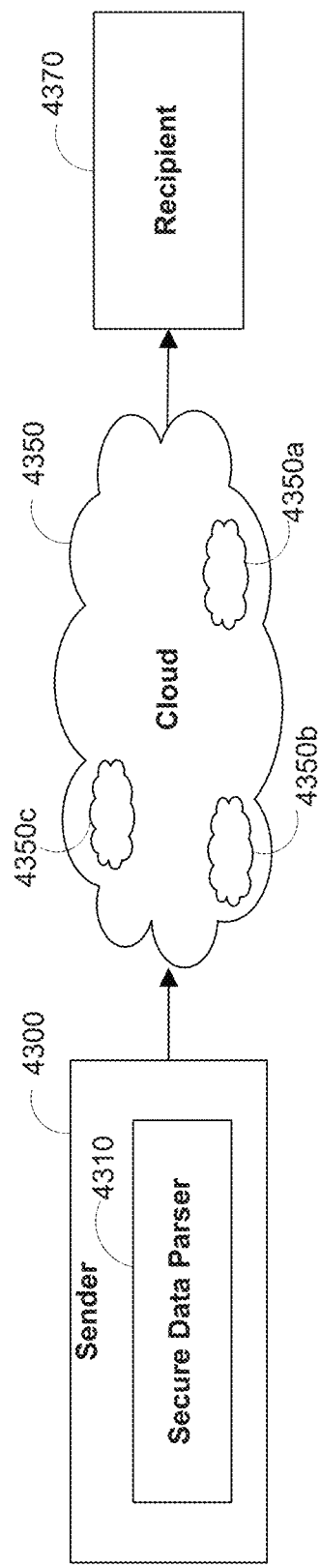
FIG. 43 is a block diagram of an illustrative arrangement in which the secure data parser is integrated into a system for sending data through the cloud in accordance with one embodiment of the present invention.

FIG. 43 is an illustrative block diagram of a cloud computing security solution for securing data in motion (i.e., during the transfer of data from one location to another) through the cloud. FIG. 43 shows a sender system 4300, which may include any suitable hardware, such as a computer terminal, personal computer, handheld device (e.g., PDA, Blackberry), cellular telephone, computer network, any other suitable hardware, or any combination thereof. Sender system 4300 is used to generate and/or store data, which may be, for example, an email message, a binary data file (e.g., graphics, voice, video, etc.), or both. The data is parsed and split by secure data parser 4310 in accordance with the present invention. The resultant data portions may be communicated over cloud 4350 to recipient system 4370.

Cloud 4350 may include any suitable combination of public and private cloud storage shown illustratively as clouds 4350*a*, 4350*b*, and 4350*c*. For instance, clouds 4350*a* and 4350*c* may be cloud storage resources that are publically accessible, such as those provided by Amazon, Google, or Dropbox. Cloud 4350*b* may be a private cloud that is inaccessible to any individual or group outside of a particular organization, e.g., an enterprise or educational institution. In other embodiments, a cloud may be a hybrid of a public and private cloud.

Recipient system 4370 of system 4300 may be any suitable hardware as described above with respect to sender system 4300. The separate data portions may be recombined at recipient system 4370 to generate the original data in accordance with the present invention. When traveling through cloud 4310 the data portions may be communicated across one or more communications paths including the Internet and/or one or more intranets, LANs, WiFi, Bluetooth, any other suitable hard-wired or wireless communications networks, or any combination thereof. As described above with respect to FIGS. 28 and 29, the original data is secured by the secure data parser even if some of the data portions are compromised.

Figure 44:
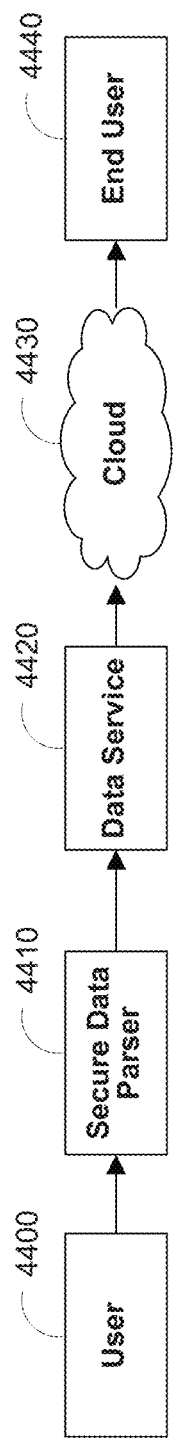
FIG. 44 is a block diagram of an illustrative arrangement in which the secure data parser is used to secure data services in the cloud in accordance with one embodiment of the present invention.

FIG. 44 is an illustrative block diagram of a cloud computing security solution for securing data services in the cloud. In this embodiment, a user 4400 may provide data services 4420 to an end user 4440 over cloud 4430. Secure parser 4410 may secure the data services in accordance with the disclosed embodiments. Data service 4420 may be any suitable application or software service that is accessible over cloud 4430. For example, data service 4420 may be a web-based application implemented as part of a service-oriented architecture (SOA) system. Data service 4420 may be stored and executed on one or more systems within cloud 4430. The abstraction provided by this cloud computing implementation allows data service 4420 to appear as a virtualized resource to end user 4440 irrespective of the underlying hardware resources. Secure parser 4410 may secure data in motion between data service 4420 and end user 4440. Secure parser 4410 may also secure stored data associated with data service 4420. The stored data associated with data service 4420 may be secured within the system or systems implementing data service 4420 and/or within separate secure cloud data storage devices, which will be described in greater detail below. Although data service 4420 and other portions of FIG. 44 are shown outside of cloud 4430, it should be understood that any of these elements may be incorporated within cloud 4430.

Figure 45:
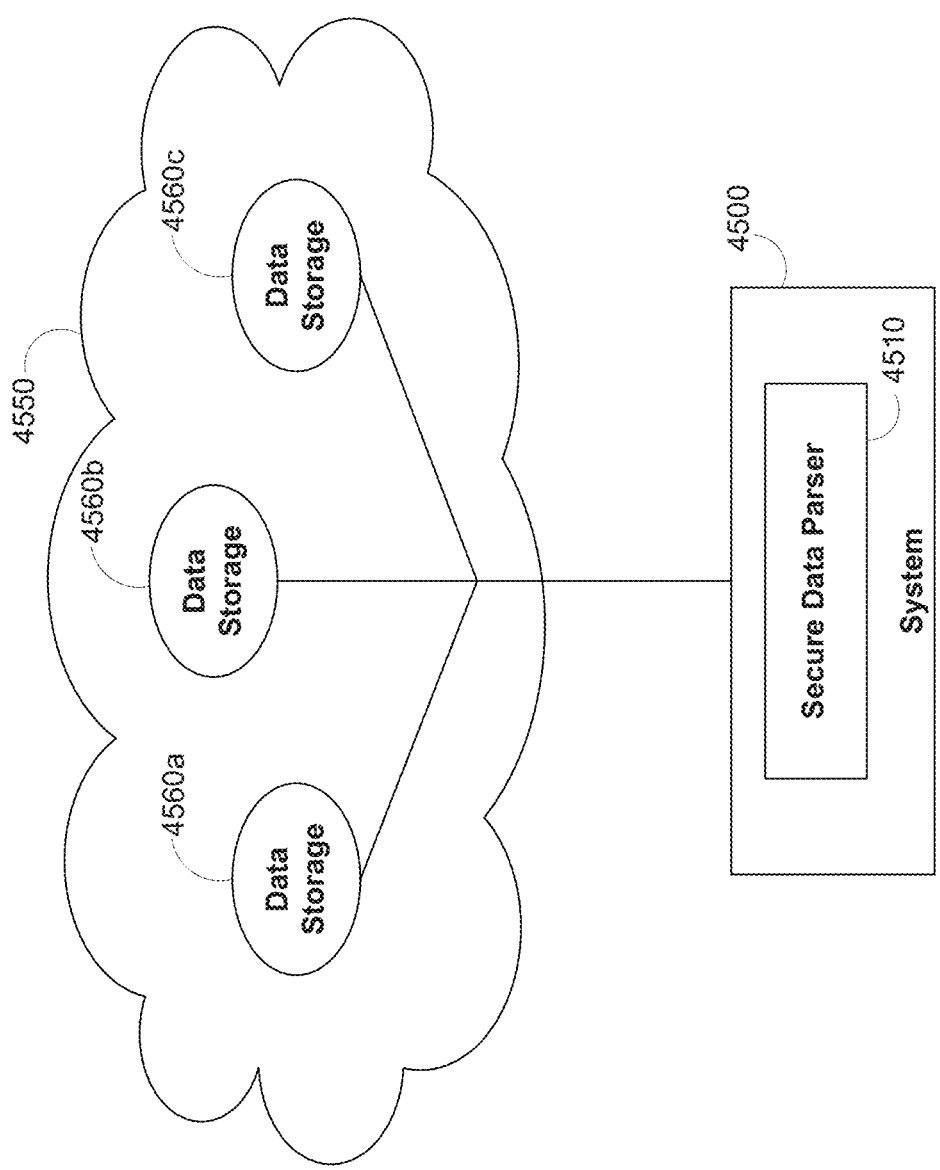
FIG. 45 is a block diagram of an illustrative arrangement in which the secure data parser is used to secure data storage in the cloud in accordance with one embodiment of the present invention.

FIG. 45 is an illustrative block diagram of a cloud computing security solution for securing data storage resources in the cloud. System 4500, including secure data parser 4510, is coupled to cloud 4550 which includes data storage resources 4560. Secure data parser 4510 may be used for parsing and splitting data among one or more data storage resources 4560. Each data storage resource 4560 may represent a one or more networked storage devices. These storage devices may be assigned to a single user/system of may be shared by multiple users/systems. The security provided by secure data parser 4510 may allow data from multiple users/systems to securely co-exist on the same storage devices or resources of cloud storage providers. The abstraction provided by this cloud computing implementation allows data storage resources 4560 to appear as a single virtualized storage resource to system 4500 irrespective of the number and location of the underlying data storage resources. When data is written to or read from data storage resources 4560, secure data parser 4510 may split and recombine the data in a way that may be transparent to the end user. In this manner, an end user may be able to access to dynamically scalable storage on demand.

Data storage in the cloud using secure data parser 4510 is secure, resilient, persistent, and private. Secure data parser 4510 secures the data by ensuring that no forensically discernable data traverses the cloud or is stored in a single storage device. The cloud storage system is resilient because of the redundancy offered by the secure data parser (i.e., fewer than all separated portions of the data are needed to reconstruct the original data). Storing the separated portions within multiple storage devices and/or within multiple data storage resources 4560 ensures that the data may be reconstructed even if one or more of the storage devices fail or are inaccessible. The cloud storage system is persistent because loss of a storage device within data storage resources 4560 has no impact on the end user. If one storage device fails, the data portions that were stored within that storage device may be rebuilt at another storage device without having to expose the data. Furthermore, the storage resources 4560 (or even the multiple networked storage devices that make up a data storage resource 4560) may be geographically dispersed to limit the risk of multiple failures. Finally, the data stored in the cloud may be kept private using one or more keys. As described above, data may be assigned to a user or a community of interest by unique keys such that only that user or community will have access to the data.

Data storage in the cloud using the secure data parser may also provide a performance boost over traditional local or networked storage. The throughput of the system may be improved by writing and reading separate portions of data to multiple storage devices in parallel. This increase in throughput may allow slower, less expensive storage devices to be used without substantially affecting the overall speed of the storage system.

Figure 46:
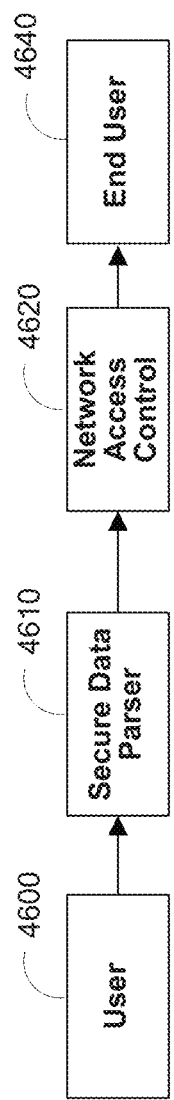
FIG. 46 is a block diagram of an illustrative arrangement in which the secure data parser is used to secure network access control in accordance with one embodiment of the present invention.

FIG. 46 is an illustrative block diagram for securing network access using a secure data parser in accordance with the disclosed embodiments. Secure data parser 4610 may be used with network access control block 4620 to control access to network resources. As illustrated in FIG. 46, network access control block 4620 may be used to provide secure network communications between user 4600 and end user 4640. In some embodiments, network access control block 4620 may provide secure network access for one or more network resources in the cloud (e.g., cloud 4250, FIG. 42). Authorized users (e.g., user 4600 and end user 4640) may be provided with group-wide keys that provide the users with the ability to securely communicate over a network and/or to access secure network resources. The secured network resources will not respond unless the proper credentials (e.g., group keys) are presented. This may prevent common networking attacks such as, for example, denial of service attacks, port scanning attacks, man-in-the-middle attacks, and playback attacks.

In addition to providing security for data at rest stored within a communications network and security for data in motion through the communications network, network access control block 4620 may be used with secure data parser 4620 to share information among different groups of users or communities of interest. Collaboration groups may be set up to participate as secure communities of interest on secure virtual networks. A workgroup key may be deployed to group members to provide members of the group access to the network and networked resources. Systems and methods for workgroup key deployments have been discussed above.

Figure 47:
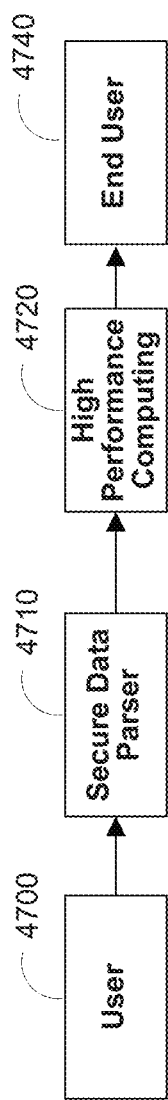
FIG. 47 is a block diagram of an illustrative arrangement in which the secure data parser is used to secure high performance computing resources in accordance with one embodiment of the present invention.

FIG. 47 is an illustrative block diagram for securing access to high performance computing resources using a secure data parser in accordance with the disclosed embodiments. Secure data parser 4710 may be used to provide secure access to high performance computing resources 4720. As illustrated in FIG. 47 end user 4740 may access high performance computing resources 4720. In some embodiments, secure data parser 4710 may provide secure access to high performance resources in the cloud (e.g., cloud 4250, FIG. 42). High performance computing resources may be large computer servers or server farms. These high performance computing resources may provide flexible, scalable, and configurable data services and data storage services to users.

The secure data parser of the present invention may be configured to implement a server-based secure data solution. The server-based solution of the secure parser of the present invention refers to a backend server-based Data at Rest (DAR) solution. The server may be any Windows-based, Linux-based, Solaris-based, or any other suitable operating system. This server-based solution presents a transparent file system to a user, i.e., a user does not observe any indication of the splits of data. When data is presented to the backend server of the secure data parser of the present invention, the data is split into N shares and sent to N accessible (therefore, available) data storage locations mounted/attached to the server. However, only some number M of those shares is required to rebuild the data. In some embodiments, the server-based solution of the secure parser of the present invention may first randomize the original data and then split the data according to either a randomized or deterministic technique. For example, if randomizing at the bit level, the secure parser of the present invention may jumble the bits of original data according to a randomized technique (e.g., according to a random or pseudo-random session key) to form a sequence of randomized bits. The server-based solution of the secure parser of the present invention may then split the bits into a predetermined number of shares by any suitable technique (e.g., round robin) as previously discussed. For the embodiments of FIGS. 42-47 above, and the embodiments of the FIGURES below, it will be assumed that the secure parser of the present invention may first split the data according to either a randomized or deterministic technique. Furthermore, in the embodiments described below, splitting data may include splitting data using any suitable information dispersion algorithm (IDA), including round robin or random bit splitting, as described above.

The abovedescribed solutions enable the recovery of data from local storage or remote storage such as single or multiple clouds because data may be rebuilt from any M of the N data shares, even when the data is first randomized and then split according to either a randomized or deterministic technique. Further descriptions of the server-based solution of the secure parser of the present invention are provided below, particularly with respect to FIGS. 48-56. In some embodiments, the server-based solution may be used in conjunction with cloud computing embodiments described above with respect to FIGS. 42-47.

Figure 48:
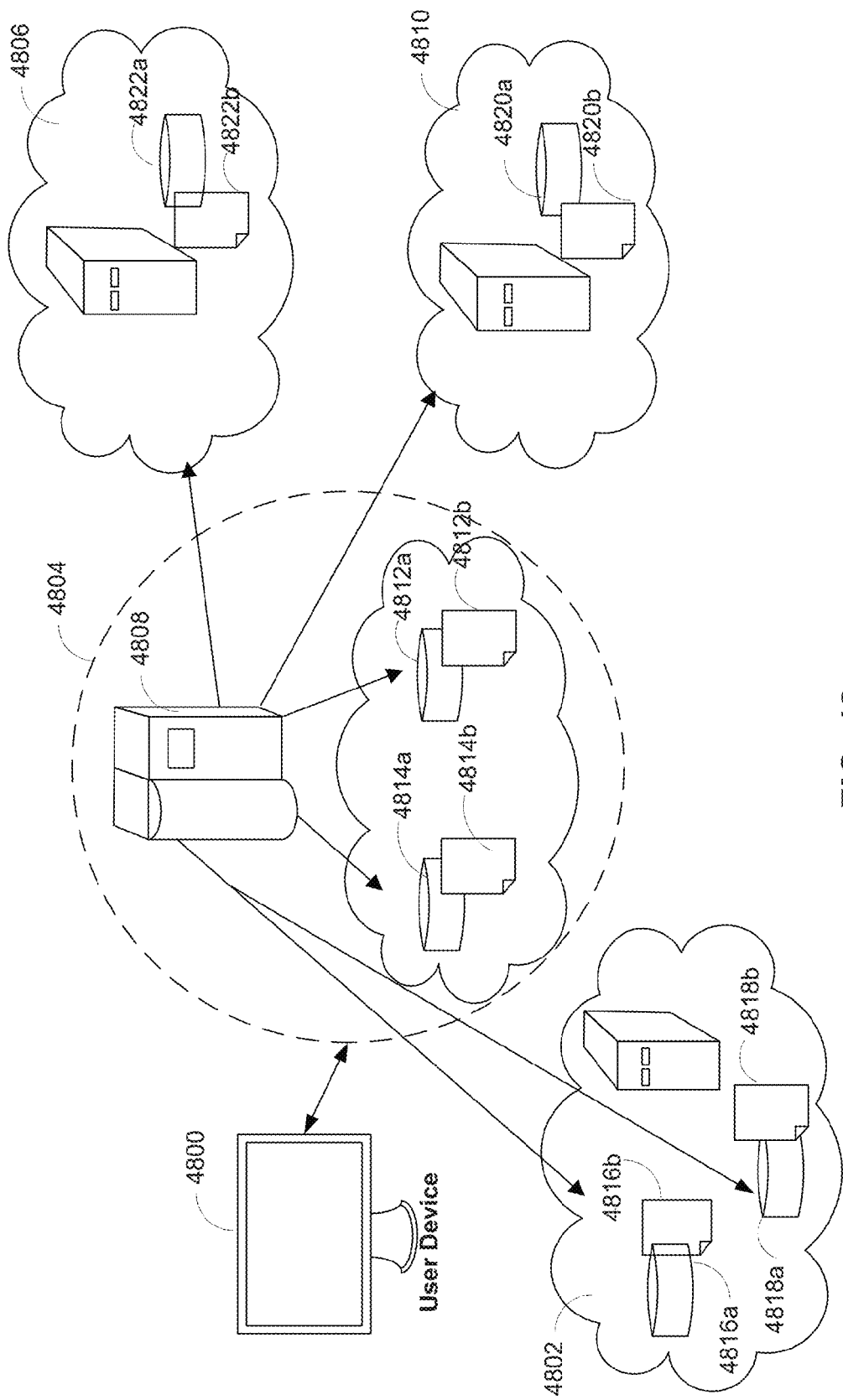
FIG. 48 is a schematic of an illustrative arrangement in which the secure data parser is used to secure data storage in a plurality of storage devices in a cloud in accordance with one embodiment of the present invention.
Figure 49:
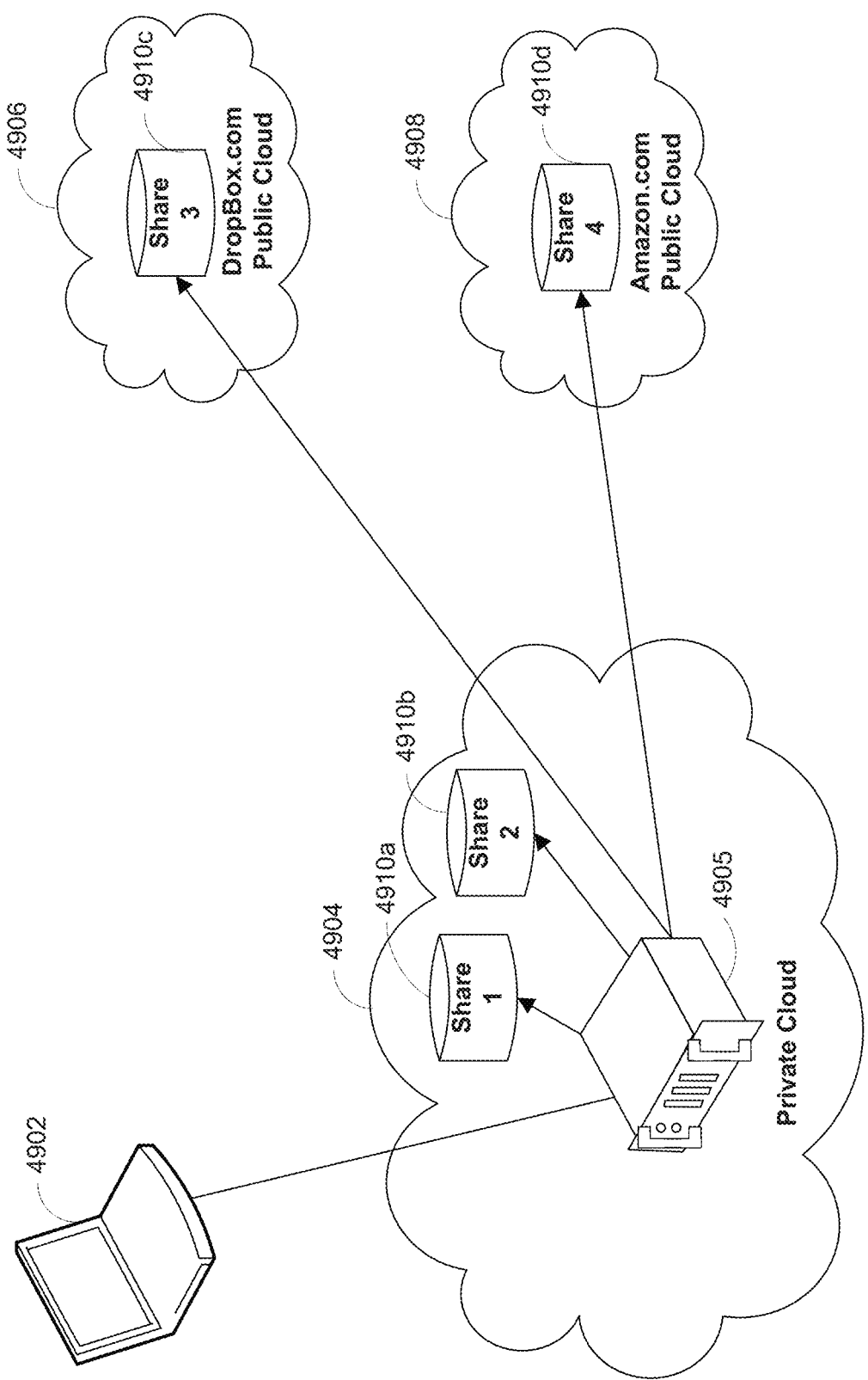
FIG. 49 is a schematic of an illustrative arrangement in which the secure data parser is used to secure data storage in a plurality of private and public clouds in accordance with one embodiment of the present invention.
Figure 50:
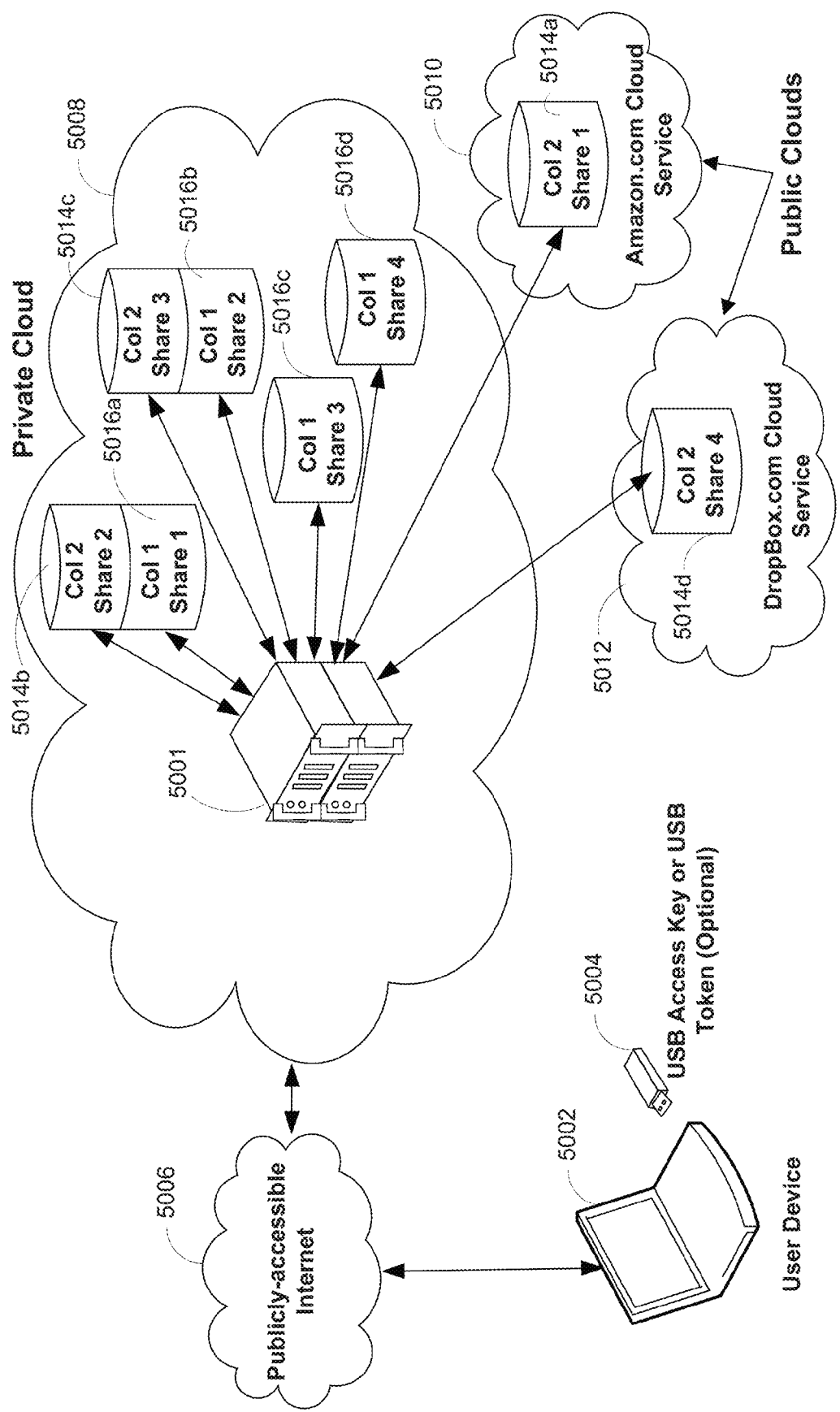
FIG. 50 is a schematic of an illustrative arrangement in which the secure data parser is used to secure data storage in a plurality of private and public clouds via a public Internet in accordance with one embodiment of the present invention.

In the embodiments of FIGS. 48-50, embodiments of the server-based solution of the secure parser of the present invention will be described in relation to their implemented in connection with public clouds (e.g., Dropbox), as well as other private, public, and hybrid clouds or cloud computing resources.

FIG. 48 is a schematic of an illustrative arrangement in which the secure data parser is used to secure data storage in a plurality of storage devices in a private and a public cloud in accordance with one embodiment of the present invention. Private cloud 4804 includes a processor 4808 which is configured to implement the server-based solution of a secure parser of the present invention and generate encrypted data shares 4816*b*, 4818*b*, 4814*b*, 4812*b*, 4820*b*, and 4822*b*. Private cloud 4804 may optionally be accessible, e.g., via an Internet connection, to an end user device 4800. Remote users may access their data stored on the private cloud 4804 via end user device 4800, and may also transmit commands relating to data share generation and management from end user device 4800 to processor 4804 of cloud 4804. A subset of these encrypted data shares are stored on storage devices within the private cloud 4804. In particular, data share 4814*b* is stored on storage device 4814*a*, while data share 4812*b* is stored on storage device 4812*a*. Processor 4808 is also configured to store other subsets of the encrypted data shares in other public, private, or hybrid clouds 4802, 4806, or 4810. For instance, cloud 4806 may include public cloud resources provided by Amazon, while cloud 4802 may include public cloud resources provided by Dropbox. In this illustrative embodiment, shares 4818*b* and 4816*b* are stored on storage devices 4818*a* and 4816*a*, respectively, in cloud 4802, share 4822*b* is stored on storage device 4822*a* in cloud 4806, and share 4820*b* is stored on storage device 4820*a* in cloud 4810. In this manner, the provider of private cloud 4804 may leverage the storage resources of other cloud storage providers to store data shares, thereby reducing the storage burden on the storage devices with cloud 4804. The secure parser of private cloud 4804 simultaneously secures data while providing robust data survivability from disasters because only M of N parsed shares will be required to rebuild the data, where M<N. For example, if access to one of the public or private clouds 4806, 4810, or 4802 is interrupted or lost, the data can still be accessed and recovered using the available subset of encrypted data shares. In general, only M of N parsed shares will be required to rebuild the data, where M<N. For example, if access to one of the public or private clouds 4806, 4810, or 4802 is interrupted or lost, the data can still be accessed and recovered using the available subset of encrypted data shares.

As a further illustrative example, if a storage resource within one or more of public or private clouds 4806, 4810, or 4802 is down or otherwise inaccessible, the data can still be accessed and recovered using the accessible subset of encrypted data shares within the cloud(s).

FIG. 49 is a schematic of an illustrative arrangement in which the secure data parser is used to secure data storage in a plurality of private and public clouds similar to the arrangement of FIG. 48, in accordance with one embodiment of the present invention. FIG. 49 illustrates a private cloud 4904 which is coupled, e.g., via an Internet connection, to an end user device such as laptop 4902, and to public clouds 4906 and 4908, e.g., via an Internet connection. Public clouds include cloud storage resources that are publically accessible, such as those provided by Dropbox and Amazon (e.g., Amazon's S3 storage facility). The abovedescribed Internet connections may be secure or unsecure. In the illustrative embodiment of FIG. 49, public cloud 4906 is provided by Dropbox, while public cloud 4908 is provided by Amazon. Data from the end user device 4902 may be transmitted to private cloud 4904. The processor 4905 of the private cloud 4904 may be configured to implement the server-based solution of a secure parser of the present invention and generate encrypted data shares 4910a, 4910b, 4910c, and 4910d. Shares 4910a and 4910b are stored on storage devices within private cloud 4904, while shares 4910c and 4910d are transmitted to and stored on public clouds 4906 and 4908, respectively. As with the arrangement of FIG. 48, the provider of private cloud 4904 may leverage the storage resources of other cloud storage providers to store data shares, thereby reducing the storage burden on the storage devices with cloud 4904. The secure parser of private cloud 4904 simultaneously secures data while providing robust data survivability from disasters because only M of N parsed shares will be required to rebuild the data, where M<N. For example, if access to one of the public or private clouds 4906 or 4908 is interrupted or lost, the data can still be accessed and recovered using the available subset of encrypted data shares.

FIG. 50 is a schematic of another illustrative arrangement in which the secure data parser is used to secure data storage in a plurality of private and public clouds via the Internet 5006 in accordance with one embodiment of the present invention. In the arrangement of FIG. 50, similar to that of FIGS. 48 and 49, an end user device 5002 is coupled to a private cloud 5008 via the publicly-accessible Internet 5006. Private cloud 5008 includes a processor 5001 that is configured to implement the server-based solution of the secure parser of the present invention and generate two sets of encrypted data shares: 5014a-d and 5016a-d. Some of these encrypted data shares are stored in the same storage device, e.g., shares 5014b and 5016a, and shares 5014c and 5016b, while other shares are stored in different storage devices, e.g., shares 5016c, and 5016d. Shares 5014a and 5014d are transmitted to and stored on public clouds 5010 and 5012, respectively, provided by public cloud storage providers Google, Amazon, and Dropbox, which were described above respectively. As with the arrangement of FIGS. 48 and 49, the provider of private cloud 5008 may leverage the storage resources of other cloud storage providers to store data shares, thereby reducing the storage burden on the storage devices within private cloud 5008. The secure parser of private cloud 5008 therefore simultaneously secures data while providing robust data survivability from disasters because only M of N parsed shares will be required to rebuild the data, where M<N. Thus, if access to one of the public or private clouds 5010 or 5012 is interrupted or lost, the data can still be accessed and recovered using the available subset of encrypted data shares. In some embodiments, a removable storage device such as USB access key 5004 may be required at the end user device 5002 for authenticating the identity of a remote user who wishes to view, encrypt, or decrypt data that is managed by processor 5001 of private cloud 5008. In some embodiments, a removable storage device such as USB token 5004 may be required at the end user device 5002 to initiate the encryption, decryption, or splitting of data by processor 5001 of private cloud 5008. In some embodiments, data is split using any suitable information dispersion algorithm (IDA). In some embodiments, data is first randomized prior to splitting. In some embodiments, a user may manage their cryptographic keys themselves. In these embodiments, a user's keys may be stored on a user's end device such as USB token 5004 or end-user device 5002. In other embodiments, any suitable centralized or dispersed key management system may be used to manage a user's or work groups' cryptographic keys.

In some embodiments, to allow for data viewing and/or reconstruction at each of a plurality of distinct end-user devices, one or more cryptographic keys and/or one or more data shares may be stored on the USB memory device 5004. In addition, one or more of the data shares may also be stored on a cloud 5010 and/or 5012. Thus, a user in possession of the portable user device may access the USB memory device 5004 from a different end user device than device 5002 to view and/or rebuild the data from the shares dispersed across the USB memory device 5004 and if necessary, the cloud. For instance, two data shares may be stored on USB memory device 5004 and two data shares may be stored in each of clouds 5010 and 5012. A user in possession of USB memory device 5004 may use any computing device with the secure parser of the present invention coupled to USB memory device 5004 to access the two data shares stored on device 5004. For example, a user may use a first laptop computer to create and disperse the shares across the USB memory device 5004 and the cloud, and may then use a second, different laptop computer to retrieve the shares from the USB memory device 5004 and/or the clouds 5010 and 5012, and then reconstruct/rebuild the data from the retrieved shares.

In some embodiments, the secure parser of the present invention may provide confidentiality, availability, and integrity of stored data by ensuring that a lost or stolen device's data remains secure and undecipherable. In some embodiments, the present invention may include software running at the kernel level in the background of any Windows or Linux enabled PC or end user device (e.g., mobile phone, laptop computer, personal computer, tablet computer, smart phone, set-top box, etc.). In some embodiments, a secure parser such as Security First Corp.'s FIPS 140-2 certified, Suite B compliant, SecureParser Eχtended (SPχ) may be used to split the data to be secured. In some embodiments, FIPS 140-2 AES 256 encryption, random bit data splitting, integrity checking and re-encrypting split shares is performed. In some embodiments, the data is split using any suitable information dispersion algorithm (IDA). In some embodiments, the splitting is deterministic. In some embodiments, the data may also be randomized prior to the splitting. In some embodiments, any files stored to a secure location (e.g. the "C:" drive) on a user's end device are invisible without the proper credentials and access. In some embodiments, even the file names cannot be seen or recovered without the requisite cryptographic key and authentication process.

Figure 51:
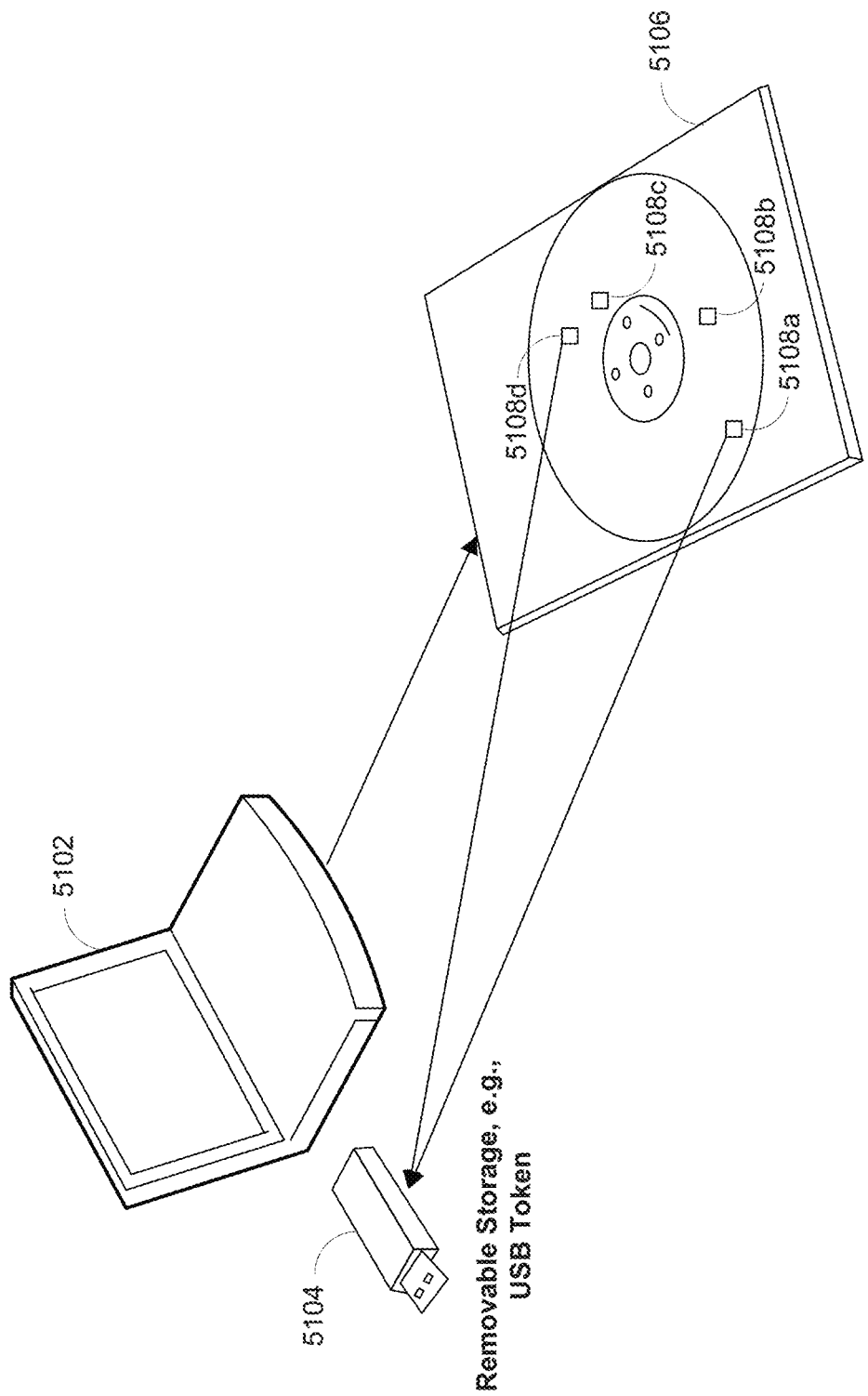
FIG. 51 is a schematic of an illustrative arrangement in which the secure data parser is used to secure data storage in a user's removable storage device in accordance with one embodiment of the present invention.
Figure 52:
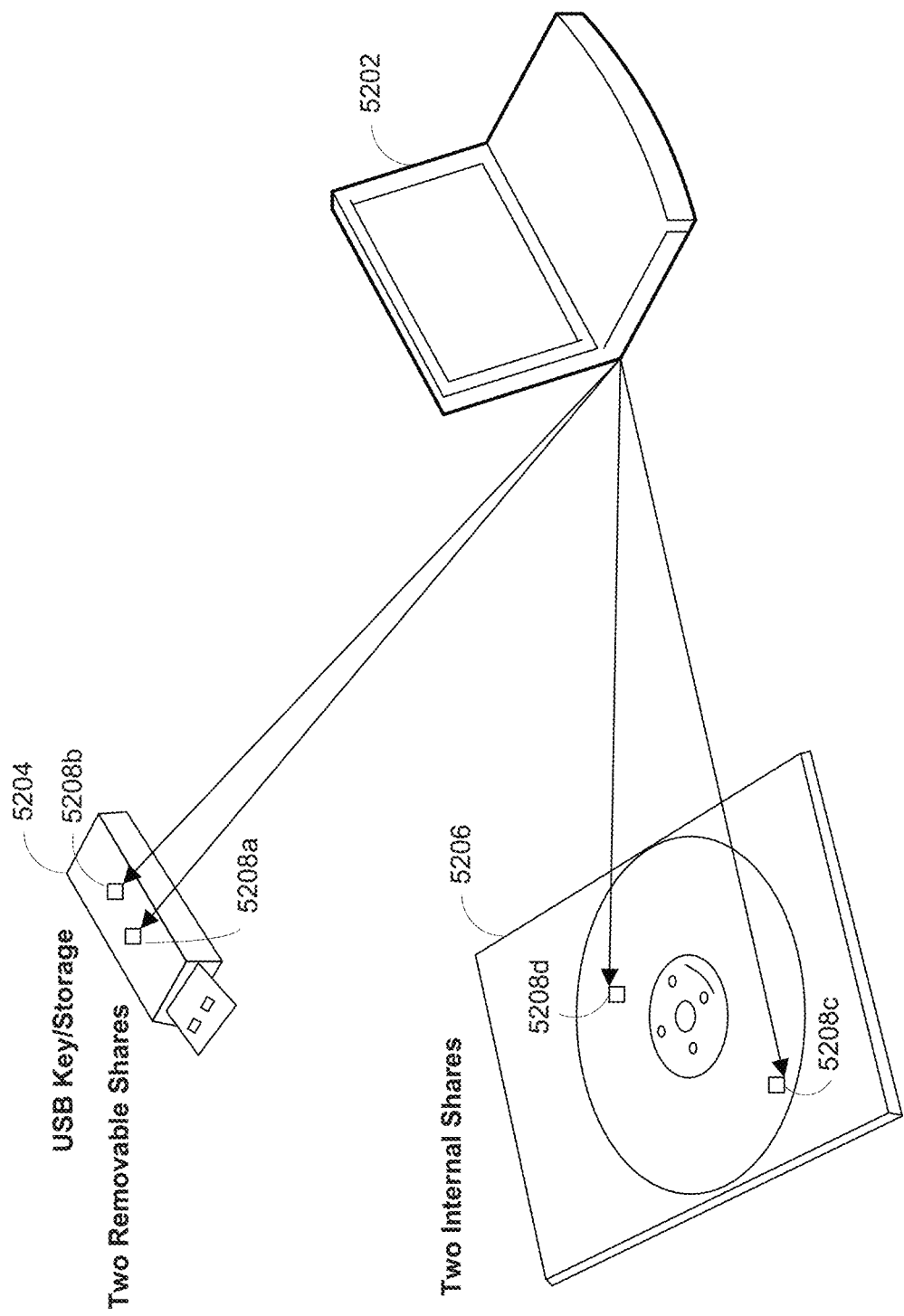
FIG. 52 is a schematic of an illustrative arrangement in which the secure data parser is used to secure data storage in a plurality of user storage devices in accordance with one embodiment of the present invention.
Figure 53:
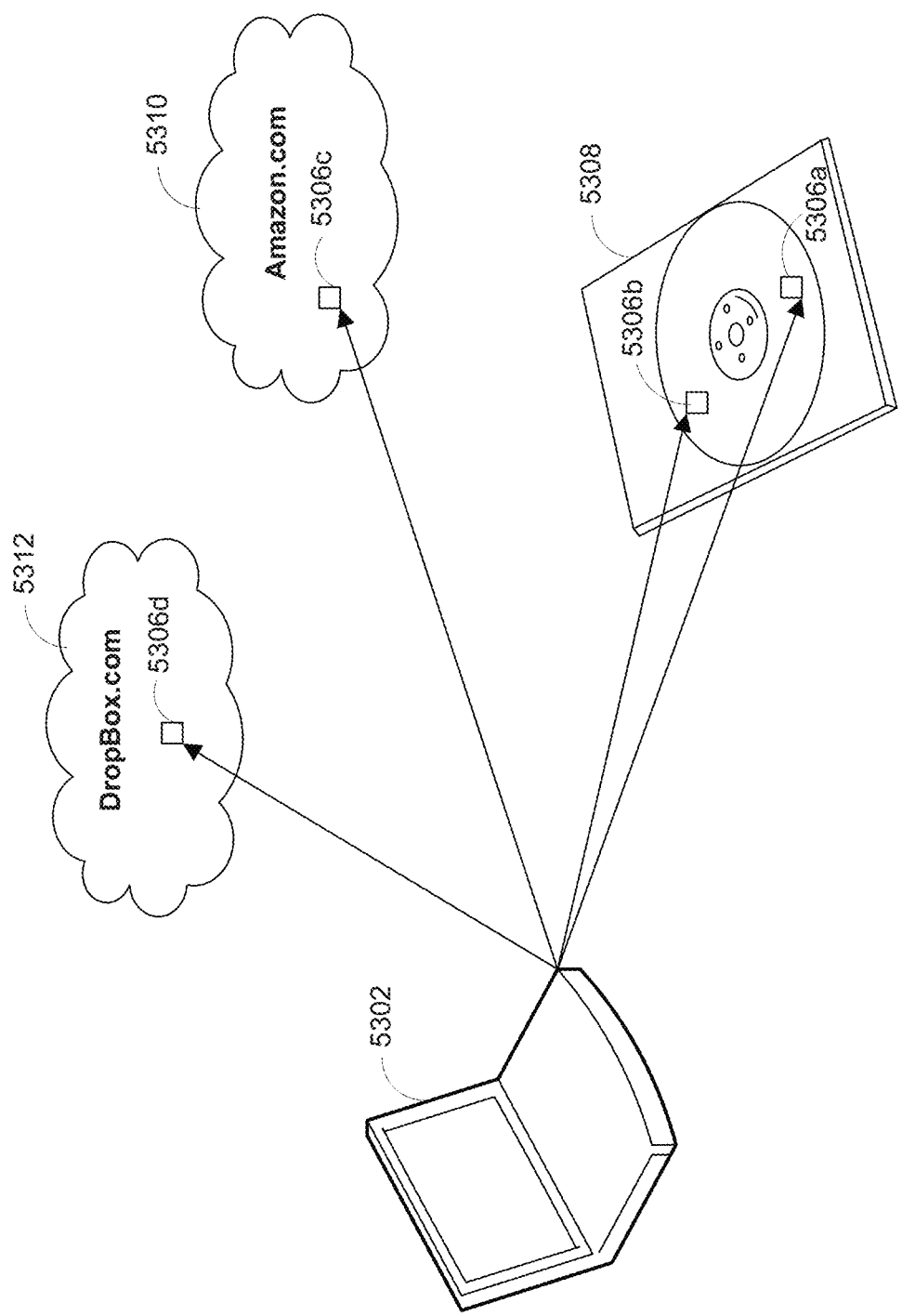
FIG. 53 is a schematic of an illustrative arrangement in which the secure data parser is used to secure data storage in a plurality of public and private clouds and at least one user storage device in accordance with one embodiment of the present invention.

In some embodiments, a set of N shares are created and the secure parser of the present invention stores these N shares in N separate, possibly geographically-dispersed storage locations. For instance, four (4) encrypted shares may be created and the secure parser of the present invention then stores these four encrypted shares in four (4) separate storage locations. FIGS. 51-53 illustrate two such embodiments, in which four encrypted shares are created, of the secure parser of the present invention.

FIG. 51 is a schematic of an illustrative arrangement in which the secure data parser is used to secure data storage in a user's removable storage device 5104 and on mass storage device 5106 in accordance with one embodiment of the present invention. FIG. 51 shows an end user device such as a laptop computer 5102 that has generated four encrypted shares 5108a, 5108b, 5108c, and 5108d. Each of these encrypted shares 5108a-d is stored in a different storage sector within mass storage device 5106 of the end user device 5102. The secure parser of the end-user device simultaneously secures data while providing robust data survivability from disasters because only M of N parsed shares will be required to rebuild the data, where M<N. In the embodiment of FIG. 51, there are 4 shares, and 2 or 3 of these shares would be required to re-construct the data. Assuming that only two of the four, or three of the four, encrypted shares are required to re-construct the data, the disaster recovery process is accelerated if one or two of the encrypted shares are lost, e.g., if one of the sectors of mass storage 5106 is corrupted. The removable storage device 5104 may be used to store one or more cryptographic access keys that may be required in order to view and/or decrypt and/or encrypt data within the mass storage 5106 of the end user device 5102. In some embodiments, without the cryptographic key on the removable storage device 5104, the encrypted data shares 5108a-d cannot be decrypted and/or reconstituted. In some embodiments, a user may manage their cryptographic keys themselves. In these embodiments, a user's keys may be stored on a user's end device such as removable storage device (e.g., USB memory) 5104 or end-user device 5102. In other embodiments, any suitable centralized or dispersed key management system may be used to manage a user's or work groups' cryptographic keys.

In some embodiments, to allow for data viewing and/or reconstruction at each of a plurality of distinct end-user devices, one or more cryptographic keys and/or one or more data shares may be stored on the USB memory device 5104. In addition, one or more of the data shares may also be stored on a cloud. Thus, a user in possession of the portable user device may access the USB memory device 5104 from a different end user device than device 5102 to view and/or rebuild the data from the shares dispersed across the USB memory device 5104 and if necessary, the cloud. For instance, two data shares may be stored on USB memory device 5104 and two data shares may be stored in end user device 5102. A user in possession of USB memory device 5104 may use any computing device with the secure parser of the present invention coupled to USB memory device 5104 to access the two data shares stored on USB memory device 5104. For example, a user may use a first laptop computer to create and disperse the shares across the USB memory device 5104 and the end user device 5102, and may then use a second, different laptop computer to retrieve the shares from the USB memory device 5104 and, assuming these two shares are sufficient for reconstructing the data, reconstruct/rebuild the data from these two shares.

FIG. 52 is a schematic of an illustrative arrangement in which the secure data parser is used to secure data storage in a plurality of user storage devices in accordance with one embodiment of the present invention. FIG. 52 shows an end user device such as a laptop computer 5202 that has generated four encrypted shares 5208a, 5208b, 5208c, and 5208d. Each of these encrypted shares 5208a-d is stored in geographically dispersed storage location and/or different parts of the same storage location. In particular, encrypted shares 5208c and 5208d are stored in two different sectors on mass storage device 5206 of the laptop computer 5202, while encrypted shares 5308a and 5308b are each stored on a removable storage device such as USB memory device 5204. The secure parser of the end-user device simultaneously secures data while providing robust data survivability from disasters because only M of N parsed shares will be required to rebuild the data, where M<N. In the embodiment of FIG. 52, there are 4 shares, and 2 or 3 of these shares would be required to re-construct the data. Thus, the encrypted shares are geographically and physically dispersed, and assuming that only two of the four, or three of the four encrypted shares are required to re-construct the data, the disaster recovery process is accelerated if one or two of the encrypted shares are lost. Such a loss may occur, e.g., if one of the sectors of mass storage 5202 is corrupted, or if the removable storage device such as USB memory device 5204 is lost, or any combination thereof.

In some embodiments, instead of or in addition to storing encrypted shares on the USB memory device 5204, one or more keys (e.g., encryption key, split key, or authentication key) are stored on the USB memory device 5204. These keys may be used to split, encrypt/decrypt, or authenticate shares of data stored on the USB memory device 5204 itself, or elsewhere, e.g., in the end-user device mass storage 5202 or in a public or private cloud storage. For example, a user may store a key on USB memory device 5204 and use this key to decrypt encrypted shares of data stored on mass storage device 5202. As a further illustrative example, two data shares may be stored on USB memory device 5204 and two data shares may be stored in end user device mass storage 5202. A user in possession of USB memory device 5204 may use any computing device with the secure parser of the present invention coupled to USB memory device 5204 to access the key stored on USB memory device 5204. For example, a user may use a first laptop computer to store the key within USB memory device 5204, and may then use a second, different laptop computer to retrieve the key from the USB memory device 5204. This key may then be used to encrypt/decrypt, split, or authenticate data.

In some embodiments, to allow for data viewing and/or reconstruction at each of a plurality of distinct end-user devices, one or more cryptographic keys and/or one or more data shares may be stored on the USB memory device 5204. In addition, one or more of the data shares may also be stored on a cloud. Thus, a user in possession of the portable user device may access the USB memory device 5204 from a different end user device than device 5202 to view and/or rebuild the data from the shares dispersed across the USB memory device 5204 and if necessary, the cloud. For instance, two data shares may be stored on USB memory device 5204 and two data shares may be stored in end user device 5202. A user in possession of USB memory device 5204 may use any computing device with the secure parser of the present invention coupled to USB memory device 5204 to access the two data shares stored on USB memory device 5204. For example, a user may use a first laptop computer to create and disperse the shares across the USB memory device 5204 and the end user device 5202, and may then use a second, different laptop computer to retrieve the shares from the USB memory device 5204 and, assuming these two shares are sufficient for reconstructing the data, reconstruct/rebuild the data from these two shares.

FIG. 53 is a schematic of an illustrative arrangement in which the secure data parser is used to secure data storage in a plurality of public and private clouds and at least one user storage device in accordance with one embodiment of the present invention. FIG. 53 shows an end user device such as a laptop computer 5302 that has generated four encrypted shares 5306a, 5306b, 5306c, and 5306d. Each of these encrypted shares 5306a-d is stored in geographically dispersed storage location and/or different parts of the same storage location. In particular, encrypted shares 5306a and 5306b are stored in two different sectors on mass storage device 5308 of the laptop computer 5302, while encrypted share 5306c is stored, by transmission over a secure network connection, in a publicly accessible cloud storage such as Amazon's S3 cloud storage 5310, and encrypted share 5306d is stored, by transmission over a secure network connection, in a publicly accessible cloud storage such as Dropbox's cloud storage 5312. In this manner, the encrypted shares are geographically and physically dispersed, and assuming that only two of the four, or three of the four, encrypted shares are required to re-construct the data, the disaster recovery process is accelerated if one or two of the encrypted shares are lost. Such a loss may occur, e.g., if one of the sectors of mass storage 5308 is corrupted, or if the internet connection between the end user device 5302 and the clouds 5310 and 5312 is lost.

In each of the embodiments of FIGS. 51-53, the encrypted data share generation process splitting process is transparent to the user. Furthermore, the secure parser of the present invention simultaneously secures data while providing robust data survivability from disasters because only M of N parsed shares will be required to rebuild the data, where M<N. For example, in some of the embodiments described above, only two (2) or three (3) of the four (4) parsed shares would be needed to re-construct or rebuild the data. If a hard drive's sector fails, or a removable USB device is lost, or a remote storage location is down or inaccessible, the data can still be accessed and recovered. Furthermore, if a failed drive's share is recovered, or if a share is stolen, goes off-line or is hacked into, the data may remain safe and protected since any single parsed share contains no forensically discernable information. In other words, a single parsed share cannot be reconstituted, decrypted, hacked or recovered without first having the corresponding second and/or third shares, proper user authentication, the secure parser of the present invention, and in some cases, the USB key or USB memory device.

In some embodiments, the secure parser of the present invention may be used in a mobile device such as an Apple iPad, a RIM Blackberry, an Apple iPhone, a Motorola Droid phone, or any suitable mobile device. Those skilled in the art will come to realize that the systems and methods disclosed herein are application to a variety of end user devices, including but not limited to mobile devices, personal computers, tablet computers, smart phones and the like.

Figure 54:
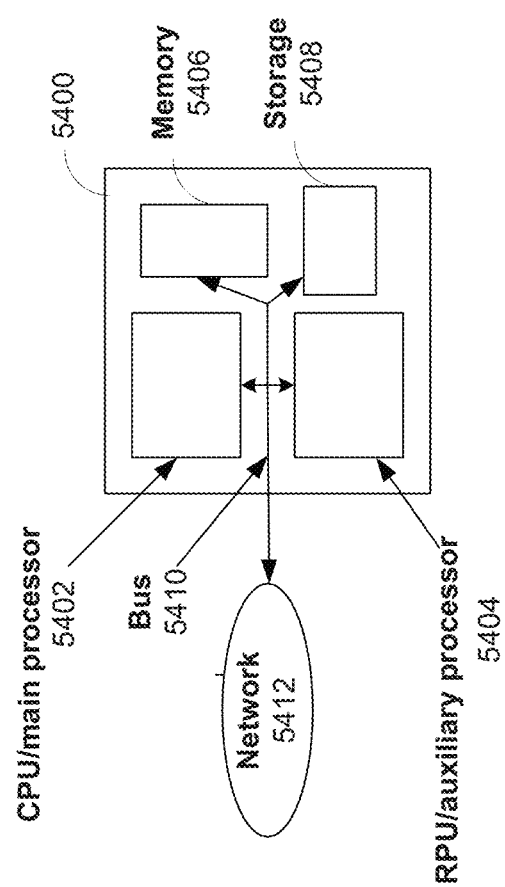
FIG. 54 is a schematic of a co-processor acceleration device for the secure data parser in accordance with one embodiment of the present invention.
Figure 55:
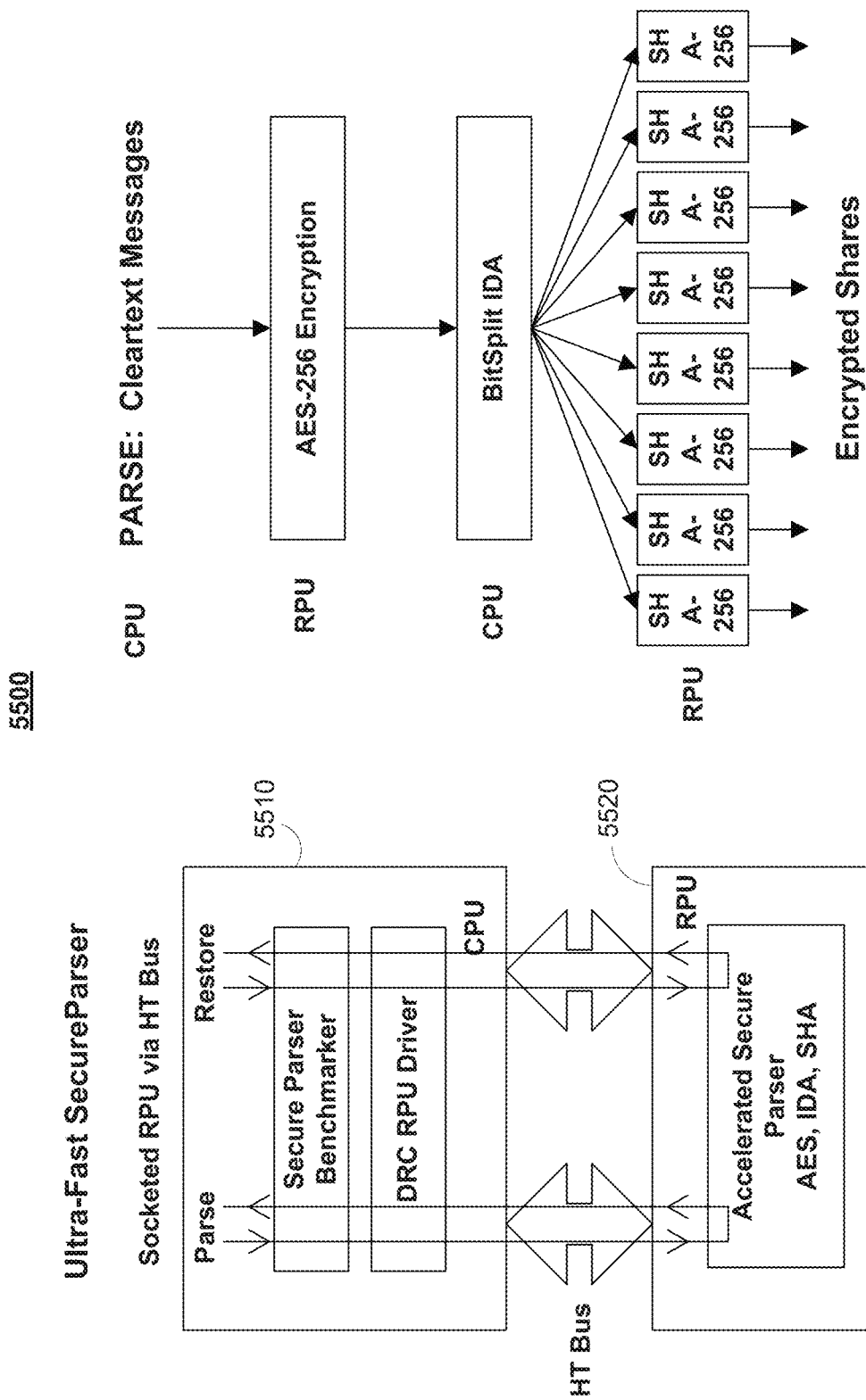
FIG. 55 is a first process flow diagram of an illustrative acceleration process using the co-processor acceleration device of FIG. 54 for the secure data parser in accordance with one embodiment of the present invention.
Figure 56:
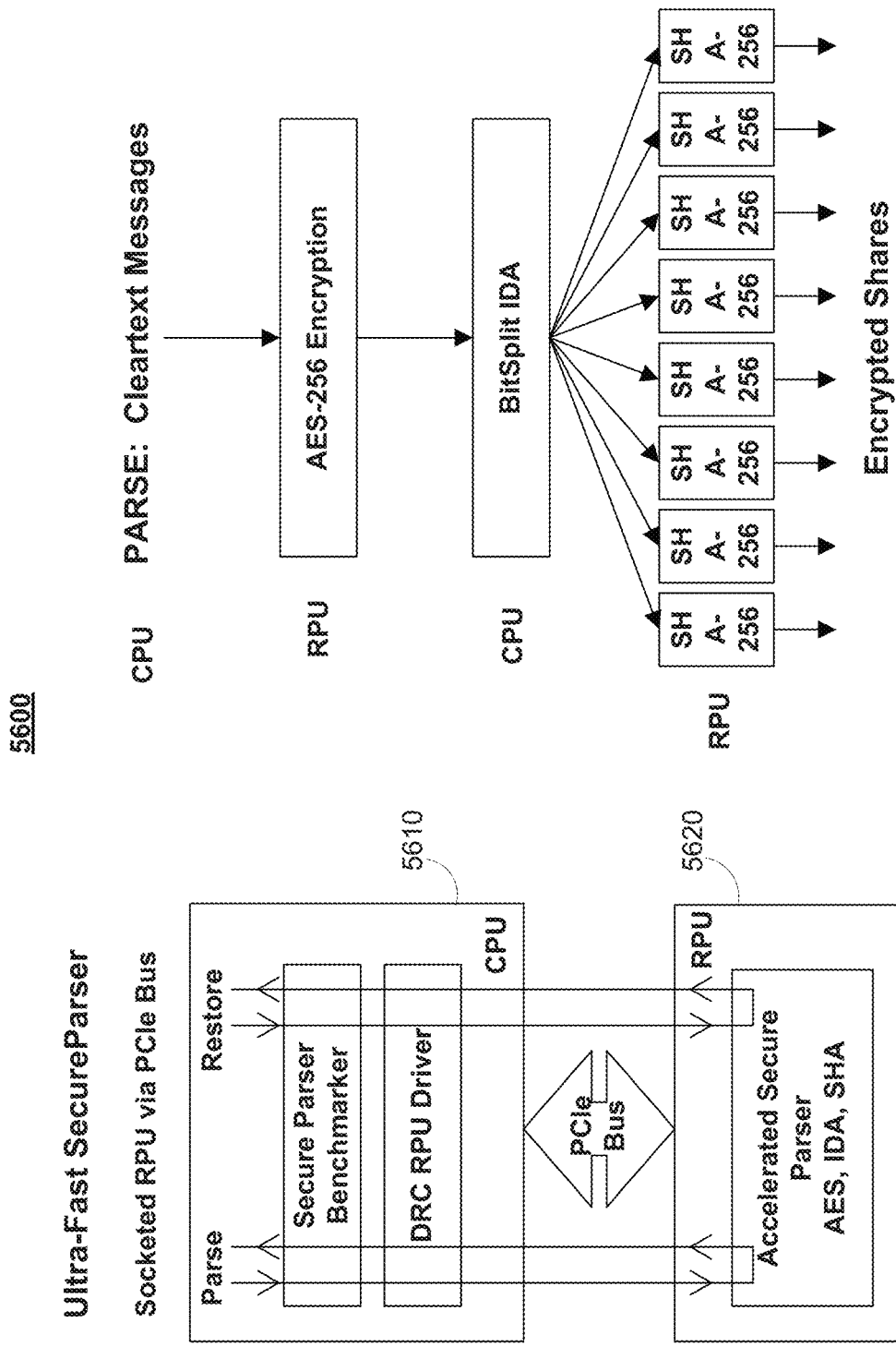
FIG. 56 is a second process flow diagram of an illustrative acceleration process using the co-processor acceleration device of FIG. 54 for the secure data parser in accordance with one embodiment of the present invention.

The secure parser of the present invention may be implemented using one or more processors, each of which performs one or more of the secure parser functions such as key generation, data encryption, share generation, data decryption, etc. In some embodiments, splitting data includes cryptographically splitting data, e.g., random bit splitting. In some embodiments, the data is split using any suitable information dispersal algorithm (IDA). The processor(s) may be any suitable processors, e.g., Intel or AMD, and may run a back end for a server based platform. In some embodiments, one or more dedicated coprocessors may be used to accelerate the operation of the secure parser of the present invention. In the embodiments of FIGS. 54-56 described below, one or more functions of secure parser of the present invention are implemented on one or more dedicated co-processors, which allows for the acceleration of the secure parser functions. In some embodiments, the coprocessors may be included in a main motherboard or in a daughterboard, or any suitable combination thereof, of the secure parser hardware platform.

FIG. 54 is a schematic of a co-processor acceleration device 5400 for the secure data parser in accordance with one embodiment of the present invention. Device 5400 includes two processors: central processing unit (CPU) or main processor 5402 and rapid processing unit (RPU) or auxiliary processor 5404. Processors 5402 and 5404 are coupled to one another, and also coupled to a memory device 5406 and mass storage device 5408. The coupling of these devices may include the use of an interconnect bus. Each of the CPU and RPU may include a single microprocessor or a plurality of microprocessors for configuring the CPU and/or RPU as a multiprocessor system. Memory 5406 may include dynamic random access memory (DRAM) and/or high-speed cache memory. Memory 5406 may include at least two dedicated memory devices, one for each of CPU 5402 and RPU 5404. Mass storage device 5408 may include one or more magnetic disk or tape drives or optical disk drives, for storing data and instructions for use by the CPU 5402 and/or RPU 5406. Mass storage device 5408 may also include one or more drives for various portable media, such as a floppy disk, a compact disc read only memory (CD-ROM), DVD, a FLASH drive, or an integrated circuit non-volatile memory adapter (i.e. PC-MCIA adapter) to input and output data and code to and from the CPU 5402 and/or RPU 5406. The CPU 5402 and/or RPU 5406 may each also include one or more input/output interfaces for communications, shown by way of example, as the communications bus 5410. Communications bus may also include an interface for data communications via the network 5412. The network 5412 may include one or more storage devices, e.g., cloud storage devices, NAS, SAN, etc. The interface to the network 5412 via the communications bus 5410 may be a modem, a network card, serial port, bus adapter, or any other suitable data communications mechanism for communicating with one or more systems on-board the aircraft or on the ground. The communication link to the network 5412 may be, for example, optical, wired, or wireless (e.g., via satellite or cellular network).

In some embodiments, RPU may include a redundant array of independent disks (RAID) processing unit that implements one or more RAID functions for one or more storage devices associated with the co-processor acceleration device 5400. In some embodiments, RPU 5404 may include a general purpose or special purpose integrated circuit (IC) to perform array built calculations and/or RAID calculations. In some embodiments, the RPU 5404 may be coupled to the CPU 5402 via a PCIe connection such as a PCIe bus coupled to the RPU. If RPU includes a RAID processing unit, then the PCIe connection may include a specialized RAID adapter. In some embodiments, the PCIe card may run at 10 Gigabits/sec (Gb/s) or more. In some embodiments, the RPU 5404 may be coupled to the CPU 5402 via an HT connection, such as a socketed RPU connected to an HT bus. The processors 5402 and 5404 will typically access the same memory and mass storage devices such that the same data is accessible to both these processors. The coprocessor may perform dedicated secure parsing accelerated functions including, but not limited to, data splitting, encryption, and decryption. These functions are independent of one another, and may be performed using different algorithms. For example, encryption may be performed using any of the abovedescribed techniques, while splitting may be performed using any suitable information dispersal algorithm (IDA), such as those described above. In some embodiments, the RPU may be coupled to a Field Programmable Gate Array (FPGA) device that could also perform dedicated accelerated functions of the secure parser of the present invention external to the coprocessor acceleration device 5400.

FIG. 55 is a first process flow diagram of an illustrative acceleration process using the co-processor acceleration device 5400 of FIG. 54 for the secure data parser in accordance with one embodiment of the present invention. With continued reference to FIGS. 54 and 55, in this illustrative embodiment, the RPU 5510 may be coupled to the CPU 5520 via an HT connection, such as a socketed RPU via an HT bus. The left side of FIG. 55 illustrates that certain functions of the secure parser such as the data splitting and share generation functions (3910 and 3912 in FIG. 39) may be performed by the CPU, while other functions such as the encryption (e.g., the AES, IDA, SHA algorithms) (3902, 3904, 3906 in FIG. 39) may be performed by the RPU. These functions of encryption and encryption share generation are shown on the right side of FIG. 55, in which there is an indication of whether the CPU or RPU performs a particular secure parser function.

FIG. 56 is a second process flow diagram of an illustrative acceleration process using the co-processor acceleration device 5400 of FIG. 54 for the secure data parser in accordance with one embodiment of the present invention. With continued reference to FIGS. 54 and 56, in this illustrative embodiment, the RPU 5610 may be coupled to the CPU 5620 via an HT connection, such as a socketed RPU via an HT bus. The left side of FIG. 56 illustrates that certain functions of the secure parser such as the data splitting and share generation functions (3910 and 3912 in FIG. 39) may be performed by the CPU, while other functions such as the encryption (e.g., the AES, IDA, SHA algorithms) (3902, 3904, 3906 in FIG. 39) may be performed by the RPU. These functions of encryption and encryption share generation are shown on the right side of FIG. 55, in which there is an indication of whether the CPU or RPU performs a particular secure parser function.

With respect to the embodiments in FIGS. 48-56 describing the server-based solution of the secure parser of the present invention, there are several additional functions and characteristics of the secure parser of the present invention that may be enabled or provided by the server-based solution. In addition to performing cryptographic splitting and data share rebuilding, other functionality may be included such as block level updates of encrypted data shares and cryptographic key management. The description that follows will describe each of these functions. Those skilled in the art will come to realize that this functionality may be easily incorporated into any of the embodiments described with respect to FIGS. 48-56.

In some embodiments, the server-based solution of the secure parser of the present invention allows block level updates/changes to files, instead of updates/changes to the entire data file. In some embodiments, once a data share has been sent from the secure parser to a cloud storage device, in order to operate more efficiently, when the underlying data is updated by a user or workgroup, instead of restoring the entire data file, only the updates at the file block level of particular data shares may be transmitted to the cloud storage device using the cryptographic systems of the present invention. Thus, restoration of an entire data file is not performed nor required when only minor changes are made to the data file.

In some embodiments, the server-based solution of the secure parser of the present invention generates a stub for each of the data shares. In some embodiments, a stub may include a list of attributes for its associated data share, and is stored together with the data share. In some embodiments, a stub may include information about the data share including, e.g., the name of a data share, the date the data share was created, the last time the data share was modified, a pointer to the location of the data share within the file system of a storage device, etc. Such information could be used to quickly provide a user with information regarding the data shares. In some embodiments, a user may designate a stub directory which stores the stubs. For instance, a user may designate a particular virtual or physical drive on their storage device on which the stub directory should be stored. For instance, a stub directory may be created for a user, wherein each of the stubs in the directory points the user to secure data stored by the secure parser in a mass storage device, removable storage device, public cloud, private cloud, or any combination thereof. In this manner, stubs may be utilized to generate a virtual file system of data shares for a user.

In some embodiments, the stubs may be stored in a separate location from the data shares, in the same location as the data shares, or both. In some embodiments, when a user wishes to view some information on the data shares, they may access the stub directory. In some embodiments, instead of directly viewing the stub directory, the stubs are retrieved from the stub directory, processed by the server-based solution of the secure parser of the present invention, and subsequently used to provide the aforementioned information to the user. In this manner, stubs may be utilized to generate a virtual file system of data shares for a user.

In some embodiments, the stubs are stored in the respective headers of the data shares. Thus, if a user wishes to view the information in a stub, the stub is retrieved from the header, processed by the server-based solution of the secure parser of the present invention, and subsequently a stub directory is generated and provided to the user.

In some embodiments, the server-based solution of the secure parser of the present invention frequently checks the stub(s) and/or encrypted data shares for data integrity using the above described techniques. The secure parser of the present invention is essentially proactive in retrieving and examining data shares for data integrity, even when not initiated or prompted by a user. If a data share or stub is missing or damaged, the secure parser of the present invention attempts to recreate and restore the stub or data share.

The server-based solution of the secure parser of the present invention may be configured to provide a centralized cryptographic key management facility. In particular, cryptographic keys used to encrypt/decrypt data, data shares and communication sessions across a plurality of storage devices and systems may be stored in a central location within an enterprises' storage facility, e.g., an enterprises' private cloud. This centralized key management facility may also interface with hardware-based key management based solutions such as those provided by SafeNet, Inc., Belcamp, Md., or with software-based key management systems. For instance, an existing private cloud may control access to encrypted shares of data via an authentication/access/authorization system, and the server-based solution may use the authentication information to allow access to the cryptographic keys used to encrypt those shares, thereby allowing a user to cryptographically split data, or restore the encrypted shares of data. In other words, the server-based solution of the secure parser of the present invention may act in conjunction with an existing authentication/access/authorization system. In this manner, an enterprise is not forced to change its current way of managing users' and work groups' access to data.

Figure 57:
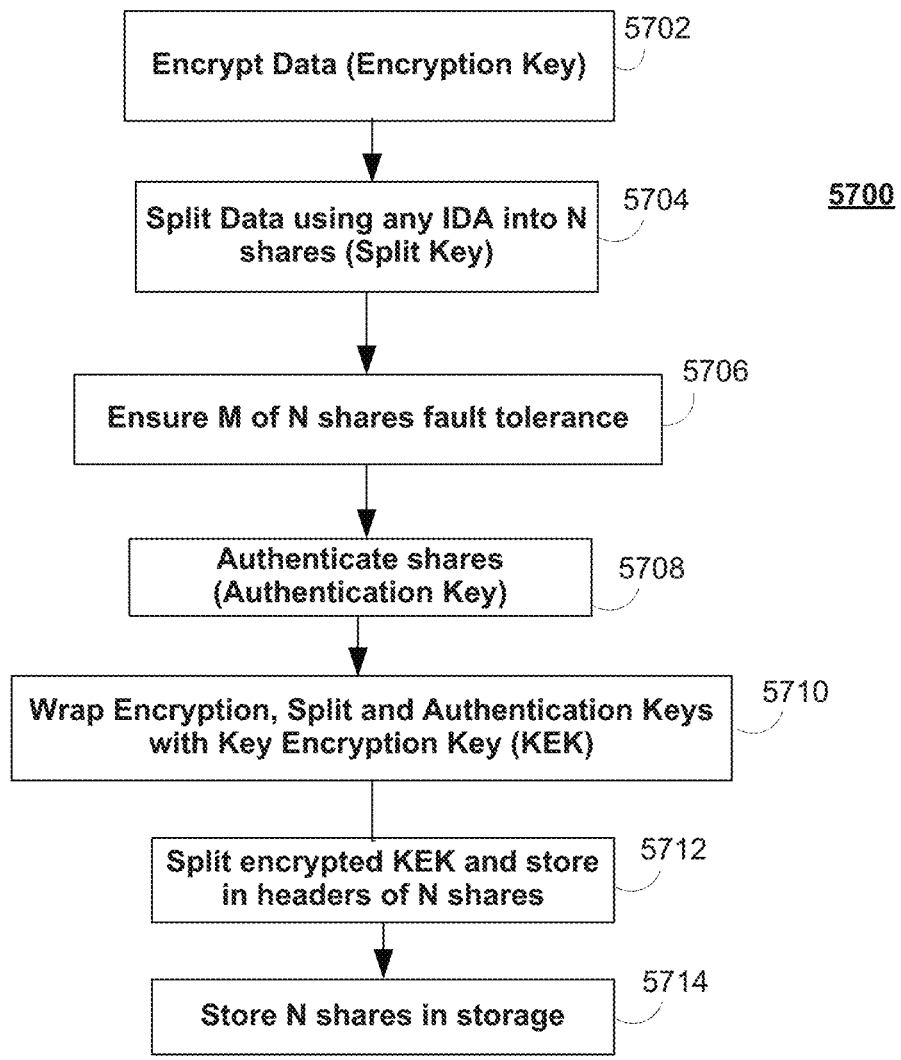
FIG. 57 illustrates a process by which data is split into N shares and stored, according to an illustrative embodiment of the present invention.
Figure 58:
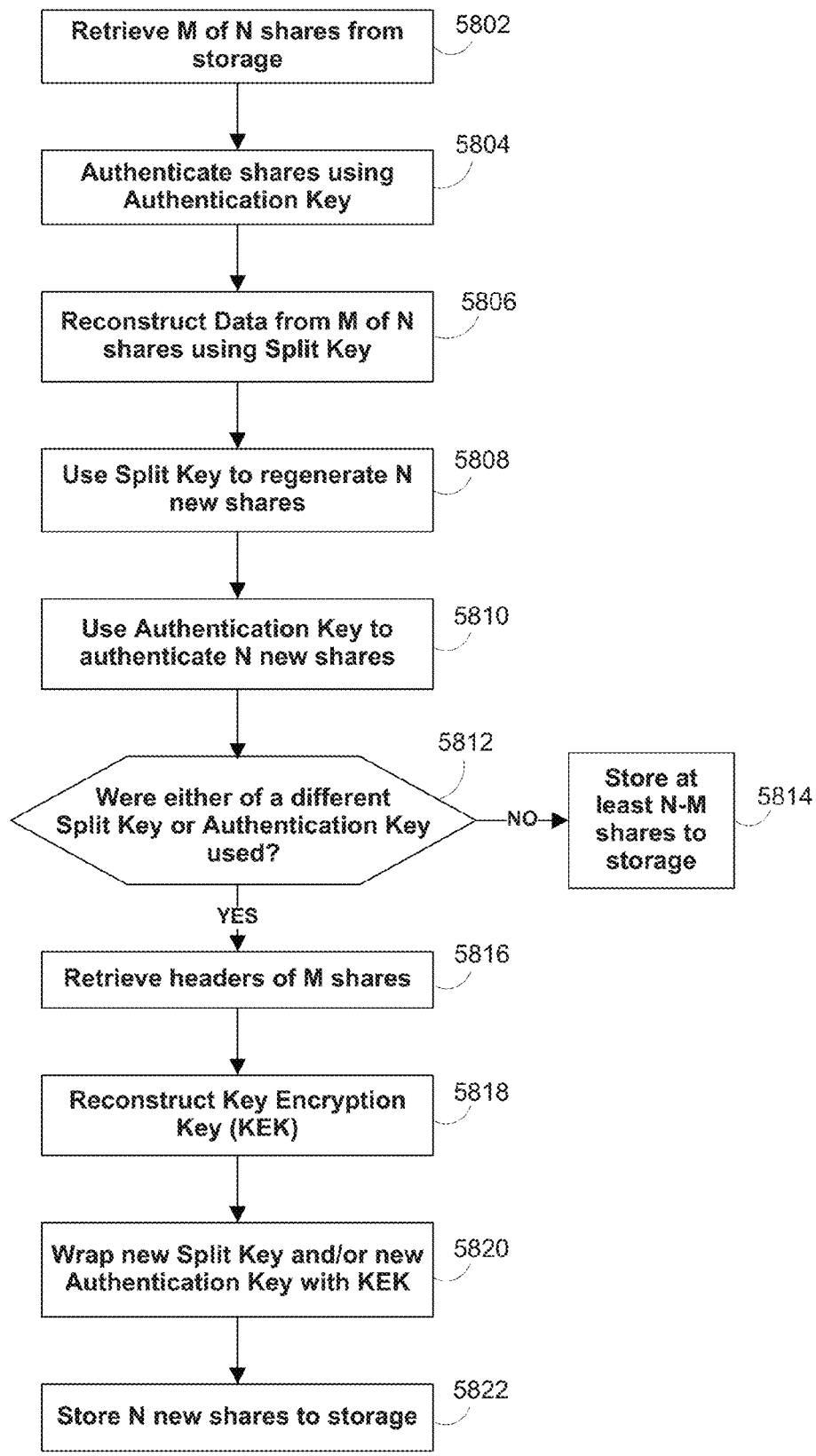
FIG. 58 illustrates a process by which shares of data are rebuilt and/or re-keyed, according to an illustrative embodiment of the present invention.

In some embodiments, the server-based solution of the secure parser of the present invention may perform share rebuilding without decrypting any of the encrypted data shares. In some embodiments, the server-based solution of the secure parser of the present invention may re-generate splits of data using one or more new keys without decrypting any of the encrypted data shares. FIG. 57 illustrates a process 5700 by which data is split into N shares and stored, according to an illustrative embodiment of the present invention. FIG. 58 illustrates a process by which shares of data are rebuilt and/or re-keyed, according to an illustrative embodiment of the present invention. In each of FIGS. 57 and 58 each of the steps of the process may be optional. For instance, it is not necessary to encrypt data prior to splitting the data.

With reference to FIG. 57, the secure parser first encrypts the data using an encryption key (5702). The encryption key may be generated internally within the secure parser of the present invention. The encryption key may be generated based at least in part on an external workgroup key. The secure parser then splits the data into N shares using a split key (5704). The split key may be generated internally within the secure parser of the present invention. The split key may be generated based at least in part on an external workgroup key. The secure parser then ensures that only M of N shares will be required to rebuild the data (5706) and authenticates the N shares using an authentication key (5708). The authentication key may be generated internally within the secure parser of the present invention. The authentication key may be generated based at least in part on an external workgroup key. The authentication, split, and encryption keys are each wrapped using a key encryption key (5710). The KEK is then split and stored within the headers of the N shares (5712). The N shares are then dispersed across N storage locations.

In some instances, it is desirable for a user or an enterprise to use a new split key and/or a new authentication key for a set of data shares. With the server-based solution of the secure parser of the present invention, this re-keying of the data may be performed without decrypting any of the data shares. In other instances, it is desirable for a user or an enterprise to regenerate a set of new data shares because one or more existing data shares have been corrupted, lost or otherwise inaccessible. With the server-based solution of the secure parser of the present invention, this rebuilding of the lost data shares may be performed without decrypting any of the remaining, available data shares. With reference to FIG. 58, assuming that N-M shares of data are corrupted or otherwise inaccessible, the secure parser retrieves the remaining M of N shares from their storage locations (5802). These M shares are authenticated using an authentication key (5804). Using the authenticated M shares, the encrypted data is reconstructed by the secure parser (5806). The split key is then used to regenerate the N shares (5808), and the authentication key is used to authenticate the N shares (5810). If a different split key or authentication key were used (5812) for steps 5808 or 5810, then the headers of each of the M shares are retrieved (5816), the key encryption key is reconstructed (5818), and similar to the processes of steps 5710 and 5712 (FIG. 57), the new split key and/or authentication key are wrapped/encrypted using the key encryption key (5820). The N shares are then stored in one or more storage devices of the secure parser of the present invention (5822). If a different split key or authentication was not used (5812) in steps 5808 or 5810, then the lost/inaccessible N-M shares are stored in one or more storage devices of the secure parser of the present invention (5814).

The server-based solution of the secure parser of the present invention may be configured to secure the file name of a data share, such as the data shares described in relation to the embodiments of FIGS. 42-58 above. In some embodiments, when splitting a file into N data shares, e.g., using an IDA, the generated data shares are stored on one or more share locations in a storage network. The storage network may include a private cloud, a public cloud, a hybrid cloud, a removable storage device, a mass storage device, or any combination thereof. In many applications, there will be more than one file that is split and stored in a share location in the storage network. In other words, there may be several files, each of which may be split into N data shares (e.g., using an IDA), where each of the generated data shares may be stored as files on the share locations. In these applications, it is advantageous to have a unique identifier such as a file name that associates a data share in a share location with the file from it was generated.

In some embodiments, the secure parser of the present invention may be configured to use a portion of the file name of the original file (i.e., the file that is to be split) to name the data shares with the same name as the original file. As an illustrative example, if an original file "2010Budget.xls" is split into 4 data shares, these data shares may be named "2010Budget.xls.1", "2010Budget.xls.2", "2010Budget-.xls.3" and "2010Budget.xls.4", thereby associating each generated data share with the original file. By this process, the secure parser of the present invention would efficiently be able to locate the data shares and associate them with the original file. The drawback of this process, however, is that it may expose information such as the fact that the budge information is for year 2010 to a third party. In many applications, exposing the file name in this manner is not acceptable, and thus the file name of a data share cannot be easily associated with the file name of the original file In some embodiments, the secure parser of the present invention may be configured to first secure the file name would be to use an authentication algorithm such as HMAC-SHA256 to hash the file name of the original file into a value that cannot be reversed. The secure parser of the present invention would thus process the file name of the original file with the HMAC-SHA256 algorithm to obtain a "hashed" file name and receive an authentication value that is secure and may not be reversed to the file name of the original file. The file names of the data shares associated with the original file are then generated using this hashed file name instead of the file name of the original file. In these embodiments, in order to locate the data shares (on a storage network) associated with the file name of the original file, the secure parser of the present invention would once again use the HMAC-SHA256 algorithm on the original file name and regenerate the authentication value. In some embodiments, the authentication value for the original file name and the file names of the generated shares are substantially equal. The secure parser of the present invention would then search the share locations on the storage network for data share file names that match this authentication value. The storage network may include a private cloud, a public cloud, a hybrid cloud, a removable storage device, a mass storage device, or any combination thereof. In some embodiments, the full path of the original file name is used so that the authentication value generated for a file with full path, e.g., "\Marketing\2010Budget.xls" is different from the authentication value generated for the file with full path, e.g., "\Sales\2010Budget.xls". In some embodiments, the resulting data share filenames corresponding to each data share location are made different by hashing the full path for a file, the full path including the share location. For instance, by appending the share number of a data share to the full path of the original file, for example "\Sales\2010Budget.xls.1", the resulting data share filenames are different for each data share location.

In some embodiments, the secure parser of the present invention secures the file name of a file by encrypting the full path of the original filename using an encryption algorithm such as AES, as described above. Such encryption ensures that the file name of the original file is secure until it is decrypted by the secure parser of the present invention based on authenticated access to the share locations on a storage network, the retrieved data shares and the encryption key. The storage network may include a private cloud, a public cloud, a hybrid cloud, a removable storage device, a mass storage device, or any combination thereof. As with the above-described example, unique data share filenames for each share location can be created by first appending additional information such as the share number for a data share to the full path of the original file.

In some embodiments, a journaling service may be used to protect against I/O failures, such as read and write failures to a disk. In these embodiments, the journaling service may be used to identify and record each of the data storage operations, such as read and write requests, associated with one or more shares of data stored in one or more share locations. The one or more shares of data may be created from a set of original data using any suitable information dispersal algorithm, such as a keyed IDA. The shares of data may include data jumbled and then split using any suitable randomized or deterministic techniques disclosed above. The share locations may include any suitable data storage facility or combinations of data storage facilities described above, such as a local or networked hard disk, removable storage such as a USB key, or the resources of a cloud storage provider such as DropBox or Amazon S3. In addition, the share locations may store any suitable number of files associated with shares of data. In some embodiments, the journaling service may integrated with a secure data parser, such as secure data parser 3706 of illustrative overview process 3700 of FIG. 37, in order to maintain the health of data on share locations that the secure data parser uses to store data. In some embodiments, the journaling service may be implemented on a general-purpose computer having one or more microprocessors or processing circuitry.

In some embodiments, the journaling service may use one or more logs to record each of the read and write requests to the share locations. This log may be managed centrally on the facilities running the journaling service, or may be located at the share locations themselves. In some embodiments, the log may be a queue data structure that stores information associated with failed data storage operations, such as read and write operations, associated with a particular share location. In some embodiments, a journaling queue may be maintained for each share location associated with the journaling service. The journaling queues may store information for failed data storage operations at the file level, the block level, the bit level, or any suitable level of granularity. In some embodiments, the journaling queue may be maintained in a memory associated with the journaling service, such as the RAM of a server running the journaling service. In some embodiments, the journaling queue may be maintained in disk storage associated with the journaling service. For example, the journaling queue may be maintained in a configuration filed stored on a disk in a server running the journaling service. As will be described below with respect to FIG. 60, in some embodiments the journaling service may leverage both memory and disk storage in order to maintain the journaling queue.

Figure 59:
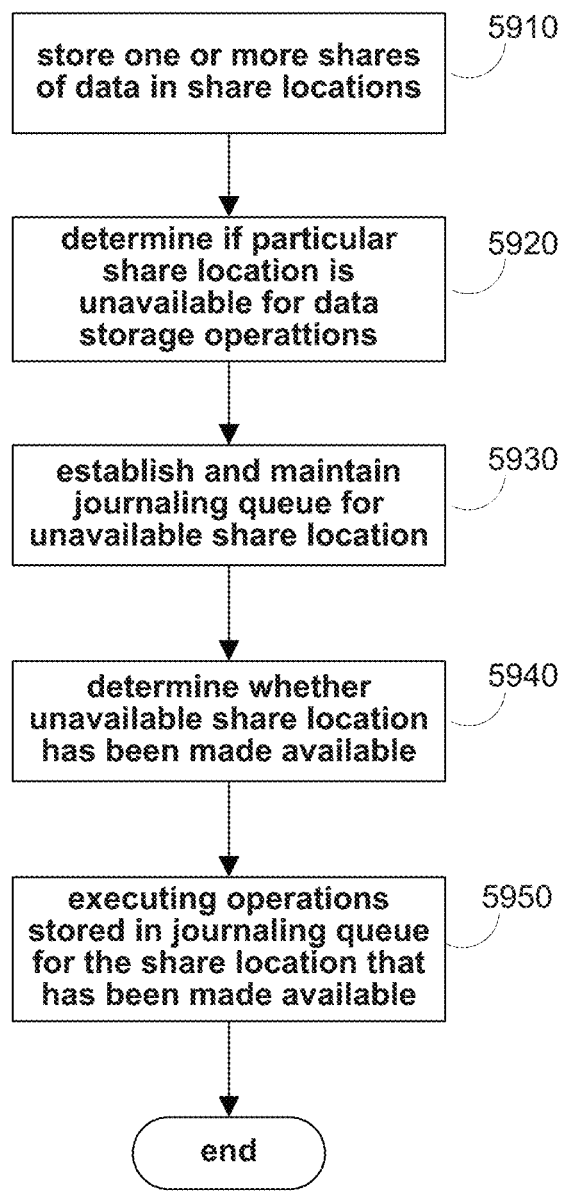
FIG. 59 is an illustrative process for operating a journaling service in an embodiment of the present invention.

FIG. 59 is an illustrative process 5900 for operating a journaling service in an embodiment of the present invention. Process 5900 begins at step 5910. At step 5910, one or more shares of data may be stored in share locations. As discussed above, the one or more shares of data may be created using any suitable IDA, and may include data that has been jumbled and split using any suitable randomized or deterministic technique. Process 5900 then proceeds to step 5920. At step 5920, the journaling service may determine if a particular share location is offline, or unavailable for data storage operations. This determination may result from an attempted data storage operation associated with the particular share location. For example, the journaling service may attempt to write a data share to a particular share location. If the write operation is unsuccessful, the journaling service may receive a notification that that the write operation has failed. Accordingly, the journaling service will mark the particular share location as being unavailable, or offline, for future read or write operations. In some embodiments, the indication that a share location is offline may be stored in any suitable data flag maintained in memory or disk central to the journaling service, or on the data share itself. Process 5900 then proceeds to step 5930.

At step 5930, a journaling queue may be established and maintained for the particular share location that has been designated as offline. In some embodiments, as long as the share location has been designated as offline, the journaling service may store information associated with incoming data storage operations related to the share location in the journaling queue. For example, if a share location has been marked as offline, future read and write operations related to that share location are stored in the journaling queue that has been established for that share location. In some embodiments, each journaling queue maintained by the journaling service may be associated with a unique share location. In addition, each journaling queue maintained by the journaling service may be managed by a separate processing thread. Process 5900 then proceeds to step 5940.

At step 5940, the journaling service may determine whether an offline storage location has been made available. In some embodiments, this determination may be performed by the journaling service constantly monitoring the offline share location for an indication that the share location has been restored. This indication may be a change in a data flag associated with the share location that is caused by, for example, the repair of the share location by the journaling service or an administrator of the journaling service. Process 5900 then proceeds to step 5950.

At step 5950, the journaling service may replay the failed data storage operations stored in the journaling queue for the share location that has been made available. In some embodiments, replaying the failed operations may include executing the failed read and write operations that have been stored in the journaling queue. Once the failed operations stored in the journaling queue have been executed, the journaling service may optionally clear or flush the journaling queue. In flushing the journaling queue, the journaling service may free up any memory or disk resources associated with the journaling queue. Once the failed operations stored in the journaling queue are replayed, process 5900 then ends.

Figure 60:
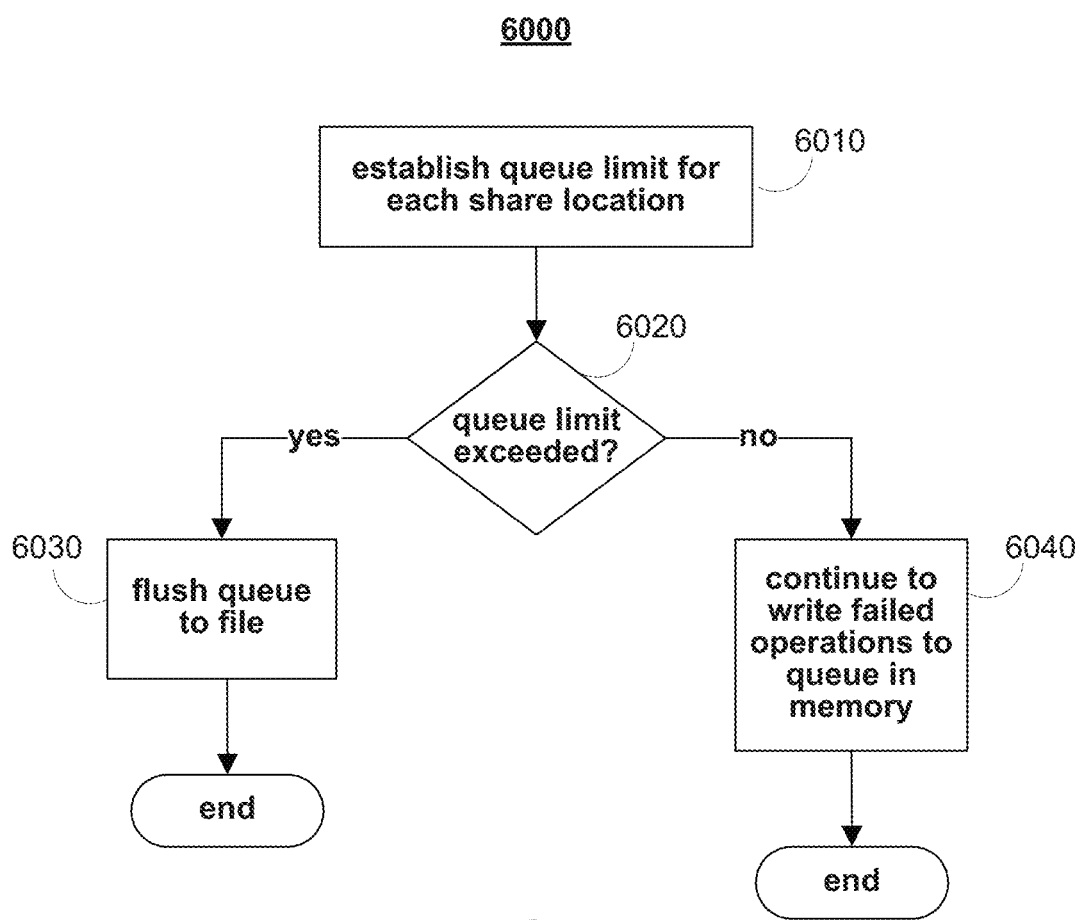
FIG. 60 is an illustrative process for operating a journaling service in an embodiment of the present invention.

FIG. 60 is an illustrative process 6000 for operating a journaling service in an embodiment of the present invention. Process 6000 begins at step 6010. At step 6010, the journaling service may establish a queue limit may for each share location that has an associated journaling queue. This queue limit may specify the maximum number of messages (for example, failed read or write operations) associated with a journaling queue that can be stored in a memory associated with the journaling service. The journaling service may then track the number of messages in each journaling queue by, for example, maintaining a log of the number of messages in each journaling queue. Process 6000 then proceeds to step 6020. At step 6020, the journaling service may determine that the queue limit has been exceeded for a particular journaling queue. For example, the journaling service may determine that the number of failed operations stored in the particular queue exceeds a preconfigured maximum number. If the journaling service determines that the queue limit has been exceeded, process 6000 proceeds to step 6030.

At step 6030, the journaling queue may be flushed, or stored, to a file maintained in disk storage associated with the journaling service. In some embodiments, the file may be maintained in disk storage until the share location becomes available. For example, after the share location becomes available, the journaling service may replay each operation stored in the file, and then remove the file from disk storage. In this manner, the number of failed operations recorded by the journaling service are allowed to surpass the memory limitations of the system running the journaling service. In some embodiments, the contents of the journaling queue that are stored in memory may be flushed to file in the event of a system shutdown (for example, a loss of power to the system running the journaling service). In this manner, the journaling service may recover operations without a loss of data integrity once the system running the journaling service is restored. Process 6000 then ends. If the journaling service determines that the queue limit has not been exceeded, process 6000 proceeds to step 6040. At step 6040, the journaling service may continue to write failed operations to the queue in memory. Process 6000 then ends.

Figure 61:
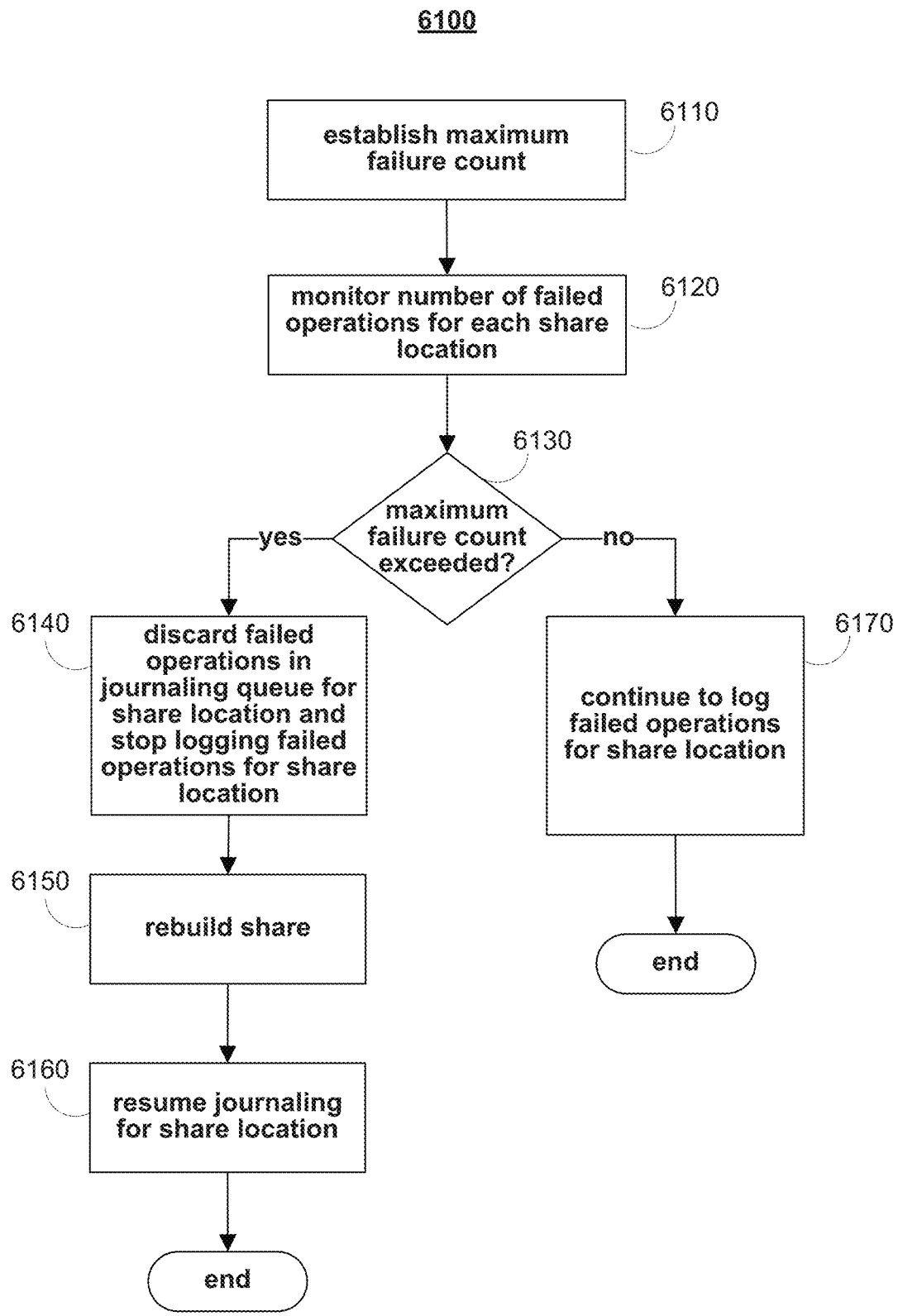
FIG. 61 is an illustrative process for operating a journaling service using a critical failure state in an embodiment of the present invention.

In some embodiments, if too many failed data storage operations are logged for a share location, the journaling service will log a "critical failure" state. This critical failure state may indicate that the integrity of the data within the share location can no longer be trusted and a restore or rebuild operation is required. As will be described with respect to FIG. 61, marking a share location as being in a critical failure state may effectively place an upper limit on the amount of memory and/or disk space used by the system running the journaling service. FIG. 61 is an illustrative process 6100 for operating a journaling service using a critical failure state in an embodiment of the present invention. Process 6100 begins at step 6110. At step 6110, the journaling service establishes a maximum failure count. In some embodiments, this maximum failure count may be a preconfigured number of failed operations that the journaling service is permitted to record in a journaling queue associated with a share location before that share location is marked as being in a critical failure state. Process 6100 then proceeds to step 6120. At step 6120, the journaling service monitors the number of failed operations for each share location. In some embodiments, this monitoring may include the journaling service maintaining a running tally of the number of failed operations stored in the journaling queue for each share location. Process 6100 then proceeds to step 6130.

At step 6130, the journaling service may determine whether the maximum failure count has been exceeded for a particular share location. In some embodiments, the journaling service may perform this determination by comparing a running tally of the number of failed data storage operations stored in a journaling queue associated with the particular share location to the maximum failure count. If the maximum failure count has been exceeded, process 6100 proceeds to step 6140. In some embodiments, if the maximum failure count has been exceeded for a particular share location, the journaling service may mark that share location as being in a critical failure state. In some embodiments, an indication that a share location is in a critical failure state may be stored in any suitable data flag maintained in memory or disk central to the journaling service, or on the data share itself.

At step 6140, the journaling service may discard any failed data storage operations stored in the journaling queue associated with the share location that is in a critical failure state. In some embodiments, the journaling service may discard these failed operations by clearing the journaling queue associated with the share location that is in a critical failure state. Alternatively, the journaling service may delete the entire journaling queue associated with the share location that is in a critical failure state. Additionally, at step 6140 the journaling service may stop logging failed operations associated with the share location that is in a critical failure state. For example, the journaling service may no longer update the journaling queue associated with the share location that is in a critical failure state. Process 6100 then proceeds to step 6150.

At step 6150, the journaling service may rebuild a share location that is in a critical failure state. In some embodiments, the restore functionality of a secure data parser may be used to rebuild a share location. For example, the data stored in the share location that is in a critical failure state may be associated with original data that was split using any suitable information dispersal algorithm into any number of data shares. Each of these data shares may be stored in two or more share locations, such as any suitable combination of a public or private cloud, removable storage device, or mass storage device. As long as the secure parser is able to recover this data from at least one of the other share locations that are online (in other words, not in a critical failure state), then the secure data parser may rebuild the share location. In some embodiments, the share location may be rebuilt from scratch. For example, all files that are to be restored on the share location may be removed before the rebuilding process is initially executed on the share location. In some embodiments, administrative permissions to read and write to the share location may be required for the rebuilding process to be executed on the share location.

As will be described below with respect to FIG. 62, in some embodiments the share locations that are in the process of being rebuilt may be marked as being in a "critical rebuilding state". This critical rebuilding state may indicate to the journaling service that certain failed operations should be logged. These operations may be at the file level, block level, bit level, or any suitable level of file granularity. In some embodiments, step 6150 may be optional. Process 6100 then proceeds to step 6160. At step 6160, the journaling service may resume maintaining a journaling queue for the share location that was rebuilt at step 6150. In some embodiments, step 6150 may be optional. Process 6100 may then end.

If the journaling service determines that the maximum failure count for a particular share location is not exceeded at step 6130, process 6100 may proceed to step 6170. At step 6170, the journaling service may continue to log failed operations for the particular share location. Process 6100 then ends.

In some embodiments, process 6100 may use a maximum timeout in addition to the maximum failure count at steps 6110, 6120, and 6130 in order to determine whether a share location is in a catastrophic failure state. In some embodiments, the maximum timeout may be preconfigured amount of time that a particular share location can remain offline before the share location is marked as being in a catastrophic failure state. The catastrophic failure state may indicate to the journaling service that all read and write operations to the share should be refused until the share is restored or in the process of being restored. In some embodiments, the share may be restored according to the rebuild process described with respect to step 6150. In other embodiments, the share location may be restored by an administrator of the journaling service by manually restoring the share location. For example, an administrator of the journaling service may replace or remap the data storage facility associated with the share location.

In some embodiments, the journaling service may log a critical rebuilding state for a share location that is in the process of being rebuilt. In some embodiments, the journaling service may log a critical rebuilding state for a particular share location as soon as the rebuilding process begins. In some embodiments, this rebuilding process may be similar to that described with respect to step 6150 of FIG. 61. As will be described below with respect to FIG. 62, this critical rebuilding state may indicate to the journaling service that it should log failed operations for files that have already been restored in the share location that is being rebuilt.

Figure 62:
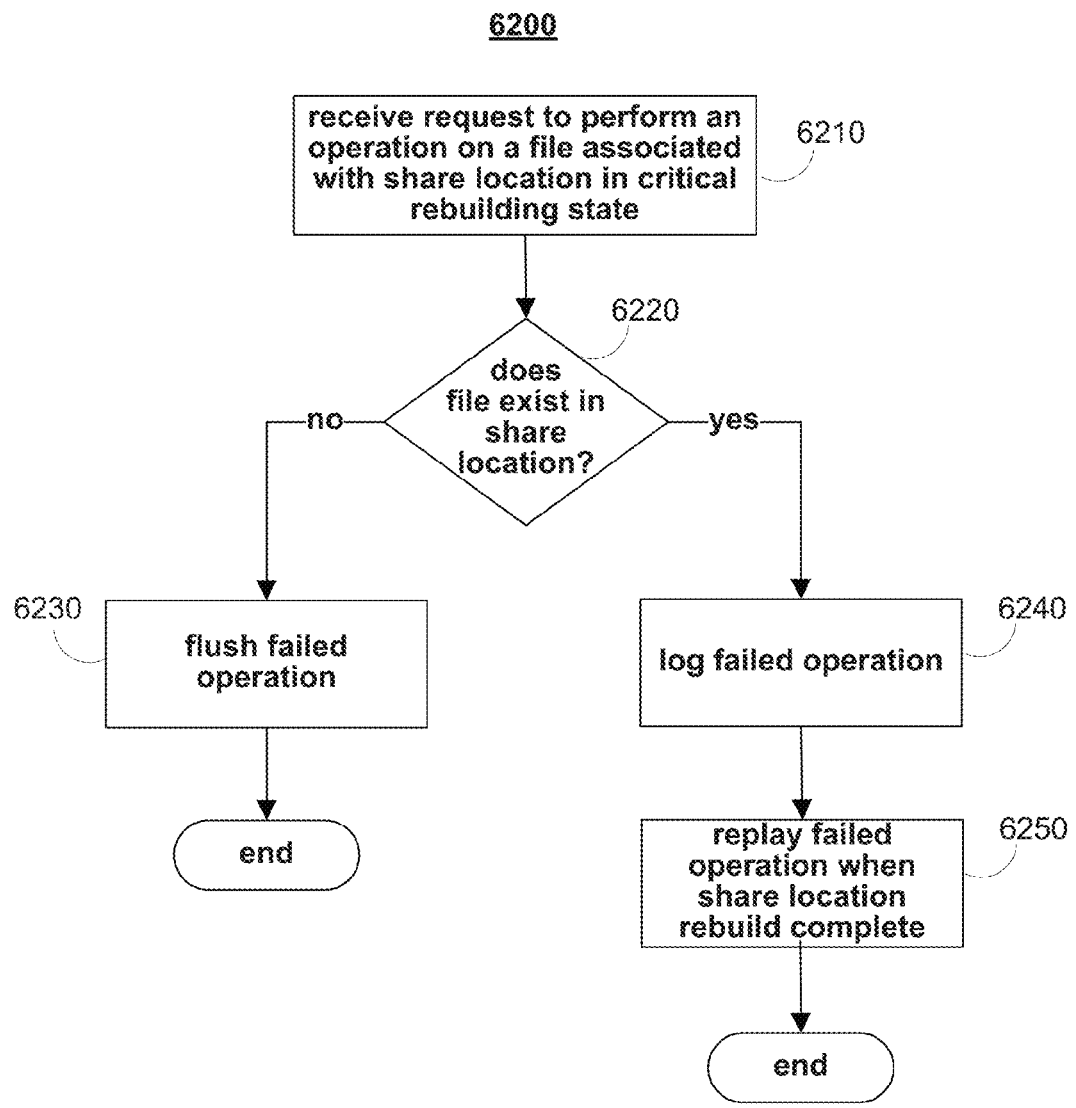
FIG. 62 is an illustrative process for operating a journaling service using a critical rebuilding state in an embodiment of the present invention.

FIG. 62 is an illustrative process 6200 for operating a journaling service using a critical rebuilding state in an embodiment of the present invention. While process 6200 is described as operating on the file level, it will be recognized that the journaling service may execute process 6200 at any suitable level of granularity, such as at the block level or bit level. Process 6200 begins at step 6210. At step 6210, the journaling service receives a request to perform a data storage operation on a file associated with a share location that is in a critical rebuilding state. In some embodiments, this data storage operation may be a read or write request on the file. Because the share location is in a critical rebuilding state, the read or write request for the share location will fail. For example, the journaling service may receive a request to write to a file that contains a slideshow presentation. Shares of data associated with the file containing the slideshow presentation may be stored in a share location that is being rebuilt and is in a critical rebuilding state, as well as three other share locations that are in an online state. The request to write to the file will fail with respect to the share location that is in a critical rebuilding state, but succeed with respect to the share locations that are in an online state. Process 6200 proceeds to step 6220.

At step 6220, the journaling service determines whether the file exists in the share location that is in a critical rebuilding state. In some embodiments, the journaling service may maintain a list of files that have been restored in the share location that is in a critical rebuilding state. If the file associated with the data storage operation is on the list, the journaling service may determine that the file exists in the share location. Process 6200 then proceeds to step 6240. At step 6240, the journaling service logs the data storage operation, such as a read or write request, which failed at step 6210. In some embodiments, this failed operation may be stored in a journaling queue similar to that described with respect to process 5900 of FIG. 59. Process 6200 then proceeds to step 6250. At step 6250, the journaling service replays the failed operation once the rebuild process is complete. In some embodiments, the journaling service may be informed that the rebuild process is complete with respect to a share location when all of the files associated with the share location are restored. When all files associated with the share location are restored, the share location may be marked as being available for data storage operations (i.e., is in an online state). In this manner, the critical rebuilding status allows the journaling service to continue to maintain the health of the file system while one or more share locations in the file system are being rebuilt. Process 6200 then ends.

If the journaling service determines at step 6220 that the file from the request to perform an operation at step 6210 does not exist (i.e., has not yet been restored) at the share location that is being rebuilt, process 6200 proceeds to step 6230. At step 6230, the operation which failed at step 6210 is discarded by the journaling service. In some embodiments, the journaling service may discard these failed operations by not writing them to the journaling queue associated with the share location that is in a critical rebuilding state. In such embodiments, the journaling service may rely on the operation on the file being successful with respect to other data stores associated with the journaling service. For example, an update to a file containing a slideshow presentation may be discarded with respect to a share location that is in a critical rebuilding state and has not yet restored the file containing the slideshow presentation. However, the update operation may be successful with respect to three other share locations which are in an online state and contain the file. Process 6200 then ends.

Figure 63:
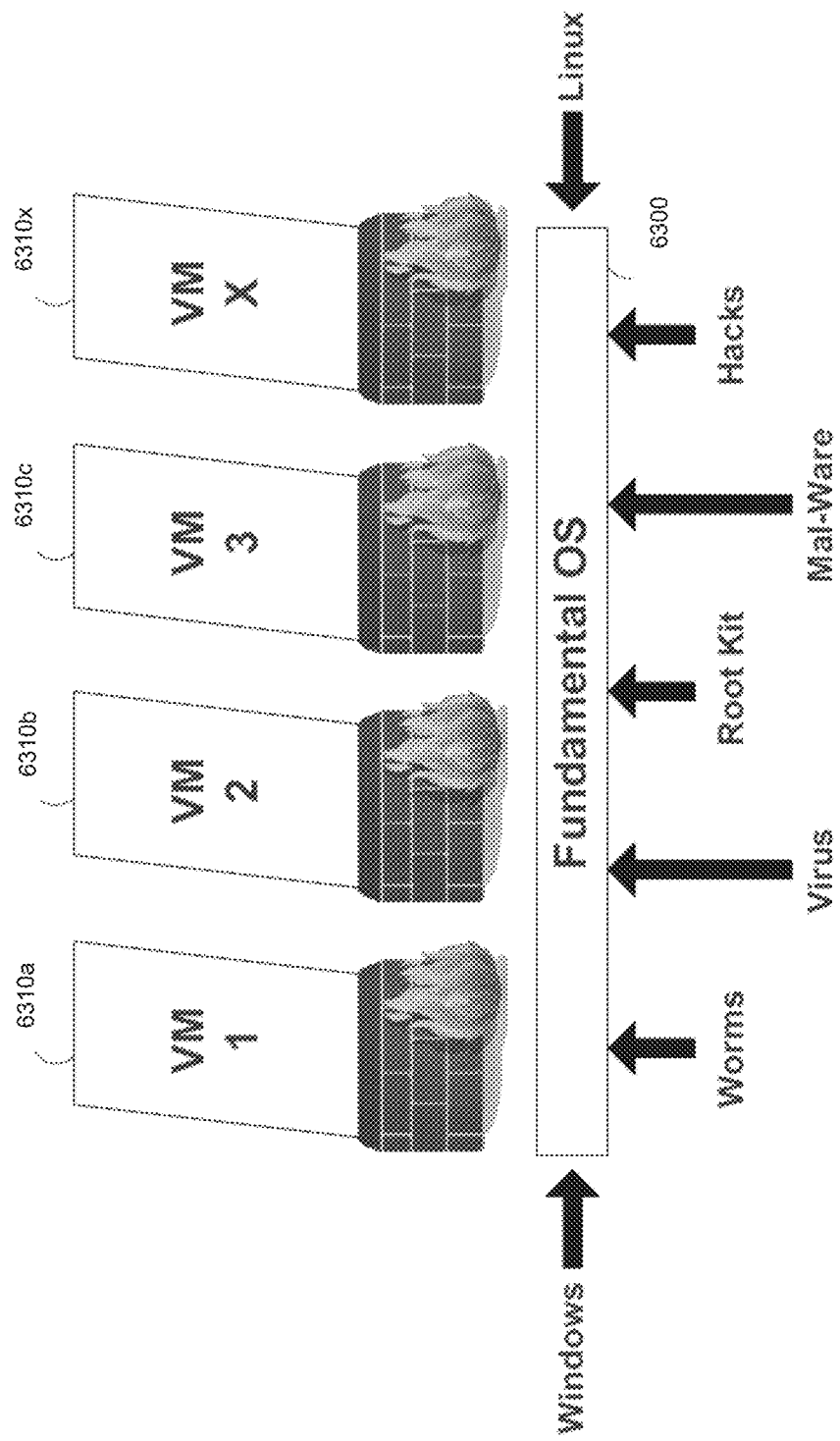
FIG. 63 is a block diagram of an illustrative arrangement in which the secure data parser is used to secure access using virtual machines in accordance with one embodiment of the present invention.

In accordance with another embodiment, a secure data parser may be used to secure data access using virtual machines. A hypervisor, also referred to as a virtual machine monitor (VMM) is a computer system that allows multiple virtual machines to run on a single host computer. FIG. 63 shows an illustrative block diagram including hypervisor 6300 and a series of virtual machines 6310 running on hypervisor 6300. Hypervisor 6300 runs a fundamental operating system (e.g., Microsoft Windows® or Linux). Virtual machines 6310 may be firewalled off from the fundamental operating system such that attacks (e.g., viruses, worms, hacks, etc.) on the fundamental operating system do not affect virtual machines 6310. One or more secure data parsers may be integrated with hypervisor 6300 to secure virtual machines 6310. In particular, using the secure data parser, virtual machines 6310 may securely communicate with one or more servers or end users. In accordance with this embodiment, secure data access may be deployed to users by providing the users with secure virtual machine images. This embodiment may allow for on demand information sharing while assuring confidentiality and integrity of the data.

Figure 64:
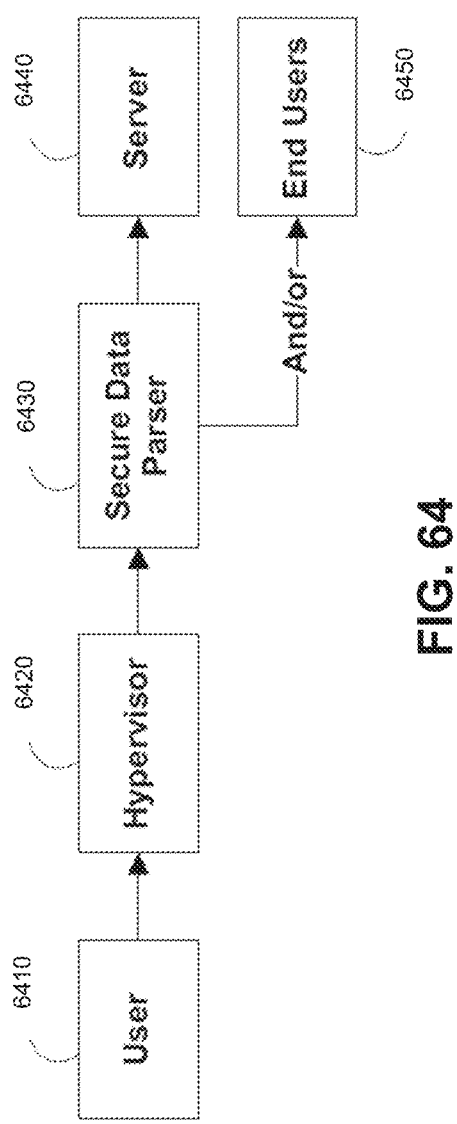
FIGS. 64 and 65 show block diagrams of alternative illustrative arrangements for securing access using virtual machines in accordance with embodiments of the present invention.
Figure 65:
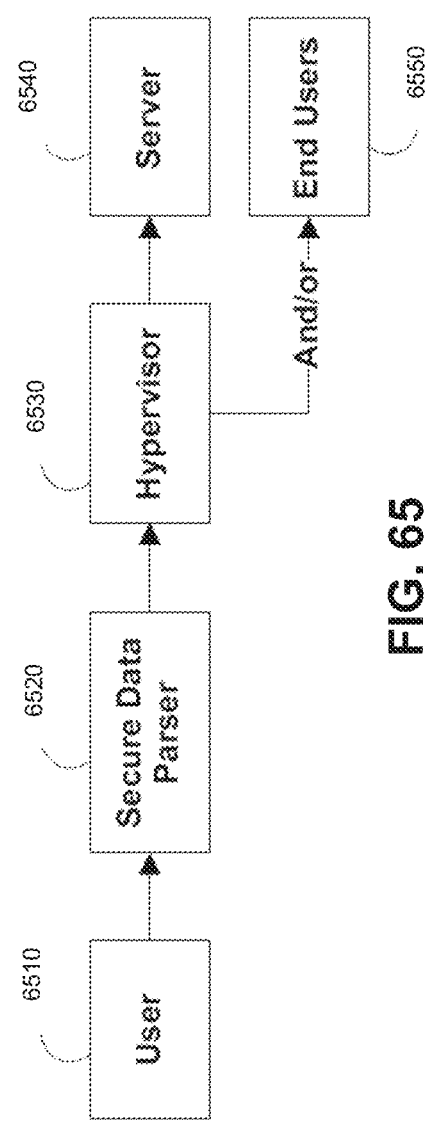

FIGS. 64 and 65 show alternative embodiments for integrating a secure data parser with a hypervisor. In FIG. 64, secure data parser 6430 is implemented above hypervisor 6420. For example, secure data parser 6430 may be implemented as a software application or module operating on hypervisor 6420. In some embodiments, secure data parser 6430 may be implemented by a virtual machine running on hypervisor 6420. A virtual machine running on hypervisor 6420 may securely couple to server 6440 and end users 6465 using secure data parser 6430. In FIG. 65, secure data parser 6530 is implemented below hypervisor 6520. For example, secure data parser 6530 may be implemented within the hardware of hypervisor 6520. The virtual machine running on hypervisor 6520 may securely communicate with server 6540 and end users 6565 using secure data parser 6530.

Figure 66:
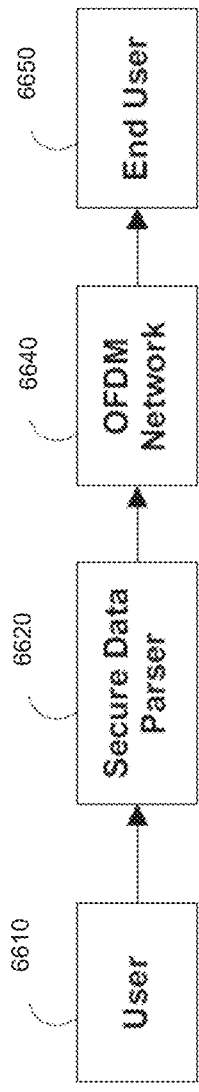
FIG. 66 is a block diagram of an illustrative arrangement in which the secure data parser is used to secure orthogonal frequency-division multiplexing (OFDM) networks in accordance with one embodiment of the present invention.

In accordance with another embodiment, the secure data parser may be used to secure orthogonal division multiplexing (OFDM) communications channels. OFDM is a multiplexing scheme that is used for wideband digital communication. Broadband wireless standards (e.g., WiMAX and LTE) and broadband over power line (BPL) use OFDM. OFDM is unique because all adjacent channels are truly orthogonal. This eliminates crosstalk, cancellation, and induction of noise. Currently, in these OFDM standards, data is transmitted across a single OFDM communications channel. The secure data parser may secure OFDM communications by splitting data amongst multiple OFDM communications channels. As described above, splitting data amongst multiple data channels using the secure data parser secures the data because only a portion of the data is transmitted over each channel. As an additional benefit, the secure data parser may simultaneously transmit multiple data portions on multiple data channels. These simultaneous transmissions may increase the effective bandwidth of the data transmission. Additionally or alternatively, the secure data parser may transmit the same data portions on multiple data channels. This redundant transmission technique may increase transmission reliability. FIG. 66 is an illustrative block diagram for securing an OFDM communications network. As illustrated in FIG. 66 end user 6610 may use secure data parser 6620 to send data over OFDM network 6640 to end user 6650. OFDM network 6640 may be a broadband over wireless network, a broadband over power line network, or any other suitable OFDM network.

Figure 67:
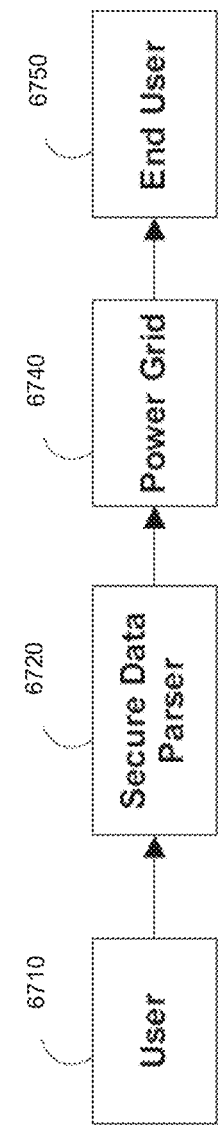
FIG. 67 is a block diagram of an illustrative arrangement in which the secure data parser is used to secure the power grid in accordance with one embodiment of the present invention.

In accordance with some other embodiments, the secure data parser may be used to protect critical infrastructure controls including, for example, the power grid. Internet Protocol version 6 (IPv6) is the next-generation Internet Protocol. IPv6 has a larger address space than the current Internet Protocol. When implemented, IPv6 will allow more devices to be directly accessed over the Internet. It is important that the controls of critical infrastructure be restricted to limit access to authorized individuals. As described above, the secure data parser may limit access to network resources to authorized users and groups. Critical systems may be protected using the "two man rule" whereby at least two users would need to provide their respective keys to access the critical systems. FIG. 67 is an illustrative block diagram for securing the power grid. As illustrated in FIG. 67 user 67210 may use secure data parser 6720 to provide secure access to power grid 6740 for end user end user 6750.

In some embodiments, power grid systems may be coupled to the Internet using broadband over power line networks to eliminate network cabling and associated equipment of typical communications networks. Coupling power grid systems to the Internet may enable smart grid technologies that allow for more efficient use of power by reporting usage in real time. As another benefit, high powered computing resources and/or data storage facilities may be installed at Internet connected power monitoring facilities. These resources may provide reliable storage and processing nodes for protecting data in the cloud.

Data storage applications typically store data in one or more of locally attached memories (e.g., a personal computer, a USB drive, a SCSI drive, an external hard drive), networked storage devices (e.g., a mounted network drive, a shared server, a Samba server, a Windows file server), and cloud storage. Cloud storage may include a number of distributed remote data storage devices with varying interfaces and capabilities. Typical techniques for storing data in the cloud include a local cache of client data with which the cloud storage is synchronized. Synchronization may take place on a periodic basis or on an event-driven basis, such as in response to a file save event, a file change event, a file access event, or a file delete event. During a synchronization, the cloud data provider may examine the local cache for differences between what is stored there and what is stored in the cloud copy, and update the cloud copy accordingly. FIGS. 68-73 illustrate systems and methods for storing data in the cloud that provide improved security, resiliency and efficiency over existing cloud storage systems. These systems and methods may be integrated with any of the techniques and applications described herein, including the secure data parser functionality and journaling service discussed above.

Figure 68:
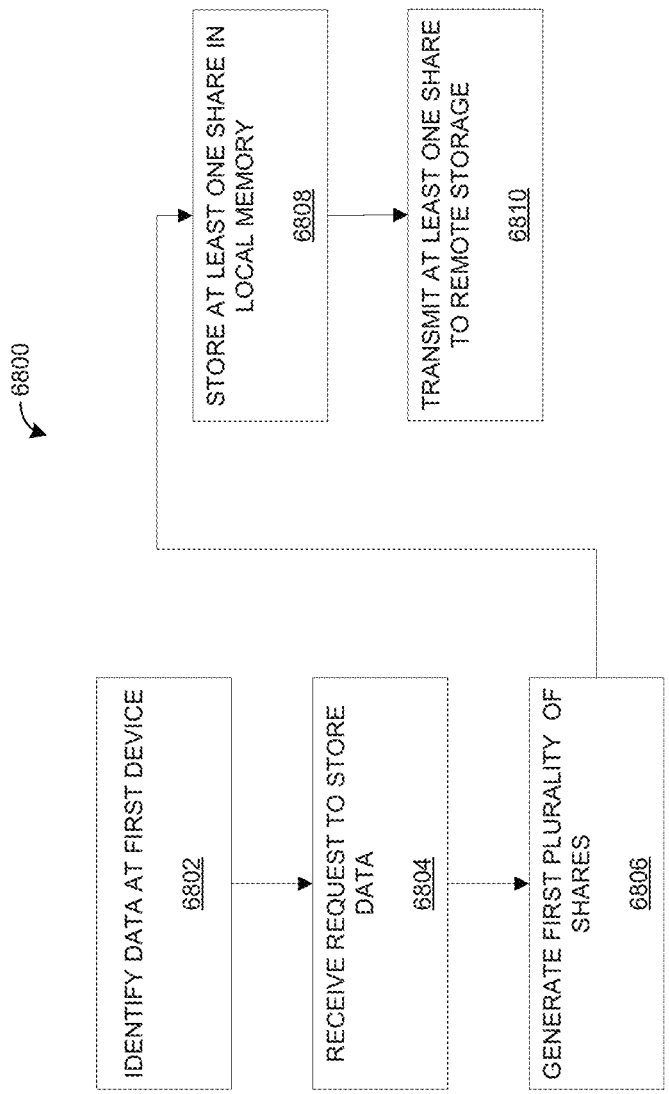
FIG. 68 is a flow diagram of a process for transmitting data to at least one remote storage system in accordance with one embodiment of the present invention.

FIG. 68 is a process flow diagram 6800 of a process for transmitting data to at least one remote storage system. The steps of flow diagram 6800 are shown as proceeding sequentially for ease of explanation; the steps may be performed in any order, and may be performed in parallel. These steps may be performed by any one or more computer chips, processors, accelerators, blades, platforms or other processing or computing environments. At step 6802, a data set may be identified at a first device. In some implementations, the first device may identify the data set by receiving the data set at an input/output interface. The input/output interface may include a user input device (such as a keyboard, mouse, trackball, touchpad, or other user input device), a peripheral device interface (such as a USB port, a SCSI port, a Firewire port, a parallel port, a serial port, an optical port, or other port), a data interface (such as an Ethernet connection, a wireless data connection, a data feed, or other data interface), a software interface, a virtual partition interface, or any combination thereof. The data may be text, graphic, video, computer code, executable applications, or any other data represented in electronic form. At step 6804, a request may be received to store the data in a storage location. The request may come from a user or may be issued by an application or operating system. The request may be a request for long-term storage (e.g., in a hard drive) or short-term storage (e.g., in a buffer). For example, the request may be an instruction to save the data. The storage location may be a locally attached disk, a networked storage device, a cloud storage location, or a combination of locations. For example, the request may indicate that a data file is to be stored in a laptop's local directory, and be backed up in cloud storage. In another example, the request may indicate that a data file is to be uploaded to a web server.

At step 6806, a first plurality of shares may be generated from the data file. Each of the first plurality of shares may contain a distribution of data from the data set. Shares may be generated at step 6806 by any of the share generation techniques described herein, including parsing at the bit level, or any information dispersal algorithm. In some implementations, the data set may be encrypted before or after the first plurality of shares is generated at step 6806. Any of the encryption techniques described herein, or any technique otherwise known, may be used. For example, the data set may be encrypted by applying a key encryption technique with a workgroup key, as described above. In some implementations, access to a threshold number of the first plurality of shares may be necessary to restore the data set. In some implementations, access to the key may also be necessary. By generating shares of a data from a data set (and optionally encrypting those shares), the process of FIG. 68 improves the security of cloud data storage by making it more difficult to intercept usable data during transmission to the cloud and during storage in the cloud.

At step 6808, the data may be stored in a local memory. The local memory may be long-term storage or short-term storage. The local memory may be configured for backup in the at least one remote storage system, such that data stored in the local memory is backed-up in the at least one remote storage system on a periodic or event-driven basis. The local memory may be selected for storing the at least one of the first plurality of shares (e.g., by a user, an administrator, or an application), and may include a selected folder. In some implementations, the first plurality of shares includes a first portion and a second portion. The first portion may be stored in a first local memory area (e.g., a folder or other memory area) and a second portion may be stored in a second local memory area. The first local memory area may be configured for backup in a first remote storage system and the second local memory area may be configured for backup in a second remote storage system. Implementations with multiple remote storage systems are described in additional detail below.

At step 6810, at least one share of the first plurality of shares is transmitted, over a network link, for storage in at least one remote storage system. The network link may be a wired or wireless network link, or any combination of links. In some implementations, step 6810 includes synchronizing the data stored in the local memory with the data stored in the at least one remote storage system. This synchronization may occur according to any proprietary synchronization protocol implemented by any cloud storage or remote storage provider. For example, synchronizing the data may include identifying each write operation made to the local memory and mirroring that operation to the at least one remote storage device, as described above for the journaling service. In some implementations, the synchronization between the local memory and the remote storage takes place according to, for example, the journaling service protocols described herein. The at least one remote storage system may include cloud storage, such as the storage systems offered by commercial providers such as Dropbox, Zumo, Syncplicity, Mesh, SugarSync, SkyDrive, Box, and Memopal, among others.

FIG. 69 illustrates a system 6900 that may be configured to implement the process of FIG. 68. System 6900 includes input/output interface 6902, through which data may be transmitted, as well as local memory 6904. Both input/output interface 6902 and local memory 6904 may be included in client side 6906 of system 6900; for example, input/output interface 6902 and local memory 6904 may be components in a personal computer. On remote side 6908, the data stored in local memory 6904 may be replicated in cloud file 6910. For example, the data in cloud file 6910 may be one or more of the plurality of shares transmitted over a network link at step 6810 of FIG. 68.

In some implementations, transmitting at least one share of the first plurality of shares at step 6810 of FIG. 68 includes processing the at least one share to generate at least one computer instruction that is recognizable by the at least one remote storage system. For example, the data to be stored in the remote storage system may be preceded by one or more API calls that provide instructions to the remote storage system. In some implementations, the computer instructions include journaling operations, as described above.

More than one remote storage system may receive shares of data at step 6810 of FIG. 68. For example, two or more remote storage systems may receive shares. These two or more remote systems may have different proprietary interface protocols, each requiring its own set of commands for storage and retrieval operations. An instruction intended for the first remote storage system may not be recognizable by the second remote storage system. Thus, prior to or during transmission, step 6810 may include processing the at least one share to generate at least one first computer instruction that is recognizable by a first remote storage system and generating at least one second computer instruction that is recognizable by a second remote storage system.

FIG. 70 illustrates a system 7000 that may be configured to implement the process of FIG. 68, including storing data in more than one remote storage system. System 7000 includes input/output interface 7002, through which data may be transmitted, as well as four local memories 7004a, 7004b, 7004c and 7004d. System 7000 also includes a security engine 7012, which may generate a plurality of shares based on a data set transmitted through input/output interface 7002, and distribute those shares to local folder memories 7004a, 7004b, 7004c and 7004d. Input/output interface 7002, security engine 7012 and local folder memories 7004a, 7004b, 7004c and 7004d may be included in client side 7006 of the system 7000, and may be distributed over multiple devices. Client side 7006 may further include compatibility interface 7014, which generates the proper instructions to accompany the data stored in local memories 7004c and 7004d in order for them to be properly replicated in cloud files 7010c and 7010d, respectively. In particular, cloud files 7010c and 7010d may be maintained by different cloud storage providers, or may be different partitions, devices or virtual devices within a cloud storage environment, and may use distinct protocols for communication between storage applications on client side 7006 and cloud files 7010c and 7010d. In order to store different shares with different storage providers, compatibility interface 7014 may be configured to detect the storage destination of a particular share or shares and transmit that share or shares with computer instructions recognized by the destination storage provider. This may enable efficient distribution of shares between storage providers without manual client intervention.

Figure 71:
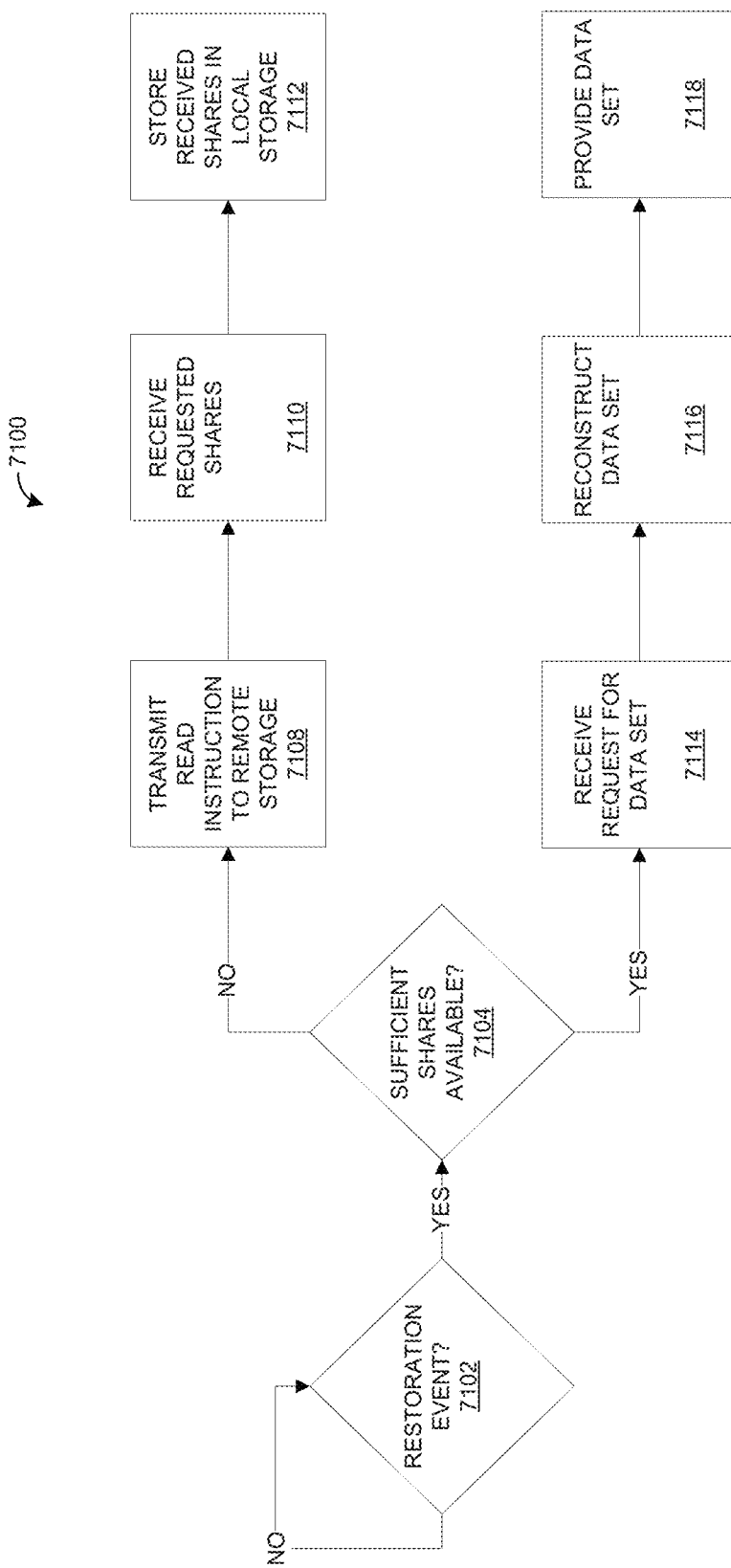
FIG. 71 is a flow diagram of a process for improving data availability in accordance with one embodiment of the present invention.

Information dispersal techniques may also be used with cloud data storage to reduce the local storage burden while maintaining data availability FIG. 71 is a process flow diagram 7100 of a process for improving data availability in systems in which a copy of each share may not be stored in a local memory. The steps of flow diagram 7100 are shown as proceeding in a particular sequence for ease of explanation; the steps may be performed in any order, and may be performed in parallel. These steps may be performed by any one or more computer chips, processors, accelerators, blades, platforms or other processing or computing environments. At step 7104, a determination may be made as to whether a restoration event has occurred. A restoration event may indicate that a data set has been or may be needed and may trigger restoration of that data set from data dispersed between different shares via an information dispersal algorithm. In some implementations, a restoration event may include a request for the data set from a client, application or operating system. In some implementations, a restoration event occurs periodically (e.g., every twelve hours) at an interval that may be set, for example, by a client. In some implementations, a restoration event may occur when a failure is detected at one or more remote storage systems or one or more local storage locations.

As described in detail above, some information dispersal algorithms may require that M of N shares be collected in order to restore a data set. If a restoration event has occurred, process 7100 proceeds to step 7104 to determine whether a sufficient number of shares of data are available to a client device in order for the client device to reconstruct a data set from the available shares of data. If an insufficient number of shares are available, process 7100 may proceed to step 7108 and may transmit at least one read instruction to at least one remote storage system. The read instruction may request one or more additional shares of data. In some implementations, the read instruction may be generated as a journaling operation. For example, the read instruction may be included in one or more logs maintained by the journaling service that otherwise record each of the read and write requests to the share locations. As discussed above, the log may be a queue data structure that stores information associated with data storage operations, such as read and write operations, associated with a particular share location, and may also store one or more read instructions indicative of a request to retrieve one or more shares associated with the particular share location from a remote storage system. When the journaling service replays data storage operations stored in the journaling queue for a share location, the journaling service may respond to the read instruction by providing the one or more shares associated with the share location to the appropriate device. In some implementations, the read instruction may be tagged with the identity of the requesting device.

At step 7110, the requested one or more additional shares of data may be received. The received shares may be stored in a storage device local to the client device at step 7112. When a sufficient number of shares are available (either initially or after additional shares have been received), process 7100 proceeds to step 7114 and receives a request for the data set. The request for the data set may be included in the restoration event of step 7102, or may be a separate request. For example, the restoration event may indicate that a client has launched an application that relies on a set of configuration files, but a request for any one of those files may not be received until the client activates a particular function within that application. At step 7116, the data set is reconstructed from at least some of the available shares, and at step 7118, the data set is provided in response to the request. In some implementations, shares may be cleared from a storage local to the client device at predetermined intervals, or when available storage becomes low.

FIGS. 72A and 72B illustrate a system 7200 that may be configured to implement the process of FIG. 71, including storing data in more than one remote storage system and retrieving data in response to a restoration event. System 7200 may include input/output interface 7202 (a hardware or software interface through which data may be transmitted), as well as two local memories 7204*a* and 7204*b*. System 7200 may also include security engine 7212, which may generate a plurality of shares based on a data set transmitted through input/output interface 7202, and distribute those shares to local memories 7204*a* and 7204*b* and cloud files 7210*c* and 7210*d*. Cloud files 7210*c* and 7210*d* may be maintained by different cloud storage providers, or may be different partitions, devices or virtual devices within a cloud storage environment. System 7200 may not maintain a local memory replica of the data stored in cloud files 7210*c* and 7210*d*. Client side 7206 may include compatibility interface 7214, which may generate the proper instructions to accompany the data transmitted to cloud files 7210*c* and 7210*d*, and may further include conditional layer 7216. Conditional layer 7216 may be configured to evaluate whether sufficient shares are available to client side 7206 in order to reconstruct one or more data sets of interest, and if not, to trigger a read operation (such as a journaling read operation) to retrieve additional shares from remote storage. For example, as shown in FIG. 72A, when the number of shares stored in local memories 7204*a* and 7204*b* are insufficient to reconstruct a data set of interest, conditional layer 7216 queries cloud files 7210*c* and 7210*d* (through compatibility interface 7214) to determine whether the cloud files contain additional shares. If the cloud files do contain additional shares, conditional layer 7216 transmits a read operation (such as a journaling read operation) to the cloud data storage providers that maintain cloud files 7210*c* and 7210*d*, receives the requested shares, and stores those shares in local memories 7204*c* and 7204*d*, as shown in FIG. 72B.

Although some applications of the secure data parser are described above, it should be clearly understood that the present invention may be integrated with any network application in order to increase security, fault-tolerance, anonymity, or any suitable combination of the foregoing. For example, the cloud storage systems and methods described herein may be used in conjunction with an information dispersal algorithms described herein (e.g., those performed by the secure data parser) or any other information dispersal algorithm that generates shares of data.

Additionally, other combinations, additions, substitutions and modifications will be apparent to the skilled artisan in view of the disclosure herein.

What is claimed is:

1. A computer-implemented method of transmitting data to at least one remote storage system, comprising:
   identifying a data set at a first device;
   receiving a request to store the data set in a storage location;
   generating a first plurality of shares, wherein each of the first plurality of shares contains a distribution of data from the data set;
   storing at least one of the first plurality of shares in a local memory in response to receiving the request, wherein the local memory is configured for backup in the at least one remote storage system comprising a first remote storage system and a second remote storage system;
   generating at least one first computer instruction that is recognizable by the first remote storage system as an instruction to store a first portion of the first plurality of shares and generating at least one second computer instruction that is recognizable by the second remote storage system as an instruction to store a second portion of the first plurality of shares, wherein the first portion is stored in a first local memory area and the second portion is stored in a second local memory area, the first local memory area configured for backup in the first remote storage system and the second local memory area configured for backup in the second remote storage system; and
   transmitting, over a network, at least one share of the first plurality of shares for storage in the at least one remote storage system.

2. The method of claim 1, wherein the local memory includes a folder selected for storing the at least one of the first plurality of shares.

3. The method of claim 1, wherein the request comprises a save instruction.

4. The method of claim 1, wherein transmitting at least one share of the first plurality of shares comprises synchronizing the data stored in the local memory with data stored in the at least one remote storage system.

5. The method of claim 4, wherein synchronizing the data stored in the local memory with data stored in the at least one remote storage system comprises mirroring, to the at least one remote storage device, each write operation to the local memory.

6. The method of claim 1, wherein the at least one computer instruction comprises an API call.

7. The method of claim 1, wherein the first and second portions comprise different portions of the first plurality of shares.

8. The method of claim 1, wherein the at least one first computer instruction is not recognizable by the second remote storage system.

9. The method of claim 1, wherein the at least one remote storage system comprises cloud storage.

10. The method of claim 1, further comprising encrypting the data.

11. A system for transmitting data to at least one remote storage system, comprising:
    a processor;
    a memory accessible to the processor; and
    a network interface accessible to the processor;

wherein the processor is configured to:
identify a data set;
receive a request to store the data set in a storage location;
generate a first plurality of shares, wherein each of the first plurality of shares contains a distribution of data from the data set;
store at least one of the first plurality of shares in the data set in the memory in response to receiving the request, wherein the memory is configured for backup in the at least one remote storage system comprising a first remote storage system and a second remote storage system;
generate at least one first computer instruction that is recognizable by the first remote storage system as an instruction to store a first portion of the first plurality of shares and generate at least one second computer instruction that is recognizable by the second remote storage system as an instruction to store a second portion of the first plurality of shares, wherein the first portion is stored in a first local memory area and the second portion is stored in a second local memory area, the first local memory area configured for backup in the first remote storage system and the second local memory area configured for backup in the second remote storage system; and
transmit, through the network interface, at least one share of the first plurality of shares for storage in the at least one remote storage system.

12. The system of claim 11, wherein the local memory includes a folder selected for storing the at least one of the first plurality of shares.

13. The system of claim 11, wherein the request comprises a save instruction.

14. The system of claim 13, wherein the processor is further configured to synchronize the data stored in the local memory with data stored in the at least one remote storage system.

15. The system of claim 14, wherein synchronizing the data stored in the local memory with data stored in the at least one remote storage system comprises mirroring, to the at least one remote storage device, each write operation to the memory.

16. The system of claim 11, wherein the at least one remote storage system comprises cloud storage.

17. The system of claim 11, wherein the at least one first computer instruction comprises an API call.

18. The system of claim 11, wherein the at least one first computer instruction is not recognizable by the second remote storage system.

* * * * *